United States Patent [19]
Hayashida et al.

[11] Patent Number: 6,067,502
[45] Date of Patent: May 23, 2000

[54] DEVICE FOR DISPLAYING MAP

[75] Inventors: Kihachi Hayashida; Takeshi Yanagikubo; Chihiro Hayashi, all of Anjo, Japan

[73] Assignee: Aisin AW Co., Ltd., Japan

[21] Appl. No.: 08/916,131

[22] Filed: Aug. 21, 1997

[30] Foreign Application Priority Data

| Aug. 21, 1996 | [JP] | Japan | 8-239795 |
| Sep. 7, 1996 | [JP] | Japan | 8-257847 |
| Oct. 1, 1996 | [JP] | Japan | 8-261075 |
| Oct. 11, 1996 | [JP] | Japan | 8-289246 |
| Oct. 15, 1996 | [JP] | Japan | 8-272009 |

[51] Int. Cl.$^7$ ................................................. G09B 29/10
[52] U.S. Cl. ........................ 701/209; 701/211; 701/212; 340/990; 340/995
[58] Field of Search ................................. 701/208, 209, 701/201, 210, 211, 212; 340/990, 995

[56] References Cited

U.S. PATENT DOCUMENTS

| 4,675,676 | 6/1987 | Takanebe et al. | 340/995 |
| 5,398,188 | 3/1995 | Maruyama | 701/208 |
| 5,729,109 | 3/1998 | Kaneko et al. | 318/587 |
| 5,731,979 | 3/1998 | Yano et al. | 701/211 |
| 5,748,109 | 5/1998 | Kosaka et al. | 340/995 |
| 5,884,217 | 3/1999 | Koyanagi | 701/208 |

FOREIGN PATENT DOCUMENTS 4-335390  11/1992  Japan .

*Primary Examiner*—Tan Nguyen
*Attorney, Agent, or Firm*—Lorusso & Loud

[57] ABSTRACT

A navigation system has a display screen which can be divided into a plurality of windows for simultaneously displaying different classifications of routes in the same scale, or different routes from a present position or starting point to a destination or return to a route from which a car has deviated.

43 Claims, 58 Drawing Sheets

FIG. 2

| | |
|---|---|
| MAP DATA FILE | F1 |
| INSC. DATA FILE | F2 |
| NODE DATA FILE | F3 |
| ROAD DATA FILE | F4 |
| PHOTO DATA FILE | F5 |
| DES. DATA FILE | F6 |
| GUIDE POINT DATA FILE | F7 |
| DETAILED DES. DATA FILE | F8 |
| ROAD NAME DATA FILE | F9 |
| BRANCH POINT NAME DATA FILE | F10 |
| ADDRESS DATA FILE | F11 |
| DATA FILE OF A LIST OF TOLL No.S AND LOCAL OFFICE No.S | F12 |
| REGISTERED TELEPHONE No. DATA FILE | F13 |
| LANDMARK DATA FILE | F14 |
| POINT DATA FILE | F15 |
| FACILITY DATA FILE | F16 |

50

F I G. 18
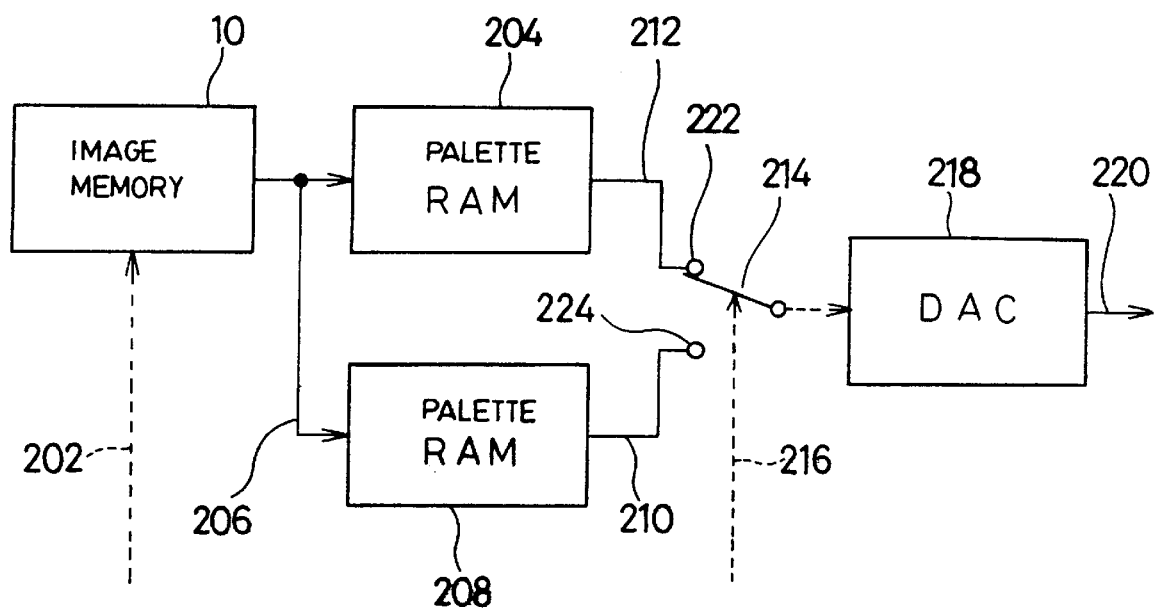

FIG. 58

POSTAL CODE No. SELECTION DATA 50

| | No. OF POSTAL CODE NUMBERS  PC (n) |
|---|---|
| 1 | POSTAL CODE No.  PCN |
| | STREET ADDRESS LA, SIZE LD |
| | FACILITY GENRE LIST ADDRESS NA, SIZE ND |
| | EAST LONGITUDE COORDINATE PEO OF A REPRESENTATIVE POINT |
| | NORTH LATITUDE COORDINATE PNO OF A REPRESENTATIVE POINT |
| | AREA SHAPE DATA ADDRESS EA, SIZE ED |
| ⋮ | ⋮ |
| n | POSTAL CODE No.  PCN |
| | STREET ADDRESS LA, SIZE LD |
| | FACILITY GENRE LIST ADDRESS NA, SIZE ND |
| | EAST LONGITUDE COORDINATE PEO OF A REPRESENTATIVE POINT |
| | NORTH LATITUDE COORDINATE PNO OF A REPRESENTATIVE POINT |
| | AREA SHAPE DATA ADDRESS EA, SIZE ED |

FIG. 59

STREET LIST DATA 55

| | No. OF STREETS SS(m) |
|---|---|
| 1 | STREET NAME SSN |
| | EAST LONGITUDE COORDINATE SEO OF A REPRESENTATIVE POINT |
| | NORTH LATITUDE COORDINATE SNO OF A REPRESENTATIVE POINT |
| | SHAPE DATA ADDRESS SEA, SIZE SED |
| ⋮ | ⋮ |
| m | STREET NAME SSN |
| | EAST LONGITUDE COORDINATE SEO OF A REPRESENTATIVE POINT |
| | NORTH LATITUDE COORDINATE SNO OF A REPRESENTATIVE POINT |
| | SHAPE DATA ADDRESS SEA, SIZE SED |

FIG. 60

FACILITY GENRE LIST DATA 60

| | No. OF FACILITY GENRES NC(k) |
|---|---|
| 1 | FACILITY GENRE NAME NM |
| | FACILITY LIST ADDRESS NLA, SIZE NLD |
| 2 | FACILITY GENRE NAME NM |
| | FACILITY LIST ADDRESS NLA, SIZE NLD |
| ⋮ | ⋮ |
| k | FACILITY GENRE NAME NM |
| | FACILITY LIST ADDRESS NLA, SIZE NLD |

FIG. 61

ST. SHAPE DATA    65

| | |
|---|---|
| | No. OF NODE ES (t) |
| 1 | EAST LONGITUDE   EEO |
| | NORTH LATITUDE   ENO |
| | ADDRESS   ENO |
| ⋮ | ⋮ |
| t | EAST LONGITUDE   EEO |
| | NORTH LATITUDE   ENO |
| | ADDRESS   ENO |

FIG. 62

FACILITY LIST DATA 70

| | |
|---|---|
| | No. OF FACILITIES  IS(u) |
| 1 | FACILITY NAME  IM |
| | EAST LONGITUDE COORDINATE  IEO |
| | NORTH LATITUDE COORDINATE  INO |
| | ADDRESS  IB |
| | STREET NAME  SSN |
| ⋮ | ⋮ |
| u | FACILITY NAME  IM |
| | EAST LONGITUDE COORDINATE  IEO |
| | NORTH LATITUDE COORDINATE  INO |
| | ADDRESS  IB |
| | STREET NAME  SSN |

FIG. 63

AREA SHAPE DATA 75

| | No. OF NODE ANC (v) |
|---|---|
| 1 | EAST LONGITUDE AEO |
| | NORTH LATITUDE ANO |
| 2 | EAST LONGITUDE AEO |
| | NORTH LATITUDE ANO |
| ⋮ | |
| V | EAST LONGITUDE AEO |
| | NORTH LATITUDE ANO |

DEVICE FOR DISPLAYING MAP

BACKGROUND OF THE INVENTION

1. Field of the Invention

This invention is related to a map display device to guiding and searching a movement route of a vehicle based on a map information, especially this invention is relate with the improvement of the display of the map information.

2. Description of the Related Art

A map is shown in a display at a conventional map display device, e.g. a conventional navigation device, a requested destination is set and a optimal guide route which links this destination and a present position of the vehicle is retrieved and is shown. Then when a route but this route are required while the vehicle is traveling this route, this another route is searched and is guided. In the search of this another route, a search cost of the road which is traveling at present is raised and the another route is re-searched by a condition which is different from a search condition of the route which is guiding at present. In this way, a road to be traveling at present is excluded and a new guide route is searched.

Also in the conventional device, when a vehicle deviates from a guide route, new route is automatically re-searched from the present position. Or when a re-search key is operated, this re-search is executed. At this conventional device, a neighborhood of a present position is searched first and a whole route is searched by a request of a user. In the search of the neighborhood, a route which returns to a previous route is searched and in a whole route searching, a whole route to the destination is searched.

SUMMARY OF THE INVENTION

In the conventional navigation device, one map is shown in a whole screen of a display device. However recently the price of the liquid crystal display declined and the screen also get widely. Therefore geographical information in a wider range is displayed, and a more detailed geographical information expands more and is shown.

However at the time of some movement condition, the geographical information in the wide range isn't necessary sometimes. For example when the vehicle (car) approaches the destination, only a geographical relation between the vehicle and the destination should be shown. The other geographical information isn't necessary. In this case a geographical information which is necessary is sufficiently displayed in a part of the screen and wasteful geographical information is shown. Further a information which isn't too necessary is sometimes shown in the screen with conventional area at the time of some movement situation.

Moreover when plural route is retrieved from a present position of the car to the destination, that each guide route is alternately displayed in one screen can not compare each route sufficiently. Each of this route isn't clearly distinguished between each other when plural guide route is displayed at once in one screen and a part of the each route overlaps.

To solve the above problem, in this invention, a screen which displays a map is divided into more than one, according to a traveling condition of the car, a simple map which shows geographical relation between a present position of the car and a destination is shown in a 1st screen, detailed map information is shown in a 2nd screen. Therefore a seeing person can know a direction of the destination immediately and can also know detailed geographical information around the present position of the car at the same time.

Also when the car approaches a right or left turning point, a geographical information of the right or left turning point on the identified route is shown in the 1st screen. Moreover at this time, a detailed map is displayed in the 2nd screen. At this detailed map, a information quantity which is displayed according to a traveling condition of the car is adjusted. Therefore the user can know a direction which the car should progress and a geographical information around the car.

Moreover a north up map, i.e. a map which above (upper) of the map is north is displayed in the 1st screen, a head up map, i.e. a map which above (upper) of the map is the direction of the progress is displayed in the 2nd screen.

Also when another route is searched at the conventional navigation device, based on this another new route, it is guided to the destination. For example this another route is searched according to a request of a user when route during traveling is congested. This another route has sometimes a very big round to a previous route and the previous route had been erased and could not compare the previous route and the another route. Further plural route which is searched by the different search condition could not be compared each other.

Moreover the another route is searched when the vehicle deviates from a route or at the time of a indication of a user, and guidance is executed by the another new route. However when another re-searched route is making a big round fairly to the previous route, the previous route had better guide. However the previous route had been erased and could not compare the previous route and the another route. Also the route by the above neighborhood searching and the route by all the range searches can not be compared, too.

Moreover it is in the case like the following, too. The car deviates from the guide route temporarily because the vehicle deviates off road of the guide route while traveling and returns to the above guide route after that. For example, it is to finish a suddenly occurring occupation or to go around a road which is crowed. However in the conventional navigation device, a mark of the car (vehicle) becomes a center of a map screen, therefore the previous guide route isn't included in the screen and sometimes the guide route isn't shown at all. In this case, a direction and a position of the previous guide route can not be immediately confirmed in the screen. Therefore it is necessary to operate for a reduced scale of the map to be made small and for the previous guide route to be displayed.

Moreover a new guide route which is re-searched when the car deviated from the guide route is not a better route than always. Rather it sometimes had better return to the previous guide route. When the present position of the car and the previous guide route aren't displayed in one screen, this return is difficult. Moreover a position of the car and a new guide route can not be compared each other.

Also when dropping in the facilities in the neighborhood while traveling the guide route, it could not be displayed a return route to this guide route in a center of the screen and a neighborhood of the car together. Moreover the information with the retrieving condition which is necessary when a destination or a dropping in place is set can be sufficiently shown in a part of a screen, a getting widely display screen isn't sufficiently utilized. Also because a screen switched over when specifying one of a retrieving condition, when wanting to see a previous specification condition, it must be returned the screen one back or be returned to a first input screen.

To solve the above problem, in this invention, the screen which displays a map is divided into more than one, when the car deviates off the guide route, the new searched route is displayed in the 1st screen and the guide route which is searched previously is shown in the 2nd screen. In the map which is displayed in this 2nd screen, a information quantity which is displayed according to a traveling condition of the car is adjusted. Therefore a direction which the car should progress and a geographical information around the car can be known together.

Also a guide route and a map around the present position of the car are displayed in the 1st screen and the map and the destination which connects with the guide route of the 1st screen are shown in the above 2nd screen. According to a traveling position of the car, a direction of a right or left turn in the guide route, a direction of the destination or information about the destination and so on are alternately shown in this 1st screen.

Moreover different guide routes from the present position of the car to the destination is displayed in the above 1st screen and the 2nd screen and is able to choose the guide routes.

Also a whole return route which returns to the guide route and a part of the guide route are shown in the 1st screen when the car deviates off the guide route. A map centered on the present position of the car or a re-searched new guide route is shown in the above 2nd screen. Further the return route of the 1st screen is displayed when guiding beginning is instructed and is shown in a maximum in a whole screen.

Moreover on the occasion of setting of a destination or a dropping in place, a result of a facility retrieving by the 1st retrieving condition is displayed in the 1st screen and a choice branch of another new retrieving condition is shown in the above 2nd screen. After this, a result of a facility extraction by a new retrieving condition is displayed in the above 2nd screen and a choice branch of this new retrieving condition is shown in the 1st screen. Therefore the retrieving condition to extract facilities and the retrieving result are shown in parallel in the divided screen.

All the ward "destination", "dropping in place" or "guidance ending point" respectively in this application papers include "destination", "dropping in place" and "guidance ending point". All the ward "present position", "start point", "dropping in place" or "guidance beginning" respectively in this application papers include "present position", "start point", "dropping in place" and "guidance beginning".

BRIEF DESCRIPTION OF THE DRAWINGS

FIG. 2 shows a data structure which is memorized in data 38c at an information memory unit 37.

FIG. 18 shows a circuit which is provided between a image memory 10 and a display 33.

FIG. 58 shows postcode choice data 50.

FIG. 59 shows contents of street list data 55.

FIG. 60 shows contents of facility genre list data 60.

FIG. 61 shows contents of street shape data 65.

FIG. 62 shows contents of facility list data 70.

FIG. 63 shows contents of area shape data 75.

Figure 1:
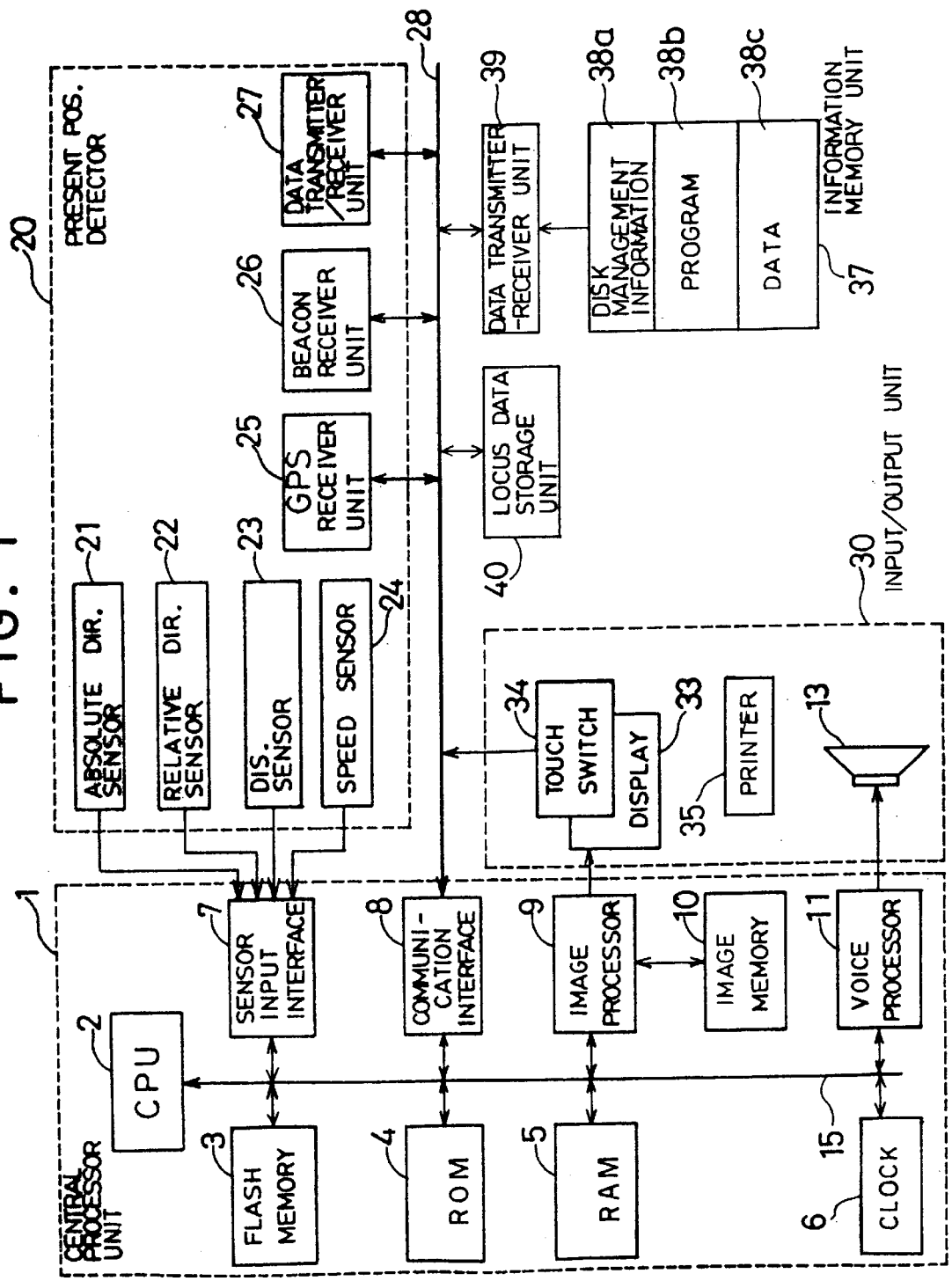
FIG. 1 shows a whole circuit of a navigation device.

PRO(S).:PROCESSING(S), DIR.:DIRECTION, DIS(S).: DISTANCE(S), DISS.:DISTANCES, CLA.: CLASSIFICATION, POS.:POSITION, No(s).:NUMBER(S), IDN.:IDENTIFIED, IND.:INDICATE, INDD.: INDICATED, INDN.:INDICATION, INSC(S).:INTERSECTION(S), INSCG.:INTERSECTING, PRED.:PREDETERMINED, PAR.:PARTICULAR, DES(S).:DESTINATION, DET.:DETERMINE, DETG.:DETERMINING, DETD.:DETERMINED, DETN.:DETERMINATION, OVE.:OVERLAPPED, PER.:PERIPHERAL, DELG.:DELETING, DEL.:DELETE, DELD.:DELETED, REPR.:REPRESENTATIVE, ST:STREET, FAC.:FACILITIES, RED.:REDUCED, CON.:CONNECTION.

DETAILED DESCRIPTION OF THE PREFERRED EMBODIMENTS

1. Summary of the Embodiments (1) When a single screen (a 1st screen) is divided (step SC4), a map of head up or a map at north up is shown in one of the screens (a 2nd screen) which were divided (Steps SC20, SC22). A present position of a car and distance to a direction, a destination of a destination etc. are shown in the other which divided screen (a 3rd screen) (step SC24). This is a simple map where necessary and minimum information is displayed. After this, an other guidance/display processing is executed (step SC18).

(2) When a single screen (a 1st screen) is divided (steps SB10, SB12), the fore route is displayed (step SB18) or the whole route of the remainder is shown (step SB22) in one of the screens (a 2nd screen) which were divided. All the wards "fore" in this application papers include "front" and "forward". A map which was displayed in a single screen (a 1st screen) before division is shown in the other which divided screen (a 3rd screen) (step SB14). After this, an other guidance/display processing is executed (step SB8).

(3) When another route is searched (steps SL4, SL8), a single screen (a 1st screen) is divided (step SL10). A guide route which was searched at a N-th is displayed in one of the screens (a 2nd screen) which were divided and a guide route which was searched at a (N-1)th is shown in the other which divided screen (a 3rd screen) (step SL12). A guide route in a 2nd screen or in 3rd a screen is selected after this (step SL30).

(4) When a car deviates off a guide route (step SQ2), a processing to deviating route is executed (step SQ4), and a return route is searched (step SR14) and a single screen (a 1st screen) is divided (step SR16). A return route which includes a car is shown in one of the screens (a 2nd screen) which were divided (step SR16B). A map which was displayed in a screen (a 1st screen) before division is shown in the other which divided screen (a 3rd screen) (step SQ28).

(5) When a genre selection is directed (step SX2), a list for a genre choice is shown in a screen before division (step SX4). When one genre is chosen and specified, a single screen (a 1st screen) is divided (step SX10) and all facilities corresponding to a specified genre are shown in one of the screens (a 2nd screen) which were divided (step SX12). A list of an sales article which is the following selection condition is shown in the other screen (a 3rd screen) which divided (step SX14). If facilities are chosen and specified after this, screen division is canceled and specified facilities are set as a dropping in place (step SX28).

2. Overall Circuitry

FIG. 1 illustrates the overall circuitry of the navigation device. A central processor 1 controls the operation of the whole navigation device. The central processor 1 is comprised with a CPU 2, a flush memory 3, a RAM 5, a ROM 4, a sensor input interface 7, a communication interface 8, an image (picture) processor 9, a image (picture) memory 10, a voice processor 11 and a clock (clock generator) 6. The CPU 2 and the devices through up to the clock 6 are connected together through a CPU local bus 15, and the data are exchanged among these devices.

A flash memory 3 is composed of a memory (EEPROM) etc. by which it is possible to be erased electrically and stored. Computer programs 38b which are memorized at an information memory unit 37 (a outside storage media/ means) are copied and are memorized (Installed/transferred) into this flash memory 3 (a inner storage media/means). Also programs 38b which are sent through a data sending and a data transmitter/receiver (sending/receiving) unit 27 from a outside system are copied and are memorized into a flash memory 3. These programs 38b correspond to various processing by each flow chart to mention later and are executed in CPU 2. For example, these programs 38b correspond to a display control of information and a guidance control by sound (voice) and so on.

This installation (transferring/copy) is automatically executed when setting an information memory unit 37 in this navigation device, is automatically executed when turning on the power of this navigation device or is executed by operation of an operator. This information memory unit 37 can be replaced with the other information memory unit 37 and it is replaced with one to be newer or to be latest for the above program and data. As a result, the latest navigation system is supplied by this replacement.

The flush memory 3 is storing a variety of parameters required for the programs. The ROM 4 is storing figure data to be displayed and various general-purpose data. The figure data to be displayed are used for route guidance and map showing on the display 33. The general-purpose data include voice waveforms recording synthetic or human voice for voice guidance, and are used for the navigation operation.

The RAM 5 is storing data input from external units, a variety of parameters used for the arithmetic operation, the operated results and programs for navigation. The clock 6 comprises a counter, a battery backed-up RAM or EPROM, etc., and outputs time data.

The sensor input interface 7 comprises an A/D converter circuit or a buffer circuit. The sensor input interface 7 receives analog or digital sensor data from the sensors 21 to 24 of a present position detector 20. The present position detector 20 includes an absolute direction sensor 21, a relative direction sensor 22, a distance sensor 23 and a vehicle speed sensor 24.

The absolute direction sensor 21 is, for example, a terrestrial magnetism sensor and detects terrestrial magnetism. The absolute direction sensor 21 outputs data indicating a south-and-north direction which serves as the absolute direction. The relative direction sensor 22 is, for example, a steering angle sensor and detects the steering angle of the wheel based upon a gyroscope such as optical fiber gyroscope or piezo-electric vibration gyroscope. The relative direction sensor 22 outputs a relative angle of a direction of progress of the car with respect to the absolute direction detected by the absolute direction sensor 21.

The distance sensor 23 comprises a counter or the like interlocked to, for example, an odometer. The distance sensor 23 outputs data indicating distance travelled by the car. The vehicle speed sensor 24 comprises a counter or the like connected to a speedometer. The vehicle speed sensor 24 outputs data that vary in proportion to the running speed of the car.

An I/O data bus 28 is connected to the communication interface 8 of the central processor 1. To the I/O data bus 28 are connected the GPS receiver unit 25, the beacon receiver unit 26 and the data transmitter/receiver unit 27 of the present position detector 20. To the I/O data bus 28 are further connected a touch switch 34 and a printer 35 of the input/output unit 30, and an information memory unit 37. That is, a variety of data are exchanged between the external accessory equipment and the CPU local bus 15 through the communication interface 8.

The present position detector 20 outputs data for detecting the present position of the car. In other words, the absolute direction sensor 21 detects the absolute direction. The relative direction sensor 22 detects the relative direction with respect to the absolute direction. Furthermore, the distance sensor 23 detects the distance travelled. The vehicle speed sensor 24 detects the running speed of the car. The GPS receiver unit 25 receives GPS (Global Positioning System) signals to detect position data such as longitude and latitude of the car. The GPS signals are microwaves transmitted from a plurality of satellites orbiting round the earth.

Similarly the beacon receiver unit 26 receives beacon from a data offering system such as VICS (Vehicle Information and Communication System) or the like, and the received data and the corrected data of GPS are output to the I/O data bus 28.

The data transmitter/receiver unit 27 exchanges a variety of information related to the present position or the road conditions near the car relative to the bi-directional present position information offering system or the ATIS (advanced traffic information service), etc. by utilizing a cellular phone, FM multiplex signals or a telephone circuit. These information are used as a detecting information of the car position or a support information of movement. The beacon receiver unit 26 and the data transmitter/receiver unit 27 may not be provided. As for this data sending and the data transmitter/receiver unit 27, a radio receiver, a television receiver, a carrying telephone, a pager or the other radio communication machine are used.

The input/output device 30 comprises a display 33, a transparent touch panel 34, a printer 35 and a speaker 13. The display 33 displays guide data during the navigation operation. The touch panel 34 is constituted by a plurality of transparent touch switches that are arranged in the form of a matrix on a plane, and is adhered onto the screen of the display 33. By using the touch panel 34, data necessary for setting the destination, such as start point, destination, passing points, drop-in places, etc. are input to the navigation device.

A printer 35 is used for printing a variety of data such as map and guide to facilities output through the communication interface 8. Information of various kinds is transmitted by voice to the user from the speaker 13. The printer 35 may be omitted.

The display 33 may be a CRT, a liquid crystal display or a plasma display, and displays picture. Desirably, however, the liquid crystal display is preferred as a display 33 because it consumes small amounts of electric power, it can be seen highly clearly, and is light in weight. In this embodiment (invention), this display 33 is liquid crystal having more wide screen.

Furthermore this display 33 may be composed of more than 2 liquid crystal displays which can separate. Then each liquid crystal display is connected with a image processor 9 respectively with an independent video signal cable and is placed in a same or a different position each other.

A image memory 10 such as DRAM (dynamic RAM) or dual port DRAM is connected to the image processor 9 that is connected to the display 33. The picture data are written into the image memory 10 by the image processor 9. Being controlled by the image processor 9, furthermore the data are read out from the image memory 10 and are displayed on the display 33.

According to division of a screen of a display 33, a image memory 10 also is divided into an area for a 2nd screen and an area for a 3rd screen and independent image data is written in each. According to this division, an address of each memory element of a image memory 10 also is divided with a 2nd screen and a 3rd screen.

In accordance with a drawing command from the CPU 2, the image processor 9 converts map data and character data into picture data for display and writes them into the image memory 10. At this moment, the peripheral picture on the screen is also formed and is written into the image memory 10. Therefore the peripheral picture can be also readily displayed upon scrolling.

When the screen of the display 33 is divided, a memory area of image memory 10 are divided corresponding to the divided screen. And image data which is different each other is written to each divided memory area of image memory 10.

A voice processor 11 is connected to the speaker 13. The voice processor 11 is connected to the CPU 2 and to the ROM 4 through the CPU local bus 15. The voice waveform data for voice guidance read out from the ROM 4 by the CPU 2 are input to the voice processor 11. The voice waveform data are converted into analog signals by the voice processor 11, and are output from the speaker 13. The voice processor 11 and the image processor 9 comprise general-purpose DSPs (digital signal processors) or the like.

The information memory unit 37 connected to the I/O data bus 28 through the data transmitter/receiver 39. In a nonvolatile manner, disk management information 38a, programs 38b and data 38c such as road map data necessary for the navigation operation are stored in the information memory unit 37. The disk management information 38a is related data or programs stored in the information memory unit 37, for example version information of the programs 38b. The information memory unit 37 is provided with a data transmitter/receiver 39 for reading data written into the information memory unit 37 and outputting them onto the I/O data bus 28.

The information memory unit 37 may be an optical memory (CD-ROM, etc.), a semiconductor memory (IC memory, card, etc.), or a magnetic memory (opto-magnetic disk, hard disk, floppy disk, etc.). The data transmitter/receiver 39 is equipped with, a data pickup adapted to the recording medium so as to be adapted to a change in the data recording medium. When, for example, the recording medium is a hard disk, a core head is provided.

A part or all of the above programs 38b may be stored in an area center which is different from this navigation device, data which was sent from this navigation device to the area center through this data sending and the data transmitter/receiver unit 27 is processed based on these programs 38b, this processed data may be sent from the area center to this navigation device through this data sending and the data transmitter/receiver unit 27.

The data 38c of the information memory unit 37 stores map data, intersection data, node data, road data, photographic data, destination data, guide point data, detailed destination data, destination read data, house shape data, as well as other data and programs that are necessary for the navigation operation as the data 38c. In accordance with these programs, the navigation operation is executed by using the road map data stored in the information memory unit 37. The program for navigation is read by the data transmitter/receiver 39 from the information memory unit 37, copied and written into the flush memory 3. Other data include indication guide data, voice guidance data, picture data showing simple guide route, etc.

The data 38c of the information memory unit 37 stores map data of a plurality of reduced scales or one scale. In other words, the data 38c have map data of a plurality of reduced scales of same region. Or, the data 38c have map data of an one scale of same region. When the map of a large scale is to be shown on the display 33, the map data stored in the information memory unit 37 is shown on a reduced scale. In this case, not only the lengths of the roads, etc. are shortened but also signs and data representing buildings and facilities are reduced.

3. Data 38c of Information Memory Unit 37

FIG. 2 is a diagram illustrating the contents of data files stored in the data 38c of the information memory unit 37. A map data file F1 stores the map data such as road maps of the whole of the country, road maps of a district, and house maps. Each road of the main turnpike, an expressway and a backlane and so on and aiming one (facilities and so on) on the ground are shown in a road map. A diagram which shows an outward form of a building on the ground and so on and a road name and so on are shown in a house map. For example, as for a backlane, road width is narrow below a specific value, or is a municipal road and a driveway except a national highway or a local road, isn't used by processing of searching route of FIG. 5 which is mentioned later.

An intersection data file F2 stores the coordinates of geographical positions of the intersections and data related to the intersections. A node data file F3 stores geographical coordinate data of the nodes utilized for searching a route on the map. A road data file F4 stores data related to the positions and kinds of the roads, number of the lanes, connections among the roads, etc. A photographic data file F5 stores photographic image data of places where visual display is required such as of various facilities, sightseeing spots, major intersections, etc.

A destination data file F6 stores data related to the positions and names of various facilities that may be destinations. The facilities may be sightseeing spots, buildings, sites, companies and offices listed in a telephone book. A guide point data file F7 stores guide data of points that require guidance. The points may be the contents of information boards and branch points. A detailed destination data file F8 stores detailed data related to destinations stored in the destination data file F6. A road name data file F9 stores name data of principal roads among the roads stored in the road data file F4. A branch point name data file F10 stores name data of principal branch points. An address data file F11 stores list data for identifying, from the addresses, the destinations stored in the destination data file F6.

A file F12 of a list of toll numbers and local office numbers stores list data of toll numbers and local office numbers only of the destinations stored in the destination data file F6. A registered telephone number file F13 stores telephone number data of clients input by the user. A landmark data file F14 stores data related to positions and names of points that serve as marks while driving and of the places that should be remembered input by the user. The point data file F15 stores detailed data of landmark points stored in the landmark data file F14. A facility data file F16 stores data related to positions and descriptions of destinations such as gas stations, drug stores, parking lots and positions of objective places where the driver may wish to drop in, in addition to the destinations.

4. Contents which are Memorized in RAM 5

Figure 3:
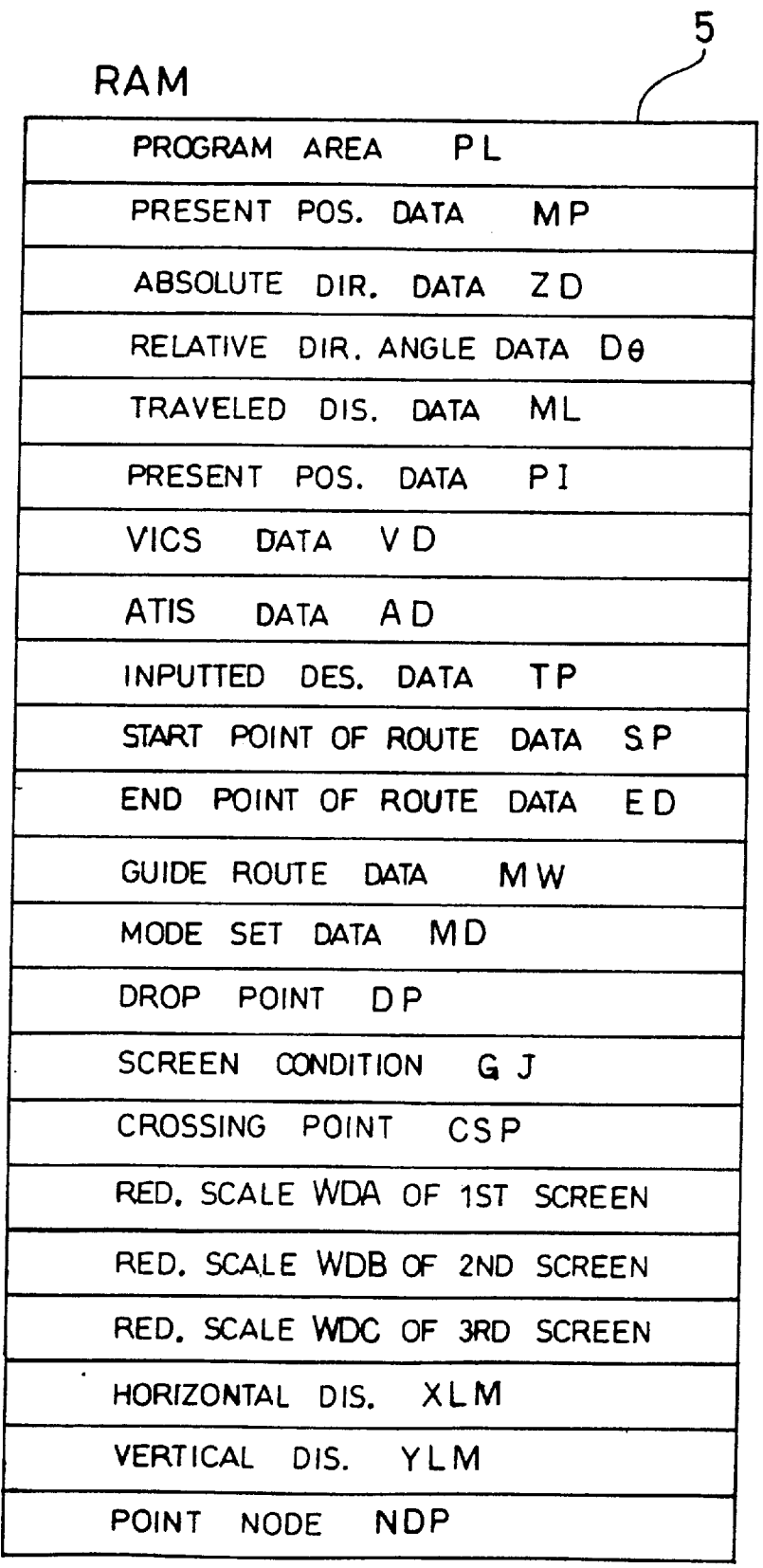
FIG. 3 shows data which is memorized in RAM 5.

FIG. 3 illustrates some of a group of data stored in the RAM 5. The present position data MP represent the present position of the vehicle and are detected by a present position detector 20. The absolute direction data ZD represents the south-north direction relying upon the terrestrial magnetism and are found based upon the data from an absolute direction sensor 21. The relative direction angle data D$\theta$ represent an angle of the direction in which the vehicle is traveling with respect to the absolute position data ZD and are found based upon the data from a relative direction sensor 22.

The traveled distance data ML represent a distance traveled by the vehicle and are found based on the data from a distance sensor 23. The present position data PI are related to the present position and are input from a beacon receiver 26 or the data transmitter-receiver 27. The VICS data VD and ATIS data AD are input from the beacon receiver 26 or the data transmitter-receiver 27. The VICS data VD are used for correcting an error in the position of the vehicle detected by a GPS receiver 25. The ATIS data AD are used for determining traffic regulations and traffic jamming in the areas.

The inputted destination data TP are related to the coordinate positions and names of the destinations and are input by the user. The start point of route data SP are map coordinate data of a point from where the navigation operation starts. The end point of route data ED are map coordinate data of a point where the navigation operation ends.

The start point of route data SP utilize node coordinates on a guide route closest to the present position of the vehicle or to the point of departure. This is because, the present position of the vehicle may be on a site such as golf course or parking lot, but may not necessarily be on the guide route. Similarly the end point of route data ED utilize node coordinates on a guide route closest to the inputted destination data TP. This is because the coordinates of the inputted destination data TP may not often be on the guide route.

The guide route data MW stored in the RAM 5 represent an optimum route or a recommended route up to the destination, and are found by a processing for searching a route that will be described later. Specific road numbers are attached to the individual roads in the road map stored in the data 38c of the information memory unit 37. The guide route data MW are constituted by the road numbers or by the link numbers that will be described later of from the start point of route data SP to the end point of route data ED.

Mode set data MD is used by processing to set a destination which is described later and set by a touch switch 34 which is made on a display 33 in a product layer by a laminate. Mode contents which are displayed on display 33 are decided by this mode set data MD. Dropping in place data DP shows facilities in which the car drop on the way of a guide route. A screen condition data GJ shows a display condition of a display 33 and shows whether a display screen is in a division condition or the single (non-division) condition. A screen condition data GJ is rewritten every time a display condition of a display 33 is changed.

Crossing point data CSP is used by processing of a display a fore route and so on which is described later, and indicates an end point geographical coordinate of a guide route which is displayed in one of the above divided screens. It makes this crossing point CSP a start point and therefore the guide route is shown in the other divided screen.

A reduced scale WDA of a 1st screen shows a reduced scale of a map which is displayed in a single screen before division of a display 33. A reduced scale WDB of a 2nd screen shows a reduced scale of a map which is displayed in a divided screen of the display 33 which is near a assistant's seat after division. A reduced scale WDC of 3rd a screen shows a reduced scale of a map which is displayed in a screen which is near a driver's seat after division. Therefore the 2nd screen is situated on the side of the assistant's seat and the 3rd screen is situated on the side of the driver's seat. Furthermore, these screens may replace each other.

A horizontal distance XLM shows a geographical maximum straight line distance which can be displayed in a horizontal direction of a map screen of display 33. A perpendicular distance YLM shows the geographical maximum straight line distance which can display in a perpendicular direction of the map screen of display 33.

A point node NDP is used by program "a calculation processing of a possible display range" which is described later and is the coordinate value of the node of the guide route which is displayed at the edge of the divided screen.

5. Road Data

Figure 4:
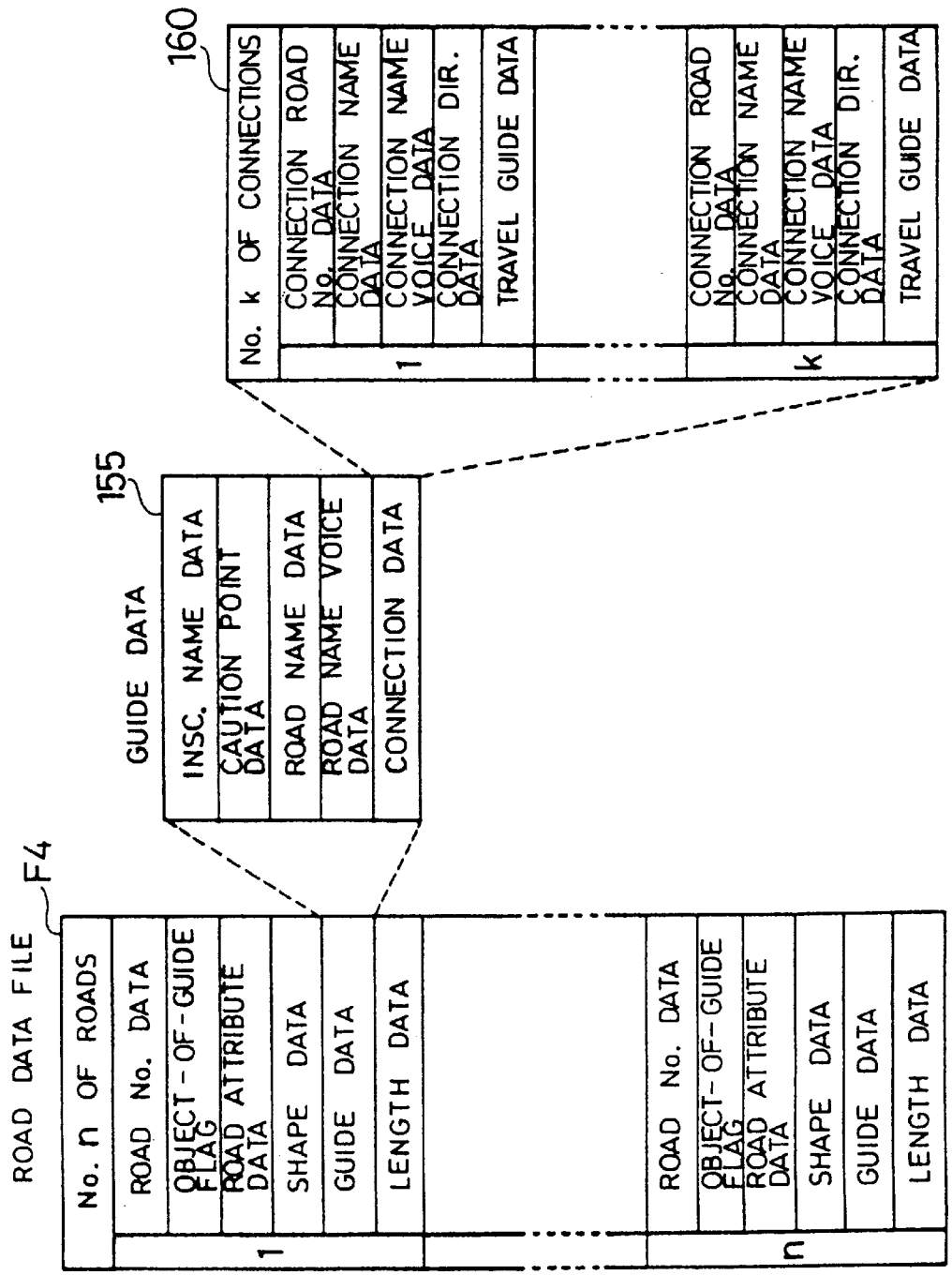
FIG. 4 shows structure of a road data file F4.

FIG. 4 is a diagram illustrating some of road data in the road data file F4 stored in the information memory unit 37. The road data file F4 includes data related to all roads wider than a predetermined width in the whole areas stored in the map data file. When the number of roads contained in the road data file F4 is n, the road data related to the roads of a number n are stored in the information memory unit 37. Each road data is constituted by road number data, object-of-guide flag, road attribute data, shape data, guide data and length data.

The road number data are discrimination numbers attached to all roads contained in the map data of the information memory unit 37, the roads being sectionalized by the branch points. The object-of-guide flag becomes "1" in the case of a guide road and becomes "0" in the case of a non-guide road. The guide road is the one wider than a predetermined width, such as a main trunk road or a general road, and may be selected as a route. The non-guide road is a road(backlane) narrower than a predetermined width, such as footpath or lane, and is seldom selected as a route.

The road attribute data represent attribute of road such as elevated road, underpass, speedway or toll road. The shape data represent the shape of a road and are constituted by coordinate data of start points and end points of the roads, and of the nodes between the start point and the end point.

The guide data are constituted by intersection name data, caution point data, road name data, road name voice data and connection data. When the end point of a road is an intersection, the intersection name data represent the name of the intersection. The caution point data represent caution points on the road such as railway crossing, inlet of a tunnel, exit of the tunnel, point where the width of the road decreases, etc. The road name voice data are voice data of road names, and are used for a guidance by voice.

The connection data represent a road that connects to the end point of the above-mentioned road, and are constituted by a number k of connections and data of the connections. The data for each connection are constituted by connection road number data, connection name data, connection name voice data, connection direction data and travel guide data.

The connection road number data represent a road number of a connection. The connection name data represent a name of a road that is connected. The connection name voice data store voice data for guiding the name of connection by voice. The connection direction data represent the direction in which the road of connection is headed. The travel guide data include guide data for guiding the driver to enter into the right lane or into the left lane on the road to proceed to a road that is connected, or to travel on the center lane. The length data represent a length from the start point to the end point of a road, lengths from the start point to the nodes, and lengths among the nodes.

6. Overall Processing

Figure 5:
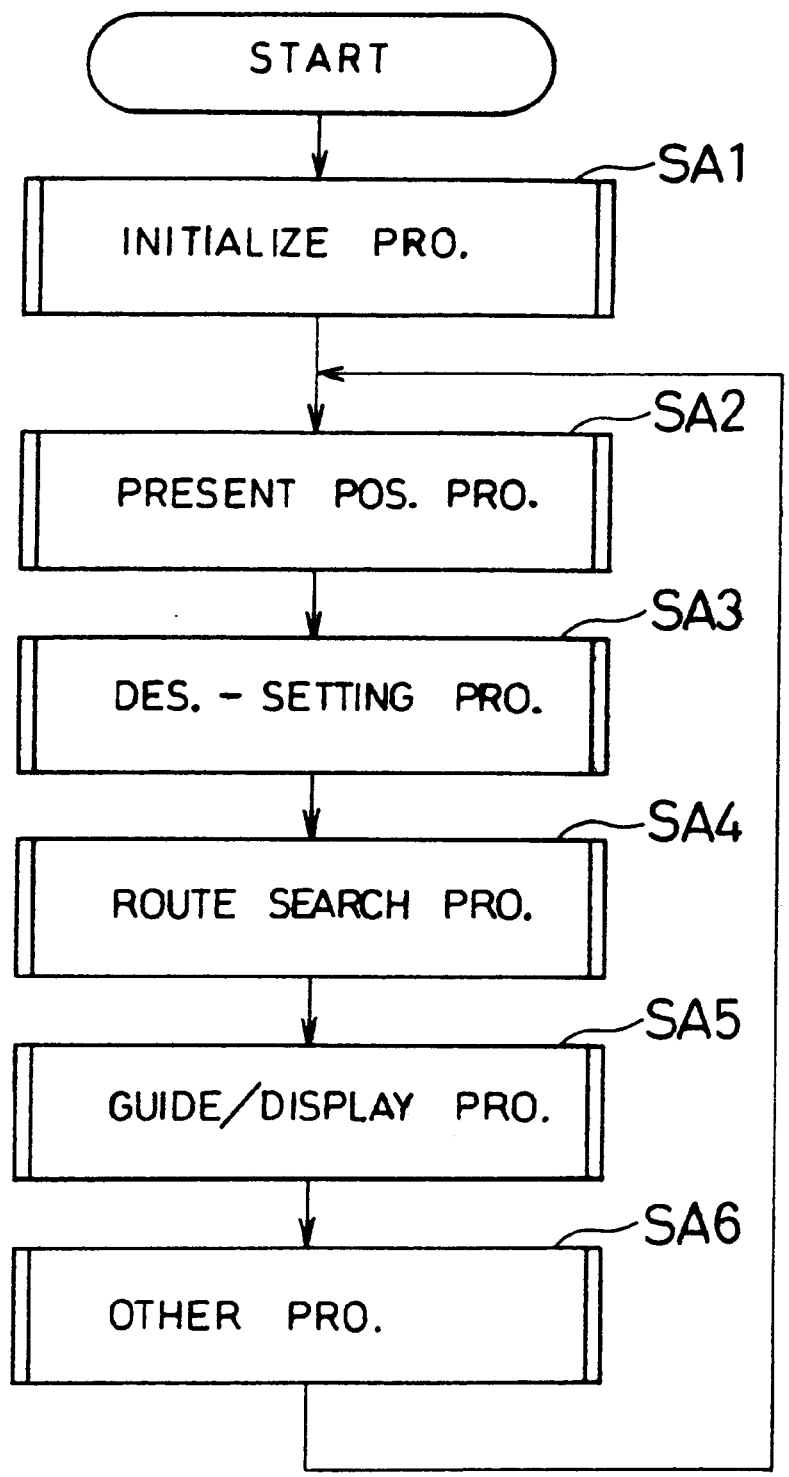
FIG. 5 shows a flow chart of a whole processing.

FIG. 5 is a flow chart of the overall processing executed by a CPU 2 in the navigation device according to the present invention. The processing starts upon closing the power source circuit and ends upon breaking the power source circuit. The power source is turned on or off as the power source of the navigation device is turned on or off, or as the engine start key (ignition switch) of the vehicle is turned on or off.

First the processing for initialization is executed (step SA1). In this processing, a program for navigation is read out from the data 38c of the information memory unit 37, copied into a flush memory 3, and is executed. The CPU 2 clears the general-purpose storage areas in the RAMs, such as work memory of a first RAM 5 and an image memory 10.

Then a present position processing (step SA2), a destination-setting processing (step SA3), a route search processing (step SA4), a guide/display processing (step SA5) and a other processing (step SA6) are cyclically executed.

Furthermore a destination-setting processing (step SA3) and a route search processing (step SA4) aren't again executed when a destination isn't changed or the car doesn't leave a route.

Then a processing for detecting the present position (step SA2) and the subsequent processing are executed. The processing for detecting the present position (step SA2) detects the geographical coordinates (latitude, longitude, altitude, etc.) of an overland moving body, i.e., of a vehicle mounting the navigation device. That is, a GPS receiver 25 receives signals from a plurality of satellites orbiting around the earth, detects coordinate positions of the satellites, times at which the electromagnetic waves are emitted from the satellites and the time at which the electromagnetic waves are received by the GPS receiver 25, and calculates the distances to the satellites. The coordinate position of the vehicle is calculated from the distances to the satellites, to detect the present position of the vehicle. The thus found geographical coordinate data of the vehicle are stored in the RAM 5 as present position data MP. The present position data MP are often corrected by the data input through a beacon receiver 26 or the data transmitter/receiver 27.

In the processing for detecting the present position (step SA2), furthermore the absolute direction data ZD, relative direction angle data D θ and the traveled distance data ML are simultaneously found by using an absolute direction sensor 21, a relative direction sensor 22 and a distance sensor 23. The absolute direction data ZD, relative direction angle data Dθ and traveled distance data ML are operated to determine the position of the vehicle. The thus determined position of the vehicle is collated with map data stored in a data 38c of the information memory unit 37, and the present position on the map screen is corrected and is indicated more correctly. Therefore, the present position of the vehicle is correctly indicated even when the GPS signals are not received such as traveling through a tunnel.

In setting the destination(step SA3), the geographical coordinates of the destination desired by the user are stored as inputted destination data TP. For example, a coordinate position is specified by the user on a road map or on a house map shown on a display 33. The destination is selected by operator from a list of destinations shown on the display 33. Thereafter, a central processing unit 1 stores the data related to the geographical coordinates of the destination in the RAM 5 as inputted destination data TP.

Present position data MP is set as the above guidance beginning point data SP or a node data of the guidable road which is near present position data MP is set. All the ward "beginning" and "begin" in this application papers include "starting" and "start". Furthermore, when the car is deviated from the guide route, a optimal route from this deviating position to a end point of guide route is automatically researched. This is a auto re-route mode, if this auto re-route mode isn't set, the re-search of the route isn't done. Further when a dropping in place is set, the guide route which goes via the dropping in place is sometimes searched.

In the processing for guiding and displaying the route (step SA5), the guide route identified by the above-mentioned processing for searching a route (step SA4) is shown on the display 33 with the present position of the vehicle as a center. The guide route is displayed on the map in a manner that it can be easily discriminated. For example, the guide route and the road other than the guide route are indicated in different colors, so that the two can be discriminated from each other. Furthermore, guide information is sounded by voice from a speaker 13 or is shown on the display 33 at all times, so that the vehicle is allowed to travel favorably along the guide route. The image data of the guide route are the road map data around the present position or are the house map data around the present position stored in the data 38c of the information memory unit 37.

The road map data and the house map data are changed over depending upon the conditions such as a distance from the present position to a guide point (destination, place to be dropped in or intersection), a traveling speed of the vehicle, the size of the area that can be displayed, or the switching operation by the user. Near the guide point (destination, place to be dropped in or intersection), the map is shown on an enlarged scale on the display 33. Instead of displaying the road map, a minimum amount of necessary data only may be displayed, such as the guide route, direction of the destination or the place to be dropped in and the present position, but omitting geographical data.

Furthermore as described later the screen of display 33 is divided in 2 by the operation of the operator or by automatic and an information of the map etc. is shown. Then various guidance information and road information are shown in these two screens by the processing and the operation which was independent respectively.

After the guide/display processing of step SA5, the other processing (step SA6) is executed. At "the other processing" of this step SA6, nearest facility processing is sometimes executed. A dropping in place (the facilities and so on) except the above entry destination data TP is retrieved and is specified by this nearest facilities processing. Data about this dropping in place is set by using the map or each item information etc. which is displayed in display 33. This nearest facilities processing is executed as with the destination-setting processing of the above step SA3.

For example, it is determined whether the traveling position of the car goes along a calculated guide route or not in the above other processing. Also it is also determined whether the destination is changed or not by the switch operation of the operator and so on. After processing of step SA6, processing is repeated from "the present position processing" (step SA2). Furthermore when the car reaches a destination, a guide/display processing of the route is ended and processing is returned to step SA2 once again. In this way, the processing of step SA2-step SA6 is repeated in order.

7. Guide/display Processing of 1st Embodiment

This guide/display processing is the processing to report the information to make travel the car along the guide route. In other words, a guide route is searched and this searched guide route is shown in display 33. This guide route is displayed for the car to become always a screen center and an information about points which should turn right or left in the guide route is reported at any time. In this guide/display processing, various information is reported and is shown at any time for the car to travel a guide route smoothly.

Figure 6:
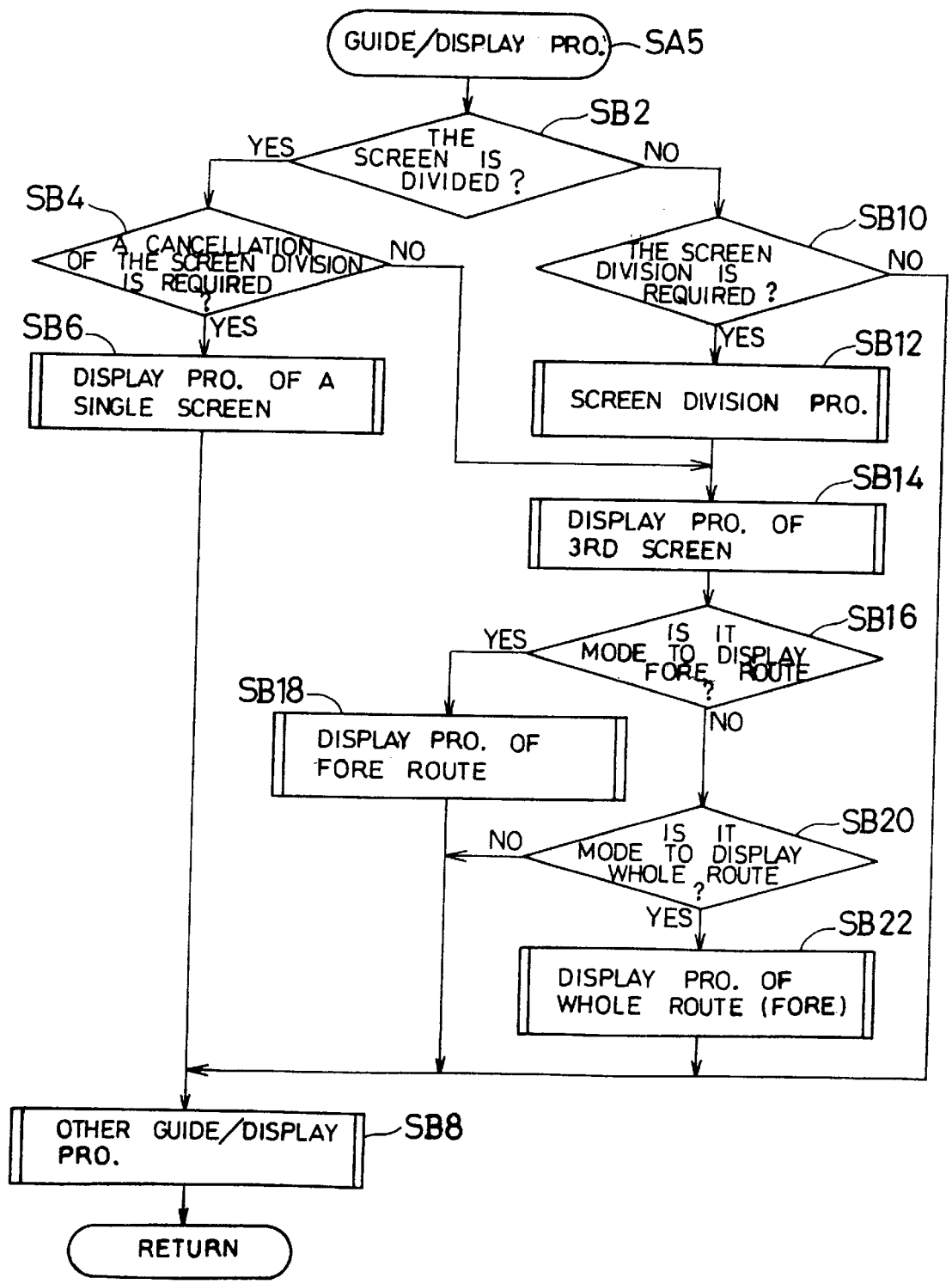
FIG. 6 shows a flow chart of a guidance/display processing of 1st embodiment.

FIG. 6 shows the flow chart of the guide/display processing. Firstly it is determined whether a display screen of display 33 is divided or not (step SB2). In the division of the display screen of this display 33, for example, the display screen is long into the direction of the side, the screen is divided into the right and the left at the about center. Furthermore this screen may be divided into the top and the bottom. Then an independent map is each other shown at each divided screen. In this embodiment, the divided screen of the side of the assistant's seat is a 2nd screen and the screen of the side of the driver's seat is the 3rd screen. Therefore at the car of the right handle, the left side is a 2nd screen and at the car of the left handle, the right is a 2nd screen.

It is determined whether a screen division cancellation was required or not (step SB4), if the screen is divided (step SB2). This request is executed by the operation of the specific switch of touch switch 34. Furthermore the touch switch 34 may be replaced with a push switch etc. which is provided for the lower part of the screen of display 33.

If a cancellation of the screen division is required, "display processing of a single screen" of the subroutine is executed (step SB6). In the display processing of the single screen, at the reduced scale of the 1st screen before the division, a map is shown in the whole screen of display 33. This "display processing of a single screen" is described later in detail. Then "other guide/display processing" of the subroutine is executed and the flow returns to the overall processing (step SB8). Each information about the guide route which the car travels is displayed and reported at any time in this step SB8. On the other hand, if the cancellation of the screen division isn't required at step SB4, "display processing of 3rd screen" of the subroutine is executed (step SB14). This "display processing of the 3rd screen" is described later.

Further it is determined whether screen division is required or not when the screen of display 33 isn't divided in the above step SB2 (step SB10). The request of this screen division is also based upon a operation of a switch which is set on touch switch 34. When screen division isn't required, "other guide/display processing" of step SB8 is executed. However when screen division is required, "screen division processing" of the subroutine is executed (step SB12). In this "screen division processing", the screen of display 33 is divided at the center and a map or a guidance information which is independent respectively is shown in each divided screen. This "screen division processing" is described later in detail.

When "screen division processing" of step SB12 is executed, subroutine "display processing of 3rd screen" is further executed (step SB14). In this "display processing of 3rd screen", a information which is displayed in the 3rd screen is changed according to the traveling condition of the car. This "display processing of 3rd screen" is described later.

Next if a display mode the fore route is selected (step SB16) by the operator, "display processing of fore route" of a subroutine is executed (step SB18). In this processing, a guide route which connects with the upper end (crossing point CSP) of the guide route which is displayed in the 3rd screen is shown in the 2nd screen. This "display processing of fore route" is described later in detail. Then "other guide/display processing" of step SB8 is executed and the flow returns to "the overall processing" of FIG. 5.

On the other hand, "display processing of whole route (fore)" of the subroutine is executed (step SB22), if a display mode of fore route isn't selected (step SB16) and a display mode of a whole route is selected (step SB20). The selection of the display mode of the whole route is executed by a operation of a specific switch which is set on touch switch 34. When the display mode of whole route isn't selected, "other guide/display processing" of step SB8 is executed.

In the above "whole route (fore) display processing", a guide route to the destination which is connected with a upper end of a guide route in the 3rd screen is shown in the 2nd screen. Furthermore this subroutine "display processing of whole route (fore)" is described later in detail. After this, "other guide/display processing" of step SB8 is executed and the flow returns to "the overall processing" of FIG. 5.

8. Display Processing of a Single Screen

Figure 7:
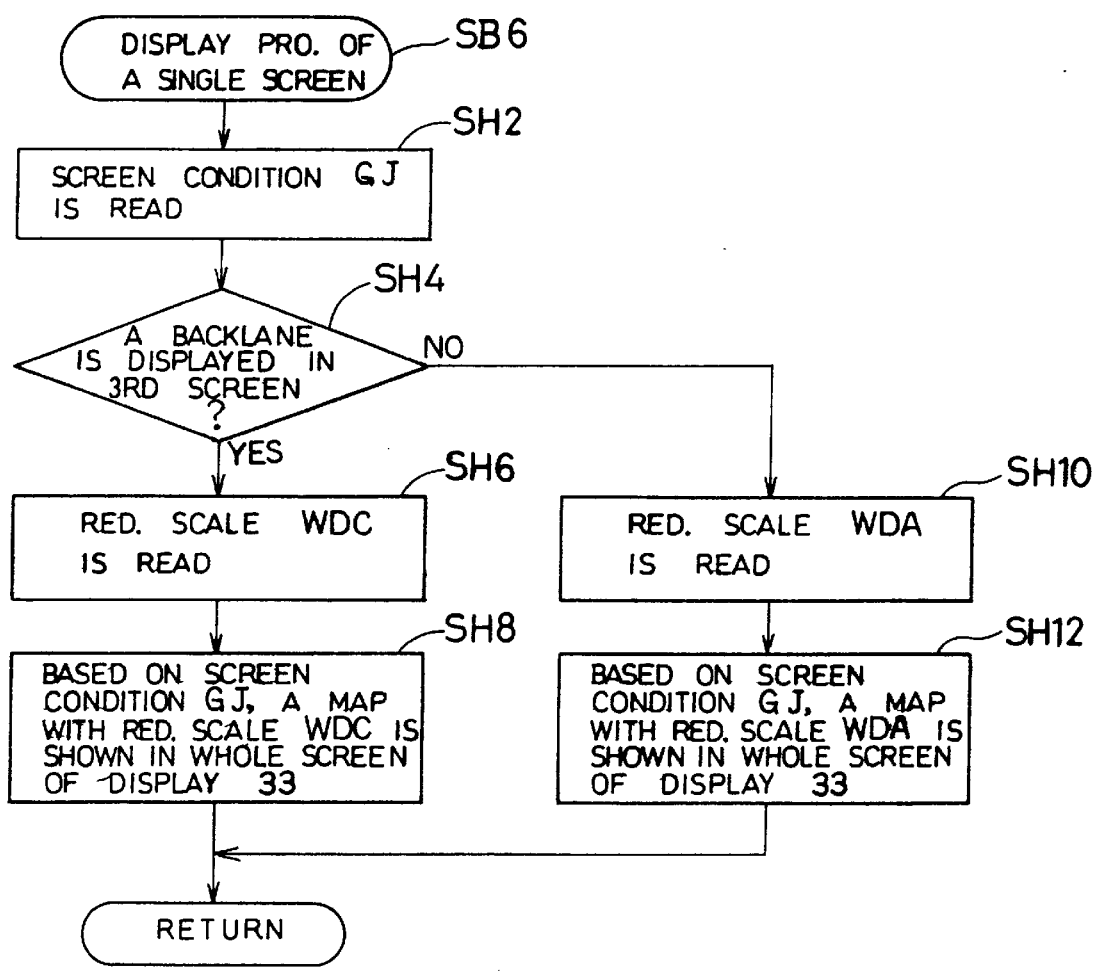
FIG. 7 shows a subroutine of single screen display processing of 1st embodiment.

FIG. 7 shows a subroutine of "display processing of a single screen". In this processing, the divided screen of display 33 is returned to a single screen. Firstly the screen condition GJ of RAM 5 is read (step SH2). This screen condition GJ indicates a display condition of a map which is displayed in the divided 3rd screen.

For example, when the map which includes a backlane in the divided 3rd screen is displayed, the information which shows the display condition is memorized as the screen condition GJ in RAM 5. Then a map is shown in the screen in which division was canceled based on this screen condition GJ. Therefore when the map which includes a backlane in the divided 3rd screen is displayed, the map which includes a backlane is shown in the 1st screen after division cancellation (combination). Furthermore, the 1st screen means the whole single screen of display 33 which isn't divided.

If a backlane is included in the map which was displayed in the 3rd screen based on the screen condition GJ that was read (step SH4), "the reduced scale WDC of the 3rd screen" of RAM 5 is read (step SH6), based on the screen condition GJ, a map with reduced scale WDC is shown in the whole screen of display 33 (step SH8) and a map which includes a backlane is shown in the 1st screen which isn't divided.

On the other hand, when the map which includes a backlane isn't displayed in the 3rd screen, "the reduced scale WDA of the 1st screen" of RAM 5 is read (step SH10) and a map with reduced scale WDA is shown in the whole screen of display 33 (step SH12) based on the screen condition GJ. Furthermore, when a simple map is displayed at the divided 3rd screen, a display condition is memorized as the screen condition GJ. Therefore this simple map is shown in the 1st screen after division cancellation. When screen division of display 33 is canceled in step SH8 or step SH12, the flow returns to the guide/display processing of FIG. 6.

9. Screen Division Processing

Figure 8:
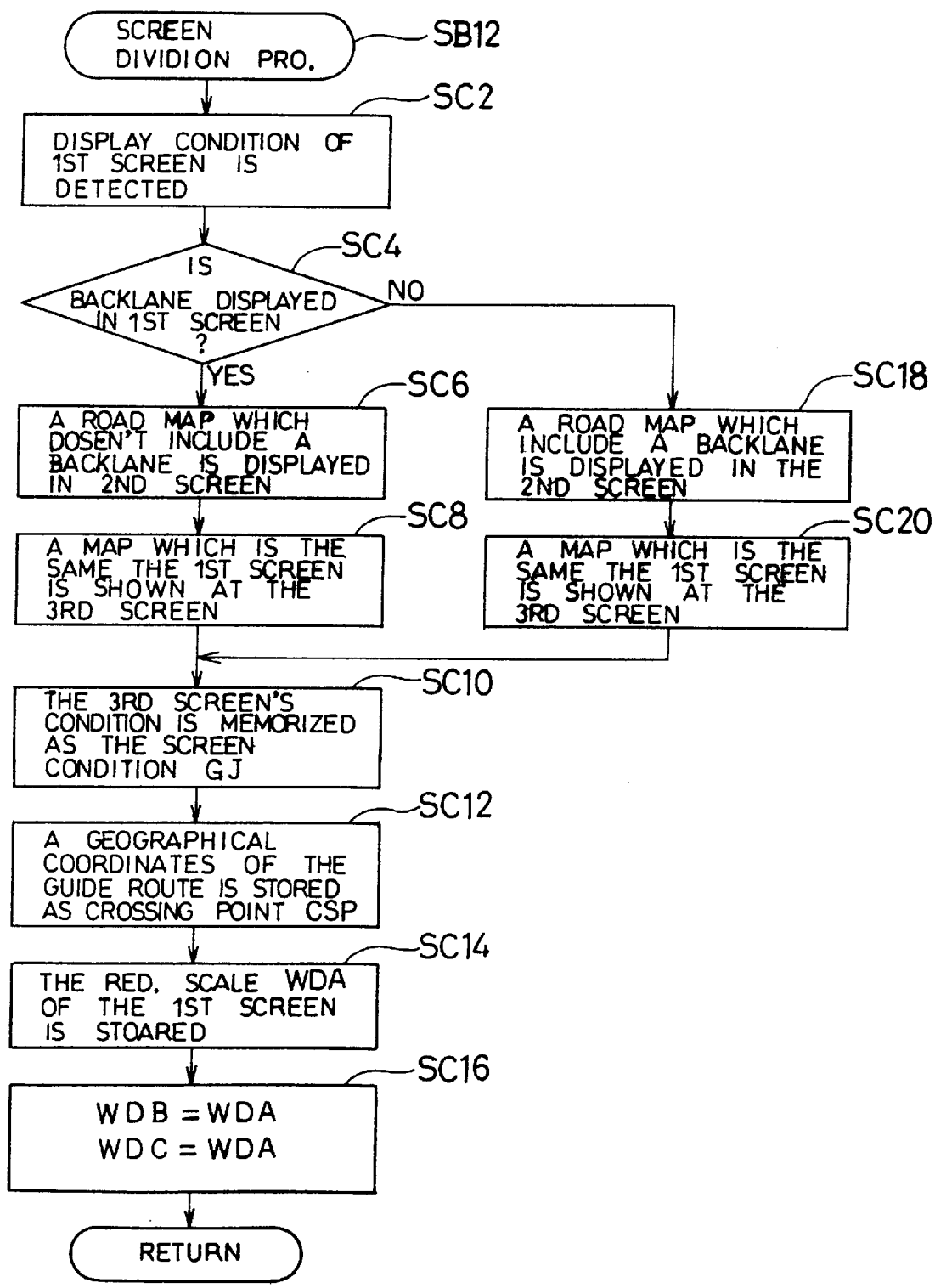
FIG. 8 shows a subroutine of screen division processing of 1st embodiment.

FIG. 8 shows a flow chart of subroutine "screen division processing" of FIG. 6. In this screen division processing, the whole screen of display 33 is divided and a 2nd screen, a 3rd screen are formed. Furthermore, in this screen division, a memory area of image memory 10 are divided corresponding to the divided screen and map information which is different each other is written to each memory area of divided image memory 10 by image processor 9. The display screen of display 33 is divided into two by this and different map information is shown in both screens. Furthermore in this embodiment, the screen was divided approximately in the center but may be divided in the right side of the center or in the left side of the center.

At the beginning of the screen division processing, the display condition of the 1st screen, i.e. the screen before the division is detected (step SC2), and if the road map which includes a backlane in the 1st screen is displayed (step SC4), a road map which excludes a backlane in the 2nd screen (a screen of a side of a assistant's seat) after the division is shown (step SC6). A road map which is the same as the one in the 1st screen before the division is shown in the 3rd screen (the screen on a side of a driver's seat) after the division (step SC8). Here a road map which includes a backlane is shown in the 3rd screen.

On the other hand, when a road map which doesn't include a backlane in the 1st screen before the division is displayed, a road map which includes a backlane in the 2nd screen (a screen on a side of a assistant's seat) is displayed (step SC18) and a road map which doesn't include a backlane in the 3rd screen is displayed (step SC20). In this way, a different map from the one in the 1st screen before the division is displayed in the divided 2nd screen and the same map as the one in the 1st screen before the division is shown in the divided 3rd screen.

After this, a display condition of the road map which is displayed in the 3rd screen is memorized as the screen condition GJ in RAM 5 (step SC10). If a road map which includes a backlane is displayed in the 3rd screen, the data which indicates a condition is set as the screen condition GJ. Furthermore as this screen condition GJ, a display condition of the simple map or a display condition of figure which shows only a turning direction to the right or left and so on are also set.

Also when a road map except the simple map is displayed in the 3rd screen, the geographical coordinate of the guide route which breaks off at the edge of the screen is detected and is stored as crossing point CSP in RAM 5 (step SC12). Furthermore, this crossing point CSP designates a point ahead of the present position of the car on the guide route and a point in the guide route which breaks off from the displayed map in the 3rd screen. All the wards "front" in this application papers include "fore" and "forward".

Then a reduced scale of the 1st screen before the division is stored as "the reduced scale WDA of the 1st screen" to RAM 5 (step SC14) and is copied as "the reduced scale WDB of the 2nd screen" and "the reduced scale WDC of the 3rd screen" to RAM 5 (step SC16). Immediately after the screen of display 33 is divided, a map with the same reduced scale is shown in the 2nd screen and the 3rd screen. If each reduced scale of the 2nd screen and the 3rd screen is changed, each value of reduced scales WDB and WDC is changed. After this, the flow is returned to the guide/display processing of FIG. 6.

Figure 9:
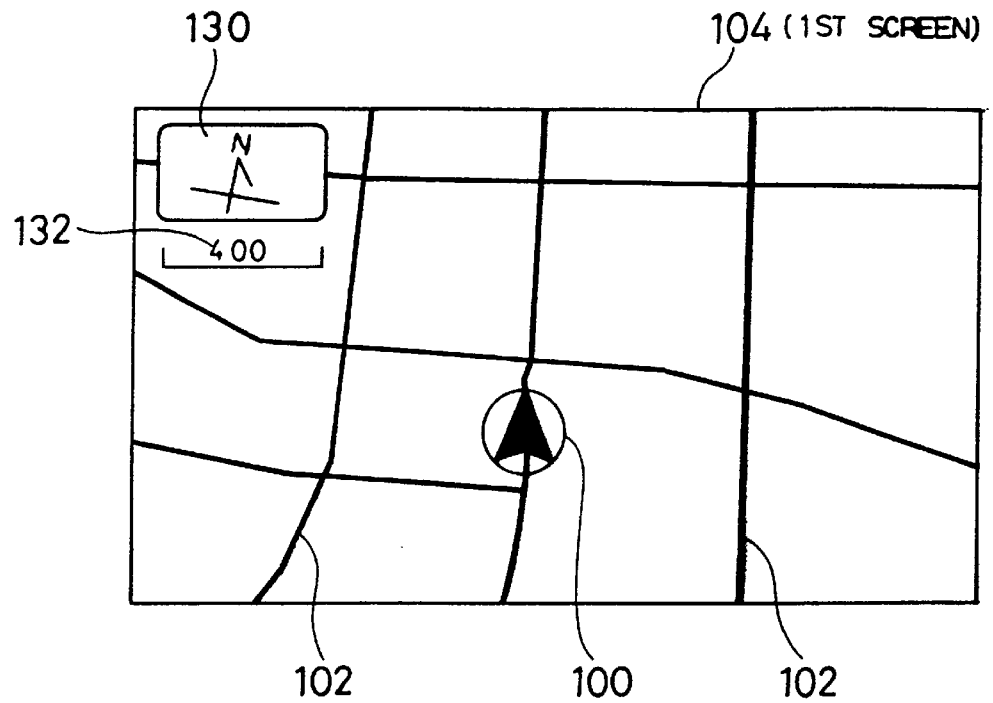
FIG. 9 shows a screen which is shown in a display 33.

FIG. 9 shows the map of display 33 before the division, i.e. the 1st screen. Symbol 100 in this map designates the present position and a traveling direction of the car. Only the principal turnpike 102 is shown in this screen 104. Symbol 130 shows a north which is an absolute azimuth and a numerical value "132" of this symbol 130 indicates a reduced scale of the map which is displayed in the screen 104. This FIG. 9 shows that a reduced scale is 1/400 in numerical value 132.

Figure 10:
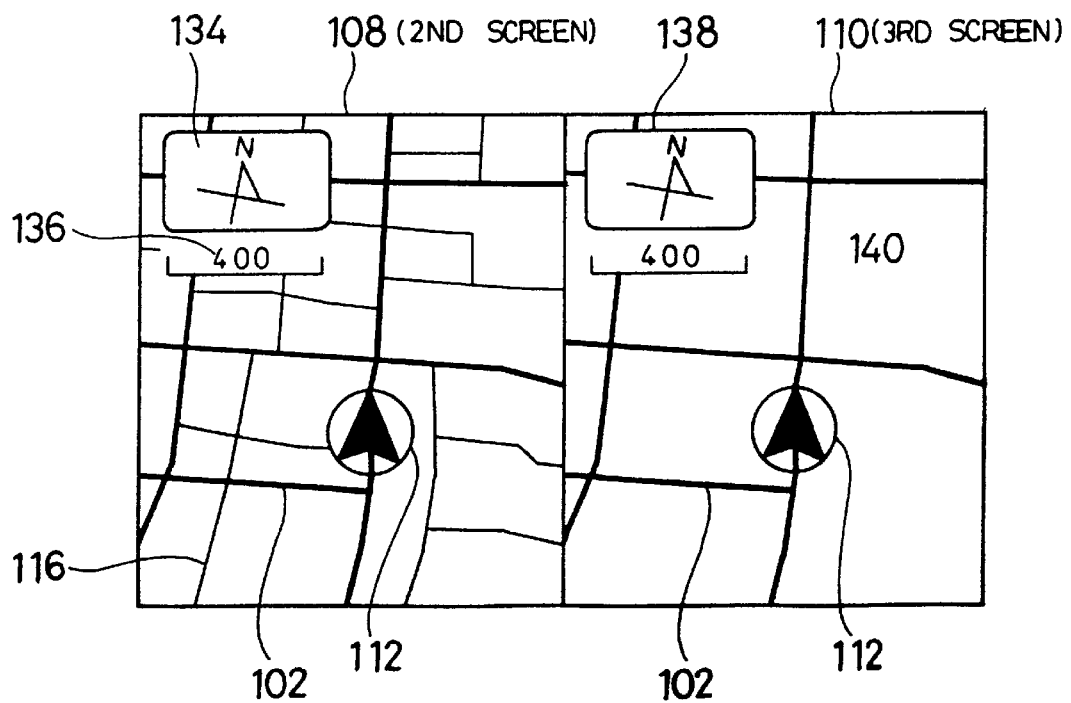
FIG. 10 shows a divided screen of a display 33.

FIG. 10 shows that the display screen 104 of the display 33 which is shown in FIG. 9 is divided into the right and the left. The symbol 112 of FIG. 10 designates a present position and a traveling direction of the car. A principal turnpike 102 and a backlane 116 are displayed in a 2nd screen 108 and only principal turnpike 102 is shown in a 3rd screen 110. In this way, the same road map as in the 1st screen before the division is shown in the 3rd screen.

The symbols 134 and 138 of FIG. 10 designate a north of a absolute azimuth, numerical value 136 shows a reduced scale of the 2nd screen, numerical value 140 shows a reduced scale of the 3rd screen and numerical value 136 is stored as a table. Furthermore in the division processing of the above screen, a different map from the one in the 3rd screen is displayed in the 2nd screen but the same map as the one in the 3rd screen may be shown in the 2nd screen.

10. Display Processing of 3rd Screen

Figure 11:
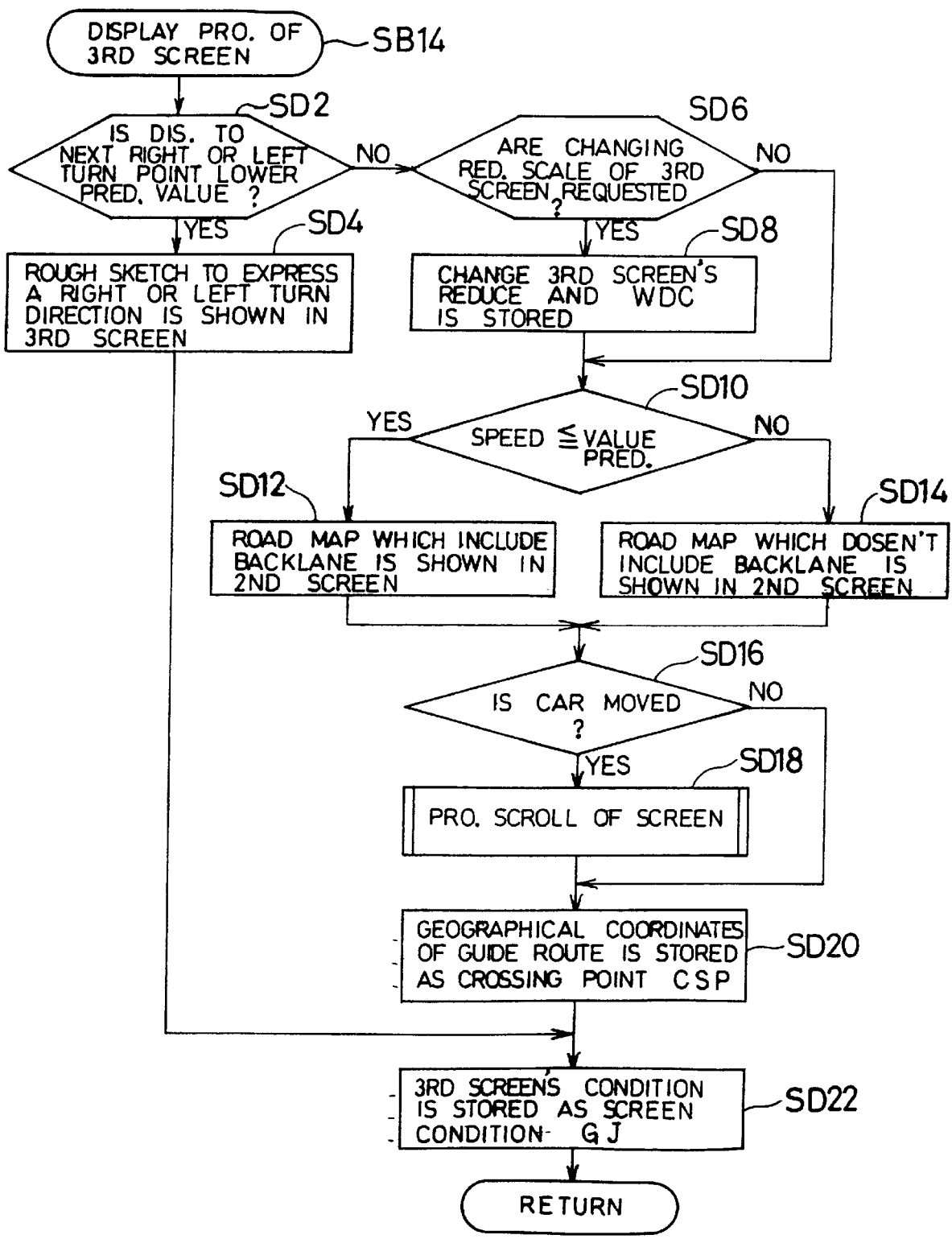
FIG. 11 shows a subroutine of 3rd screen display processing of 1st embodiment.

FIG. 11 shows a flow chart of a subroutine of "display processing of 3rd screen" of FIG. 6. In this "display processing of 3rd screen", a reduced scale of a road map which is displayed in the 3rd screen is changed.

Firstly if a distance between a present position of the car and a next turning point to the right or the left of the guide route becomes less than a specific value and the car to travel approaches a next turning point in the guide route (step SD2), a simple map of a turning direction to the right or the left against traveling direction of the car is shown in the 3rd screen (step SD4), the data which indicates a display condition of this 3rd screen is stored as the screen condition GJ in RAM 5 (step SD22). After this, the processing is returned to the flow chart of FIG. 6.

Further if a change of a reduced scale of the map which is displayed in the 3rd screen is required, when a distance between the car and a next turning point of the right or the left becomes more than a specific (step SD6), a map with changed reduced scale is displayed in the 3rd screen and the changed reduced scale is stored as "the reduced scale WDC of the 3rd screen" in RAM 5 (step SD8). The change of this reduced scale is executed by a operation of a specific switch which was provided for touch switch 34. When a road map which includes a backlane in the 3rd screen is displayed before change of this reduced scale, if the reduced scale is changed such that the backlane is insufficiently displayed, a road map which excluded the backlane is shown in the 3rd screen.

After this, if a speed of the car is less than a specific value (0 Km (stop) or a lower value Km (very slow speed) per hour) and the car goes slowly and stops (step SD10), a road map which includes the backlane is shown in the 3rd screen (step SD12). Also if a speed of the car becomes more than a specific value, a road map which excludes the backlane is shown in the 3rd screen (step SD14).

After this, if the car moves in a specific distance (step SD16), "scroll processing of screen" of a subroutine is executed (step SD18). In this scroll processing of screen, a displayed map is scrolled and the present position of the car is shown in the center of the 3rd screen. After the screen is scrolled (step SD18) or the car doesn't move in the specific distance (step SD16), a geographical coordinate in a edge of the screen of the guide route which was displayed in the 3rd screen is detected (step SD20). In other words, the guide route which is displayed in the 3rd screen breaks off in the edge of the screen and this breaking point is detected.

A coordinate value of this detected point is stored in RAM 5 as crossing point CSP and data which shows a display condition of the 3rd screen is stored in RAM 5 as the screen condition GJ (step SD22). After this, the processing is returned to the guide/display processing of FIG. 6.

11. Display Processing of Fore Route

Figure 12:
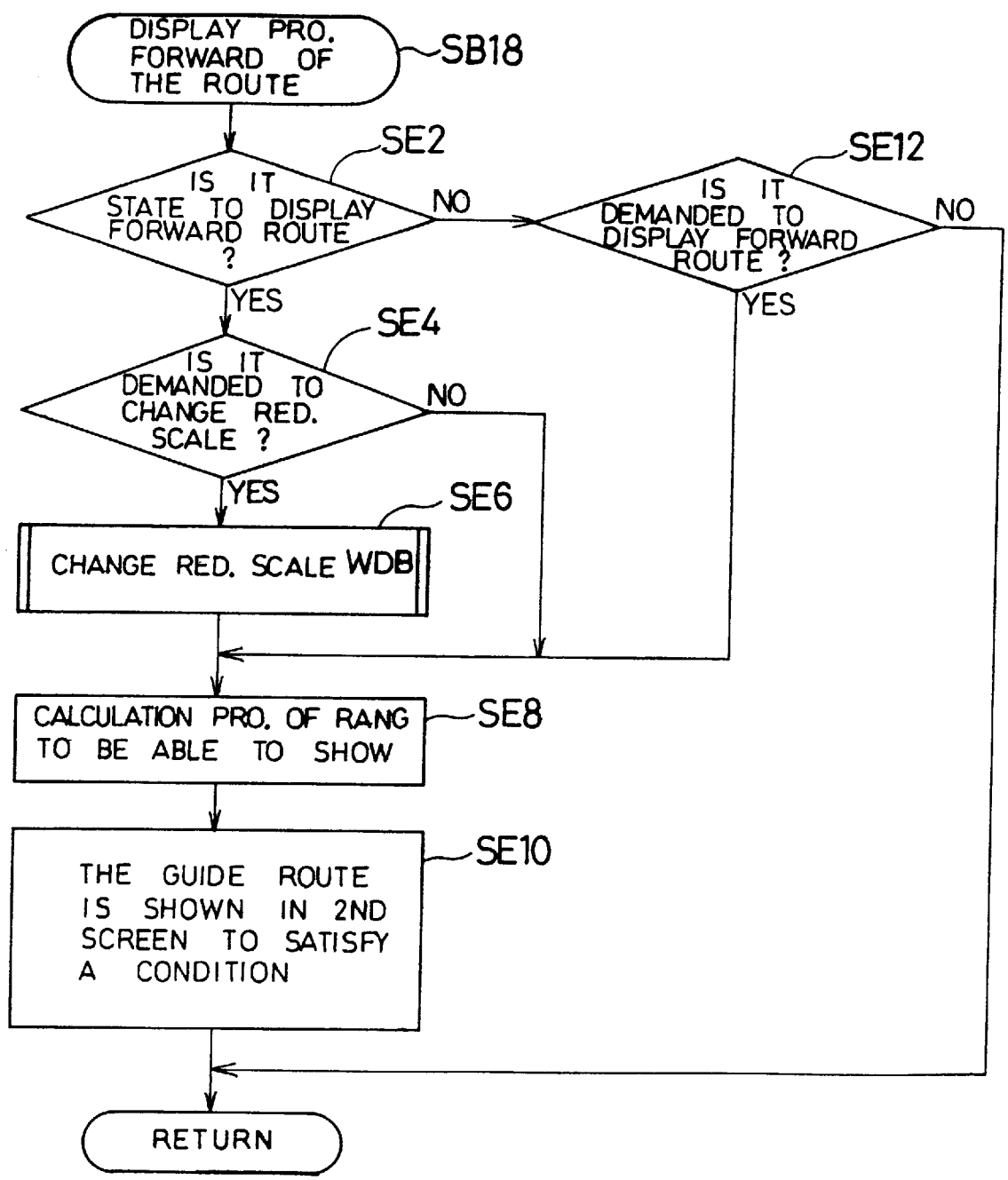
FIG. 12 shows a subroutine of a display processing of a fore route of a 1st embodiment.

FIG. 12 shows a flow chart of a subroutine "display processing of fore route" in the guide/display processing of FIG. 6. In this display processing of fore route, a remaining guide route which continues from the guide route which was displayed in the 3rd screen is shown in the 2nd screen.

Firstly if the map which is displayed in the 2nd screen is not in the display condition of the fore route (step SE2), it is determined whether a front display was required or not (step SE12). This request of front display is executed by a operation of a specific switch which was provided for touch switch 34.

If the front display isn't required (step SE12), this "display processing of fore route" is ended and processing is returned to the guide/display processing of FIG. 6. On the other hand, if the front display is required (step SE12), "calculation processing of possible display range" of a subroutine is executed (step SE8).

Further if a change of the reduced scale isn't required (step SE4) when the 2nd screen is not in a condition of the front display (step SE2), "calculation processing of possible display range" of a subroutine is executed (step SE8). If a reduced scale change is required oppositely, the value of the data with "reduced scale WDB of the 2nd screen" of RAM 5 is changed (step SE6). Furthermore, this change of reduced scale also is executed by a operation of a specific switch which was provided for touch switch 34.

Point node NDP is found by the calculation processing of possible display range and a guide route is shown in the 2nd screen using this point node NDP and crossing point CSP. Furthermore, the point node NDP is a value of a geographical coordinate of a end point of the guide route which it is possible to show by the above reduced scale WDB.

In other words, a guide route to point node NDP is shown from crossing point CSP on the map which is displayed in reduced scale WDB.

A halfway point of each east longitude coordinate of crossing point CSP and point node NDP is located on a central perpendicular line of the 2nd screen and crossing point CSP is situated on the bottom tip of the screen. A road map which includes the guide route is shown in the 2nd screen (step SE10). When a remain guide route of the guide route which was displayed in the 3rd screen is displayed in the 2nd screen in this way, the flow is returned to the guide/display processing of FIG. 6.

12. Calculation Processing of Possible Display Range

Figure 13:
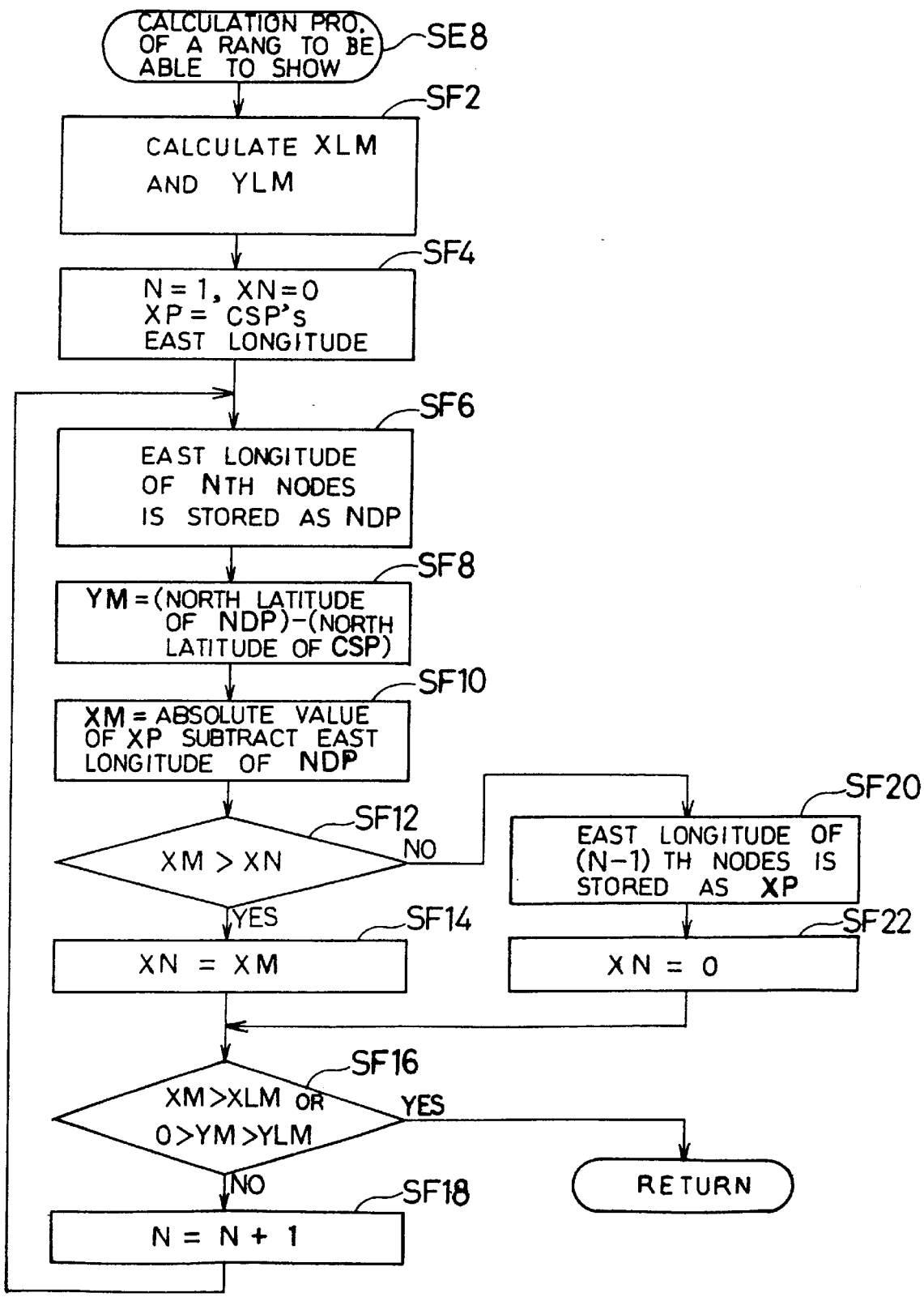
FIG. 13 shows a subroutine of calculation processing of a possible display range of 1st embodiment.

FIG. 13 shows a flow chart of subroutine "calculation processing of possible display range" which was shown in FIG. 12. Firstly a geographical range of a map which can be displayed in the 2nd screen in reduced scale WDB is calculated (step SF2). Here in the case that a map with reduced scale WDB is displayed in the 2nd screen, a straight line distance of a horizontal direction of a screen map which it is possible to show on the screen is calculated and is stored in RAM 5 as horizontal distance XLM. Similarly a straight line distance of a perpendicular direction of a screen map which it is possible to show similarly is calculated and is stored in RAM 5 as perpendicular distance YLM.

Next the processing of step SF6–SF10 is repeated until it is satisfied a condition of step SF12. By these processing, the crossing point CSP of the guide route is made as start point and the guide route is effectively shown in the 2nd screen. In other words, if crossing point CSP is a basic point, the guide route which is possible to show by the reduced scale WDB is in a area of a rectangle which is composed of the above horizontal distance XLM and perpendicular distance YLM.

And then, it is checked in order whether a coordinate value of each node on the guide route is in a square composed of the crossing point CSP as one of angles and surrounded by horizontal distance XLM and perpendicular distance YLM. Therefore value N with the number of times of step SF4 indicates a N-th node on the guide route of which a start point is the crossing point CSP. Then each processing of step SF4 to SF22 is repeatedly executed based on value N with the number of times that is increased one by one.

Moreover value N with the number of times is initialized by "1", interval XN is initialized by "0" and the coordinate value of the east longitude of crossing point CSP is stored as the horizontal XP (step SF4). Next a coordinate value of the Nth node of the guide route which connects with crossing point CSP is read from road data file F4 and node data file F3 and is stored in RAM 5 as point node NDP (step SF6). A value of a north latitude of crossing point CSP is subtracted from a value of a north latitude of this point node NDP and this subtraction result is stored in RAM 5 as perpendicular value YM (step SF8).

Moreover a value of the above horizontal XP is subtracted from a east longitude value of point node NDP and an absolute value with the subtraction value is stored in RAM 5 as horizontal value XM (step SF10). Next if the horizontal value XM is bigger than interval XN (step SF12), a value with horizontal value XM is substituted for interval XN (step SF14).

On the other hand, when the horizontal value XM is less than the interval XN, a east longitude value of a (N–1)-th node of the guide route is stored as the horizontal XP (step SF20). Then interval XN is cleared to 0 (step SF22). At these steps SF12, SF20 and SF22, it is detected that the guide route curves to a direction of east and west.

In other words, the crossing point CSP is displayed in a lower edge of the 2nd screen and when the guide route has a curve apart to the direction of east and west, the guide route which included the curve part must be efficiently shown in the 2nd screen. Therefore the curve part of the guide route is made as a new basic point (the horizontal XP) and the point node NDP which is the end of the displayed guide route is retrieved in order.

Next, the horizontal value XM, perpendicular value YM, each horizontal distance XLM and perpendicular distance YLM which is found by the above steps SF8 and SF10 are compared each other as follows.

XM>XLM (A)

0>YM>YLM (B)

In other words, it is determined that the horizontal value XM is bigger than the horizontal distance XLM by expression (A). Further it is determined that the perpendicular value YM is smaller than "0" or is bigger than the perpendicular distance YLM by expression (B).

If this expression (A) or (B) is concluded, a series of processing of steps SF6 to SF22 is ended. Then the flow returns to the display processing of fore route of FIG. 12. However if expression (A) reaching (B) isn't concluded, "1" is added to the value N with the number of times and a next node of the guide route is processed (step SF18).

By the processing of above steps SF6 to SF22, the crossing point CSP is made as a start point and the coordinate value of a point of a end of the guide route which is efficiently displayed in the 2nd screen is stored as point node NDP. Furthermore a part of the crossing point CSP of the guide route which is displayed in the 2nd screen points to a perpendicular direction.

Figure 14:
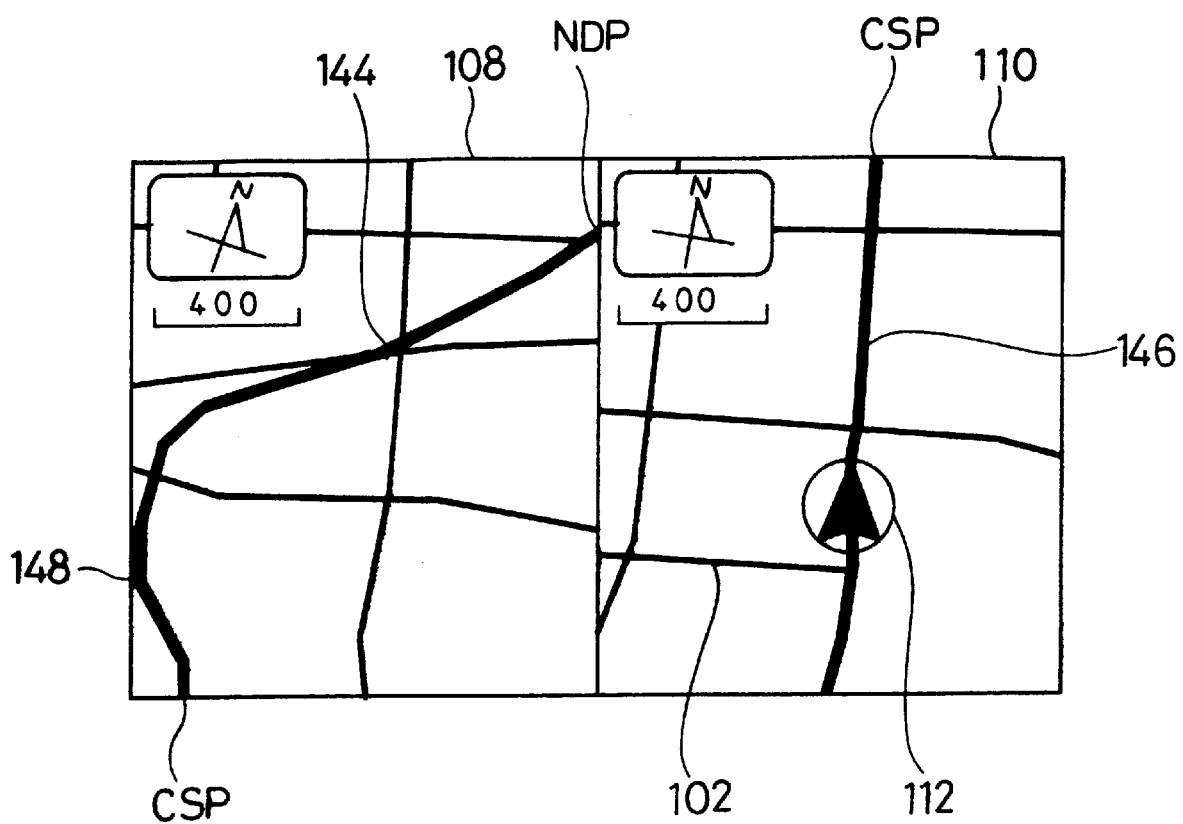
FIG. 14 shows a screen which a fore guide route is displayed.

FIG. 14 shows the 2nd screen in which a fore part of the guide route is displayed by the display processing of fore route of FIG. 12. A guide route 144 of the 2nd screen is connected with the crossing point CSP of the guide route 146 which is displayed at 3rd screen 110. Then when the road map which includes the guide route 144 is displayed in the 2nd screen by reduced scale WDB, a point on the guide route which can be displayed is point node NDP. Further a curve part 148 to a direction of east and west of the guide route is detected by steps SF12 to SF22 in the FIG. 13. In other words, an east longitude value which is stored newly as the horizontal XP by the step SF22 is a coordinates of this curve part 148.

13. Display Processing of Whole Route (Fore)

Figure 15:
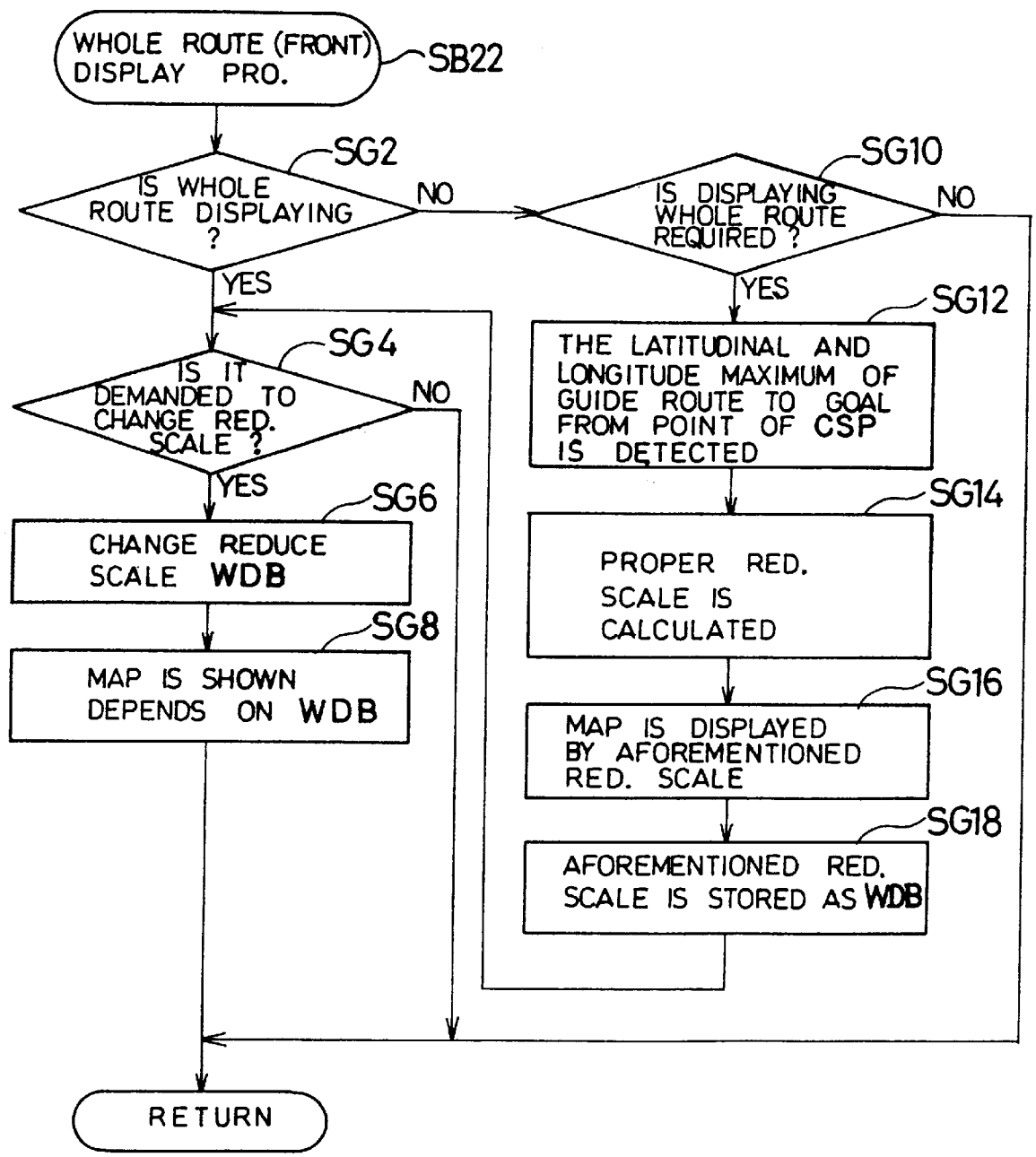
FIG. 15 shows a subroutine of display processing of a whole route (fore) of 1st embodiment.

FIG. 15 shows the subroutine of the display processing of whole route (fore) at FIG. 6. In this processing, all remaining guide route to a destination which continues to crossing point CSP at a end of the guide route which is displayed in the 3rd screen is shown in the 2nd screen. Moreover a display reduced scale can be changed and a wider road map which includes the remaining guide route can be shown in the display processing of whole route (fore).

Firstly, if a whole route is displayed in the 2nd screen (step SG2), it is determined whether a reduced scale change was required or not (step SG4). This reduced scale change is executed by a operation of a specific switch which is provided for touch switch 34 by a user.

When the reduced scale change is required, a value with reduced scale WDB is changed (step SG6) and a map is shown in the 2nd screen at the changed reduced scale WDB (step SG8). Furthermore, when this reduced scale becomes bigger and a whole guide route to a destination from the crossing point CSP can not be displayed in the 2nd screen, the processing which is the same as the display processing of fore route of FIG. 12 is executed. In other words, a display position of the guide route is adjusted and the guide route is most efficiently shown in the 2nd screen.

Also when the reduced scale change isn't required (step SG4), the processing of FIG. 15 is ended and a flow is returned to the guide/display processing of FIG. 6. Moreover when the whole route isn't displayed in the 2nd screen (step SG2), it is determined whether a display of a whole route is required or not (step SG10). The request of a display of a whole route is executed by a operation of a specific switch which is set to touch switch 34.

When the display of the whole route isn't required, the processing of FIG. 15 is ended and a flow is returned to the guide/display processing of FIG. 6. On the other hand, when the display of the whole route is required, in a each node of the guide route from the crossing point CSP to a end point of guide route data ED, maximum latitude, minimum latitude, maximum longitude and minimum longitude are detected (step SG12). A reduced scale with all this maximum latitude, the minimum latitude, the maximum longitude and the minimum longitude which can be held in the 2nd screen is found (step SG14). In the calculation of this reduced scale, a change table of a numerical value which was beforehand found for may be used.

A road map which includes the guide route by the found reduced scale is displayed in the 2nd screen (step SG16) and the reduced scale which was found by the step SG14 is stored in RAM 5 as "reduced scale WDB of the 2nd screen" (step SG18). After this, change processing of a reduced scale since the step SG4 is executed.

Figure 16:
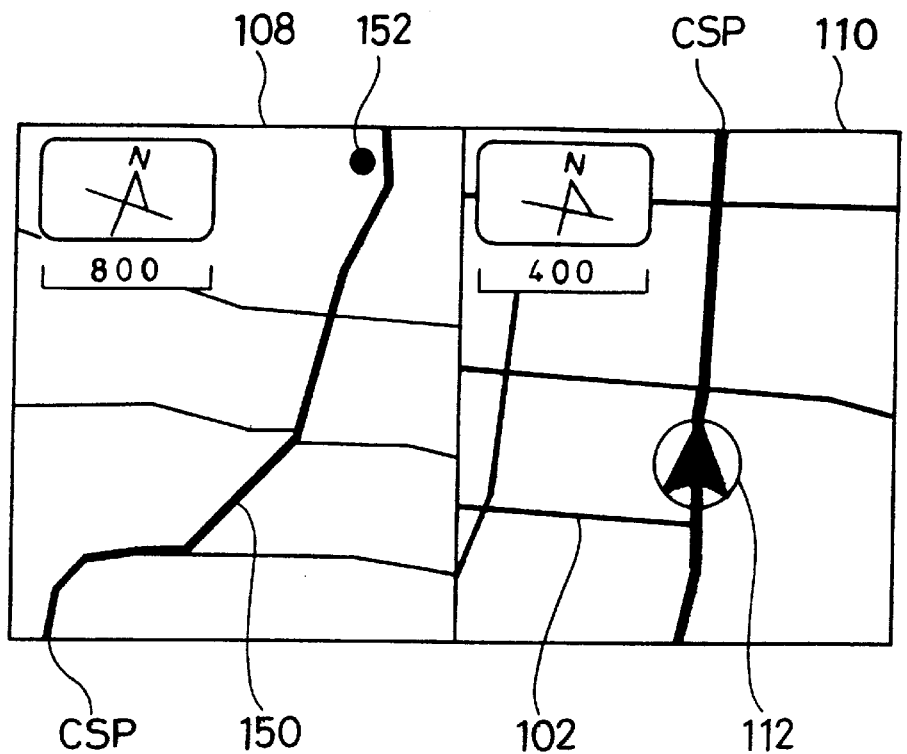
FIG. 16 shows a screen where the remainder of a guide route, i.e. a whole route to a destination was displayed.

FIG. 16 shows the 2nd screen 108 where the guide route from crossing point CSP to destination 152 is displayed by the display processing of this whole route (fore). In this way, in the display processing of the whole route (fore), a whole guide route in front of the crossing point CSP which is a end of the guide route of the 3rd screen is shown in the 2nd screen.

When instructing to divide a screen at the above embodiment, a map information which is necessary to travel is displayed in the 3rd screen and a map information which isn't so necessary to travel is shown in the 2nd screen. For example, when the car approaches intersection to turn right or left, information which indicates direction to turn right or left is more necessary than information of the whole guide route and information which indicates a turning right or left direction is shown in the 3rd screen, then a road information which isn't so necessary is shown in the 2nd screen. Here a general road map which includes the guide route is shown in the 2nd screen.

Further when the car isn't approaching a point to turn right or left, the map which includes a backlane and the map which doesn't include a backlane are automatically shown. For example, when a speed of the car exceeds a constant value, as for the road map which includes a backlane is not important to a driver, therefore a road map only for the main turnpike is displayed in the 3rd screen and a road map which includes a backlane is shown in the 2nd screen.

Furthermore the 3rd screen in the above embodiment is situated on a right of the divided screen of display 33 at a right handle car and is situated on a left side of the divided screen of display 33 at a left handle car. The 3rd screen is a divided screen near the driver.

Therefore guidance information with a higher importance is displayed with priority at a divided screen near a driver and supplementary guide route information is shown in a divided screen near a assistant's seat. Furthermore, a map at a north up may be shown in addition to the map of the head up in the 1st, the 2nd and/or the 3rd screen of the above embodiment. In the head up, a direction of a traveling by the car always points up in the screen map and in the north up, a north of a absolute direction always points up in the screen map.

Figure 17:
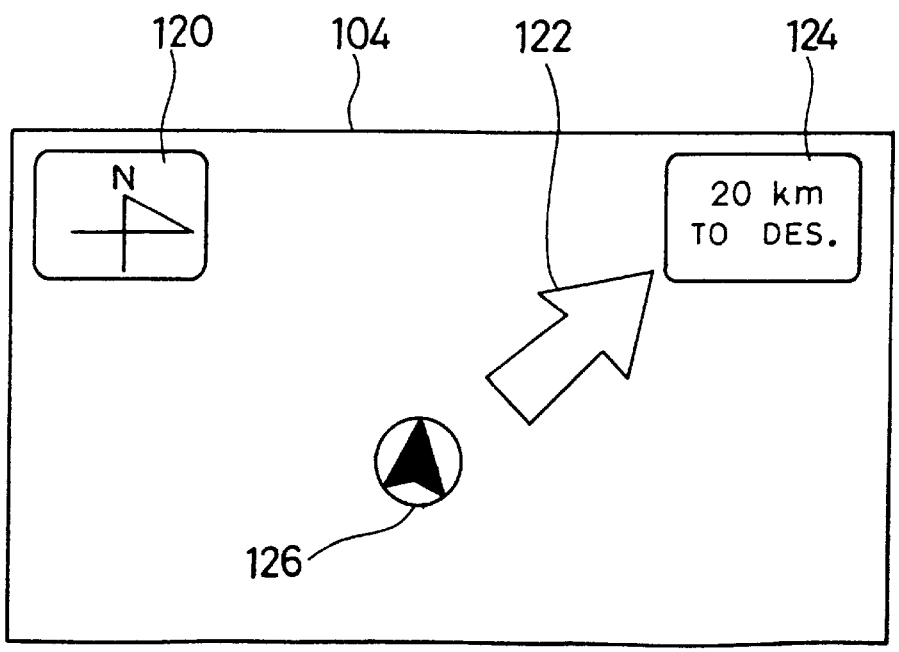
FIG. 17 shows a simple map which is displayed in a display 33.

FIG. 17 shows the simple map which is displayed in the screen of display 33. A symbol 120 which designates the absolute direction (a north of a terrestrial magnetism), a symbol 126 which designates the present position of the car, an arrow 122 which designates a direction to the destination, and characters 124 which designates a distance to the destination are shown in screen 104. Such a simple map may be shown in either of the 1st, the 2nd and/or the 3rd screen.

Furthermore, this simple map isn't limited to the one of FIG. 17, e.g. a traveling direction of the car may be always point up in the screen 104. In this case, a symbol 120 which designates the absolute direction is turned on screen 104 according to relative azimuth data D θ.

FIG. 18 shows a part of a circuit composition of the above image processor 9 which is inserted between image memory 10 and display 33. When the screen of display 33 is divided like FIG. 10, the circuit of this FIG. 18 is also used. An output terminal of image memory 10 is connected with a palette RAM 204 and a palette RAM 208 in parallel and a same image data is input to the palette RAM 204 and the palette RAM 208. An output terminal of palette RAM 204 is connected with a terminal 222 of digital switch 214, an output terminal of palette RAM 208 is connected with a terminal 224 of switch 214 and an output terminal of switch 214 is connected with a digital/analog converter (DAC) 218.

An analog video signal which is output from DAC 218 is input to a display control circuit of display 33 and a various control signal to drive a liquid crystal display is generated. A control signal 202 of image processor 9 is input to image memory 10. A switching control signal 216 of digital switch 214 is generated by image processor 9.

Furthermore although it isn't illustrated, the other circuit of the image processor 9 is connected with the palette RAM 204 and 208 and data of a change table is written. Data of a change table which is written in the palette RAM 204 and data of a change table which is written in the palette RAM 208 are different each other and this different part is data about a display color of the backlane. For example, data in which a color of the backlane is different from a background color of the screen is stored at the change table of the palette RAM 204 and data a color of the backlane is the same as or resembles the background color of the screen and is stored at the change table of palette RAM 208.

A color of the other one which was displayed in the map is made identical almost by the change table of each palette RAM 204. Digital image data which is read from the image memory 10 is changed into serial/parallel and input to address terminals of the each palette RAM 204 and 208. A digital color signal which is output from palette RAM 204 and 208 is input to switch 214 and the switching control of this switch 214 is done by image processor 9. When this switching is done in a division part of the 2nd screen 108 and the 3rd screen 110 and a image data of the 2nd screen 108 is read from image memory 10, the switch 214 is switched to a side of the palette RAM 204. Therefore a color signal which is output from palette RAM 204 is input to DAC 218.

Also when image data of the 3rd screen 110 is read from image memory 10, the switch 214 is switched to a side of the palette RAM 208. As mentioned above, data which displays the backlane is written in the change table of the palette RAM 204 and data which does not display the backlane is written in the change table of palette RAM 208. Therefore to be shown in FIG. 10, the backlane is displayed in the 2nd screen 108 and the backlane isn't shown in the 3rd screen 110.

Furthermore palette RAM 204 and 208 are shown in FIG. 18 respectively only one but these palette RAM is composed of three palette RAMs of red, green and blue.

14. Guide/display Processing of 2nd Embodiment

Figure 19:
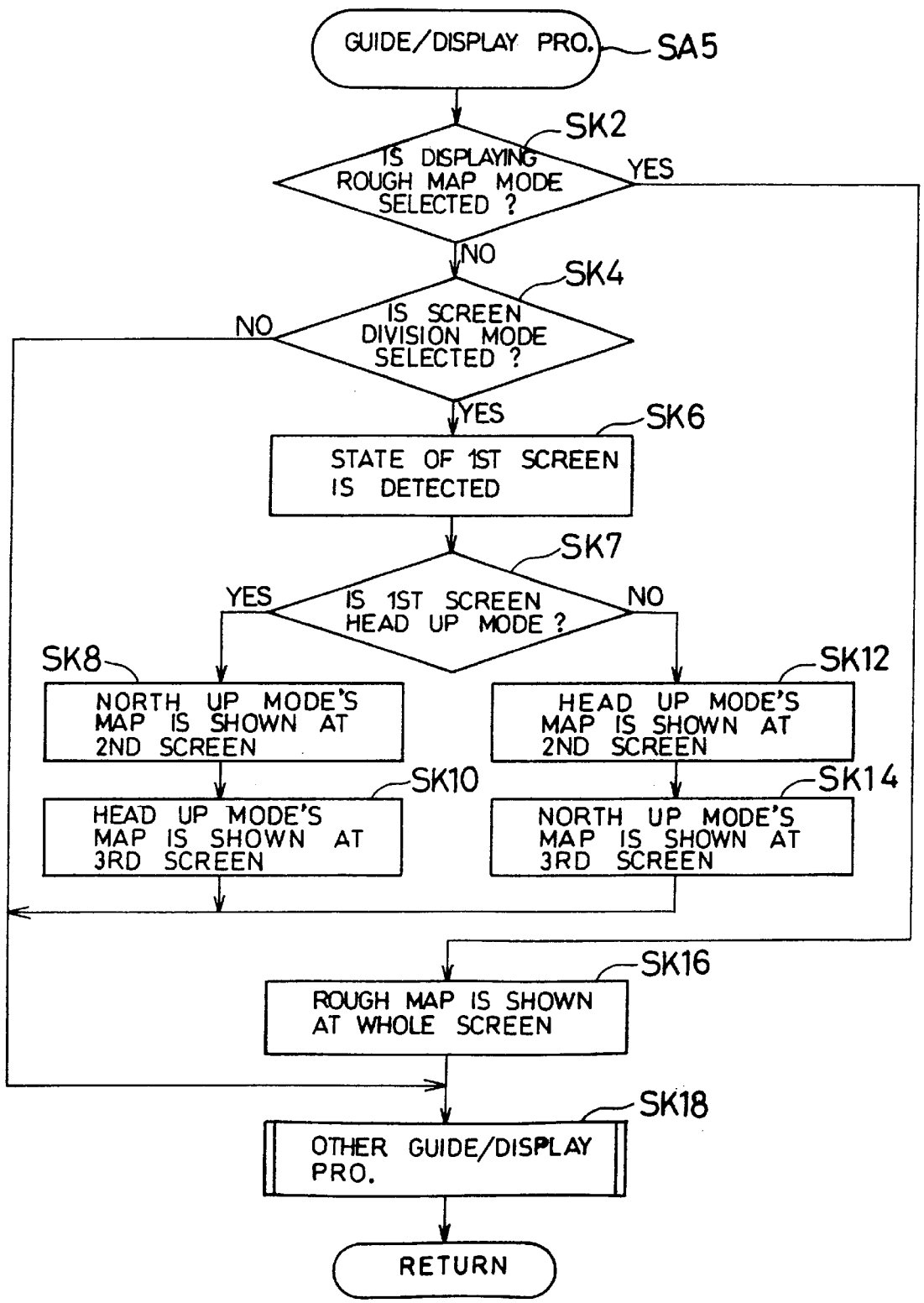
FIG. 19 shows a flow chart of a guidance/display processing of 2nd embodiment.

FIG. 19 shows a flow chart of the guide/display processing of the 2nd embodiment. At this 2nd embodiment, as with the 1st embodiment, the display screen of display 33 is divided, a image at the north up is shown in one of screens which are divided and a image of the head up is shown in the other screen. At the map at the north up, the north always becomes a top of the screen and at the map of the head up, a direction of a traveling by the car always becomes a top of the screen.

In the processing of FIG. 19, first, if a display of a sketch is chosen by the user (step SK2), the sketch is shown in the whole screen of display 33 (step SK16). This sketch is the same as the 1st embodiment and is shown in FIG. 17. A direction of this sketch display is executed by a operation of a specific switch of touch switch 34. When the sketch display isn't chosen (step SK2), if the division display of the screen isn't selected (step SK4), the other guide/display processing of step SK18 is executed. A various information about the guide route where the car travels is displayed and reported at any time at this step SK18.

On the other hand, when the division display of the screen is selected (step SK4), a display condition of the 1st screen before the division is detected (step SK6). This display condition indicates the north up screen or the head up screen and so on. When the head up map is displayed in the 1st screen before the division, the north up map is displayed in the 2nd screen (step SK8) and the head up map is shown in the 3rd screen (step SK10).

Further when the head up map isn't displayed in the 1st screen before the division (step SK7), the head up map is displayed in the 2nd screen (step SK12), the north up map is displayed in the 3rd screen (step SK14) and the map which was displayed before the division is always shown in the 3rd screen. Then the map which is different from the 3rd screen is shown in the 2nd screen. After this, the other guide/display processing is executed (step SK18), the subroutine of FIG. 19 is ended and the flow is returned to the overall processing of FIG. 5.

Furthermore, as with the 1st embodiment, about the 2nd screen and the 3rd screen, the divided screen on the side of the driving person is the 3rd screen and the divided screen on the side of the assistant's seat is the 2nd screen.

Figure 20:
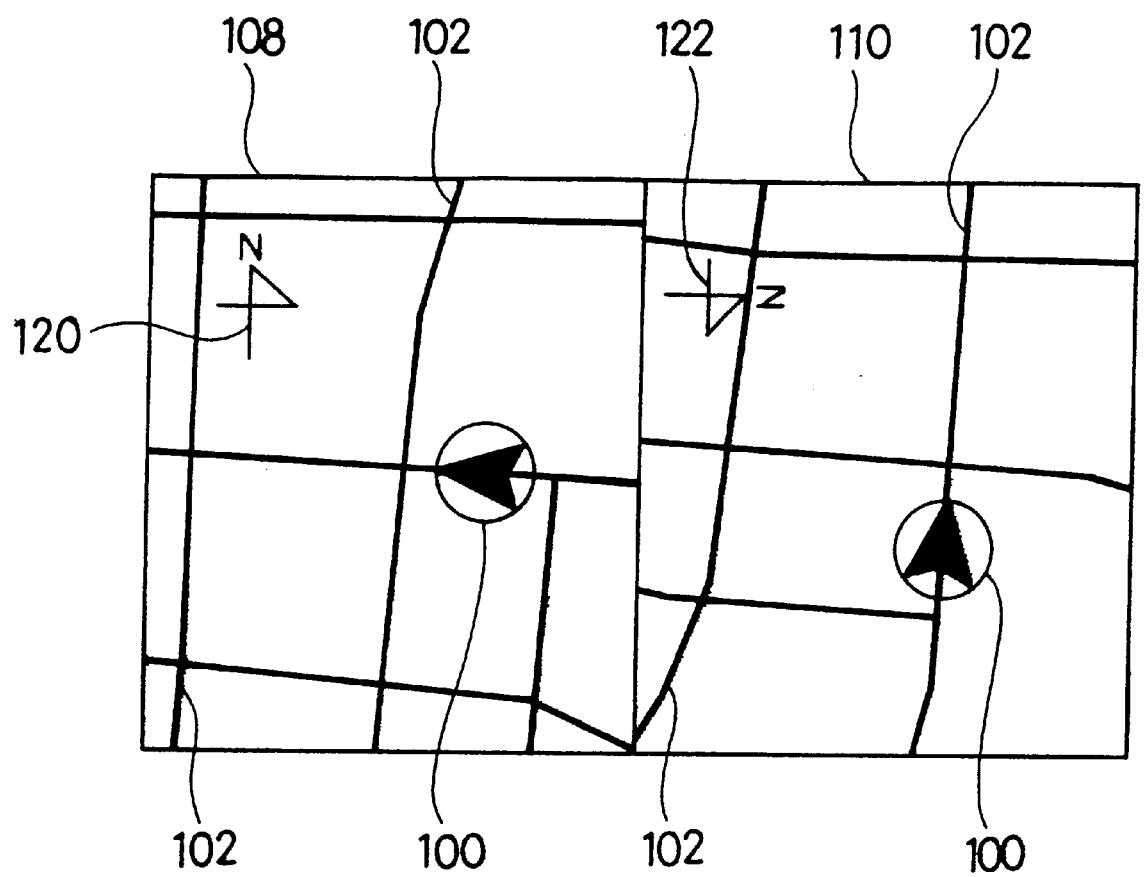
FIG. 20 shows a divided screen of a display 33 by 2nd an embodiment.

FIG. 20 shows a divided screen of this 2nd embodiment. A head up map is shown in the 1st screen before the division as shown in FIG. 9. When instructing to divide the screen, the north up map is displayed in the 2nd screen 108, in this 2nd screen 108, a symbol 120 which shows an absolute azimuth points up and a symbol 100 which shows the direction of the traveling by the car points to the left.

Also the head up map is displayed in the 3rd screen 110 and a symbol 100 which designates the direction of the traveling by the car points up in the 3rd screen and a symbol 122 which designates a northern direction points to the right in the 3rd screen.

15. Guide/display Processing of the 3rd Embodiment

Figure 21:
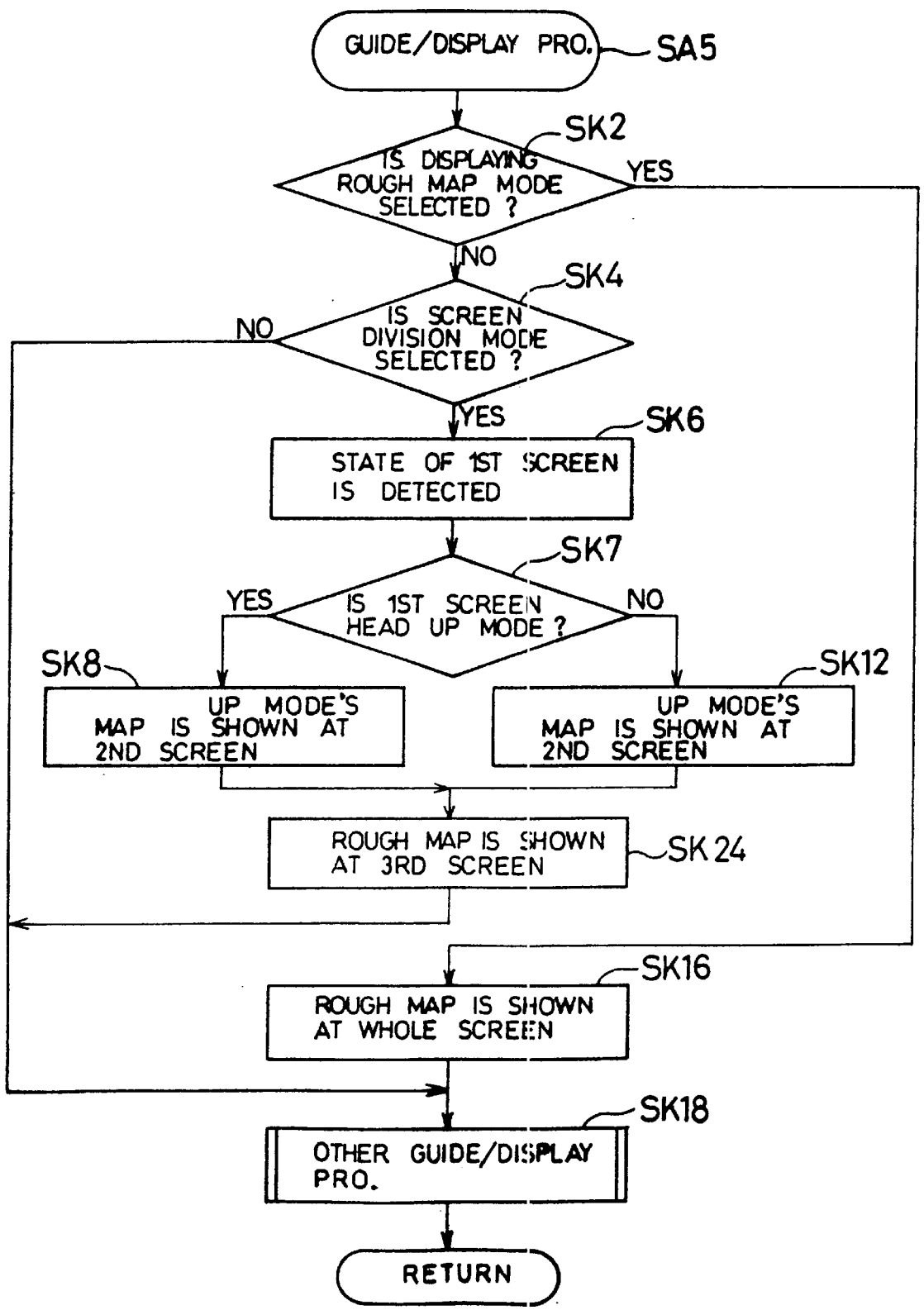
FIG. 21 shows a flow chart of a guidance/display processing of 3rd embodiment.

FIG. 21 designates the flow chart of the guide/display processing of the 3rd embodiment. At this 3rd embodiment, an identical mark is put to the processing which is the same as the 2nd embodiment. At this 3rd embodiment, the display screen of display 33 is divided, the map which was displayed before the division is shown just as it is in one of the screens which are divided and the sketch is shown in the other screen.

When a sketch display is first chosen (step SK2) in the processing of FIG. 21, the sketch is shown in the whole screen of display 33 (step SK16). This sketch is the same as the 1st embodiment and is shown in FIG. 17. The direction of this sketch display is executed by a operation of the specific switch of touch switch 34.

When the sketch display isn't chosen (step SK2), if the screen division isn't selected (step SK4), the other guide/display processing of step SK18 is executed. A various information about the guide route which the car travels is displayed and reported at any time in this step SK18.

On the other hand, when screen division is selected (step SK4), the display condition of the 1st screen before the division is detected (step SK6), when the head up map is displayed in the 1st screen, the head up map is displayed in the 2nd screen (step SK20) and the simple map of FIG. 17 is shown in the 3rd screen (step SK24).

Further when the head up map isn't displayed in the 1st screen before the division, the north up map is displayed in the 2nd screen (step SK22) and the simple map like FIG. 17 is shown in the 3rd screen (step SK24). In other words, the map which was displayed in the 1st screen before the division is always shown in the 2nd screen and minimum guidance information like the direction of the destination and so on is shown in the 3rd screen. After this, the other guide/display processing is executed (step SK18), the subroutine of FIG. 21 is ended and the flow is returned to the overall processing of FIG. 5.

Furthermore, as with the 1st embodiment, about the 2nd screen and the 3rd screen, the divided screen on the side of the driver's seat is the 3rd screen and the divided screen on the side of the assistant's seat is the 2nd screen.

16. Guide/display Processing of the 4th Embodiment

Figure 22:
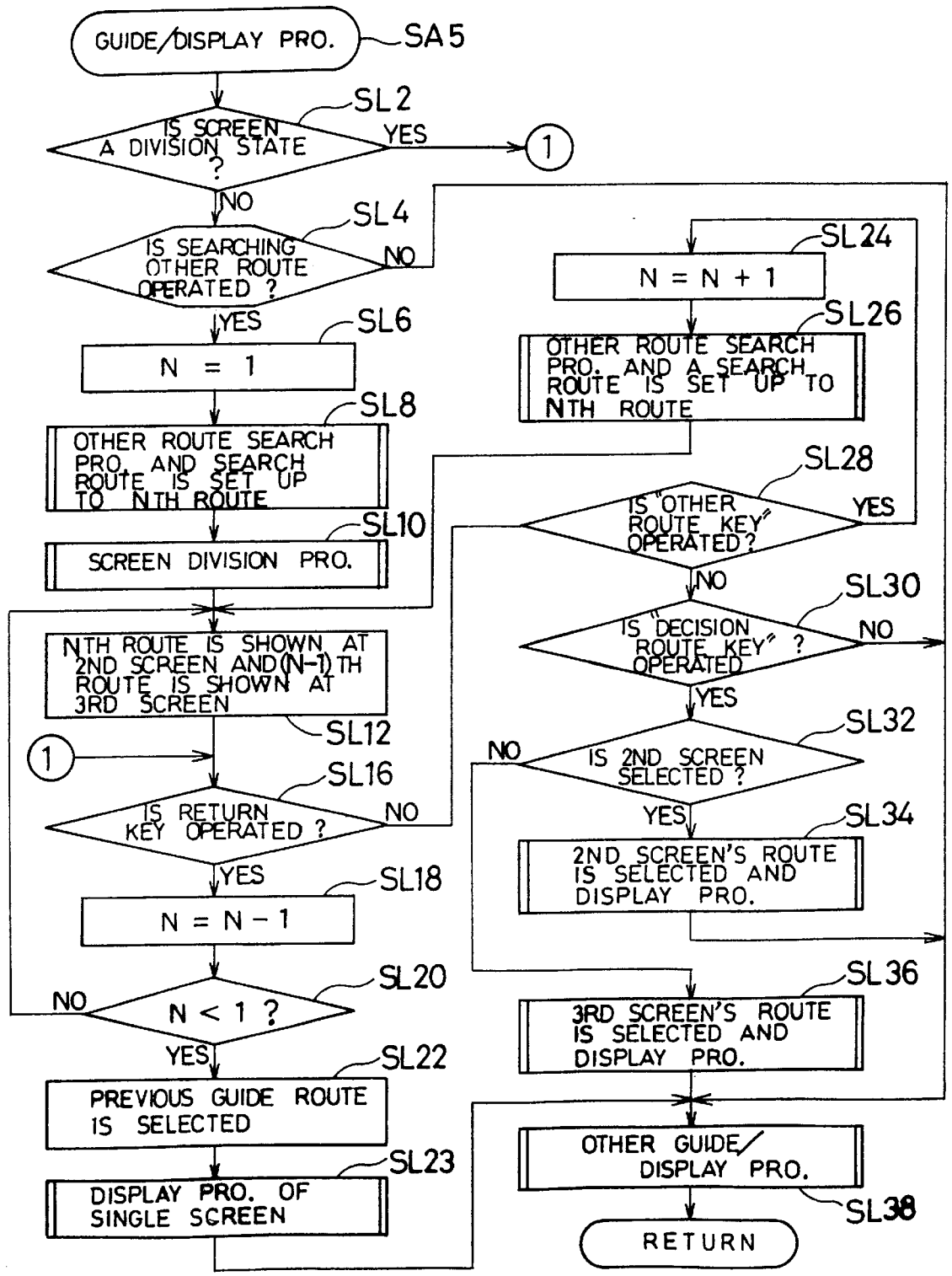
FIG. 22 shows a flow chart of a guidance/display processing of 4th embodiment.

FIG. 22 shows a flow chart of the guide/display processing of the 4th embodiment of this invention. At this embodiment, in addition to the guide route which is identified first, another guide route is searched newly according to the request of the operator (the user). Then the newly found guide route and the earlier found guide route are shown respectively at two divided screens. Also another guide route again search when instructing to do further search, a newly identified guide route is shown in one of the screens and one of the other guide routes is shown in the other screen. Therefore the previous route, the new route or the plural of another route are compared respectively with the divided screen and the operator can select the guide route which agree with the request by contrasting.

At the flow chart of FIG. 22, firstly, it is determined whether the screen of display 33 is divided or not (step SL2). If it is in a division condition, a different guide route which is searched independently is showing in each screen. When a decision of the guide route isn't inputted even if a re-search is ordered by the operator at this embodiment, the whole subroutine of FIG. 22 is repeated, the division condition of the screen of display 33 is maintained until a operation of a decision of the guide route is done by the operator. In other words, when the decision of the guide route by the operator isn't done after the re-search is ordered, the processing of FIG. 22 is once ended and the flow is returned to the main processing of FIG. 5, if the subroutine of FIG. 22 is again called, the processing which was executed just before is repeated once again.

When the search of another route isn't ordered (step SL4) if the screen isn't divided (step SL2), "the other guide/display processing" is executed (step SL38). At "the other guide/display processing", based on the guide route which was found first or the chosen guide route with re-search, various sound information and image information are reported for the car's smooth driving. After this, the guide/display processing of FIG. 22 is ended and the flow returns to the overall processing of FIG. 5. The direction of the search beginning of the another route is executed by a touch by the operator to a icon in "the re-search" or "another route" etc. which was displayed in display 33.

On the other hand, in case of the order of the search of the another route (step SL4), number N of the routes is initialized by "1" (step SL6). The number N of routes means the number of the identified guide routes. Furthermore for example, the searching order in another route is that a operator touches a place of the letter in "another route" (FIG. 23) which is displayed in the screen of display 33. Then when instructing to search another route, a guide route from the present position of the car to the entry destination is searched newly (step SL8). This searched another guide route is different from the guide route with guidance at present.

In the searching of another route of this step SL8, processing like the route search processing of FIG. 5 is executed. The route which connects from the present position of the car to the end point of guide route using each road data and each intersection data which is stored to information memory unit 37 is searched. For example, when the car exists on the guidable road, an intersection in the end of the guidable road is retrieved based on the road data and the intersection data. Then the next intersection which approaches by the destination is retrieved and the road which reaches a destination by the shortest distance is searched from each road which connects from this intersection, these processing is repeated in order and the guide route is searched.

Here the searching processing of the guide route is simply explained. Information about the road is stored, for example, as 1 unit for a road which links between of two forks (intersection etc.), at information memory unit 37 (FIG. 4). The information at each road includes length data in the road, shape data which indicates the direction etc. of the road and road attribute data which indicates the classification etc. of the road. Therefore a searching cost to convert to a length of the road to these data values is set. For example, the wider the width of the road is, the smaller the value with searching cost becomes. Concretely if a number of lanes of the road is 3, the searching cost of "10" is given and oppositely if the number of the lanes is 1 the searching cost of "30" is given. Therefore the searching cost becomes small when the road width is wide, the searching cost becomes big when the road width is narrow.

Similarly a searching cost is also set to the road attribute data, the shape data and so on. The direction (the geographical direction) of the connection at this road is determined by the connection direction data which is included in the previous road data connecting with this road. Therefore the more accurately this connection direction data points to the destination, the smaller the searching cost becomes. Further the searching cost may be also set about the local road, the municipal road, the national highway and so on, and the general road may be primarily selected.

Furthermore, in the computation of this searching cost, a beforehand set table for the numerical value calculation is used. In case of above-mentioned number of the lanes, numerical value correspondence tables (the table) such as the searching cost is "10" at 3 lanes, the searching cost is "30" at 1 lanes, is stored at information memory unit 37 or in ROM 4.

Then the searching cost which corresponds to the value of the attribute, the connection direction of the road and so on respectively is found by each table. The total of these found searching cost is the synthetic searching cost (hereinafter are an total searching cost) of this road. Furthermore, the length of the road may be used as the searching cost just as it is and may be multiplied by a coefficient. In other words, a coefficient value which is principally set by a length of the road is multiplied by a value of the length and the result is made a searching cost for length. Furthermore this coefficient may be also calculated by the numerical value correspondence table (the table) and a correspondence table with the coefficient which is principally set according to the length of the road is stored in the information memory unit 37 or the ROM 4.

For example, coefficient "1.0" is given if the length of the road is less than 10 km, a searching cost with the length is 10×1.0=10. Coefficient "3.0" is given if the length of the road is longer than 10 km and is less than 20 km and the searching cost with this length becomes 20×3.0=60. In this way, a coefficient according to the length of the road is given in order and a comparison of a size with searching cost according to a relative length with distance becomes easy. Furthermore, these values are one example and this invention isn't limited to this numerical value and the calculation of these searching costs may be executed using the computation expression.

In this way, the total searching cost of each road is calculated. Then the total searching cost of each of these roads is found if the road connected from the one beginning point (the node or the intersection) of the searching is more than one. Then the found value of the total searching cost of the each road is separately added to the totaled total searching cost of each road in the searched route, the road which has the smaller amount value with the total searching cost is selected as the optimal route.

A road with the smallest amount value with total searching cost is selected in order in the same way as the road which connects with this selected road. The road which continues from the starting place (guidance beginning point) to the destination (guidance ending point) which is searched in this way is stored in RAM 5 as the guide route data MW. In above-mentioned case, the road which is pointed to the destination and is wider is primarily selected.

Also when each road is connected each other in the intersection by turning right or left, the searching cost of the route may become bigger. By this, turning right or left in the intersection is excluded from the guide route as much as possible. Similarly the searching cost may fluctuate with the existence or non-existence of the traffic signal in the intersection or the existence or non-existence of the name of the intersection and so on. For example, the searching cost value at the intersection which dose not have traffic signal is bigger than at the intersection which has traffic signal.

Therefore an intersection in the better condition where can be passed more smoothly is primarily selected as the guide route. Furthermore in above-mentioned explanation, the total searching cost of the road in the better condition becomes smaller. The other way, the total searching cost of the road in better condition may become bigger. In this case, the searching cost value of the shorter road becomes bigger and the coefficient value which is multiplied by the value of length is in inverse proportion to the value of length. Similarly the searching cost of the wider road becomes bigger.

For example, coefficient "3.0" is given if the length of the road is less than 10 km and a searching cost with the length of the road is made 10×3.0=30, coefficient "0.1" is given if the length of the road is longer than 10 km and is less than 20 km and a searching cost with the length of the road is made 20×0.1=2. In this case, the searching cost of the road with short length becomes big.

Furthermore when the car doesn't exist on the guidable road, a node on the guidable road which is in the specific distance and is nearer to the car is selected as the searching beginning point. If this node of the guidable road which is near to the car is more than one, the node which is nearer to the destination is referred to as the guidance beginning point. This is the same in the searching processing of another route of step SL8 (FIG. 22) and the route search processing (FIG. 5) of step SA4.

Also the road of the guide route which was searched at the route search processing of FIG. 5 or the guide route with guidance at present is selected as less as possible as the new guide route in the above step SL8. For example, a newly searching cost is added to the road which is already used for the previous guide route, numerical value with searching cost "50" is added extra to each road which composes the guide route which was searched with the route search processing of FIG. 5. Therefore the selection of the road which is already used as the guide route becomes difficult, the selection of the road becomes difficult in searching of a newly guide route.

The newly guide route which was searched at the step SL8 in this way is stored in the RAM 5 as the N-th guide route, The display screen of display 33 is divided into the right and the left (step SL10), a divided screen on the left side is referred to as a 2nd screen and a divided screen in the right is referred to as a 3rd screen.

Then the N-th guide route which is identified by the above step SL8 in the 2nd screen is displayed (step SL12) and (N−1)-th guide route is shown in the 3rd screen (step SL12). This (N−1)-th guide route is the first guide route which was identified in the route search processing of FIG. 5 or a route with guidance at present and it is N−1=0. For example, the route of this N=0 is the route which was searched when the destination and so on are set before guidance beginning by the navigation system, is the newly guide route which is re-searched by the guide/display processing of FIG. 22 and is selected or is the route which is re-searched on the traveling way and with guidance at present.

But when the re-searching of the guide route is repeated, the latest guide route is shown in the 2nd screen and a guide route searched immediately before the lastest one is shown in the 3rd screen.

Next when a icon, i.e. a return key of "RETURN" which is displayed in display 33 is pushed (step SL16), each of the guide route which is displayed in the 2nd screen and the 3rd screen is turned into the previous guide route respectively.

By the way, after the searching instruction of another route in the guide/display processing of FIG. 22 is repeated, a N piece of guide route is searched. Then as mentioned above, the latest N-th guide route is displayed in the 2nd screen and (N−1)th guide route is shown in the 3rd screen.

When the return key is pushed in this condition, (N−1)-th guide route is displayed in the 2nd screen and (N−2)-th guide route is shown in the 3rd screen. By this, after the return key is pushed, the display condition of display 33 is returned to the previous one. A series of these processing is executed by steps SL12 to SL20.

That is, the number N of the routes is subtracted in 1 (step SL18) and when the number N of the routes isn't smaller than "1" (step SL20), it returns to the step SL12 again and the searched previous guide route is displayed in the 2nd screen and the former guide route which was searched before the previous one is shown in the 3rd screen.

Reversely when a value of the number N of the routes is smaller than "1" (step SL20), there is not a identified route which is older than the guide route of N=0. Therefore the first route which was searched with the route search processing of FIG. 5 or the present guide route is selected (step SL22). In this case, the division of the screen is canceled and the map which was displayed before the division is shown without changing a reduced scale (step SL23). After this, the other guide/display processing is executed (step SL38) and the guide/display processing of FIG. 22 is once ended.

Furthermore when the number N of routes becomes smaller than "1" (steps SL22 and SL23), another route which was researched at first may be displayed in the 2nd screen and the previous route may be shown in the 3rd screen. In this case, when either of routes of the 2nd screen and the 3rd screen is selected, the division of the screen is canceled.

Furthermore, when a screen is divided and the subroutine of the guide/display processing of FIG. 22 is called, the processing of step SL16 is also executed. In other words, it is determined whether the return key is pushed or not when a screen is divided or whether a route decision key which is described later is pushed or not. In case of the order of the searching of another route, the screen of display 33 is divided. Here this division condition is continued until the guide route of the 2nd screen or the 3rd screen is chosen by the operator, or the "RETURN" key is repeatedly pushed and the number N of the routes becomes to "0".

However this division is canceled, a divided screen is combined and guidance processing is executed by the guide route with decision when a guide route is chosen or "RETURN" is repeatedly pushed until number N of routes become "0". Furthermore the guide/display processing of FIG. 22 is repeatedly executed until the car reaches a end point of guide route. But a searching order in another route is permitted only when the car stops and goes slowly.

Several N of routes are added by "1" (step SL24) when a return key, i.e. "RETURN" key isn't pushed in the step SL16 and another route key is pushed (step SL28). Then a newly guide route is searched once again and a searched newly guide route is stored in RAM 5 as the N-th guide route (step SL26). Furthermore also in case of searching of the guide route of this step SL26, the road which was previous used as the guide route is made difficult to be chosen. In other words, when a road with the smaller total searching cost is selected, a newly searching cost is added to the road which was already selected as the road which composes a guide route. Plural guide routes which are composed by the different roads are searched.

Further the searching condition of the guide routes in this step SL8 or SL26 may be different from the searching condition of the 1st guide route. For example, the 1st guide route takes in a toll road (the expressway) primarily, the 2nd guide route doesn't use a toll road at all. Also the 1st guide route has the shortest distance to the destination and the 2nd guide route takes in a wide road primarily. In this way, in case of the repeated searching of a guide route, a searching condition of each route is changed.

The guide route which is searched by the step SL26 is displayed in the 2nd screen and the guide route which was displayed in the 2nd screen is shown in the 3rd screen (step SL12). Furthermore, in the 3rd screen, the guide route which is searched first by the route search processing of FIG. 5, or the guide route with guidance at present may be always shown. In other words, the latest guide route which is searched every time "another route" key is pushed is shown in the 2nd screen. On the other hand, the route with guidance at present is always shown in the 3rd screen. Therefore the previous guide route and the researched new guide route can be directly compared.

Furthermore, when number N of the route are "1", a route except the guide route which is searched with the route search processing of FIG. 5 is shown in the 3rd screen. In other words, when the route which was searched newly at the guide/display processing of FIG. 22 is selected as the guide route, this new guidance road is referred to as a basic guide route. While guiding according to the new guide route by the searching of another route, when instructing to search the another route once again, this new guide route is shown in the 3rd screen.

"The other guide/display processing" of the step SL38 is executed and the processing of FIG. 22 is once ended if another route key isn't pushed in the step SL28 of FIG. 22 and a route decision key (icon) isn't pushed (step SL30). Reversely when a route decision key is pushed, which of the guide route (icon) of the 2nd screen or the 3rd screen was chosen is determined (step SL32). If the guide route of the 2nd screen is chosen, the screen division of display 33 is canceled. Then the guide route which was displayed in the 2nd screen is shown in the single screen (the 1st screen) after division cancellation (step SL34). Then "the other guide/display processing" is executed and information according to the chosen guide route is displayed and reported and so on (step SL38).

Also when the guide route of the 3rd screen is chosen, screen division by display 33 is also canceled. Then the guide route of the chosen 3rd screen is shown in the combined single screen (step SL36). Moreover "the other guide/display processing" is executed and information according to the chosen guide route is displayed and reported and so on (step SL38). After this, the processing of FIG. 22 is ended and the processing is returned to the flow chart of FIG. 5.

Figure 23:
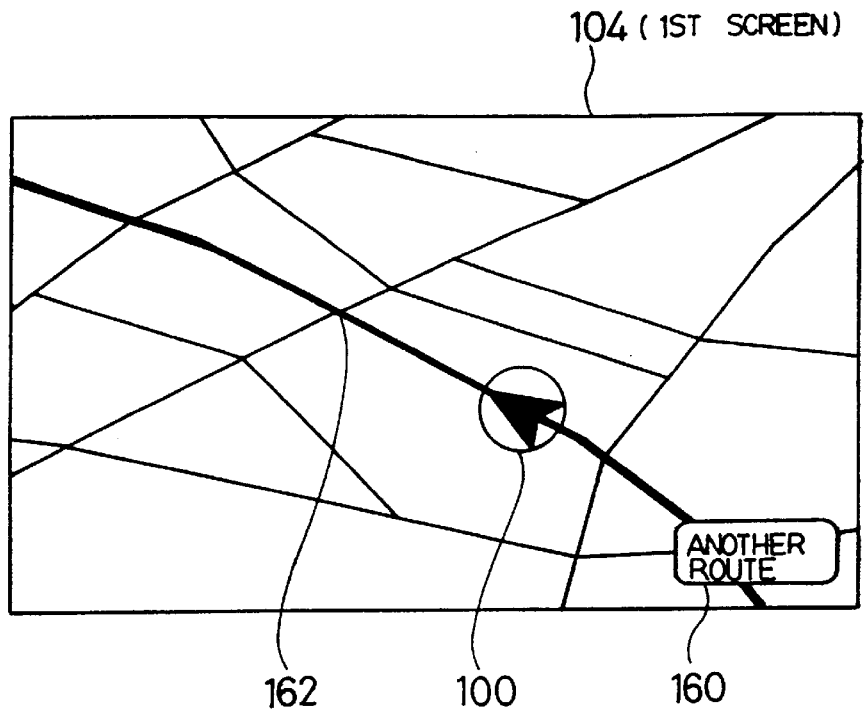
FIG. 23 shows a screen of a display 33 before a screen is divided.

FIG. 23 shows the display screen of display 33 before the division. The first guide route 162 which is searched by the route search processing of FIG. 5 is shown in screen 104, the symbol 100 which designates the present position and the direction of the traveling of the car which is traveling on this guide route 162 is shown and icon 160 of "another route" which is the object of determination of the step SL4 is shown in screen 104.

Figure 24:
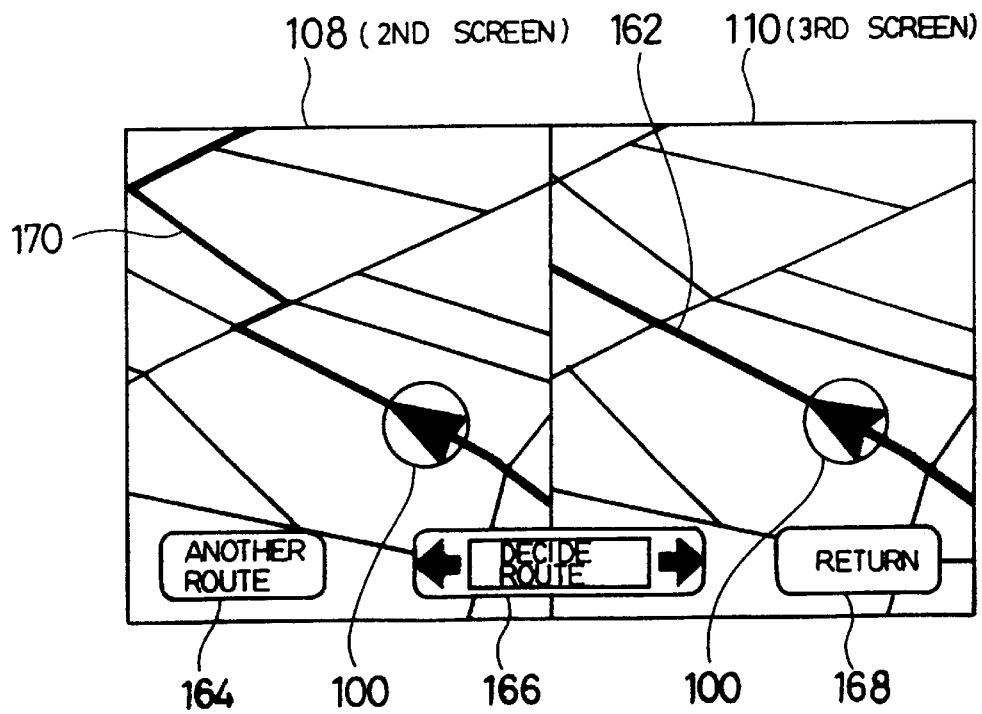
FIG. 24 shows a divided screen of a display 33.

FIG. 24 shows the divided screen of display 33 and shows the screen of the display 33 immediately after the process of the step SL8 of FIG. 22 executed for the first time. The new guide route 170 which is searched by the route search processing of the step SL8 is shown in the 2nd screen 108, the guide route 162 which is displayed with FIG. 23 is shown in the 3rd screen 110. Further icons 164, 166 and 168 are shown in the 2nd screen 108 and the 3rd screen 110, icon 164 designates "another route", icon 166 designates "route decision" key which is the determine object of step SL30, icon 168 designates the "RETURN" key which is the determine object of the step SL16, i.e. a return key.

Figure 25:
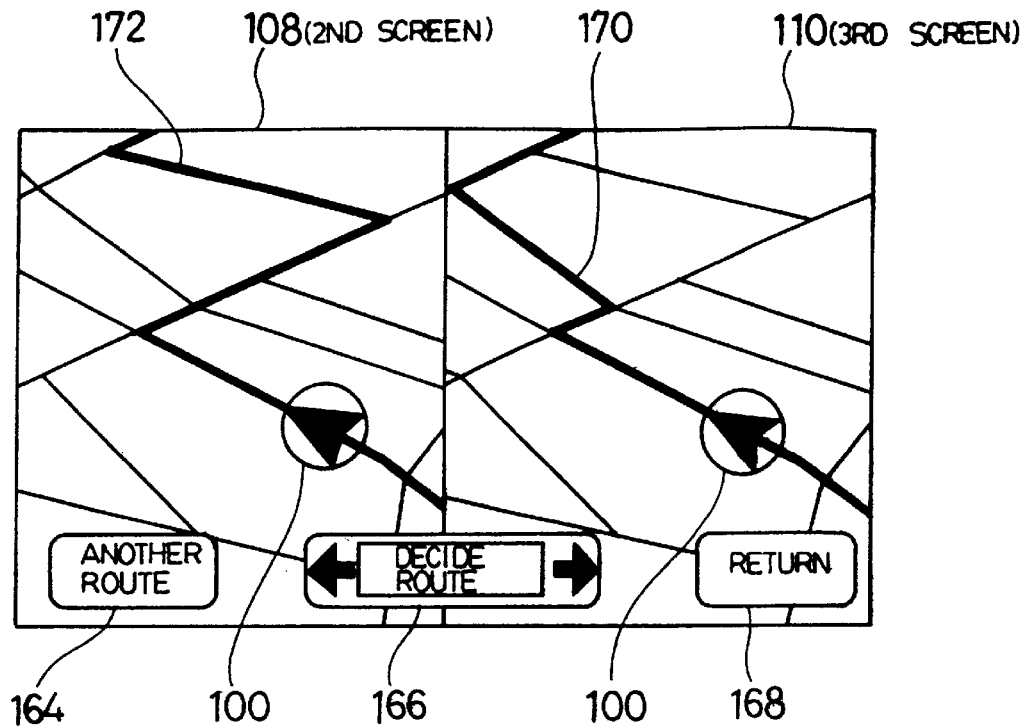
FIG. 25 shows a divided screen of a display 33.

FIG. 25 shows the display screen of display 33 immediately after execution in the processing of the step SL26 of FIG. 22. The guide route 172 which was searched newly by step SL26 is shown in the 2nd screen 108. The guide route 170 which was displayed in the 2nd screen of FIG. 24 is shown in the 3rd screen. Furthermore, icons 164, 166 and 168 are the same as the icon of FIG. 24.

Figure 26:
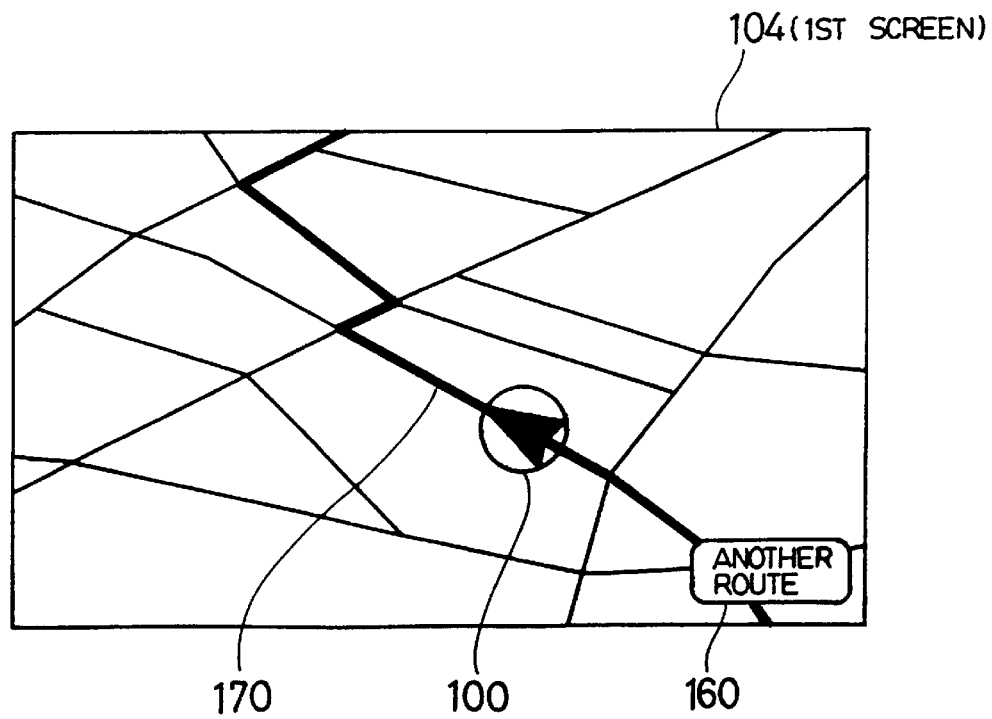
FIG. 26 shows a single screen that division of a display 33 was canceled.

FIG. 26 shows the screen of the display 33 which is returned to the single screen by the step SL36 of FIG. 22. For example, screen division is canceled when icon 166 is pushed in the FIG. 25 and the guide route 170 of the 3rd screen 110 is chosen, the guide route 170 is shown at whole single 1st screen 104. Furthermore, icon 160 is also shown in the screen 104 after this screen division cancellation.

The route which is displayed in each of the 2nd screens and the 3rd screens at the 4th embodiment may be freely selected. In other words, when another route are searched at N times, optional one of N piece of the another routes is shown in the 2nd screen. Likewise the other optional one of the another routes may be shown in the 3rd screen.

Moreover the route which is displayed in the 2nd screen or the 3rd screen may be fixed, for example, the previous route immediately before another route is re-searched may be always shown in the 3rd screen. The reduced scale of the map which is displayed in the 2nd screen and the 3rd screen isn't especially limited. In order to display the whole route from the present position of the car to the destination in each whole divided screen, the reduced scale may be automatically adjusted. Or using the reduced scale before the screen division, the map of each divided screen may be shown.

17. Guide/display Processing of the 5th Embodiment

Figure 27:
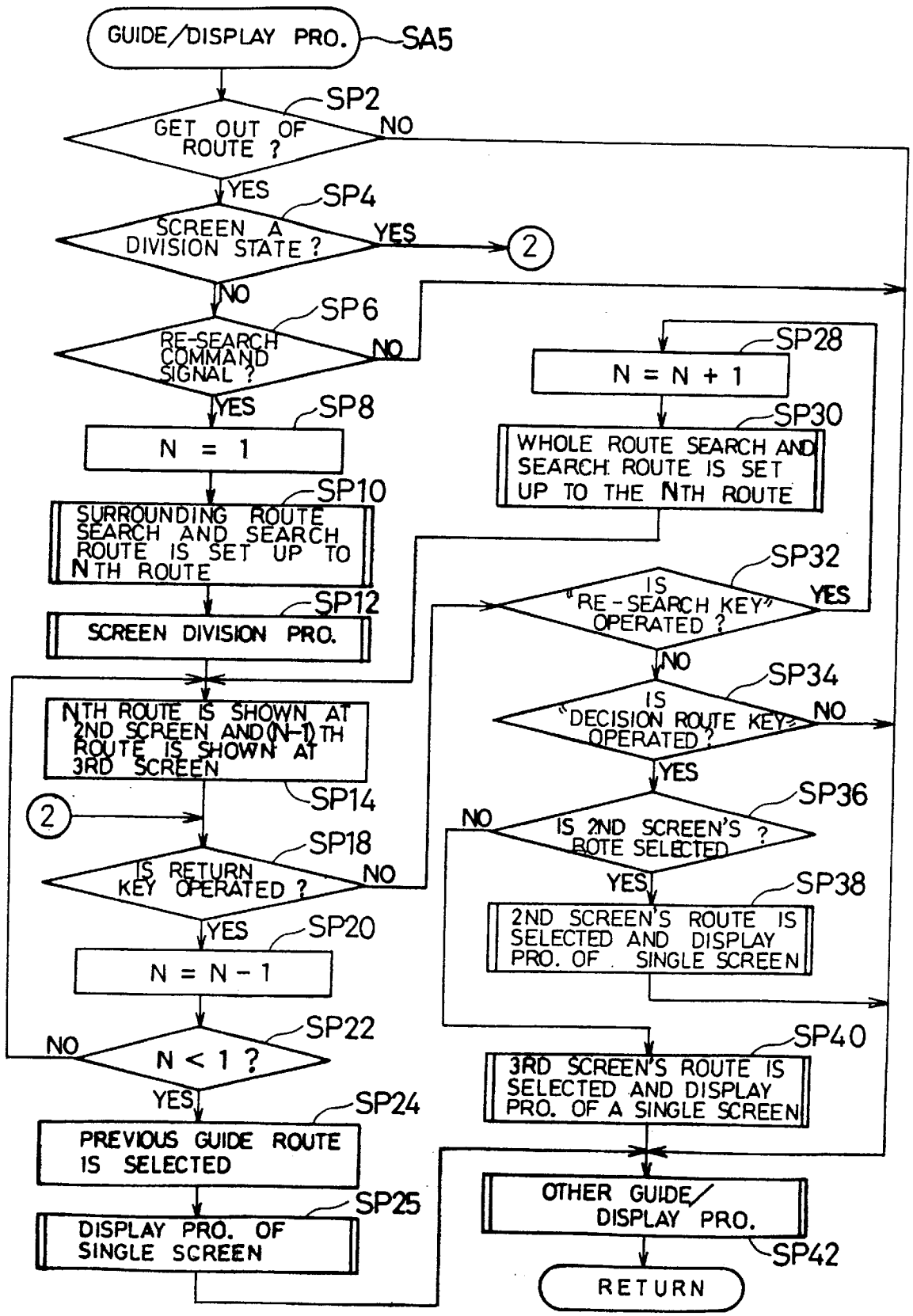
FIG. 27 shows a flow chart of a guidance/display processing of 5th embodiment.

FIG. 27 shows a flow chart of the guide/display processing of the 5th embodiment. When the car deviate from the guide route during the guide, at the guide/display processing of this 5th embodiment, a return route which returns to the guide route and another route which is searched newly or the previous route are shown respectively at the divided screen.

Firstly "The other guide/display processing" is executed (step SP42) and information according to the guide route is reported and displayed and so on, if the car doesn't deviate from the guide route and the car is traveling on the guide route (step SP2). After this, the processing of FIG. 27 is ended and the processing is returned to the flow chart of FIG. 5. In a detection in the deviations from the guide route of the step SP2, a present position information PI which is stored in RAM 5 and a geographical coordinate at the road which composes the guide route data MW are compared.

However when the car deviates from the guide route, if the screen is divided (step SP4), two of already searched guide routes are showing in each of the screens on the right and the left. In this case, when the return key is pushed or the route identity key is pushed, if the screen is divided, the processing of step SP18 is executed.

However, if the screen isn't divided, it is determined whether a order of the re-searching is input or not (step SP6) and it is determined whether a re-searching of the route which returns to the guide route on guiding is instructed or not. The order of these re-searching is executed by touches of the operator on the icon such as "re-searching" or "another route" which is displayed in the screen of display 33 and this touch is based on on/off of the touch switch 34.

When this re-searching isn't ordered, the map in which the car deviated from the guide route is continuously shown in the display 33. Further in this case, an information to warns that the car deviate from the guide route may be reported at any time. Moreover if the re-searching is ordered, number N of routes are initialized by "1" (step SP8) and a route which returns to the guide route from the present position of the car is searched. A searching of this return route is search processing of surrounding route and a road which reaches the guide route is primarily selected. For example, in case of the road opposite to the direction of the moving of the car, fixed searching cost is added to the total searching cost and the total searching cost becomes big. Similarly a specified value is also added to the cost of the road which leaves the guide route and the searching cost becomes big. As the result, a road which approaches the guide route is primarily selected.

After this the return route which is identified is set as the N(N=1)-th route (step SP10) and the screen of display 33 is divided (step SP12). N-th guide route is shown at the divided 2nd screen (step SP14). Here it is N=1 and the return route to the guide route on guiding at present is shown in the 2nd screen. Further this N-th guide route is shown in the different color, etc. from the one of the previous guide route which the car deviates from and the previous guide route can be distinguished from the return route.

Furthermore, (N−1)-th guide route is shown in the 3rd screen. Here it is N−1=0, this (N−1)-th guide route is the first guide route which was identified with the route search processing of FIG. 5 or is the guide route when the car deviates. Next if the icon of "RETURN" (the return key) which was displayed in the screen of display 33 is pushed (step SP18), the guide route which is displayed in the 2nd screen and the 3rd screen is changed to the immediate previous guide route respectively. Further if search processing of whole route in step SP30 which is described later repeated, N piece of the guide route is identified. Immediately before the above return key is pushed, the latest N-th guide route is showing in the 2nd screen and the (N−1)-th guide route is showing in the 3rd screen. The push of the icon of the above "RETURN" (the return key) depends on on/off of the touch switch 34.

Then if the return key is pushed, (N−1)-th guide route is shown in the 2nd screen and (N−2)-th guide route is shown respectively in the 3rd screen. In this way, when the return key is pushed, the display condition of display 33 is returned to the immediate previous condition, a series of these processing is executed by steps SP14 to SP22.

That is, when "RETURN" i.e. the return key is pushed, the value of number N of routes is subtracted by "1" (step SP20). When the value of number N of routes isn't smaller than "1" (step SP22), it returns to step SP14 again, the guide route which was searched once before is shown in the 2nd screen and the guide route which was searched twice before is shown in the 3rd screen.

When the value of number N of routes is smaller than "1" (step SP22), because there is not a identified route before the guide route of N=0, the guide route which was guided when the car deviated is selected (step SP24). Then the image before the division is shown, the previous route and the car which deviated from this route are shown in one map screen (step SP25). After this, the other guide/display processing is executed (step SP42) and the guide/display processing of FIG. 27 is once ended. In this case, the guiding processing of a route isn't executed.

Moreover if the "RETURN" key is pushed when the number N of the routes is "1", division isn't canceled, the return route is shown in the 2nd screen and the guide route from which the car deviated may be continuously shown in the 3rd screen. In this case, when 2nd screen or 3rd screen route is chosen, screen division is canceled. Moreover if "RETURN" key is pushed when the number N of the routes is "1", the return route of the 2nd screen may be compulsorily selected, it is determined that a return to the previous guide route is required.

Further when the car deviates from the previous guide route, moreover the screen is divided and the subroutine of the guide/display processing of FIG. 27 is called, the processing of step SP18 is also executed first. In other words, when a screen was divided, it is determined whether the return key is pushed or not or it is determined whether the route identifying key etc. which are described later are pushed or not. Moreover if the order of the re-searching is once inputted, the screen of display 33 is divided. Then, if the guide routes of the 2nd screen or the 3rd screen are not chosen by the operator or return key (RETURN) isn't repeatedly pushed until the number N of the routes becomes "0", this division is continued. However if the guide route is chosen, the division is canceled and the screen is made single, guiding processing by the identified guide route is executed.

Further, the guide/display processing of FIG. 27 is repeated until the car reaches the end point of guide route. Furthermore, the reduced scale of the map which is displayed in the 2nd screen and the 3rd screen isn't especially limited at this embodiment, when another re-searched route is displayed, the whole route may be shown on the screen. Or with the reduced scale of the map which was displayed in the 1st screen before the division, the map of the 2nd screen and the 3rd screen may be shown.

The number N of routes are added by "1" (step SP28) and a newly guide route is searched when the pushing of the return key, i.e. the "RETURN" key isn't detected at step SP18 and the research key is pushed (step SP32). A identified newly guide route is stored in the RAM 5 as the N-th guide route (step SP30). Furthermore, in the searching of the guide route of this step SP30, the road which is used for the guide route which was identified before is difficult to be selected. In this case, the newly searching cost is added to the already selected road which composes the guide route and plural guide route which was composed by the different road is searched. In the whole route searching at this step SP30, processing like the step SL8 etc. of the above FIG. 22 is executed.

Further the searching condition of the guide route in this step SP30 may be different from the searching condition of the first guide route. For example, the first guide route takes in a toll road (expressway) primarily and the second guide route doesn't use a toll road. Moreover the first guide route has the shortest distance to the destination and the second guide route takes in a wide road primarily. In this way, in repeated guide route searching, each route search condition may be changed.

The guide route which is searched in the step SP30 is displayed in the 2nd screen and the guide route which is displayed in the 2nd screen is shown in the 3rd screen (step SP14). Furthermore the guide route which was searched first by the route search processing of FIG. 5 or the guide route on guiding at present may be always shown in the 3rd screen. In other words, the latest guide route which was searched every time the "re-searching" key is pushed is shown in the 2nd screen. The guide route from which the car has deviated is shown in the 3rd screen. By this the previous guide route and the new guide route in every searching processing is executed can be directly compared.

Moreover each route which is displayed in the 2nd screen and the 3rd screen may be freely specified and be shown by number N of routes. In other words, when re-searching is executed in the N time, one of the N piece of routes is selected and may be shown by each of the 2nd and the 3rd screens.

Furthermore when number N of routes are "1", a route except the guide route which was identified by the route search processing of FIG. 5 is shown in the 3rd screen. In other words, when the new route which is searched at the guide/display processing of FIG. 27 is selected as the guide route, this new guiding road is referred to as a basic guide route. Therefore while guiding processing is executed by the new guide route which is searched by the re-searching, the new guide route is shown in the 3rd screen if re-search is instructed once again.

Further when a re-search key isn't pushed with the step SP32, it is determined whether a guidance beginning (route identifying) key is pushed or not (step SP34). Furthermore, when the search processing of surrounding route of the step SP10 is executed, a return route is displayed in the 2nd screen and the previous guide route is displayed in the 3rd screen, but the car is not on this guide route. Therefore, when guidance by the guide route of this 3rd screen is required, the guiding can be executed using the return route of the 2nd screen. Then when a return route is displayed in the 2nd screen, the icon "guidance beginning" is displayed in the 2nd screen and it is determined whether this guidance beginning key is pushed or not in the step SP34.

Further if a 3rd screen (the deviations from the guide route) is chosen when number N of routes are "1", nothing may be guided. In this case, this screen is returned to the single screen before the division, the guide route from which the car have deviated and the car is displayed and similar processing to the processing (steps SP24 and 25) that "RETURN" key was pushed is executed when the number N of the routes is "1".

However when whole route searching in step SP30 is repeated, as in the 4th embodiment, the icon of "route identifying" is shown in the screen of display 33. Then if the guidance beginning (the route identifying) key isn't pushed (step SP34), "the other guide/display processing" of step SP42 is executed and the processing of FIG. 27 is once ended. When the route identifying key is pushed, if the guide route of the 2nd screen is chosen (step SP36), the screen division of display 33 is canceled, the guide route which is displayed in the 2nd screen is shown in the 1st screen after division cancellation (step SP38), "other guide/display processing" is executed and information according to the chosen guide route is displayed and reported and so on (step SP42). The above "route identifying", i.e. the choice of the guide route also depends on on/off of the touch switch 34.

Further the screen division of display 33 is also canceled when the guide route of the 3rd screen is chosen, the guide route which is chosen is shown in the single screen of display 33 is shown (step SP40), "other guide/display processing" is executed and information according to the chosen guide route is displayed and reported and so on (step SP42). After this the processing of this FIG. 27 is ended and the processing is returned to the flow chart of FIG. 5. Furthermore the reduced scale of the map after these division cancellation may be the same as or be different from the reduced scale of the map before the division.

Figure 28:
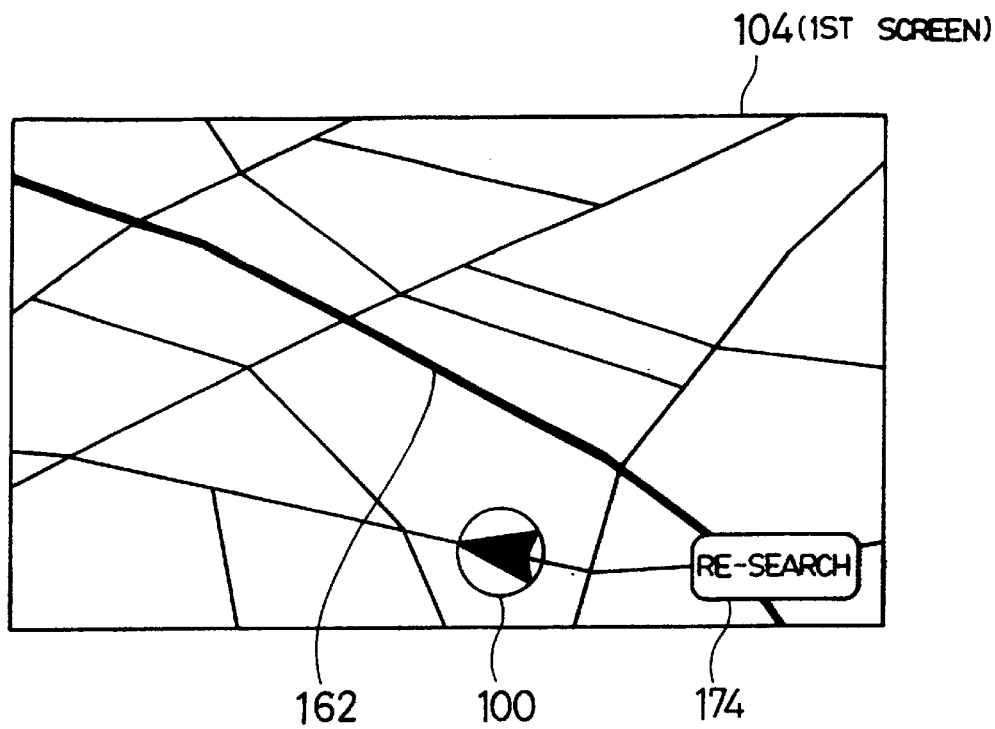
FIG. 28 shows a screen of a display 33 before a screen is divided.

FIG. 28 shows the screen of display 33 before the division. The first guide route 162 which is searched by the route search processing of FIG. 5 is shown in screen 104, the symbol 100 which shows the present position and the direction of the traveling of the car deviated from this guide route 162 is shown in screen 104 and the icon 174 of "researching" which is the object of determination of the step SP4 is shown in screen 104.

Figure 29:
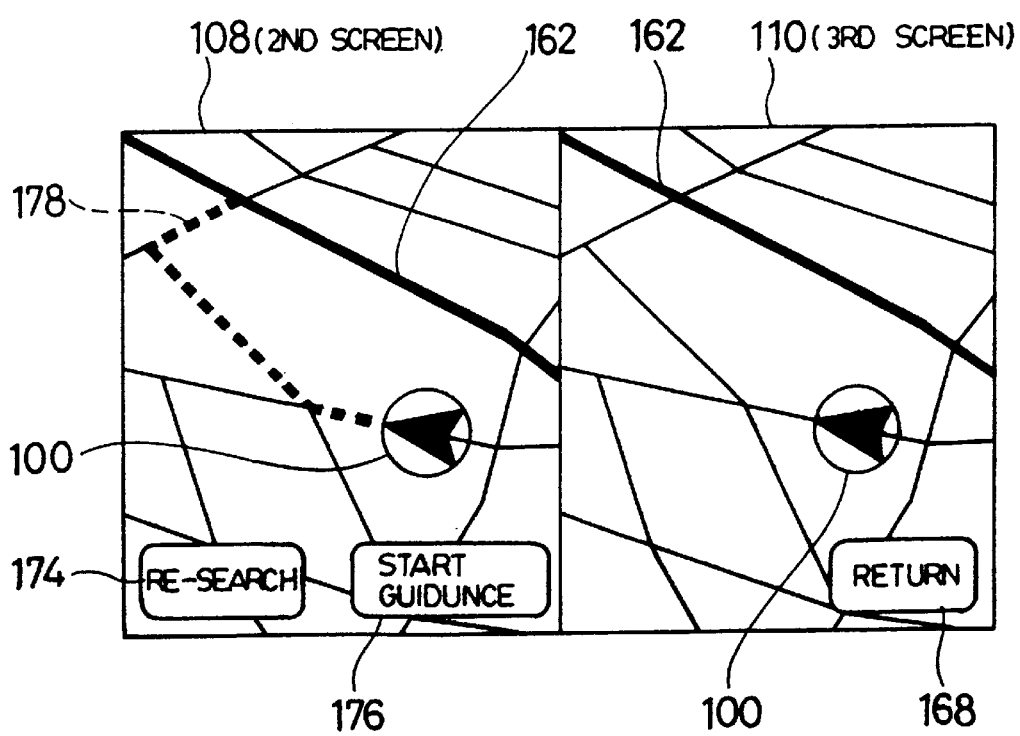
FIG. 29 shows a divided screen of a display 33.

FIG. 29 shows the divided screen of display 33 and shows the screen of the display 33 immediately after the step SP10 of FIG. 27 is executed. The return route 178 which is identified by the search processing of surrounding route of the step SP10 is displayed in 2nd screen 108 and the guide route 162 which is displayed in FIG. 28 is shown in 3rd screen 110. Further icons 174, 176 and 168 are shown in the 2nd screen 108 and the 3rd screen 110, the icon 174 designates "re-identifying" key and the icon 176 designates "guidance beginning" key which is the object of determination of the step SP34 and the icon 168 designates "RETURN" key which is the object of determination of the step SP18, i.e. a return key.

Figure 30:
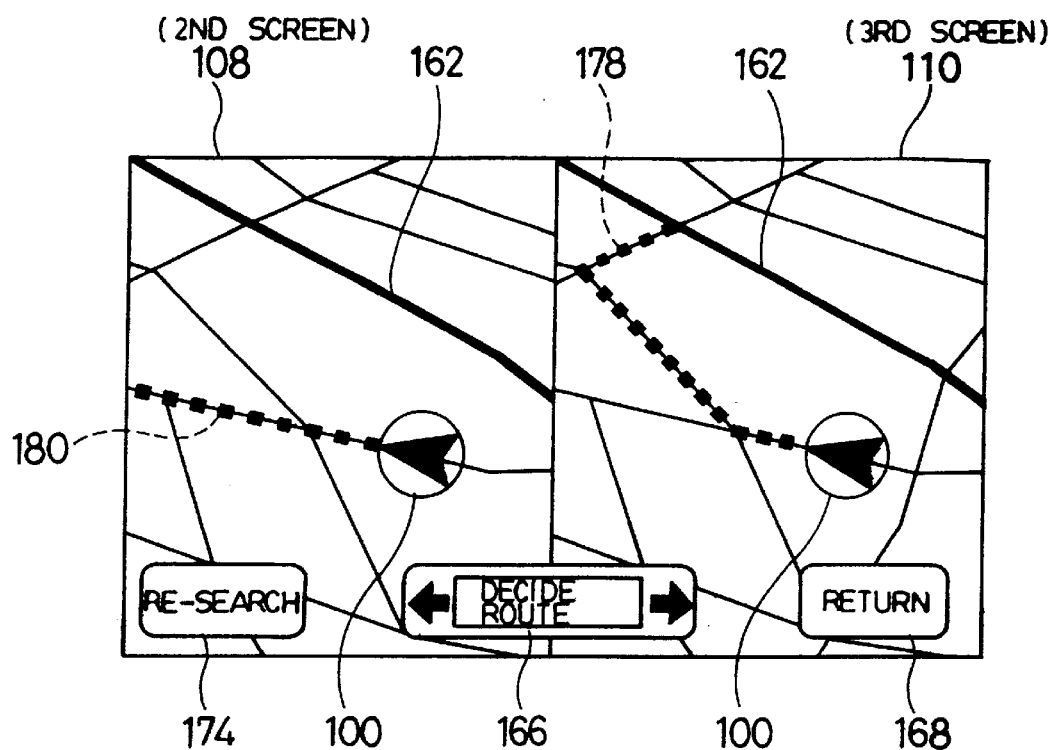
FIG. 30 shows a divided screen of a display 33.

FIG. 30 shows the screen of the display 33 immediately after the step SP30 of FIG. 27 is executed. The guide route 180 which is identified newly in the step SP30 and the guide route 162 which is identified first are shown at 2nd screen 108 and the return route 178 which was displayed in the 2nd screen of FIG. 29 is shown in the 3rd screen. Furthermore icons 174 and 168 have a function which is the same as the icon of FIG. 29 and icon 166 is a route identifying key and corresponds to the icon of "guidance beginning" of FIG. 29. Further two guide routes are displayed in the 2nd screen 108 of FIG. 30 but only guide route 180 may be shown.

Figure 31:
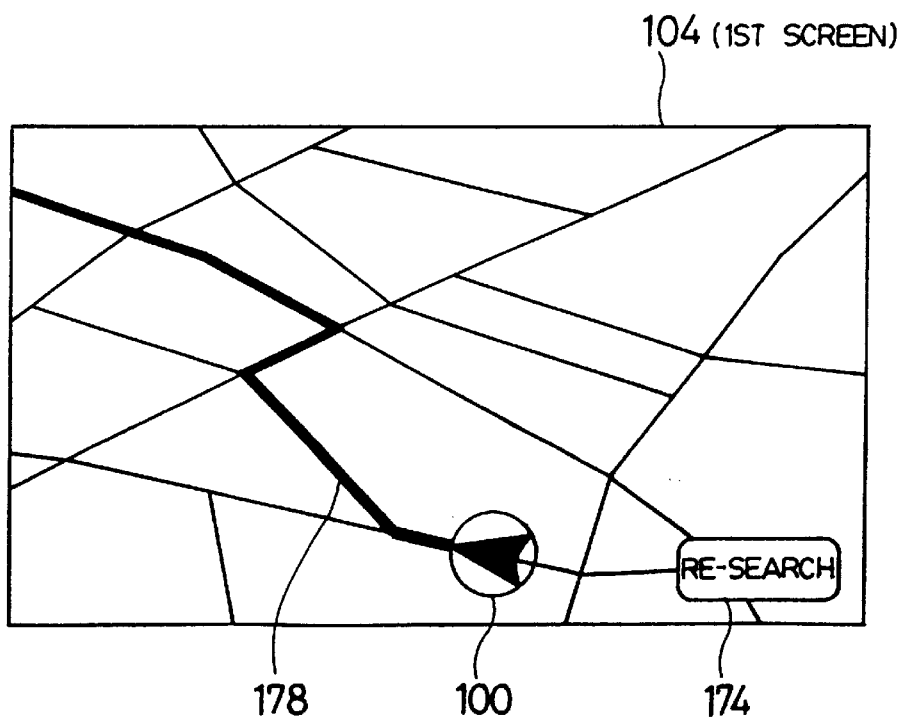
FIG. 31 shows a single screen that division of a display 33 was canceled.

FIG. 31 shows the screen of the display 33 which is returned to the single screen in the step SP40 of FIG. 27. For example, if icon 166 is pushed in FIG. 30 and the return route 178 of 3rd screen 110 is chosen, the screen division is canceled and the return route 178 and the guide route 162 are shown wholly in the single 1st screen 104. Furthermore the icon 174 is also shown in the screen 104 after this division cancellation.

Figure 32:
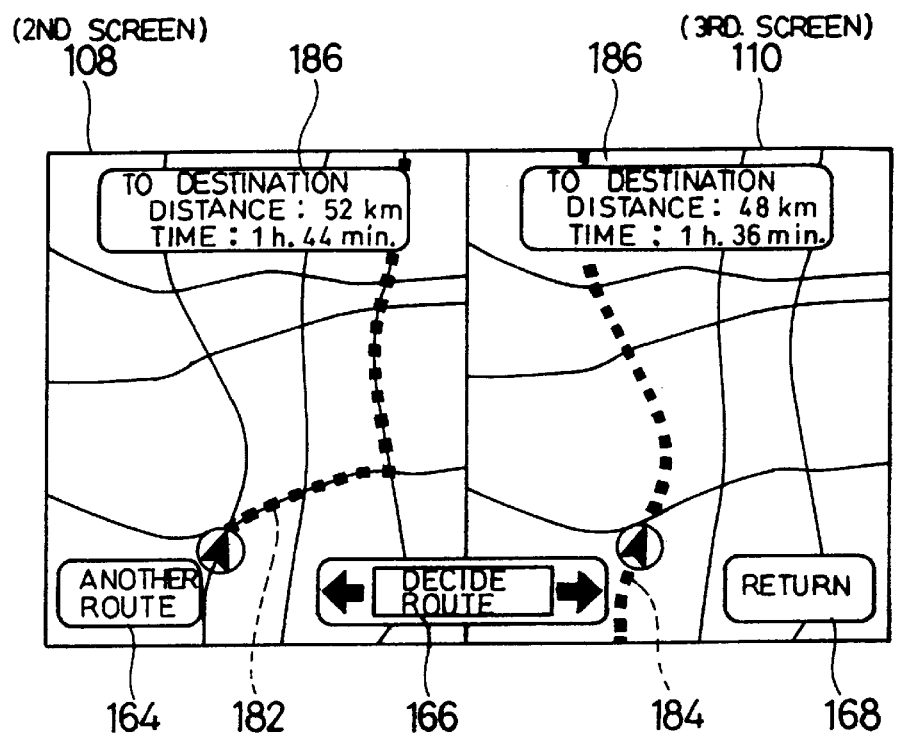
FIG. 32 shows a divided screen of a display 33.

FIG. 32 shows the other example of FIG. 24 and FIG. 25 of the 4th embodiment and FIG. 30 of the 5th embodiment. In this example, a distance and time information 186 are shown with the guide route. This distance and time information indicate a distance and required time to the end point of guide route. For example this distance and time information are the distance according to the route and the required time to travel this distance by the prescribed speed, when traveling guide route 182 to the end point of guide route in FIG. 32.

Figure 33:
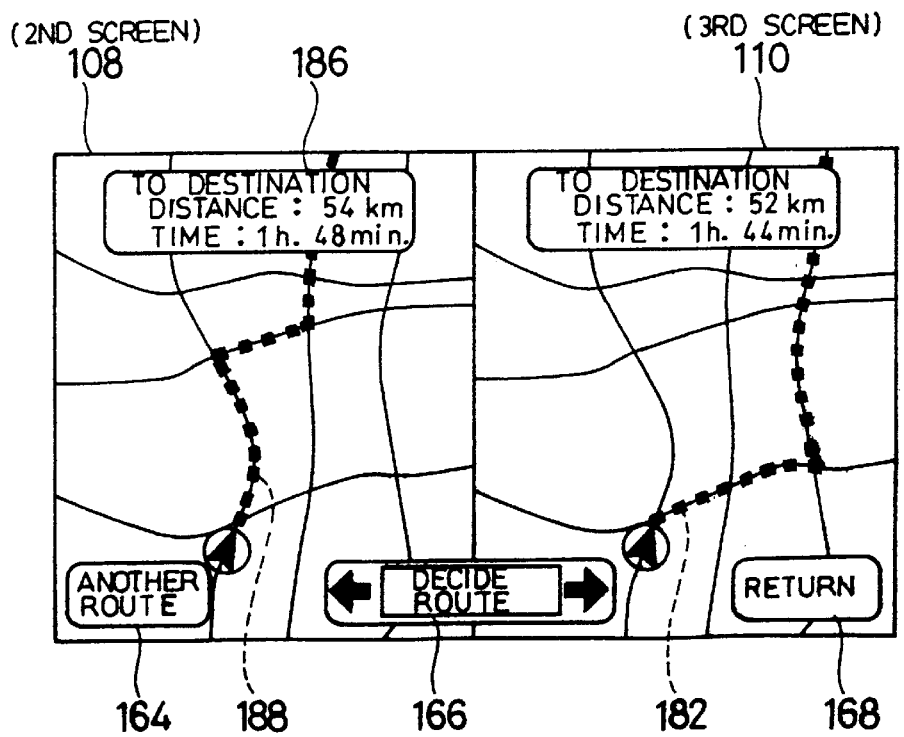
FIG. 33 shows a divided screen of a display 33.

Travelling distance to the end point of the guide route 184 and traveling time is also shown in the 3rd screen 110 of FIG. 32 as the distance and time information 186. FIG. 33 shows the guide route which is changed from FIG. 32 when the step SL26 etc. of FIG. 22 is executed. The distance and time information 186 of this FIG. 33 indicate the travelling distance and the required time to the end point of the guide route 188. Furthermore the 3rd screen 110 of FIG. 33 is copied from the 2nd screen of FIG. 32.

Further in the FIGS. 32 and 33 the distance and time information 186 may include the VICS information (construction information or information at the congestion road in the route etc.) which is received by data sending and the data transmitter/receiver unit 27 and may include the number of times of the turning right or left in the this route and so on. This VICS information can include congestion information at a parking lot around the route and so on.

Moreover names of central roads (name of national highway and prefecture road, etc.) which composes the guide route and names of main intersections (intersection having a name) may be shown. These road name and intersection name, etc. can be shown in the list form, when the icon key of "route information" which is displayed on the screen is pushed. In this case, the detailed information (road name and so on) of each guide route which is displayed in the 2nd and the 3rd screen, for example, the distance and the required time of the guide route to the destination and VICS information, etc. are shown. By this, more information which contributes to choose the route is displayed variously and therefore the comparison and the examination of each route become easy.

Further in each searching processing of "searching processing of another route", "search processing of surrounding route" and "searching processing of whole route" of 4th and the 5th embodiment, the traffic information of VICS, etc. which is received from outside may be taken account of to the searching cost.

Therefore the road which is crowed becomes difficult to be chosen based on the congestion information and the route which goes around the congestion road is searched. Further in the 4th and in 5th embodiment the head up image and the north up image of each divided screen may point to the right, the left or down.

18. Guide/display Processing of 6th Embodiment

Figure 34:
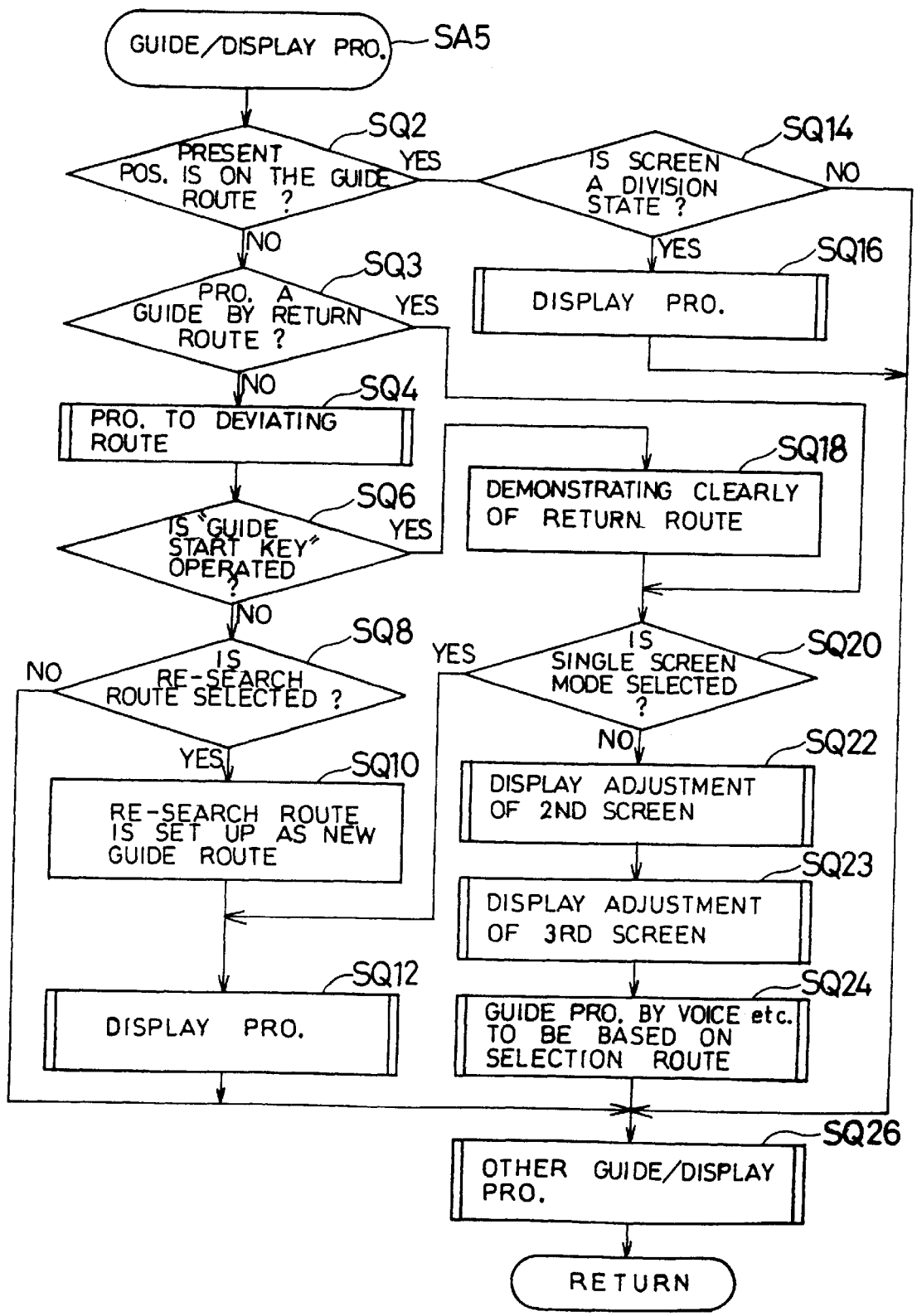
FIG. 34 shows a flow chart of a guidance/display processing of 6th embodiment.

FIG. 34 shows the flow chart of the guide/display processing of the 6th embodiment. At the 6th embodiment, the screen is divided when the car deviates from the first guide route. The road map which includes the part of the deviating guide route and the present position of the car is shown at the divided 2nd screen. The previous guide-route which is displayed before the division or the new re-searched whole guide route to the destination is shown at the divided 3rd screen. The previous guide route from which the car deviates is searched by the route search processing (step SA4) of FIG. 5 or the whole route researching (step SR20) which is described later.

Further the return route which returns to the previous guide route isn't immediately shown in the 2nd screen immediately after the division. However if the operator orders the guidance by the return route, the return route is shown on the screen. Furthermore, the reduced scale of the displayed map of the 2nd screen is adjusted and the whole return route is shown in the 2nd screen.

If first the car is on the guide route (step SQ2) and the screen of display 33 is divided (step SQ14), single screen processing is executed (step SQ16), the screen division of display 33 is canceled and the map which is displayed in the 3rd screen is shown in the whole screen of display 33.

Furthermore the determination processing of the above step SQ2 is executed as follows. Present position information PI and guide route data MW are read from RAM 5. It is determined whether the coordinate which is indicated by present position information PI almost agrees with the geographical coordinate of the road which composes a guide route data MW or not. If it is agreed, the car is traveling on the guide route and if it is not agreed, the car deviates from the guide route. Further determination processing of the above step SQ14 is executed as follows. Screen division of this display 33 is stored in the RAM 5 as the screen condition GJ and it is determined whether display 33 is divided or not by the data of this screen condition GJ.

Moreover when the car is on the guide route (step SQ2) and the screen is divided (step SQ14), the car deviates from the guide route once and returns onto the guide route again. In other words, when the car deviates from the guide route, the screen is divided. However when the operator doesn't instruct to search a route or change a route, etc. and the car returns to the previous guide route, the processing of steps SQ2, SQ14 and SQ16 is executed.

The sudden occupation occurs to the facilities in the route neighborhood while the car is traveling the guide route, the car deviates from the guide route temporarily, the car returns to the guide route again after this occupation ending, these are useful in this case. By the way, at the conventional navigation device, when a auto re-route mode is set, if the car deviates from the guide route, a new guide route from the present position to the destination has been automatically re-searched. However this new guide route doesn't always have the shortest distance to the destination. If rather the car returns to the previous guide route, the car sometimes can reach to the destination more quickly. In the case the guide route isn't automatically re-searched and it is better that the car returns to the previous guide route by the operator. Then in the condition in which the auto re-route mode isn't set, when the car returns to the previous guide route again, the processing of the above steps SQ2, SQ14 and SQ16 is executed. Furthermore at the auto re-route mode, it is detected that the car deviates from the route in guidance and a route from the present position of the car to the destination is automatically re-searched.

If the screen isn't divided in the FIG. 34 (step SQ14) or the screen division is canceled (step SQ16), the other guide/display processing is executed (step SQ26) and various information is displayed and reported and so on according to the chosen guide route. For example, when the car approaches intersection to turn right or left, a distance to the intersection is shown in display 33. After this the processing of FIG. 34 is ended and the flow is returned to the overall processing of FIG. 5.

On the other hand, when the car deviates from the guide route (step SQ2), if the return route is guiding (step SQ3), the choosing single screen and the display processing of the 2nd screen and the 3rd screen since step SQ20 are executed. In this step SQ3 based on the return route which is identified by "processing to deviating route" which is described later, it is determined whether it is during return to the previous route or not. When the processing of FIG. 34 is repeatedly executed, the determination of this step SQ3 is executed to prevent "processing to deviating route" from being executed by mistake. Furthermore the processing since this step SQ20 is described later.

When the return route is not during guiding processing, a subroutine "processing to deviating route" is executed (step SQ4). In this processing, the screen of display 33 is divided into the right and the left at the center in the beginning, the screen on the left side toward the screen becomes a 2nd screen and the divided screen in the right side becomes a 3rd screen. In this case this video memory is divided into two areas, independent image data is written in each division area and the display screen of display 33 is divided. Furthermore, the display 33 may be originally composed of two display device.

After a screen is divided into two, the return route which returns to the guide route before deviating is searched.

Furthermore, when a road map around the present position of the car is displayed in one of the screens (the 2nd screen) which were divided, this return route is used. If the navigation device is set to the auto re-route mode, a route from the present position of the car to the end point of guide route is automatically re-searched. Furthermore, a return route isn't displayed in the 2nd screen immediately after the division and a road map around the present position of the car is shown.

Figure 40:
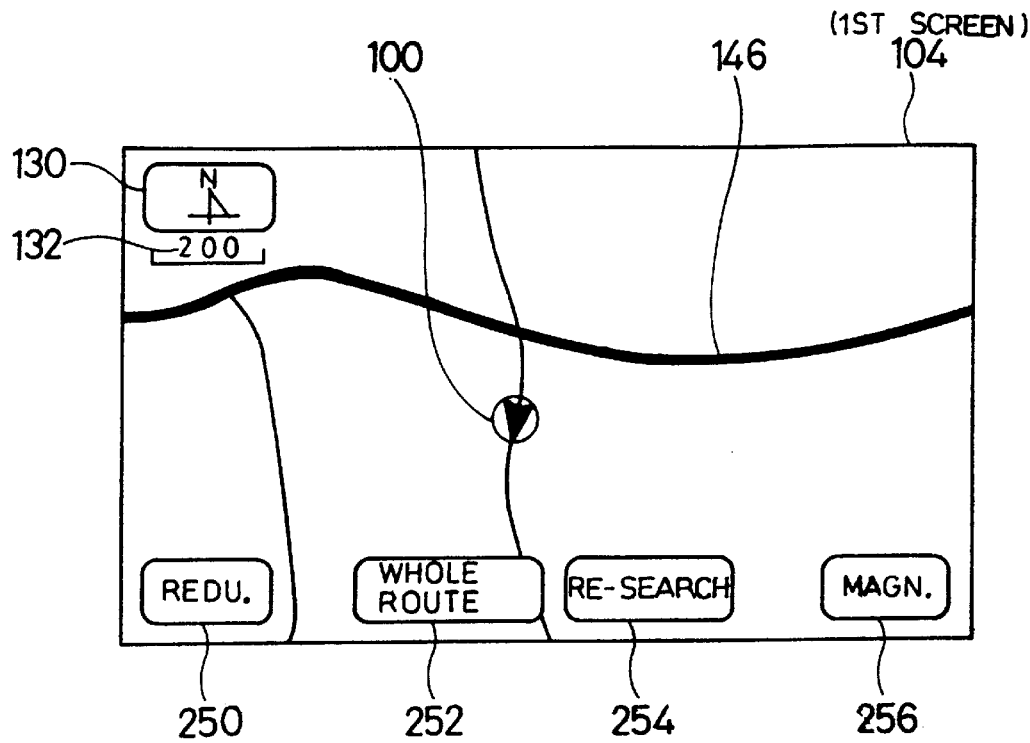
FIG. 40 shows a screen of a display 33 before a screen is divided.

FIG. 40 shows the condition of the display 33 immediately after the car deviates from the guide route 146 which is searched first. Symbol 100 designates the present position and the traveling direction of the car. The screen of display 33 before this division is a 1st screen. Icons 250, 256 and 252 with the letter "reduction", "magnification" and "whole route" and so on are shown in the lower part of the 1st screen. When the icon 250 of "reduction" is touched by the operator, the reduced scale of the map which is displayed in the 1st screen is made small and a wide area map is shown.

Further, when the icon 256 of "magnification" is touched by the operator, the reduced scale of the map which is displayed in the 1st screen is made big and a detailed map or a house map is shown. Moreover when icon 252 in "whole route" is touched by the operator, a guide route from the present position of the car to the end point of guide route is re-searched.

Figure 41:
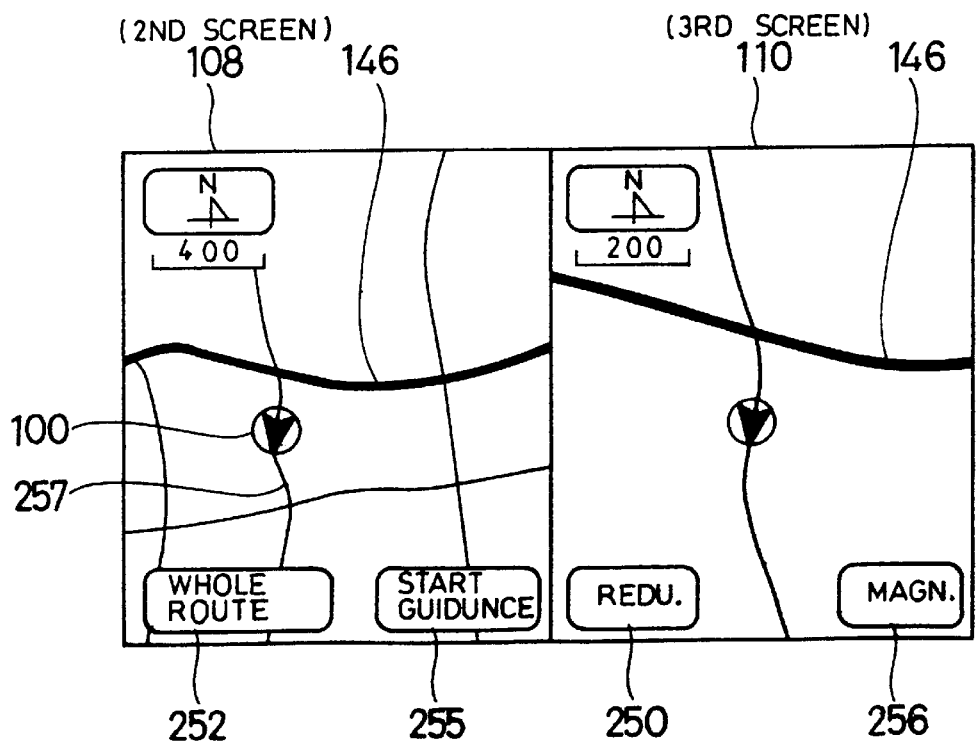
FIG. 41 shows a divided screen of a display 33 immediately after deviating from a guide route.

Further FIG. 41 shows the display screen of the display 33 immediately after the "processing to deviating route" is executed. The car which deviated from guide route 146 and the guide route 146 is shown as symbol 100 in the 2nd screen 108. The map which was displayed in the 1st screen which is the screen before the division is shown in the identical reduced scale in the 3rd screen 110. Further in the lower part of the 2nd screen 108, icon 252 of "whole route", icon 255 of "guidance beginning", icon 250 of "reduction" and icon 256 of magnification" are shown. The icon 255 of "guidance beginning" is used to instruct to begin a guidance by the return route.

When "processing to deviating route" of the subroutine is executed at FIG. 34 and the return route or the whole route is searched, it is determined whether the pushing of the guidance beginning key is detected or not (step SQ6). This guidance beginning key is shown as the icon of letter "guidance beginning" in the 2nd screen which is described above. Then it is determined whether a display part of this "guidance beginning" is touched by the operator or not by a switch signal which is output from the touch switch 34.

It is decided whether guiding process by the return route which returns to the previous guide route is executed or not by the pushing of this "guidance beginning" key. Therefore processing since step SQ18 of FIG. 34 is executed if "guidance beginning" key is pushed. In other words, a return route is displayed in the 2nd screen and specified guiding processing is executed. However if the pushing of "guidance beginning" key isn't detected (step SQ6), the determination of the following condition is executed. That is, it is determined whether a whole route which is re-searched from the present position of the car to the destination is specified or not (step SQ8). The re-searching of this whole route is executed when the auto re-route mode is set or the re-searching is ordered by the operator.

When this new whole route is chosen, the guide route for which the guiding processing have been executed a new guide route is stored in the RAM 5 (step SQ10). Moreover the division of display 33 is canceled and this new guide route is shown in the whole screen (step SQ12). In other words, the screen which was divided into two is returned to one screen and a new guide route is shown in this single screen. After this, "Other guide/display processing" by which information along the new guide route is reported and displayed is executed (step SQ26). Then the processing of FIG. 34 is once ended and the flow is returned to the overall processing of FIG. 5. Furthermore, a reduced scale before the division (the 1st screen) is used as the reduced scale of the new guide route which is displayed in the single screen.

On the other hand, when "guidance beginning" key is pushed (step SQ6), the return route which is searched when the screen was divided is shown in the 2nd screen (step SQ18). Next it is determined whether this return route is displayed in one screen or not (step SQ20). In this determination, it is determined whether the icon of "division cancellation" (example) which is displayed in the screen of display 33 is touched or not by the operator. Single screen processing is executed if screen cancellation is chosen (step SQ12).

In this single screen processing, screen division by display 33 is canceled and a return route and the previous guide route are shown in the single screen. Further the reduced scale of the map which was displayed in the 2nd screen or the reduced scale of the map which was displayed in the 1st screen before the division is used as the reduced scale of the return route which is displayed in this single screen. After single screen processing, the other guide/display processing (step SQ26) is executed and the processing of FIG. 34 is once ended.

Further when the display of the return route isn't chosen with the single screen (step SQ20), subroutine "display adjustment of 2nd screen" with movement of the car is executed (step SQ22). In this "display adjustment of 2nd screen", the position of the car which is displayed or the reduced scale of the map in the 2nd screen is adjusted. In other words, the return route and the car are shown by the following two ways of displaying in the 2nd screen. The return route of which the car is in the center is shown at the whole 2nd screen by the 1st way of displaying. A return route is displayed at the whole 2nd screen by the 2nd way of displaying and is shown for the car to move on the return route. In other words, in the 2nd way of displaying, the display position of the car moves on the 2nd screen as the car travels. Furthermore "display adjustment of 2nd screen" by these 1st or 2nd way of displaying is described later.

After "display adjustment of 2nd screen", subroutine "display processing of 3rd screen" is executed (step SQ23). In this subroutine "display processing of 3rd screen", the map which was displayed in the 1st screen before the screen division is shown in the 3rd screen. Furthermore, a displayed map is also scrolled at this 3rd screen as the car travels. After this, "guide processing of chose route" is executed and sound information, etc. by the return route are reported (step SQ24).

Furthermore, the map of the north up or the head up which is executed in the 2nd embodiment is shown in the 3rd screen. After the above step SQ24 is executed, "other guide/display processing" is executed (step SQ26). Then the processing is returned to the main flow chart of FIG. 5. Furthermore, the reduced scale of the map of the above 3rd screen may change with the traveling position of the car.

19. Processing to Deviating Route of 6th Embodiment

Figure 35:
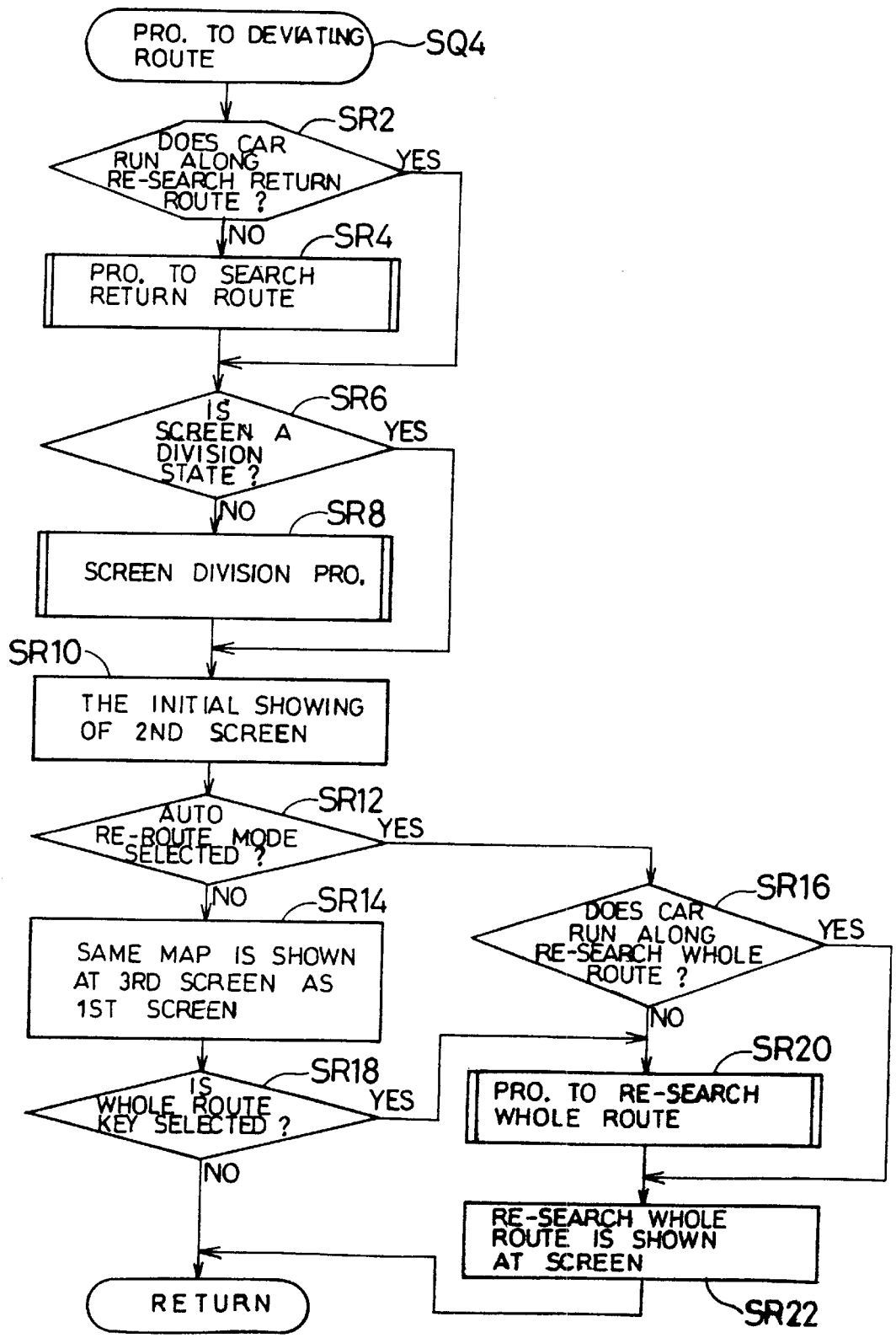
FIG. 35 shows a flow chart of a processing to deviating route.

FIG. 35 shows the flow chart of the subroutine "processing to deviating route" of FIG. 34. First it is determined whether the car which deviated from the route on guiding is traveling the return route which returns to this route or not (step SR2). Then after the series of processing of FIG. 35 is executed, the return route is already identified, if the route isn't chosen by the operation of the operator, the processing of FIG. 35 is repeatedly executed. Further "searching processing of return route" is executed when the car isn't traveling on the return route (step SR4).

Furthermore the condition which the car isn't traveling the return route which has identified also includes the condition that a return route isn't searched (identified) at all. This is the condition immediately after the car deviates from the previous route. But if the car is travelling on the already identified return route, the searching of the return route isn't executed. In this "search processing of return route", the processing which is the same as the search processing of surrounding route of the 5th embodiment of the above guide/display processing is executed.

In other words, the route which connects to the guide route from which the car has deviated is searched. Moreover in case of this return route searching, weight is put to the selecting of the road which connects (goes) to the previous guide route and the road has priority in selecting.

For example, at the opposite road to the direction of the moving of the car, fixed searching cost value is added to the total searching cost and the total searching cost becomes big. Similarly at the opposite road to progresses direction of the road which connects to the guide route, a specified value is added for the searching cost to become big. As a result, a road which progresses to the guide route is primarily selected.

Then the shortest route which links the intersection nearer to the destination which is the nearest the point of the guide route from that the car has deviated and the present position of the car is searched. But when the route which links the present position of the car and the above intersection can not be discovered, the route which links the intersection which is next near the destination and the car is searched. In this way, the return route which links the present position of the car and the intersection of the previous guide route being nearer the destination from the point that the car has deviated from is searched.

If a return route searched or the car is traveling on a return route already, it is determined whether the screen of display 33 is divided or not (step SR6). If the screen isn't divided, the screen division processing of display 33 is executed (step SR8). In other words, the area of the image memory which displayed image data is written in is divided and the display screen is divided. In this case, as with the above embodiments, it makes the center of display 33 a boundary and the screen is divided into the right and the left.

Then the screen on the left side is made the 2nd screen and the screen in the right is made the 3rd screen. Furthermore, the screen before the division is the 1st screen. If display 33 is divided, the screen division processing of step SR8 isn't executed (step SR6). In other words, the screen of display 33 is divided if the car deviate once from the route to be guiding and the processing of FIGS. 34 and 35 is executed. After that, when the choosing of a route and so on aren't operated, screen division is maintained. In this case the screen division processing of this step SR8 isn't executed.

When the screen is divided by the processing of step SR8, subroutine "initial showing of 2nd screen" is executed (step SR10). In this "initial showing of 2nd screen", the car and a guide route which the car deviate from are shown by the optimal reduced scale in the 2nd screen. In other words, the car and the connection point (the intersection and so on) of the return route which is identified by the step SR4 and the previous guide route are shown by the optimal reduced scale in the 2nd screen. Furthermore, in this "initial showing of 2nd screen", return route itself isn't displayed. But if the guidance beginning key isn't pushed in the step SQ6 of FIG. 34, the return route isn't shown in the 2nd screen. This "initial showing of 2nd screen" is described later.

After "initial showing of 2nd screen", it is determined whether the navigation device of this embodiment is set to a auto re-route mode or not (step SR12). If the auto re-route mode is set, it is determined whether the present position of the car is on the re-searched route or not (step SR16). In the processing of the steps SR12 and SR16, when the navigation device is set in the auto re-route mode, the route isn't specified by the operator after the new whole route is re-searched, the processing of FIGS. 34 and 35 is repeated. Therefore it is prohibited that the new whole route is re-searched by the repeating by the processing of the step SR16.

When the car isn't traveling the re-searched route, it also includes when the whole route isn't re-searched at all. Therefore if the car isn't traveling the re-searched new route, the whole route to the end point of guide route from the present position of the car is re-searched (step SR20). Then, the re-searched new whole route is shown in the 3rd screen. Furthermore, the previous guide route which the car deviates from may be together shown in this 3rd screen. The display reduced scale of this 3rd screen is may be the same as the reduced scale of the 1st screen before the division. When the new whole route is displayed, the reduced scale is adjusted and the whole route may be shown in the screen. When this newer whole route is displayed, like FIGS. 32 and 33 of the 5th embodiment the peculiar information in the newly searched route also may be together shown. In other words, the information of the distance with the full length of the route from the present position of the car to the destination, the expected traveling required time, the name of the principal road, the name of the principal intersection and so on may be together shown. The peculiar information in this new route may be shown in the list form by the choosing of a operator.

When the re-searching whole route is displayed in the 3rd screen, the processing of FIG. 35 is ended and the flow is returned to the processing of FIG. 34. Further when it is not set in the auto re-route mode (step SR12), the map which is displayed in the screen (the 1st screen) of display 33 before the division is shown in the 3rd screen (step SR14). In other words, the car to have deviated from the previous route is shown in a center of the map of the 3rd screen. Furthermore, the reduced scale of the map before the division is used as the reduced scale of the displayed map of this 3rd screen. Moreover the map which includes the car, the destination and the previous guide route may be shown in this 3rd screen. In other words, the reduced scale of the map may be adjusted and the previous whole route may be shown. Or the map may be shown in the 3rd screen at the reduced scale which is the same as the reduced scale of the map which is displayed in the 2nd screen.

When the display of the map of the 3rd screen ends (step SR14), it is determined whether the whole route key is pushed or not (step SR18). On/off of this whole route key is based on the touch by the operator in icon "the whole route" which is displayed in display 33. This touch or non-touch is determined by the detection signal of touch switch 34. "Re-searching processing of whole route" which is above mentioned is executed if the whole route key is pushed (step SR20). After this, the researched whole route is shown in the 3rd screen (step SR22). If the whole route key isn't pushed, the processing of FIG. 35 is ended and the flow is returned to the processing of FIG. 34.

20. 1st Embodiment of Initial Showing of 2nd Screen

Figure 36:
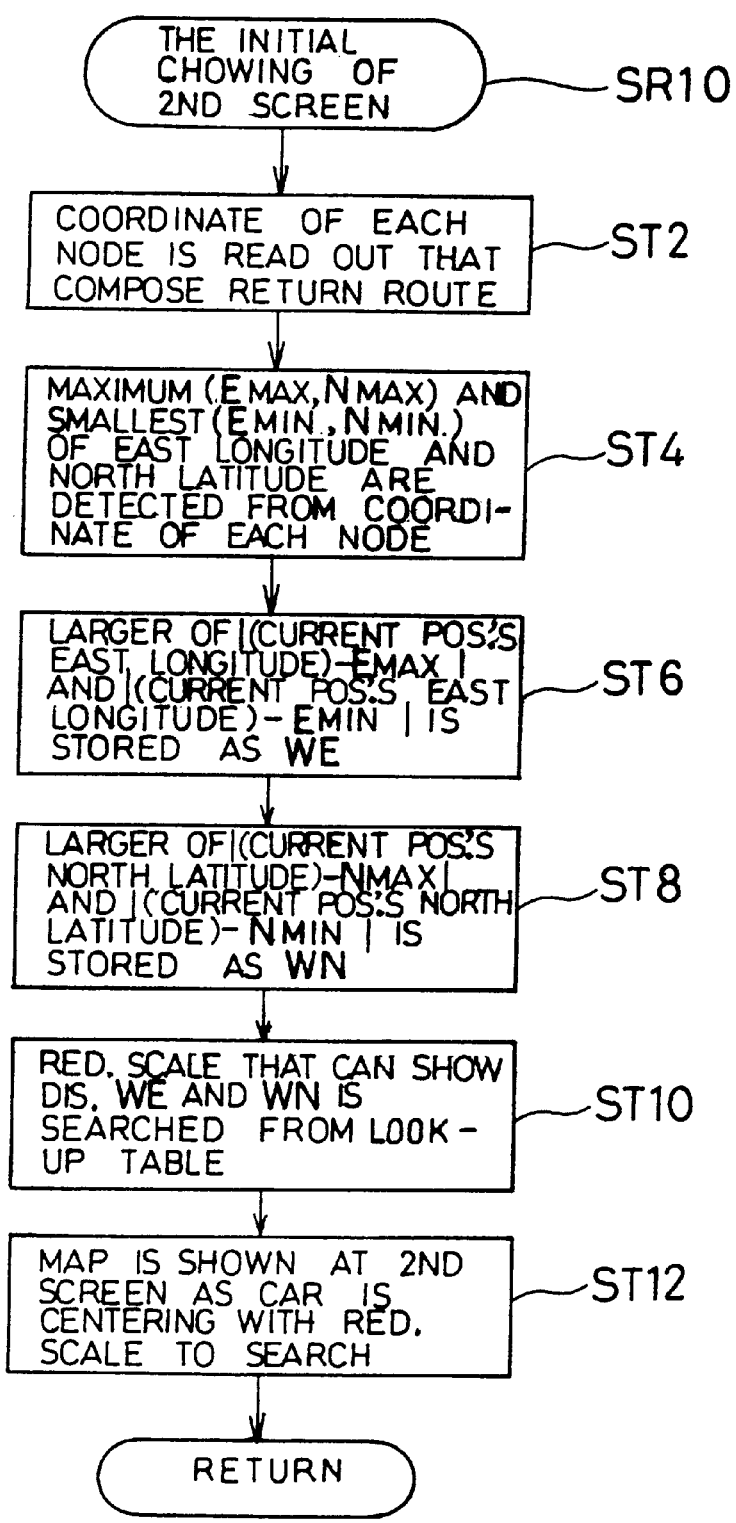
FIG. 36 shows a flow chart of the initial showing of a 2nd screen of FIG. 35 in 1st embodiment.

FIG. 36 shows the 1st embodiment of "initial showing of

2nd screen" of FIG. 35. In the "initial showing of 2nd screen" of FIG. 36, a map is displayed in the 2nd screen at the reduced scale where the whole return route can be displayed and the present position of the car becomes the screen center.

This return route is searched as the map information to return to the previous route. But, the return route itself isn't shown in the 2nd screen.

The node coordinate value of each road which composes a return route and a part of previous route that the car deviates from is read from the node data file F3 etc. (step ST2). From the coordinate value of each node which was read with step ST2, maximum value (Emax, Nmax) and minimum value (Emin, Nmin) to the east longitude direction and the north latitude direction are retrieved (step ST4). The maximum and the minimum value to the direction of this east longitude and the north latitude are explained below using FIG. 47.

Figure 47:
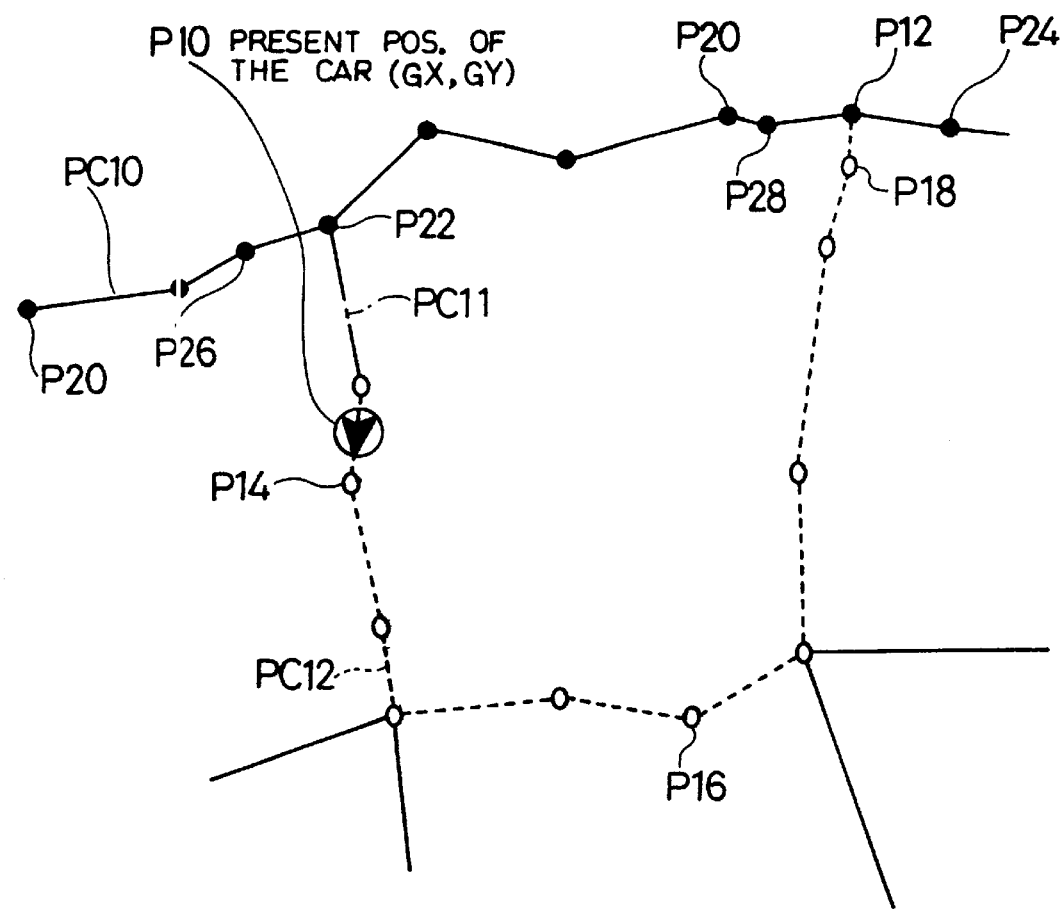
FIG. 47 shows each node of guide route etc.

For example, the route PC10 which is linked with node P24 from node P20 at FIG. 47 is the part of the previous guide route and the route PC12 of the dotted line and the route PC11 of the chain line are the return route. In other words, the point (the estrangement point, the leaving point) where the car deviated from the previous route is node P22. The junction (the return point) of the identified return route and the previous guide route is node P12. From the present position P10 of the car to node P12 at the confluence is an un-traveling part in the return route. Further a route PC11 to the present position P10 of the car from the node P22 of the leaving points supposed as the journey which the car has deviated and traveled from the previous guide route. Furthermore, the destination of the previous guide route is in the direction of node P24. The north which is a absolute azimuth points to the upper of FIG. 47. Furthermore, when the car deviates from the previous route, the return route is searched at once. Therefore actually route PC11 also is a part of the return route. Here for convenience of the explanation, it supposes that the car moved to present position P10 on the return route.

When the return route of this FIG. 47 is displayed in the 2nd screen, the route which joins the whole return route of route PC12 and route PC11 and each of the following nodes is shown. The previous route which links node P28 on the side of the starting place and node P24 on the side of the destination in the both sides of node P12 at the junction is shown in the 2nd screen with the return route. Further in the showing of the return route in this 2nd screen, all of the return route and the previous route from the node P22 of the leaving point to node P12 at the confluence may be shown in the 2nd screen.

By the way, in the return route (route PC11 and route PC12) of FIG. 47, the node which has the maximum of the east longitude becomes node P24. Therefore, the coordinate value of the east longitude of node P24 is stored in the RAM 5 as maximum Emax. Similarly if the node which has the maximum of the north latitude is node P12, the coordinate value of the north latitude of this node P12 is stored in the RAM 5 as maximum Nmax.

Further if the node which has the minimum value of the east longitude is node P14, the coordinate value of the east longitude of this node P14 is stored in the RAM 5 as minimum value Emin. If the node which has the minimum value of the north latitude is node P16, the coordinate value of the north latitude of this node P16 is stored in the RAM 5 as minimum value Nmin.

Furthermore, when the previous route also is together displayed in the 2nd screen, this route may be include the following node and a route. That is, the previous route which links the node P24 on the side of the destination from the confluence P12 and the node P26 on the side of the starting place from the node P22 of the leaving point may be shown in the 2nd screen with the return route. In this case, the node P24 has the maximum of the east longitude, the node P20 has the maximum of the north latitude, the node P26 has the minimum of the east longitude and node P16 has the minimum of the north latitude. Then, the coordinate value of each node is stored in the RAM 5 as the maximum (Emax, Nmax) and minimum value (Emin, Nmin) of the east longitude and the north latitude.

As mentioned above, the following expression is computed based on the coordinate (GX, GY) of the present position P10 of the car when maximum (Emax, Nmax) and minimum (Emin, Nmin) are detected.

$$|GX-Emax| \qquad (1)$$

$$|GX-Emin| \qquad (2)$$

An absolute value is found by this expression (1) and (2). Then the bigger value of the computation result of expression (1) and (2) is stored in the RAM 5 as east longitude width WE (step ST6).

Moreover the following expression is computed.

$$|GY-Nmax| \qquad (3)$$

$$|GY-Nmin| \qquad (4)$$

An absolute value is also found by this expression (3) and (4). Then the bigger value of the computation result of the expression (3) and (4) is also stored in the RAM 5 as north latitude width WN (step ST8).

Then, the reduced scale of the map which can display the above east longitude width WE and north latitude width WN is found using the numerical value calculation table etc. which is stored in the information memory unit 37. In other words, the road map which includes a return route with the car being situated on the center of the screen is shown in the 2nd screen. The reduced scale of this displayed road map is found using the numerical value calculation table (step ST10).

Figure 48:
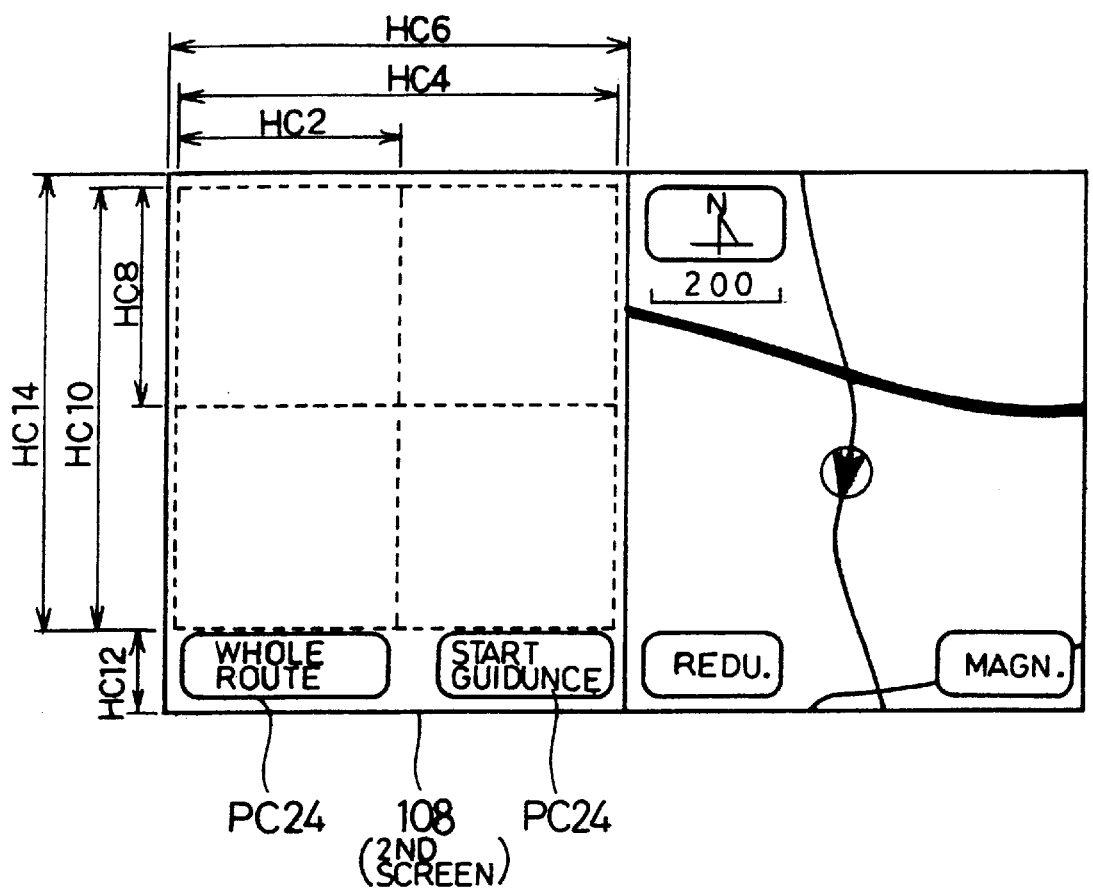
FIG. 48 shows an area of a display when a map is displayed in a 2nd screen.

It is concretely explained using FIG. 48. Divided display 33 is shown in FIG. 48. The area which can be effectively displayed in this 2nd screen 108 is a range according to horizontal width HC6 and perpendicular high HC14. Then the road map which includes the return route etc. in the area with the small of about 5 percent than with the area of this effective display is shown.

The area with the small of these about 5 percent has horizontal width HC4 and perpendicular high HC10. The reduced scale of the map is found for the above east longitude width WE to be settled within width HC2 of the half with this horizontal width HC4 and for north latitude width WN to be settled within height HC8 of the half of perpendicular high HC10. In this way, the area which displays the map which includes the return route is made smaller than the area of the effective display, i.e. the largest display area and therefore it is prohibited that important information is displayed at the end of the screen. When the important information is displayed at the end of the screen, it is difficult to see the information.

A value with east longitude width WE and north latitude width WN and each reduced scale value of the map are corresponded and stored in the numerical value calculation table. The reduced scale value which corresponds to the east longitude width WE and north latitude width WN is found from the numerical value calculation table after the east longitude width WE and the north latitude width WN are found by each of the above expressions. Furthermore, this map reduced scale may be found by the calculation of the proportional expression and so on.

For example, if the map reduced scale is "MSA", the geographical distance of the map which can be displayed from the actual size of the 2nd screen is proved. Therefore, the vertical geographical distance of the map which was displayed in the 2nd screen becomes "MYA" and the side geographical distance becomes "MXA" when the map reduced scale is "MSA". If the geographical distance which can be show is proved in these map reduced scales, the proper reduced scale to display a road map with the above east longitude width WE and north latitude width WN is found by the following expression.

$$MSA \times WE/MXA \quad (5)$$

$$MSA \times WN/MYA \quad (6)$$

Big value (the reduced scale in which the wide area map can be displayed) of the reduced scales which is found by the expression (5) and (6) is selected as the proper reduced scale. The reduced scale of the map that each east longitude width WE and north latitude width WN are calculated by the expression (5) and (6) is stored in the above numerical value calculation table. Furthermore, when a north up map is displayed in the 2nd screen, calculation by the expression (5) and (6) is executed.

When the head up map is displayed, the following value is calculated in the revision by each east longitude width WE and north latitude WN. In other words, the cosine value of the relative azimuth data Dθ which indicates an angle to the direction of the moving of the car to the absolute azimuth is found. Then the above cosine value is multiplied to the distance of the oblique side of the triangle which consists of east longitude width WE and north latitude width WN. The map reduced scale in which this multiplication value is settled within the width HC2 and the height HC8 of FIG. 48 is found.

Icon "whole route" "guidance beginning" and so on are shown in interval HC12 of the lower part in the 2nd screen of FIG. 48. The road map and so on may be also displayed in the background of the icon in this interval HC12 and the map information doesn't may be shown. Further, the area where a return route is displayed isn't limited to the area with the small of about 5 percent than to the effective display area of the 2nd screen. In other words, more than 5 percent may be smaller or 1–5 percent may be smaller than the effective display area.

When a map reduced scale is found in the step ST10 of FIG. 36, the map which includes the return route in this found reduced scale and as the car becomes the center of the screen is shown in the 2nd screen (step ST12). Furthermore, here the return route itself isn't yet shown. After this, the flow is returned to FIG. 35 and the display processing and so on of the 3rd screen are executed.

Furthermore when return route PC12 is displayed in the 2nd screen at the above embodiment, a previous party route linking nodes P28 and P24 in the both sides of the node P12 of a confluence is also together shown. However the return route PC12 may be shown in the 2nd screen only for node P12 at the confluence to be displayed. Moreover the map in the range which includes totally the whole return route to confluence P12 from the node P22 of the leaving point may be shown in the 2nd screen.

21. 2nd Embodiment of "Initial Showing of 2nd Screen"

Figure 37:
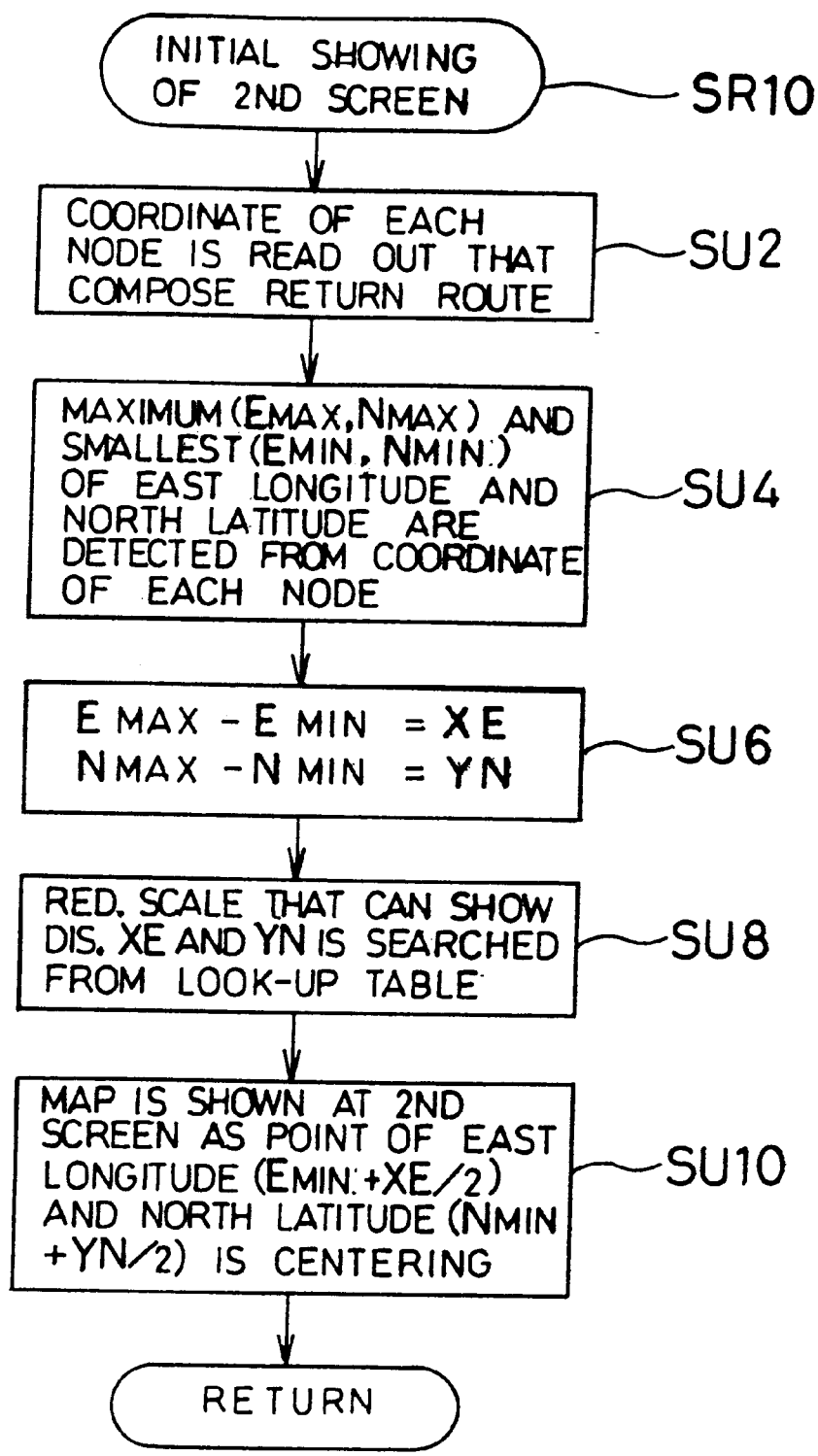
FIG. 37 shows a flow chart of the initial showing of a 2nd screen of FIG. 35 in 2nd embodiment.

FIG. 37 shows the flow chart of the 2nd embodiment of "initial showing of 2nd screen" of FIG. 35. At the 2nd embodiment of this "initial showing of 2nd screen", the present position of the car doesn't always become the center of the screen. In other words, the map which includes the whole return route which was found first is uniformly displayed in the 2nd screen and this display is maintained. Therefore, it is shown for the car to move on the map which is displayed in the 2nd screen.

Firstly the node coordinate values of each road which composes the return route are read (step SU2). The maximum (Emax, Nmax) and minimum value (Emin, Nmin) of the east longitude and the north latitude are retrieved from the coordinate value of each node which is read in the step SU2 and the coordinate value of the present position of the car (step SU4). This processing is the same as the step ST4 of FIG. 36. Furthermore, at this embodiment the return route is also composed of route PC11 and route PC12. Further when the map which includes the return route is displayed in the 2nd screen, a part (FIG. 47) of the previous route between node P28 and P24 is also together shown.

Furthermore, the previous route between this node P28 and P24 doesn't have to be shown and the map in the range which includes only route PC12 to the node P22 of the leaving point or the present position P10 of the car from node P12 at the confluence may be shown. Moreover the map in the range which includes the whole return route and the previous route to node P24 from node P26 as with "initial showing of 2nd screen" of the 1st embodiment may be shown in the 2nd screen. The case which the previous route between the above node P28 and P24 and the return route to node P12 at the confluence from the node P22 of the leaving point is displayed in the 2nd screen is explained below.

For example, in the return route (route PC11 and route PC12) of FIG. 47, node P24 has the maximum of the east longitude. Therefore the coordinate value of the east longitude of the node P24 is stored in the RAM 5 as maximum Emax. Similarly node P12 has the maximum of the north latitude. Therefore the coordinate value of the north latitude of the node P12 is stored in the RAM 5 as maximum Nmax.

Node P14 or node P22 has the minimum value of the east longitude. Therefore the coordinate value of the east longitude of node P14 is stored in the RAM 5 as minimum value Emin. Node P16 has the minimum value of the north latitude. Therefore the coordinate value of the north latitude of node P16 is stored in the RAM 5 as minimum value Nmin.

Then, the following expression is computed based on each maximum and minimum value of each east longitude and north latitude (step SU6).

$$Emax-Emin=XE \quad (7)$$

$$Nmax-Nmin=YN \quad (8)$$

Then the reduced scale that the map in the interval XE of this east longitude and the interval YN of the north latitude can be displayed in the screen is found using the numerical value calculation table which is beforehand stored in information memory unit 37 (step SU8). The map reduced scale that the interval XE of the east longitude is settled within horizontal width HC4 and that the interval YN of the north latitude is settled within perpendicular high HC10 of FIG. 48 is found by the numerical value calculation table as with "initial showing of 2nd screen" of the 1st embodiment.

Furthermore, when the interval XE of east longitude and the interval YN of the north latitude are supplied, the reduced scale value in which the return route and the part of the previous route can be correctly displayed in the display area of the 2nd screen which is surrounded in horizontal width HC4 and perpendicular high HC10 is stored in the numerical value calculation table. In other words, the reduced scale value which corresponded to the interval XE of the east longitude and the interval YN of the north latitude is stored in the numerical value calculation table. Furthermore, this reduced scale value may be directly found for by the calculation. For example, when a map is displayed in the 2nd screen at the optional reduced scale, a geographical distance i.e. a distance of the direction of the east longitude and a distance of the direction of the north latitude are proved from the actual size of the 2nd screen. Therefore the map reduced scale that the interval XE of the specific east longitude and the interval YN of the north latitude are correctly shown in the 2nd screen can be calculated by a proportional expression. Correspondence relation among the map reduced scale and the interval YN of the north latitude and the interval XE of the east longitude is stored in the above numerical value calculation table.

Furthermore, the areas which are surrounded in horizontal width HC4 and perpendicular high HC10 are about 5 percent smaller than the effective display area as with "initial showing of 2nd screen" of the 1st embodiment. A map in the range which includes the return route is shown in the 2nd screen (step SU10), at the reduced scale which was found in the step SU8, for the east longitude coordinate (Emin+XE/2) and the north latitude coordinate (Nmin+YN/2) to become the screen center. After this the flow is returned to FIG. 35. Furthermore, in this 2nd embodiment the map which includes the return route is shown in the north up condition.

FIG. 41 shows the state of display 33 immediately after the car deviates from the guide route. In other words, the previous route 146 and the present position 100 of the car are shown in 2nd screen 108. But the searched return route itself isn't yet shown and the guiding of the route based upon the return route isn't executed. Further icons 252 and 255 also are together shown. Icon 252 designates the switch which instructs for the re-searching processing of the whole route of FIG. 35 to be begun. Further icon 255 designates the switch which instructs to begin a guidance by the return route. Icons 250 and 256 are the switch to change the map reduced scale of the 3rd screen manually.

Figure 42:
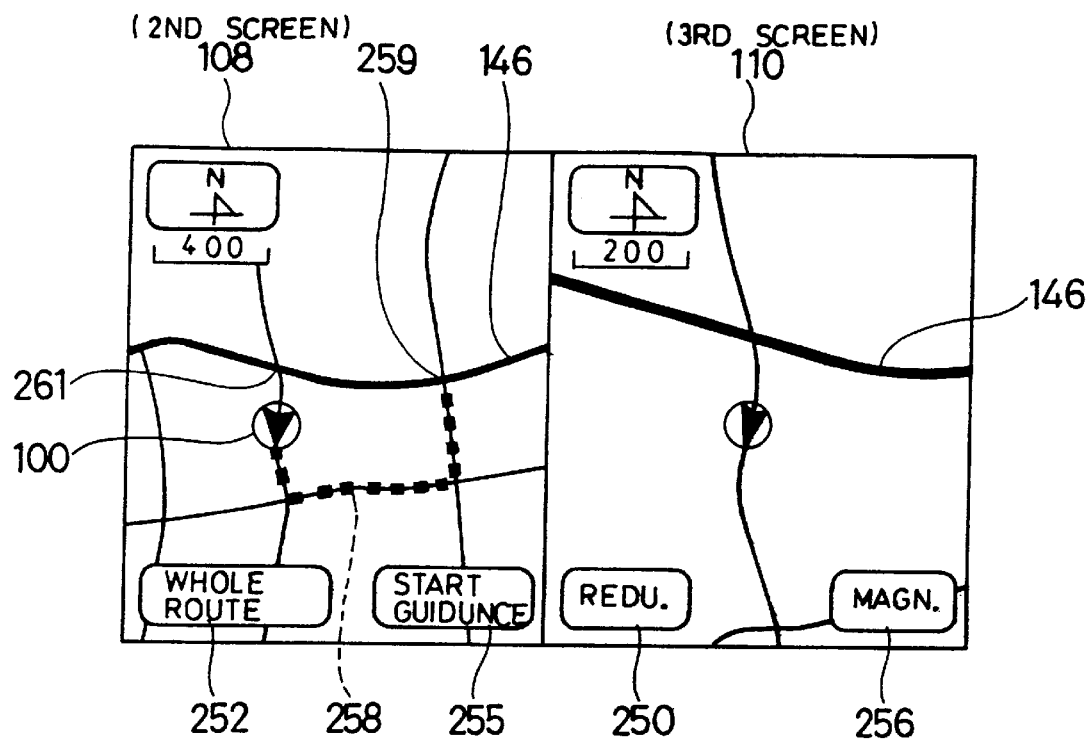
FIG. 42 shows a state that a return route 258 is displayed in a 2nd screen.

FIG. 42 shows the state that return route 258 is displayed in the 2nd screen. This FIG. 42 shows the state of the display 33 when a guidance beginning key (icon 255) is pushed in the display condition of FIG. 41. In other words, the return route is shown by dotted line 258 from the condition which the return route isn't displayed as shown in FIG. 41. Furthermore, in the actual display screen, the return route is displayed in the different color from or the same color as the previous guide route 146. Furthermore, at FIGS. 41 and 42, it is also shown the previous guide route linking between the node on the side of the starting place of the guide route which is next to the leaving point (the intersection point 261 of FIG. 42) and the node on the side of the destination of the guide route which is next to the confluence (the intersection point 259 of FIG. 42).

Figure 43:
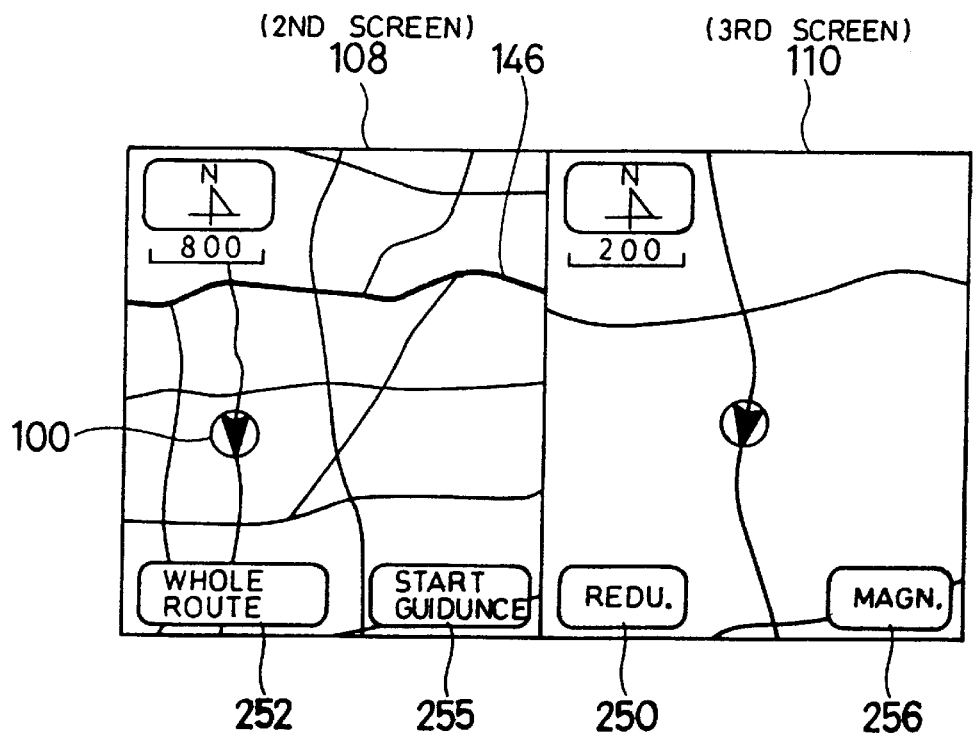
FIG. 43 shows a divided screen of a display 33 when a car leaves a guide route far.

FIG. 43 shows the state that the car deviated farther from the guide route than the state in the display condition of FIG. 41. In other words, in the condition of FIG. 41, the return route is once searched. After this, when the car deviates from this return route once again, a newly return route is searched by the processing of steps SR2 and SR4 of FIG. 35. Then the road map which includes this new return route is shown in 2nd screen 108. But because the guidance beginning key isn't also pushed in this FIG. 43, the return route isn't displayed and the route guidance based on the return route isn't executed. When the guidance beginning key is pushed in the condition of this FIG. 43, the return route is shown by dotted line 260 as shown in FIG. 44.

Figure 44:
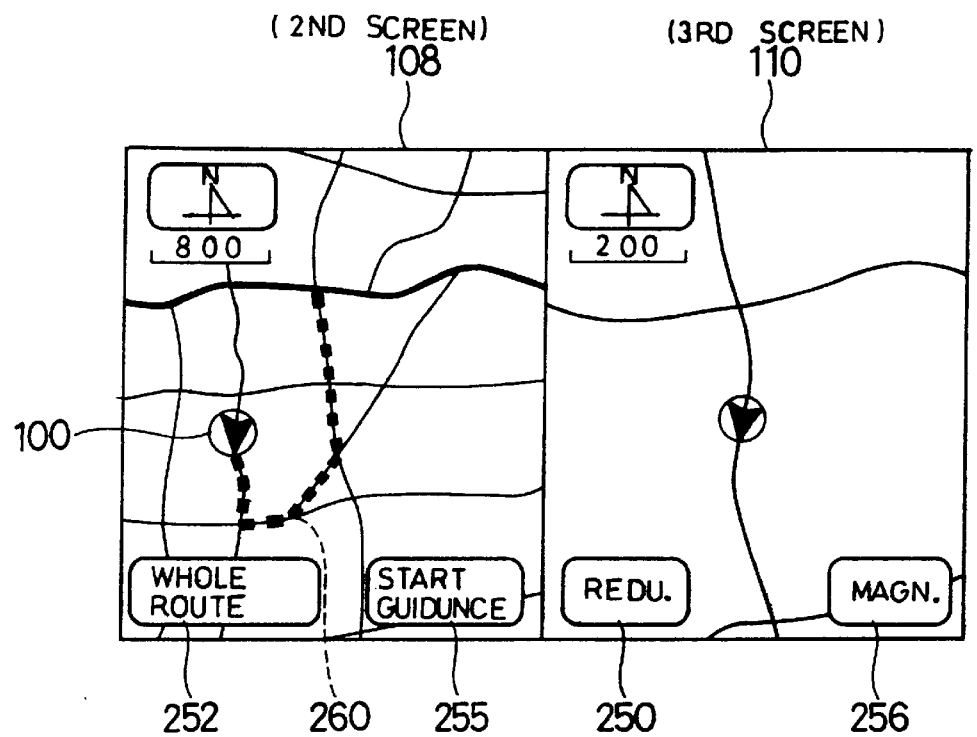
FIG. 44 shows a state that a return route 260 is displayed in a 2nd screen of FIG. 43.

FIG. 44 shows the state that the return route is displayed by dotted line 260 in the 2nd screen. This FIG. 44 shows the state of the display 33 when the guidance beginning key (icon 255) is pushed in the display condition of FIG. 43. In other words, the return route is shown by dotted line 260 from the condition which the return route isn't displayed as shown in FIG. 43. Furthermore, in the actual display screen, the return route displayed in the different color from or the same color as the previous guide route 146.

Figure 45:
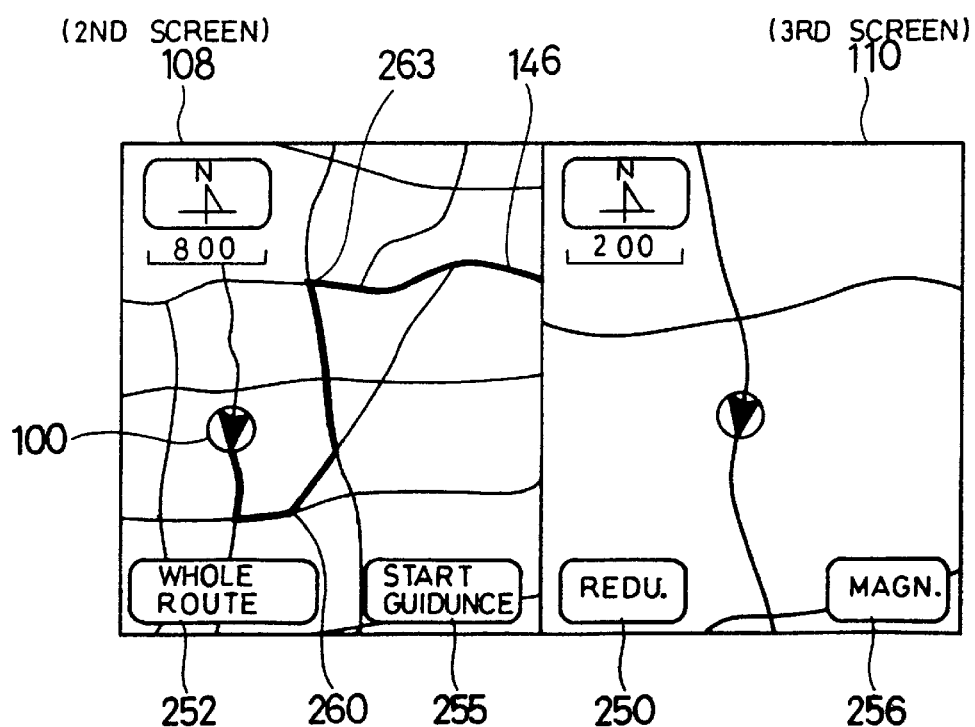
FIG. 45 shows a state that a return route 260 is displayed in a 2nd screen of FIG. 43.

FIG. 45 shows application example in return route 260. In other words, when the guidance beginning key is pushed, only the return route 260 which joins confluence 263 and the present position (position of symbol 100) of the car and the guide route 146 to the destination from confluence 263 are shown in the 2nd screen. Therefore the unnecessary part of the guide route, i.e. the part to have traveled already and so on aren't shown in the 2nd screen.

22. 1st Embodiment of "Display Adjustment of 2nd Screen" (step SQ22 of FIG. 34)

Figure 38:
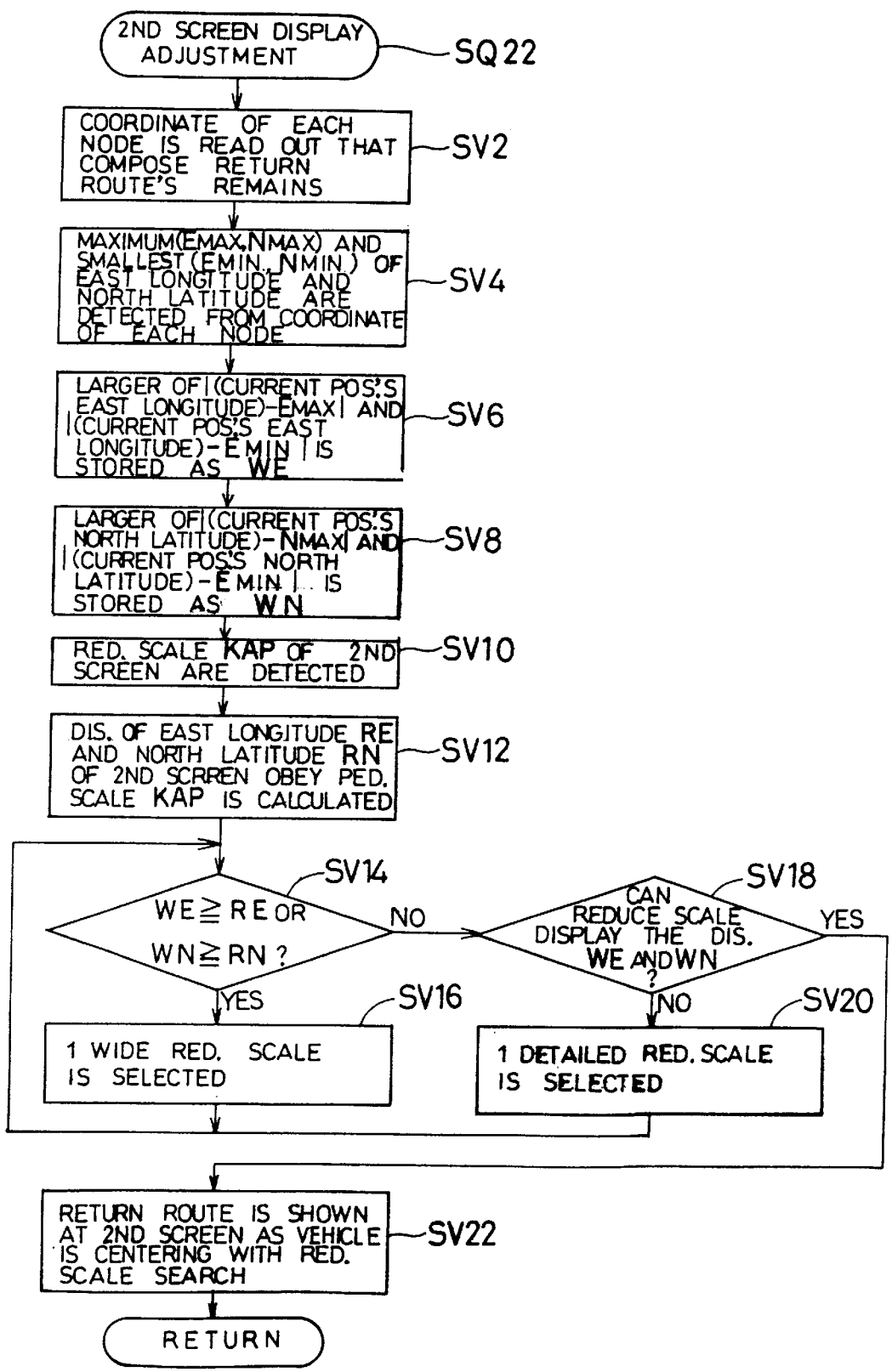
FIG. 38 shows a flow chart of a display adjustment of a 2nd screen in a guidance/display processing of FIG. 34 of 1st embodiment.

FIG. 38 shows the flow chart of the display adjustment (step SQ22) of the 2nd screen of the 6th embodiment (FIG. 34). In "the display adjustment of the 2nd screen" of FIG. 38, the display position of the return route of the 2nd screen with traveling by the car is adjusted. In other words, when the car is traveled along the return route, the return route from the present position of the car to the confluence and the guide route etc. in the confluence neighborhood is shown by the maximum in the 2nd screen. Furthermore, in "the display adjustment of the 2nd screen" of FIG. 38, the road map which includes the return route makes the car the screen center and is shown.

Firstly each road data which composes a remaining route in the return route i.e. an un-traveling route is read from the information memory unit 37. Then each node coordinate value of the read road data is read from node data file F3 etc. (step SV2). The maximum (Emax, Nmax) and minimum value (Emin, Nmin) of the east longitude and the north latitude are retrieved (step SV4) from the coordinate value of the each node which is read in the step SV2.

The processing of this step SV4 is the same as step ST4 of FIG. 36. Then the following expression is computed based on the present position coordinate (GX, GY) of the car and each maximum (Emax, Nmax) and minimum value (Emin, Nmin).

$$|GX-Emax| \tag{9}$$

$$|GX-Emin| \tag{10}$$

Furthermore, in the expressions (9) and (10), the absolute value of the computation result is found. Then the bigger one of the computation values of the expressions (9) and (10) is stored in the RAM 5 as east longitude width WE (step SV6). Moreover the following expression is computed.

$$|GY-Nmax| \tag{11}$$

$$|GY-Nmin| \tag{12}$$

Furthermore, in expressions (11) and (12), the absolute value of the computation result is found. Then the bigger one of the computation value of the expressions (11) and (12) is stored in the RAM 5 as north latitude width WN (step SV8).

Further, the reduced scale KAP of the map which is displayed at present at the 2nd screen is distinguished (step SV10). Then, geographical distance RE to the direction of the east longitude and geographical distance RN to the direction of the north latitude which can be displayed by discriminated reduced scale KAP are found (step SV12). Furthermore, these distances RE and RN may be found using the numerical value calculation table which is stored in the information memory unit 37 or in the ROM 4 and may be found by proportional arithmetic expression etc. This numerical value calculation table is the same as the numerical value calculation table which is explained in the above "initial showing of 2nd screen". In other words, when a map is displayed in the 2nd screen by each reduced scale, the geographical distance which can be shown in the perpendicular direction and the horizontal direction of the 2nd screen corresponds to the above reduced scale and is stored. Then the above distances RE and RN are found using this numerical value calculation table (step SV12).

Next comparison of the east longitude width WE and the distance RE and comparison in the north latitude width WN and the distance RN are executed. Then if the east longitude width WE is longer than the distance RE or the north latitude width WN is longer than the distance RN, reduced scale KAP is changed into the value which the map can be displayed in the wider geographical range (step SV16). In other words, when the remaining route in the return route becomes not able to be displayed on the 2nd screen by the movement of the car, the processing of the step SV16 is executed.

However when the east longitude width WE is shorter than the distance RE and the north latitude width WN is shorter than the distance RN, it is determined whether the east longitude width WE and the north latitude width WN can be appropriately displayed by the reduced scale KAP (step SV18). In other words, it is determined whether the east longitude width WE is shorter fairly than the distance RE or the north latitude width WN is shorter fairly than the distance RN or not. The East longitude width WE << the distance RE or the north latitude width WN << the distance RN indicate that the geographical range in the return route which should be display in the 2nd screen became narrow as moving of the car. In this case, a reduced scale KAP value is changed into the value by which the map can display only the narrower geographical range (step SV20). In other words, a map reduced scale is changed for a detailed map to be displayed bigger than.

When reduced scale KAP is adjusted by the steps SV16 and SV20, determine processing by the steps SV14 and SV18 is executed once again. In other words, value of the reduced scale KAP is fluctuated for the east longitude width WE and the north latitude width WN to be show most appropriately. Then when proper reduced scale KAP is found in the steps SV14 and SV18, a remaining route in the return route makes the car a screen center and is shown in the 2nd screen (step SV22). After this the processing is returned to the guide/display processing of FIG. 34. After guidance by the return route is chosen in this way, when the car travels, the remaining part to the confluence in the return route decreases. Therefore at the 1st embodiment of "the display adjustment of the 2nd screen", the map reduced scale is adjusted according to the decreasing remaining part in the return route. For example, when the remaining part in the return route becomes short and the geographical range to display becomes narrow, the reduced scale of the displayed map of the 2nd screen is made small. As the result, the more detailed map is shown at the 2nd screen.

Furthermore, the reduced scale KAP of the map may be found using the table which is beforehand recorded in the information memory unit 37. Reduced scale KAP which the car becomes the center of the 2nd screen and the remaining return route is efficiently shown on the map may be directly found using the numerical value calculation table which is stored in the information memory unit 37 and so on. Furthermore, the reduced scale KAP becomes the value that the remaining return route etc. can be appropriately displayed in the area which is a little smaller than the effective display area of the 2nd screen. This is the same as the processing of "initial showing of 2nd screen" in FIGS. 36 and 37.

23. 2nd Embodiment of "Display Adjustment of 2nd Screen" (step SQ22 of FIG. 34)

Figure 39:
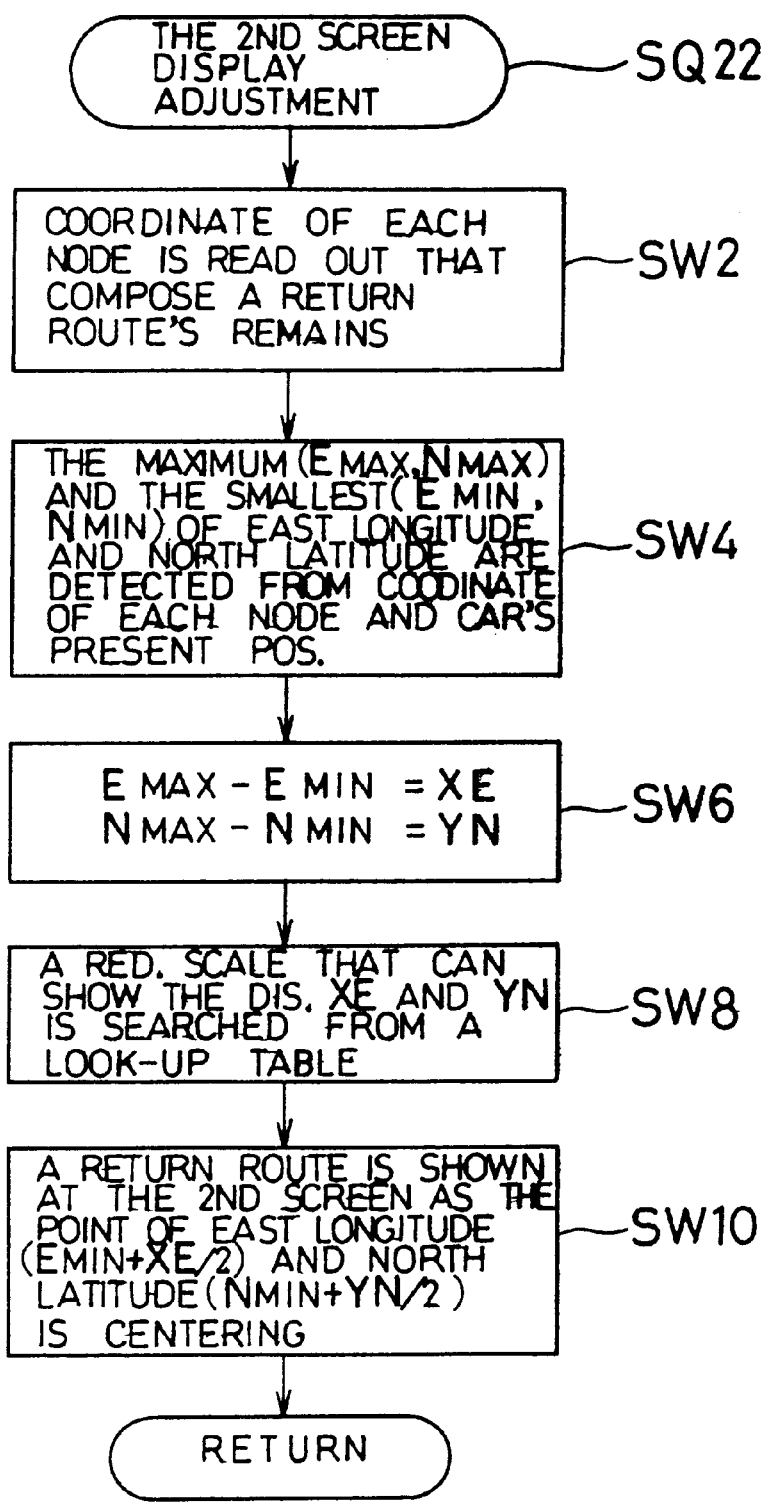
FIG. 39 shows a flow chart of a display adjustment of a 2nd screen in a guidance/display processing of FIG. 34 of 2nd embodiment.

FIG. 39 shows the flow chart of the 2nd embodiment of "display adjustment of 2nd screen". The 2nd embodiment of this "display adjustment of 2nd screen" corresponds to "initial showing of 2nd screen" of FIG. 37. In other words, the remaining part in the return route decreases as the car travels and the map reduced scale which this remaining part displays efficiently in the 2nd screen is found at any time. Un-traveling road data to the confluence in the return route from the present position of the car is read from the information memory unit 37 in FIG. 39. The node coordinate value of each road which composes a route in the confluence neighborhood of the previous guide route and this remaining return route is read from the node data file F3 (step SW2). The coordinate value of each node which is read in the step SW2 and maximum (Emax, Nmax) and minimum value (Emin, Nmin) to the direction of the east longitude and the direction of the north latitude from the coordinate value of the present position of the car are retrieved (step SW4). This processing is the same as the step SU4 of FIG. 37.

Then the following expression is computed based on the maximum and minimum value of the direction of east longitude and the direction of the north latitude (step SW6).

$$Emax - Emin = XE \tag{13}$$

$$Nmax - Nmin = YN \tag{14}$$

Then the reduced scale of the map which can display the horizontal distance XE and the perpendicular distance YN is found using the numerical value calculation table which is beforehand recorded to the information memory unit 37 (step SW8). In other words, the reduced scale which the remaining part in the return route is appropriately displayed in the 2nd screen is found. Furthermore, the calculation of this appropriate reduced scale is the same as "initial showing of 2nd screen" of FIG. 37. The map which is displayed in the 2nd screen is fixed on this embodiment and the car moves on the return route of the displayed map. But as the car moves the reduced scale of the map sometimes changes.

When a map reduced scale is found in the step SW8, by this found reduced scale, the un-traveling return route and the part of the previous guide route centered on the confluence are shown in the 2nd screen (step SU10) and in this display the east longitude coordinate (Emin+XE/2) and the north latitude coordinate (Nmin+YN/2) become the screen center. Then the flow is returned to FIG. 34. Furthermore, when the return route which is displayed in the 2nd screen is displayed by "initial showing of 2nd screen" of FIG. 27, "display adjustment of 2nd screen" of this embodiment is executed as the step SQ22 of FIG. 34. Further when the map which includes the return route is displayed by the processing of "initial showing of 2nd screen" of FIG. 37, "display adjustment of 2nd screen" of FIG. 39 doesn't have to be executed. In other words, the reduced scale of the map which includes the return route etc. which is displayed first in the 2nd screen is fixed and the adjustment of the map reduced scale doesn't have to be executed as the car moves.

Figure 46:
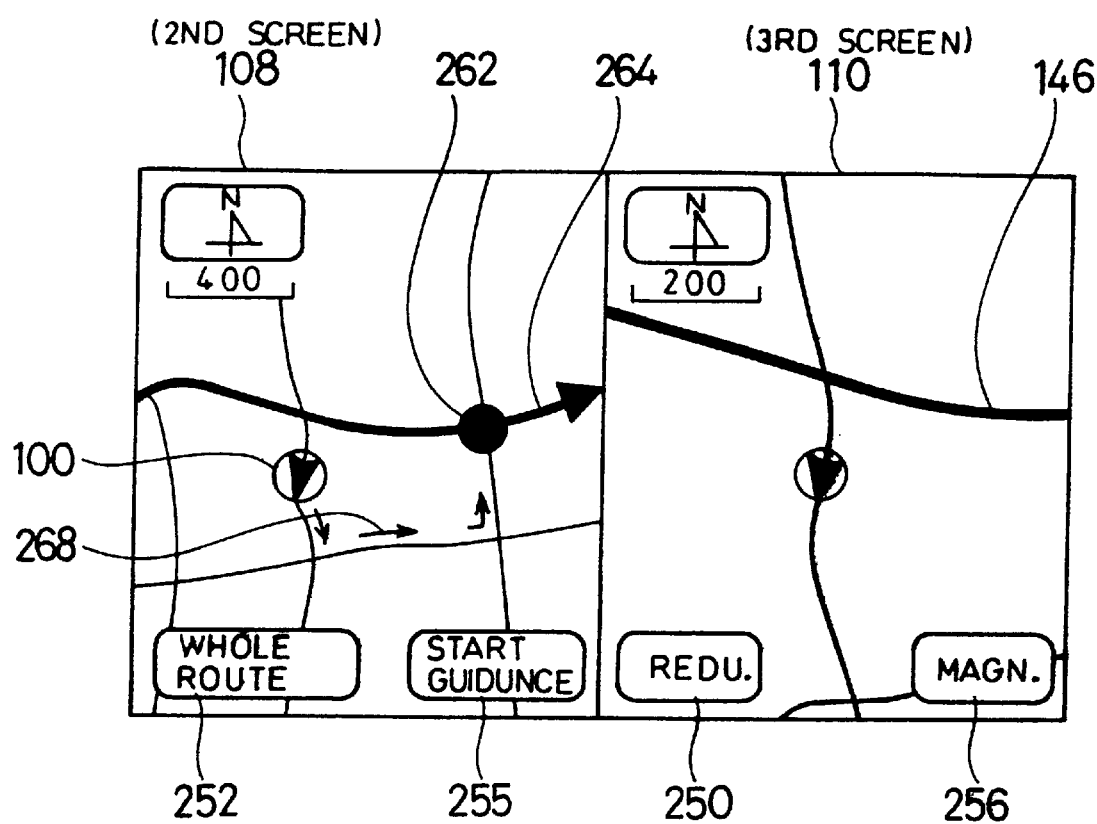
FIG. 46 shows application example of a display of a display 33 immediately after leaving a guide route.

FIG. 46 shows the application example of the display of the 2nd screen. For example, the return route is shown by arrow 268. Further when the return route isn't displayed in the 2nd screen, only the confluence which the return route and the previous route cross may be shown by mark 262. Further the confluence may be also shown by mark 262 when the return route is displayed. Moreover, the direction of the destination in the previous guide route may be shown by a direction mark 264 of the destination.

The display processing of the above direction mark 264 of the destination is simply explained below. The intersection point of the previous guide route displayed in the 2nd screen and the edge of the map screen which is displayed in the 2nd screen 108 of display 33 is computed. In this processing, The road data which is included in the coordinate range which is displayed in display 33 is read from each road which composes the above guide route data MW by image processor 9. Then the road which is the nearest entry destination TP is found from the road data. By that the road number data which links to the entry destination from the guidance beginning point is arranged in the order, the guide route data MW is composed. Therefore the road number which has this most big order (address number) indicates the road which is the nearest the entry destination.

Moreover the node in the coordinate range which is displayed in display 33 is read from the node which composes the road. Then node ND1 which has the most big order (the address number) is selected in each of these nodes. Coordinate data in the intersection point of the straight line which links this node ND1 and the node ND2 of the following address number and the screen edge of display 33 is found. This found coordinate data is stored in RAM4 as the intersection point data CP.

Next the processing which finds for the direction of the destination of the guide route which is displayed in display 33 is executed. This various processing is also thought of.

For example, inclination corner (Tan θ1) to the absolute azimuth of the straight line which links the coordinate of the above intersection point data CP (or the coordinate of node ND1) and the coordinate of the above node ND2 becomes the direction of the destination.

Next the processing to display the direction mark 264 of the destination which shows the direction of the destination in the computed intersection point CP is executed. For example, this processing is executed as follows. The character pattern data of the arrow which is used for the direction mark of the destination is stored in the information memory unit 37 or the ROM 4. Then the character pattern of the arrow is turned to show the above direction of the destination according to the above intersection point data CP. This character pattern data is sent to image processor 9 and is changed into the image data. Therefore the direction mark of the destination 264 is shown in the coordinate which is designated by the intersection point data CP. Actually as the tip of the arrow agree with the coordinate of the intersection point data CP, A deviation to the intersection point data CP is provided for the coordinate of the direction mark of the destination.

As the explanation above the above, when the car deviates from the guide route in the 6th embodiment of the guide/ display processing, the return route to return to this guide route is once searched. Then a road map in the car neighborhood is shown by the reduced scale in which the return route and so on are appropriately displayed in the 2nd screen. Then guidance processing to the previous guide route using the return route by the choosing of a operator is executed. Further in the guidance processing of this return route, 2 screens or 1 screen is shown by the choosing of the operator. Moreover when the return route doesn't fit the request of the operator, whole route searching is executed according to the direction of the operator and a guide route to the destination is searched newly. In other words, it is possible to choose the guide route according to the traveling position of the car.

Furthermore, the operation such as the guidance beginning, searching the return route and identifying the route etc. of each of the above embodiments is possible to operate only when the car is stopping or traveling by very slowly speed in this invention.

According to this above described embodiment, even if the car deviates from the guide route and travels temporarily with the intention of the operator, the road map which includes the previous guide route and the car neighborhood is shown in one of the screens of divided display 33. The road map in this car neighborhood is shown by the appropriate reduced scale when the return route to the confluence the previous route from the point which deviated from the previous route is displayed. This return routes is a recommended route to the recommended confluence of the previous guide route from the point which deviated from the previous route or the present position of the car and is automatically searched by the navigation device.

Then even if the car deviates from the guide route with the intention of the operator, the necessary map information with the position relation etc. of the present position of the car and the previous guide route can be quickly confirmed. Moreover, if it is instructed a guidance beginning, the guidance processing to return to the previous route is begun together with display of the return route. Therefore while the car is traveling the guide route, even if the car deviates temporarily from the route with the urgent business, the car can return to the guide route quickly.

Further the map which was displayed before the division is shown at the same reduced scale in the other of the divided screen and therefore a confusion which accompanies a changing of the map display is prevented. In other words, when the map which is displayed in display 33 is changed, generally a lot of time is necessary to understand the displayed present position of the car and the displayed map information, therefore a consciousness can be concentrated on the screen. As a result, it gets not to lack an attention ahead of the vehicle. Further because the map which was displayed before the division is shown in the other screen after the division just as it is, the dispersion of the consciousness to the above screen is prevented.

Moreover when the map around the present position of the car is displayed in the conventional single screen, the guide route sometimes disappears completely from the screen with some display reduced scale. In other words, when the detailed map is displayed in the screen before the division, the guide route disappears sometimes from the screen as the car leaves far from the guide route. In the case, it doesn't understand the direction of the previous guide route from the present position of this car and the previous route can not be quickly returned to. Further in such a case, even if the guide route from the present position of the car to the destination is re-searched, it takes more time to travel by the new guide route and it sometimes had better return to the previous guide route. However according to this embodiment, because the relative position of deviating previous route and the car is correctly shown in one of the divided screens, the position and the direction of the previous guide route from the present position of the car can be correctly grasped. In other words, the comparison of the condition in the case of returning to the previous route and using the new guide route is easy.

Furthermore, in this 6th embodiment, the kind of the map which is displayed in the divided 2nd screen isn't especially limited and the displayed map may be the road map and the house map. Furthermore, the house map is the road map which includes information of the facilities such as the dwelling and so on. Moreover in this 6th embodiment, the map reduced scale of the 2nd screen is decided as the value which the whole return route is displayed fully, but it may be a value which is any more or below. In other words, the map in the wide range which includes the return route may be shown in the 2nd screen. Moreover the route may be searched based on the information (for example VICS information) which is transmitted from outside and so on in the searching of the return route. Therefore a congestion road isn't selected as the return route based on the information of the road congestion (jam) and so on.

Further a traveling route is cumulatively stored after the car deviates from the previous route and the map which includes the traveling route and the return route may be shown in the 2nd screen. In other words, after the optional time passes after the car deviates from the previous route, it isn't always traveling the return route which was searched immediately after the car deviated from the previous route. Therefore when it is detected that the car deviated from the previous route, the change of the present position of the car is stored in order in the RAM 5 as the movement coordinate of the east longitude and the north latitude. Then the above change is stored as the maximum coordinate and the minimum coordinate to the direction of the east longitude and the maximum coordinate and the minimum coordinate to the direction of the north latitude. In other words, the geographical movement range of the car is stored as the maximum and the minimum value to the direction of the east longitude and the north latitude. Then when the map which includes the return route and so on in the 2nd screen is displayed, the map which includes a moved geographical range to the present position of the car from the point which deviated from the previous route may be shown.

24. Setting Processing of Nearest Facilities

Figure 49:
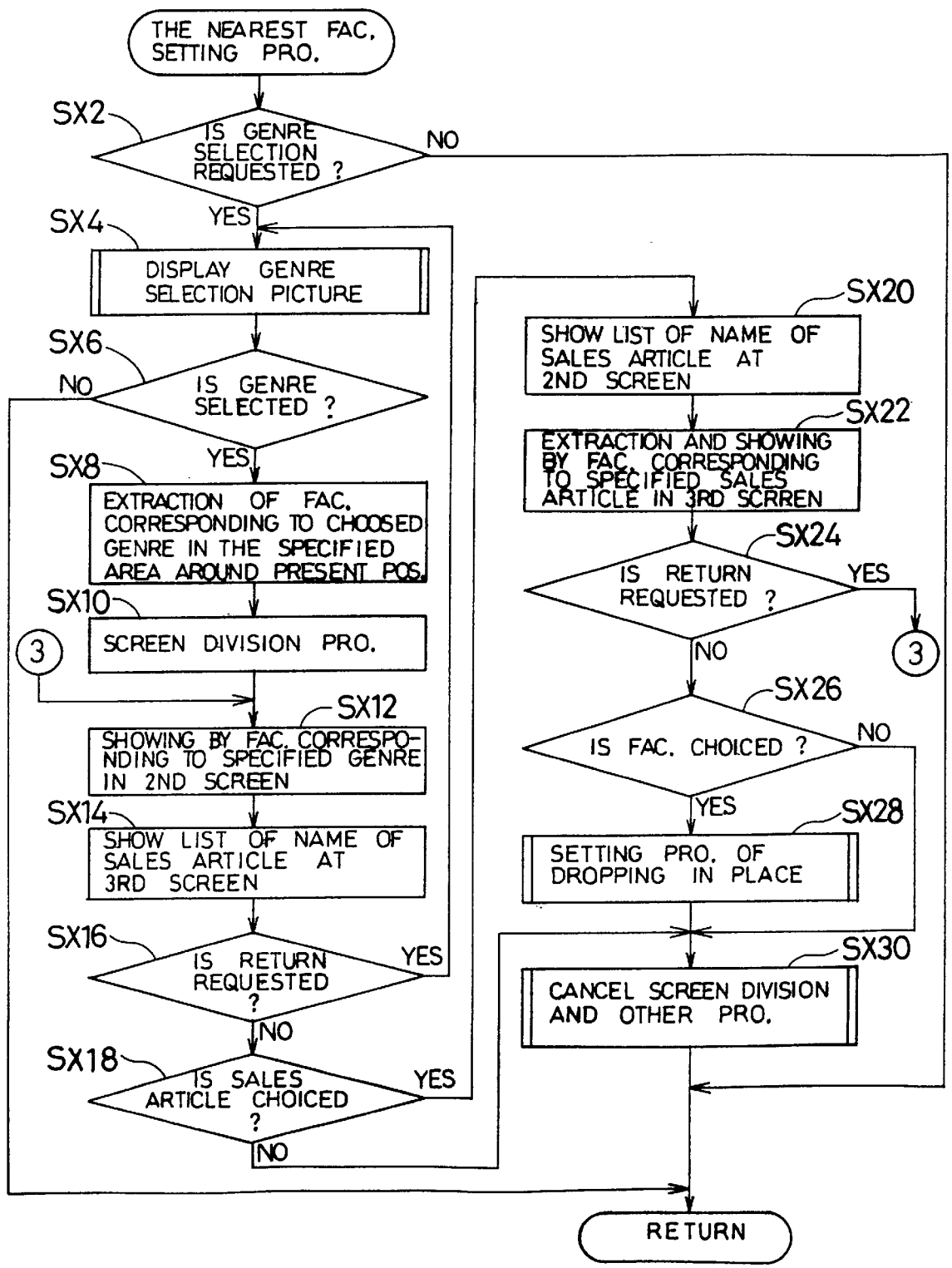
FIG. 49 shows a flow chart of setting processing of nearest facilities.

FIG. 49 shows the flow chart of the setting processing of nearest facilities of the 7th embodiment of this invention. The setting processing of nearest facilities is executed with the destination-setting processing or the other processing of the FIG. 5. In the nearest facility processing, the retrieving and the choosing of dropping in facilities except the last destination are executed. This facilities are on the neighborhood of the present position of the car or the way of the guide route. The dropping in facilities are as follows. For example, it is gasoline stations for the fuel replenishment, restaurant, banks, post offices or supermarkets for the purchase and so on. In other words, it is facilities except the last destination and it is various facilities to finish a necessary occupation in the daily life.

When the setting processing of the nearest facilities of FIG. 49 is required, the genre to specify first dropping in facilities is shown in display 33. Then one genre is specified using this genre list. The facilities which correspond to the specified genre are shown on the map of the 2nd screen. At this time, the list of the name of the sales article which is a condition of the squeeze of the retrieving facilities is shown in the 3rd screen. When a specific article is specified from the list of the name of the sales article of the 3rd screen, the list of the name of the above sales article is shown in the 2nd screen.

Moreover only the facilities which correspond to the name of this sales article are shown on the map of the 3rd screen. When specifying dropping in facilities in this way, specification is changed in order to the narrower category from the large category. Moreover the retrieving result by this specification is shown in the divided screen. Additionally a retrieving result or a retrieving condition by the category which is specified immediately before is also together shown.

Next FIG. 49 is explained. Firstly it is determined whether choosing of the genre is requested by the operator or not (step SX2). By that the letter of icon "dropping in place setting" etc. which is displayed in display 33 is pushed, the request of the genre choosing is input. The processing of FIG. 49 is ended when genre choosing isn't required and then the flow is returned to the overall processing of FIG. 5. However if genre choosing is required, the list for the genre choosing is shown in the screen of display 33 (step SX4).

Figure 50:
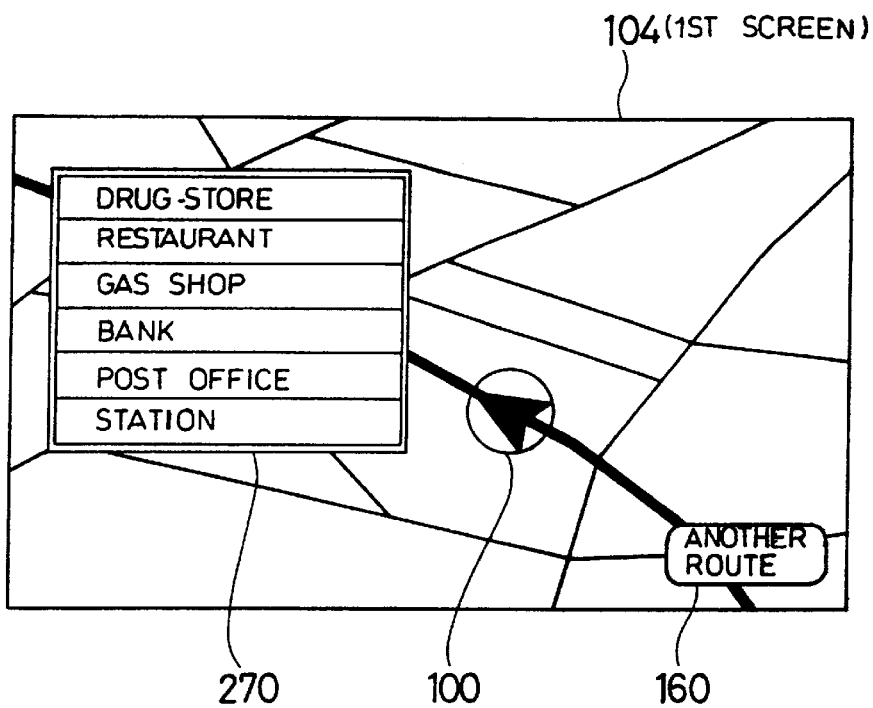
FIG. 50 shows example of a genre list.

FIG. 50 shows the example of the genre list which is displayed in the 1st screen 104 of display 33. The name of the genre is shown in each column of the list 270 which is shown in FIG. 50. For example this genre is drugstores, restaurants and gasoline stations and so on.

When the genre list is displayed, it is determined whether one genre is chosen from the this genre list or not (step SX6). When the choosing of a genre isn't executed, in other words, the operation of touch switch 34 isn't executed during the constant time, the processing of FIG. 49 is compulsorily ended (step SX6). Then the flow is returned to the overall processing of FIG. 5. However when a specific genre is specified, the facilities which correspond to the specified genre in the area with specified distance from the present position of the car are retrieved from facility data file F16 (step SX8). In other words, only the facilities which correspond to the specified genre from the each facility in facility data file F16 are retrieved. A geographical straight distance between the present position of the car and the facilities is calculated based on east longitude coordinate SEO and north latitude coordinate SNO of the each retrieved facility.

The discriminating number of the each facility which this calculated straight distance is less than the specified distance is temporarily stored in the RAM 5 as retrieving facility number GBn. When the extraction of the facilities which correspond to the choosing genre ends, next the division processing of the display screen of display 33 is executed (step SX10). Then each of facilities which is extracted in the step SX8 are shown on the map of the 2nd screen (step SX12). Moreover, the list of the name of the sales article and the brand name are shown in the 3rd screen. For example, if a gasoline station in the genre is choose in the 1st screen which is shown in FIG. 50, the list of the brand (the name of the goods) of the gasoline station which is the name of the sales article is shown in the 3rd screen as shown FIG. 51 (step SX14). Further if a bank is specified as the genre, the list of the name of each bank is shown in the 3rd screen by the processing of step SX14. Furthermore, before the list of the shop name at each restaurant is displayed when a restaurant is specified, the list of the kind, the Chinese food, Japanese cuisine and the Western dish may be previously shown. In this case, the pile (the 18th prize step SX) of the retrieving condition to be described later is repeated.

Figure 51:
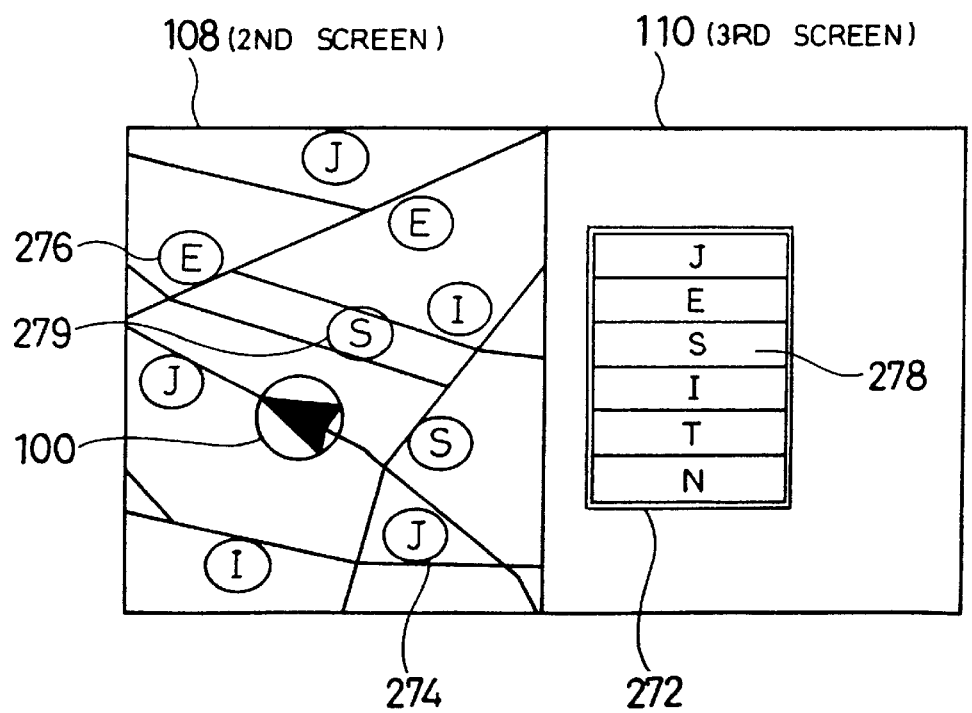
FIG. 51 shows a state where facilities which correspond to a specification genre were displayed at a divided screen.

FIG. 51 shows the condition which the screen of display 33 is divided into. The facilities which correspond to the genre which is specified by the 1st screen is extracted and is shown on the map centered on the car of 2nd screen 108. Further the list 272 of the brand (the name of the sales article) of the gasoline station which is specified in the 1st screen is shown in the 3rd screen.

Next it is determined whether a return requests or not (step SX16). The information which is shown in display 33 is returned to the contents which are displayed one ahead by this return request. When a return request is input (step SX16), it is returned to the display of the genre list of the step SX4, i.e. the 1st screen of FIG. 50. Furthermore, when the above return request is input, the genre list which is displayed in the 1st screen of FIG. 50 may be shown in the 2nd screen or the 3rd screen of FIG. 51. Further the input of the return request depends on that the icon which is displayed in display 33 is pushed.

If the return isn't required, it is determined whether the brand of the gasoline station which is the sales articles is specified or not using the list 272 which is displayed in the 3rd screen (step SX18).

Furthermore, the specification of step SX18 corresponds to the retrieving condition which is used in the 2nd retrieving. The squeeze of the specific facilities is executed by the specification of this 2nd retrieving.

When the brand (the sales article) of the gasoline station is specified in step SX18, the list of the brand (the name of the sales article) of the gasoline station is shown in the 2nd screen (step SX20). Then only the facilities to sell the brand (the sales article) of the specified gasoline station are shown on the map of the 3rd screen (step SX22). The processing result of step SX20 is shown in the 2nd screen 108 of FIG. 52. Likewise the processing result of step SX22 is shown in the 3rd screen 110 of FIG. 52. The list 272 of the 3rd screen which is shown in FIG. 51 is shown in 2nd screen 108. Only the facilities 279 which correspond to the brand (the sales article) 278 of the gasoline station of list 272 are shown on the map in the 3rd screen 110 of FIG. 52.

Next it is determined whether the return is requested or not (step SX24). The information which is displayed in display 33 by this return request is returned to the contents which are displayed one ahead. When the return request is input (step SX24), the flow is returned to the processing of the step SX12. In other words, it is returned to the display condition of FIG. 51 when the return request is executed in the display condition of FIG. 52.

Figure 52:
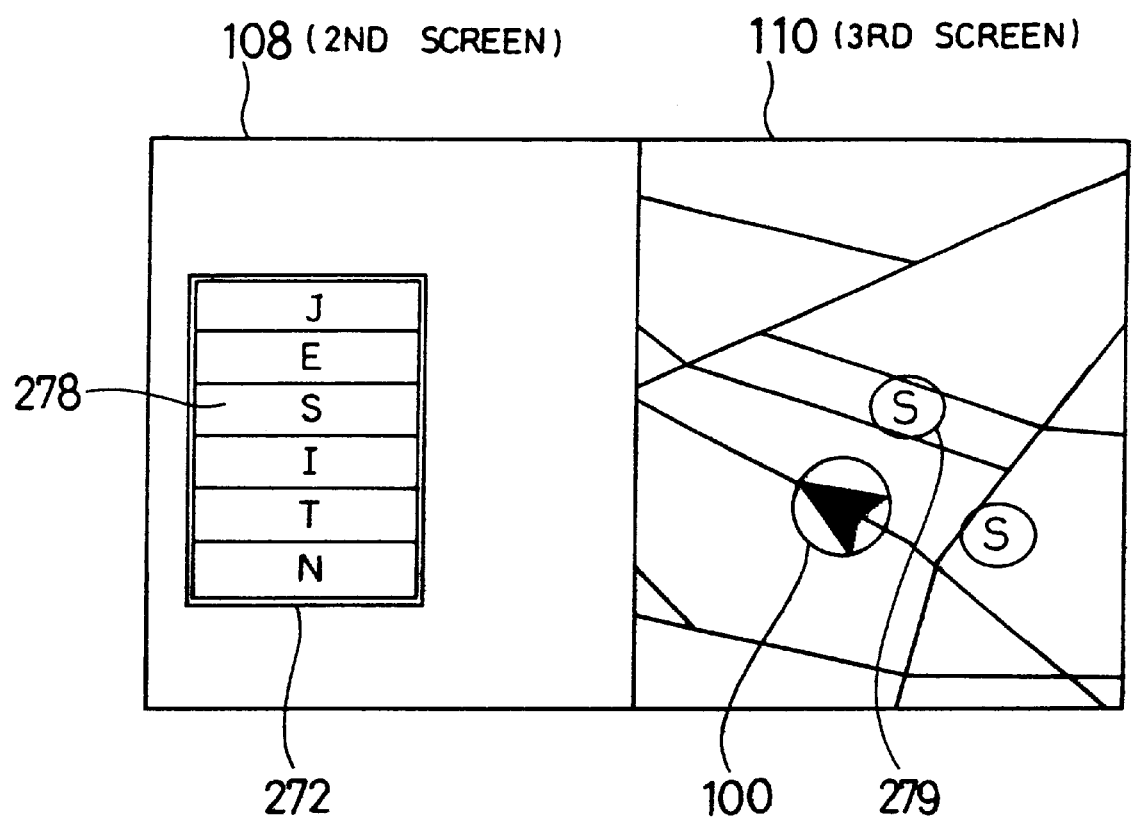
FIG. 52 shows a state of a divided screen.

However, if return isn't required, it is determined whether the specification of the facilities is operated or not (step SX26). In other words, it is determined whether the facilities are specified or not using the display of the 3rd screen as shown in FIG. 52. If facilities are specified, information of the coordinate value etc. of the specified facilities is read from the information memory unit 37 and is stored in RAM 5 as dropping in place DP (step SX28).

On the other hand, when one facility isn't specified using the display of 3rd screen 110 or touch switch 34 isn't operated during the specified time, the cancellation processing of screen division and so on are executed (step SX30). In other words, the setting processing of the nearest facilities which is shown in FIG. 49 is compulsorily ended. Furthermore, when facilities are also specified likewise described above, screen division is canceled (step SX30).

In this way, at the specification of the facilities such as the dropping in place and so on in the setting processing of the nearest facilities of FIG. 49, as it does the name of the genre and the brand (the sales article), the squeeze of the condition that facilities are retrieved is executed in order. Moreover when the squeeze of this retrieving condition is executed, the facilities which the condition agrees with and the following retrieving condition (the list of the sales articles and so on) is shown in parallel in the divided screen of display 33. Therefore the change of the retrieving condition and the retrieving result as the condition changes can be confirmed at once on the divided screen. The facilities about the dropping in place or the destination can be quickly and accurately specified.

Figure 73:
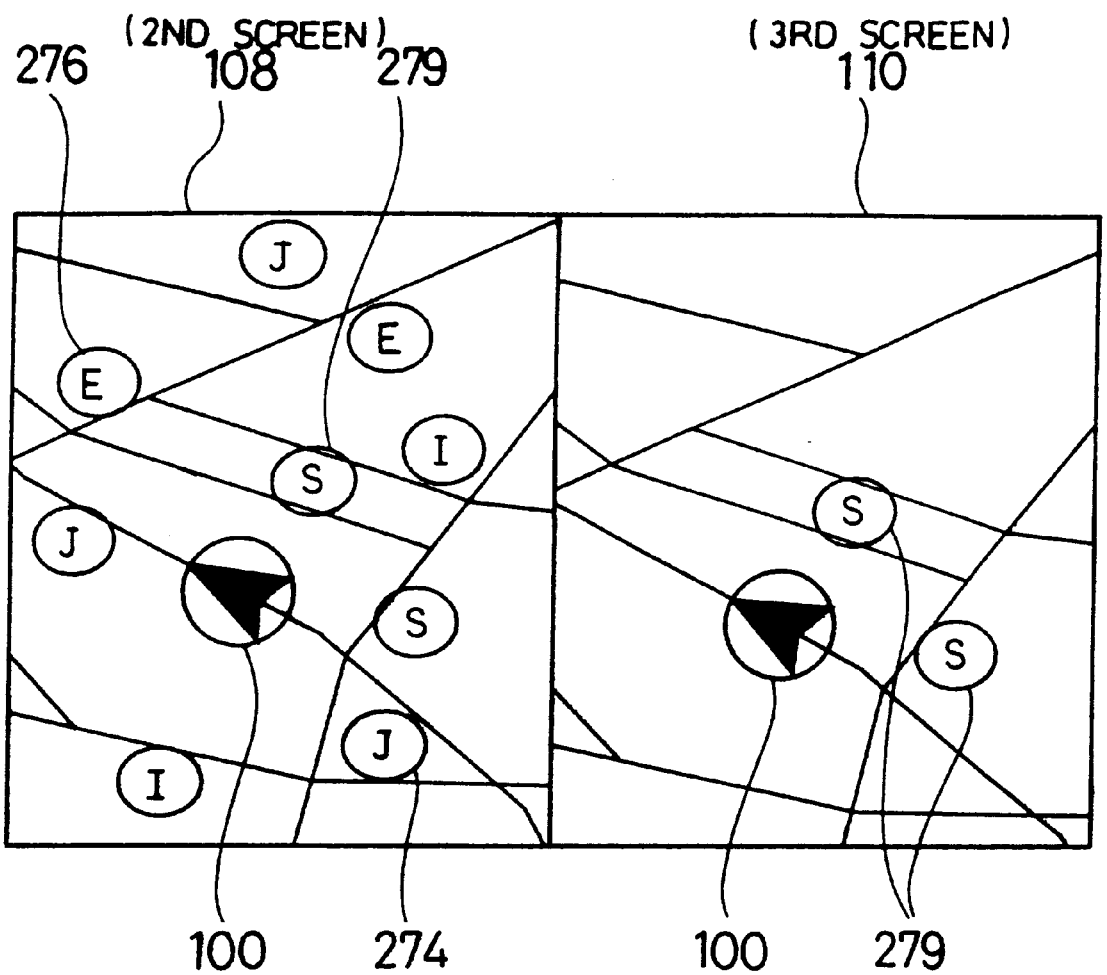
FIG. 73 shows a state where facilities which correspond to a specification genre and facilities which correspond to a specific brand were displayed at a divided screen.

Further when the specification of the brand (the sales article) of the gasoline station is executed in step SX18 of FIG. 49, as shown in FIG. 73, the map of all the facilities which correspond to the genre which is chosen in the step SX12 may be shown in 2nd screen 108. In this processing, all gasoline stations which are in the specific area are shown in the 2nd screen. Moreover only the gasoline station which treats the specific brand (the sales article) which is specified in the step SX18 is shown at the map of the 3rd screen.

At the above embodiment, the specification of the genre is executed as the 1st retrieving condition. The specification of the name of the brand (the sales article) is executed as the 2nd retrieving condition. However this invention isn't limited to this retrieving condition. For example, the retrieving condition which extracts the only facilities which are within the specified distance from the searched guide route may be replaced with the 2nd retrieving condition or the 3rd retrieving condition. Moreover the processing same as the setting processing of the nearest facilities of FIG. 49 may be executed in case of destination setting and so on. That is, in the specification of the destination, each of the facilities may be specified by the condition of the various choosing such as the genre choosing, the chain shop name choosing and the sales article choosing and so on. Moreover the extraction (FIG. 53) of the following facilities along route and/or the extraction (FIG. 54) the shortest straight distance between the guide route and the facilities may be added to the retrieving condition of the each facility.

25. The Extraction of the Facilities Along Route

Figure 53:
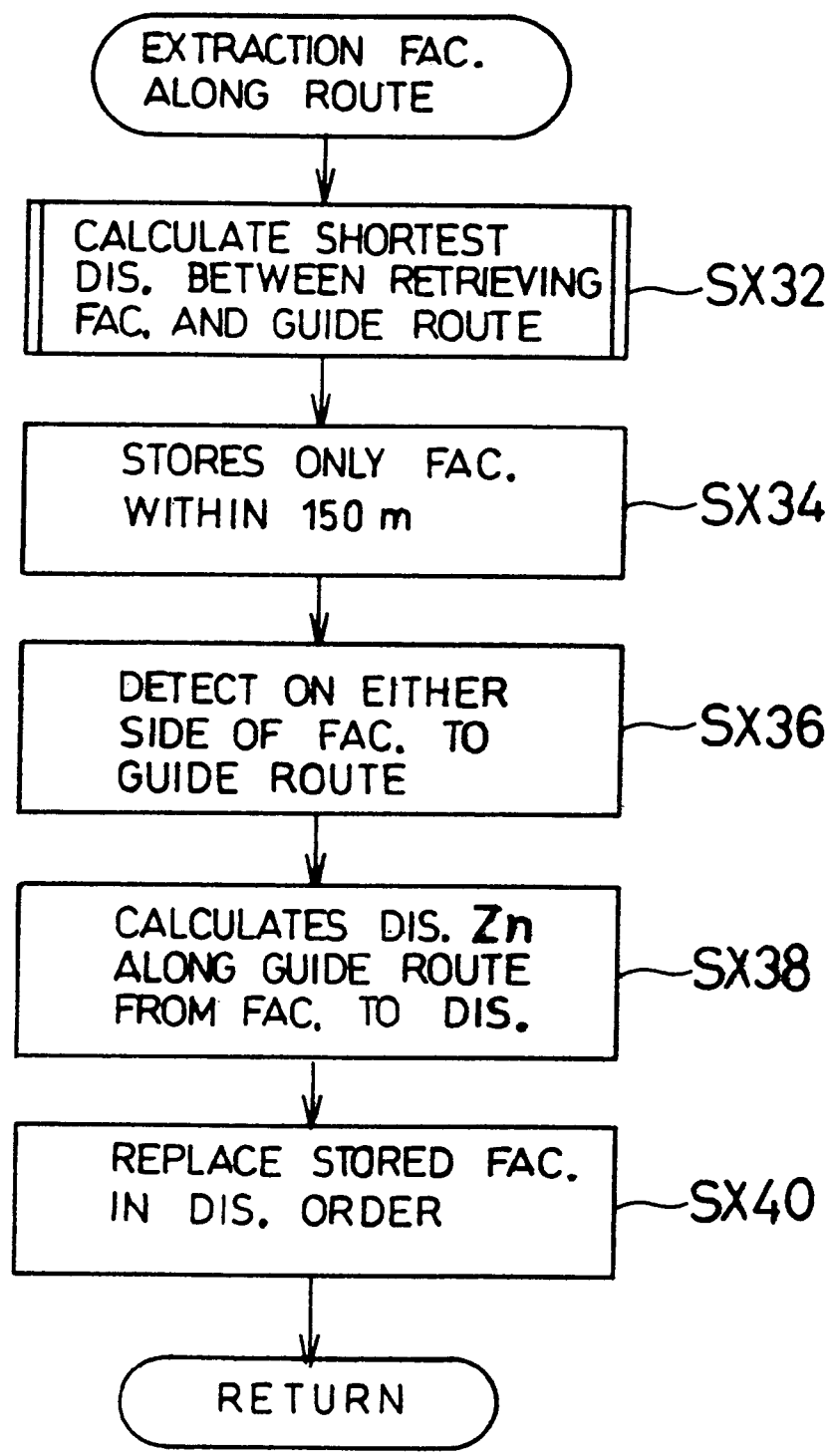
FIG. 53 shows a subroutine of extraction of facilities of route going-along.
Figure 54:
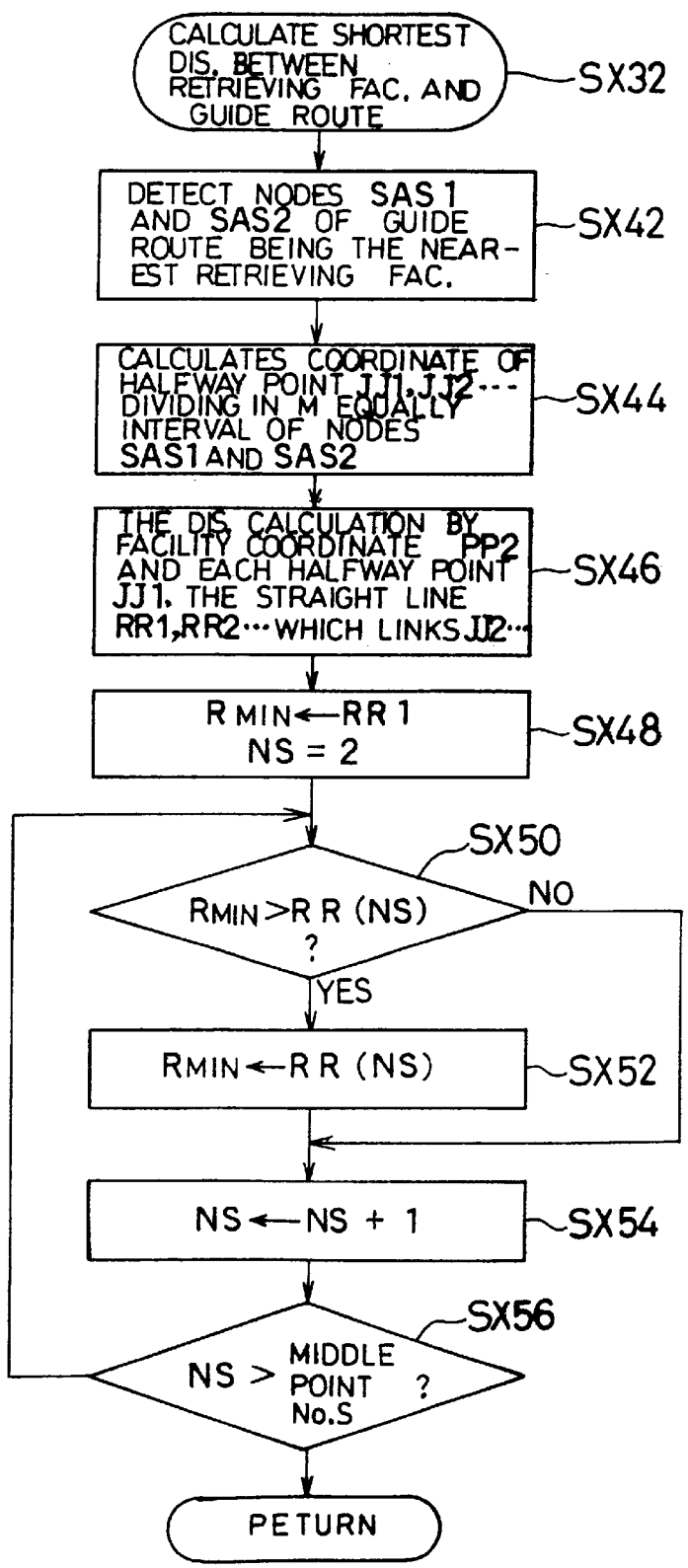
FIG. 54 shows a subroutine which calculates a shortest straight line distance between retrieved facilities and a guide route.
Figure 55:
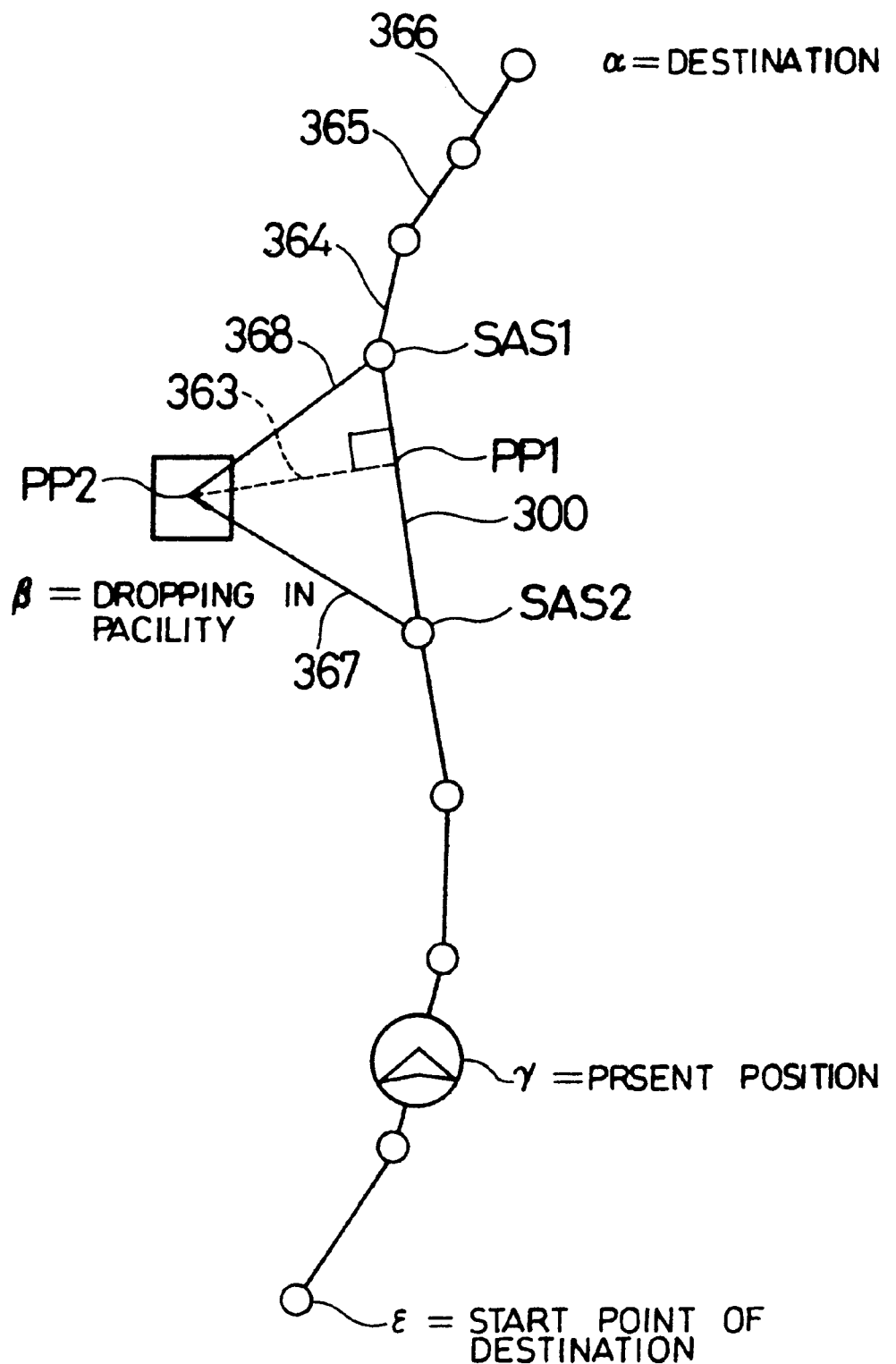
FIG. 55 shows position relation between retrieved facilities and a guide route.

FIG. 53 shows the subroutine of the extraction of the facilities along route. Based on the geographical coordinate data at each of the retrieved facilities, in this subroutine, a geographical shortest straight distance to the guide route from the facilities is calculated (step SX32). Then the only facilities with the shortest straight distance which is within the specified value is extracted. Furthermore, the subroutine of this calculation of the shortest straight distance is shown in FIG. 54. The above guide route means the guide route data MW which is found by the route search processing in the overall processing of FIG. 5. FIG. 55 explains position relation between the detected facilities and the guide route. A route to destination α from guidance beginning point ε is found by the route search processing (step SA4).

Figure 56:
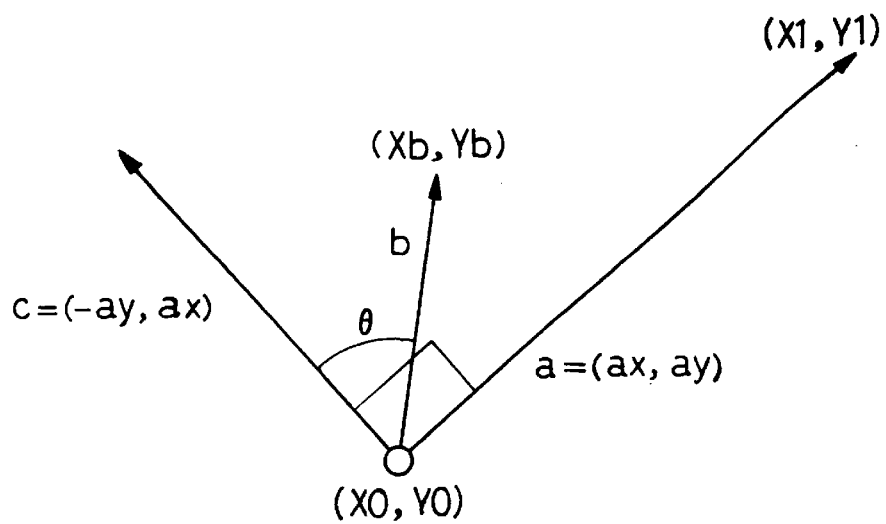
FIG. 56 explains processing of a step SX36.

In the extraction processing of the facilities along route of FIG. 53, firstly a shortest straight distance to the guide route from each of the facilities is calculated (step SX32). This shortest straight distance is about 150 m (step SX34). Then it is determined whether each of the facilities extracted in the step SX34 are on the right or the left to the moving direction of the car on the guide route (step SX36). FIG. 56 explains the processing of step SX36.

In the FIG. 56, coordinate (X1, Y1) indicates the coordinate of the node of the guide route which is near the facilities of the objective coordinate (Xb, Yb). Coordinate (X1, Y1) corresponds to the node SAS1 of the guide route which is shown in FIG. 55. Further as shown in FIG. 55, standard coordinate (X0, Y0) corresponds to the coordinate of the node SAS2 of the guide route or the present position of the car. Therefore, the standard vector a=(ax, ay) which links coordinate (X1, Y1) and basis coordinate (X0, Y0) corresponds to the branch 300 of FIG. 55. Furthermore, standard vector a is a=(ax, ay)=(X1−X0, Y1−Y0). The node of the coordinate which is the nearest objective coordinate (Xb, Yb) of the facilities is selected from each of the road data which composes a guide route data MW as this coordinate (X1, Y1) and standard coordinate (X0, Y0).

Orthogonal vector c=(−ax, ay) which turns counterclockwise by 90 degrees to this standard vector is defined. Further the objective vector b which links the standard coordinate (X0, Y0) and the objective coordinate (Xb, Yb) of the facilities shifts to the orthogonal vector c in angle θ. Furthermore, the objective vector b is b=(Xb−X0, Yb−Y0).

The inner product of such the orthogonal vector c and the objective vector b is defined as follows.

$$c \cdot b = |c| \times |b| \times \cos \theta$$

By the way, it is 0<cos θ<1 at the time of −90 degrees<θ<90 degrees. Further it is −1<cos θ<0 at the time of −180 degrees<θ<−90 degrees and 90 degrees<θ<180 degrees. Therefore, if the value with the inner product of the above vectors c and b is positive, the above facilities are on the left side to the moving direction of the car on the guide route. If the above inner product value is a negative oppositely, the this facilities are on the right side to the moving direction of the car. In this way, the position on relative either side of the extracted facilities to the guide route is determined by positive (plus) and the negative (minus) of the vector inner product (step SX36).

Therefore if the positive and negative in the calculator result of the inner product is determined, direction of the right or left of the objective one is easily decided. This determined right or left data RL is stored in the above RAM 5. Furthermore, the standard coordinate (X0, Y0) which is shown in FIG. 56 is the coordinate (node SAS2 in the FIG. 55) of the node which is near the starting point in two nodes of the guide route which is the nearest facilities of the retrieving object. Oppositely the coordinate (X1, Y1) is the node coordinate (node SAS1 in the FIG. 55) which is near the destination. Furthermore, the above orthogonal vector c may be turn clockwise by 90 degrees to standard vector a. The relative position of each of the facilities to the moving direction of the car of the guide route may be detected by the exterior product (|a|×|b|×sinE) of the standard vector a and the objective vector b. But, ε of sinE is an angle between the standard vector a and the objective vector b and the clockwise turn to standard vector a is plus (positive).

Moreover, the direction of standard vector a may be the north, the south, the east, the west, the moving direction of the present position of the car, the direction to the destination from the car or the direction which the operator set and so on. Therefore the position on either side of each of the facilities to the direction which is specified is determined.

When a position on either side of each of the extracted facilities to the guide route is detected in the step SX36 of FIG. 53 and facility-destination distance Zn from the extracted facilities to the destination are calculated (step SX38). This facility-destination distance Zn is the distance along the guide route and means the distance along route to destination a from the point PP1 which is shown in FIG. 55. Therefore in case of FIG. 55, each straight distance of branches 364, 365 and 366 is added to the straight distance to node SAS1 from point PP1 and this is facility-destination distance Zn. Further the shortest straight distance, i.e. the value which is found in step SX32 of FIG. 53 may be added to this facility-destination distance Zn.

Then the extracted facility data is replaced in line based on the found facility-destination distance Zn (step SX40). For example, each of facilities are arranged from the biggest facilities-destination distance Zn. Then the extracting condition of facilities may be set by this facility-destination distance Zn. By the comparison between the distance from the car to the destinations and the facility-destination distance Zn, the facilities which are left by more than the specified distance or are left the present position of the car by more than the specified distance may be excluded from the destination.

26. Calculation of the Shortest Straight Distance

Figure 57:
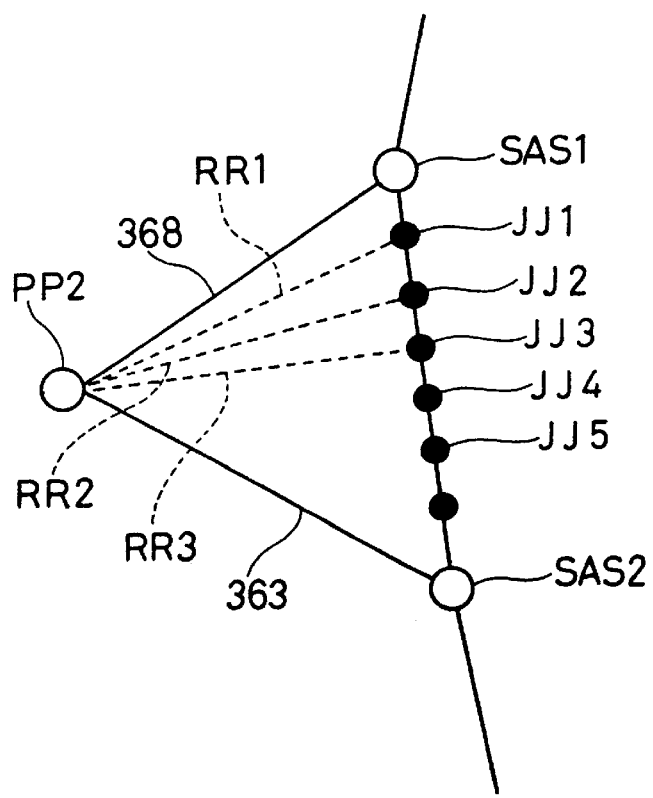
FIG. 57 explains calculation of a shortest straight line distance.

FIG. 54 shows the subroutine (step SX32) of the calculation of the shortest straight distance between the retrieving facilities at FIG. 53 and the guide route. FIG. 55 explains relative geographical position relation between the facility which is along the guide route and this guide route. FIG. 57 explains the calculation of the shortest straight distance. As described above, a route from the guidance beginning point ε which is shown in FIG. 55 to destination α is found by the route search processing (step SA4 of FIG. 5).

Further the nodes SAS1 and SAS2 which are shown in FIG. 57 correspond to the nodes SAS1 and SAS2 which are shown in FIG. 55. A geographical shortest straight distance between coordinate PP2 of one retrieved facility and the guide route is found as follows. The nodes SAS1 and SAS2 of the guide route which is the nearest coordinate PP2 at these facilities are selected (step SX42 of FIG. 54). Furthermore, two nodes which are the nearest each of the aimed facilities in the nodes which are in this guide route are detected by the following processing. First a straight distance between each node of the guide route and coordinate PP2 is calculated. The nodes which has a straight distance with minimum value and the next small value in each calculated straight distance are detected. These two nodes are made the node which is the nearest the guide route.

Next each coordinate of JJ1 and JJ2 . . . of the halfway point which divides in m equally the straight line which links these two nodes SAS1 and SAS2 is calculated from the geographical coordinate of each node SAS1 and node SAS2 (step SX44). The geographical straight distance of the straight line RR1 and RR2 . . . which links respectively halfway point JJ1 and JJ2 . . . and coordinate PP2 of the aimed facilities are calculated (step SX46).

Next the distance value of straight line RR1 is set as minimum value Rmin in the setting of a initial value. Moreover initial value "2" is set as condition variable NS (step SX48).

This condition variable NS indicates the number of the above straight lines RR1 and RR2 . . . A geographical distance of the NS-th straight line RR (NS) which is specified by this condition variable NS and the above minimum value Rmin are compared (step SX50). If the value of the straight line RR (NS) is smaller than minimum value Rmin, the distance value of straight line RR (NS) is set as minimum value Rmin (step SX52). After substitution for this numerical value, the condition variable NS is increased by one (step SX54).

However if the minimum value Rmin is smaller than the distance value of straight line RR(NS), the processing of step SX52 isn't executed and only 1 increase (step SX54) of the condition variable NS is executed. It is determined whether this condition variable NS became bigger or not than the number of the halfway points that divides nodes SAS1 and SAS2 into the regular intervals (step SX56). If the determine of this step SX56 is NO, processing from step SX50 is executed once again. However if the condition variable NS is bigger than the number of the halfway points which divided nodes SAS1 and SAS2 into the regular intervals, the processing of steps SX50 to SX56 is ended.

By the processing of above steps SX50 to SX56, the numerical value which is equal approximately to the shortest straight distance to coordinate PP2 of the aimed facilities from the straight line which links nodes SAS1 and SAS2 is set as minimum value Rmin. The minimum value Rmin which is found for by the above processing is made the shortest facility-route distance Rmin between the facilities and the guide route. This minimum value Rmin indicates the distance of the perpendicular line to the straight line which links between the nodes SAS1 and SAS2 from the objective facility. Furthermore, the calculation processing of this shortest straight distance may be executed as follows. First a straight distance from node SAS1 or node SAS2 to the objective facilities is calculated. Moreover, an angle among the straight line which links nodes SAS1 and SAS2 and the straight line which links the node and facilities is found. The shortest straight distance may be found using the triangle function based on this angle and the straight distance between the node and the facility.

Further by the position on either side to the guide route which is found for by the processing of FIG. 53, the following extracting condition may be added. That is, when the median strip exists in the road, it is impossible to turn left at the place except the intersection. Therefore the facilities on the left side of such a road part at which a car can not turn left may be excluded. In this case, a extracting means of the road condition to extract environment at each road in the guide route which is searched is provided. It is determined whether exclude or not the facilities which are extracted by the facility exception means using the result of the step SX36 of FIG. 53 by the road condition read by this extracting means. In other words, it is determined whether the facilities is in right side or left side of the guide route in the step SX36. If road environment and a position on either side of the facilities are compared here, the above extracting processing is possible.

Processing by the extracting means of the above road condition is executed as follows. That is, road attribute data and attention point data and so on are read from road data file F4 of each road. The road environment of the guide route which is the nearest the extracted facilities is determined using this read road attribute data and so on. In other words, it is determined whether the dropping in to the facilities is difficult or not by the facility exception means. It is possible to prevent that the facility the dropping in of which is very difficult are chosen as the destination or the dropping in place by this.

Moreover the transmitted information is taken from the outside system of VICS and ATIS etc. and this information may be made a extracting condition of the dropping in facilities. For example, when a parking lot around the destination is extracted as the dropping in facilities and so on, the following processing is executed. By the outside information to be spent by VICS and ATIS etc., the fullness or the empty condition of each parking lot or the congestion situation of the road in the this facility neighborhood is added to the extracting condition of the facilities. In other words, the extracting condition by the information which is sent from outside for example VISC or ATIS etc. may be added in the setting of the destination or the dropping in place. This can prohibit the choosing of the facilities which neighbor a full parking lot or a traffic jam (crowed) road. In other words, the mistake of the facility choosing is made more little. Furthermore, when the car is traveling by more than constant speed, the begin order of the setting processing of the nearest facilities and destination-setting processing isn't permitted.

As above mentioned, when wanting to drop in the facilities on the way etc. of the guide route to the destination which is set at first, the facilities and the distance along the guide route are retrieved considering the present position of the ca. Therefore the extracting condition of the dropping in facilities becomes more appropriate and the choosing of optimal facilities becomes possible. In other words, the dropping in facilities which is left far from the guide route is difficult generally. Therefore it is better that the information of the facilities which is left far from such a guide route isn't displayed on display 33. Further if facilities along route is extracted, it can be prevented that the low necessary information is displayed in the screen and it can be prevented that the facilities are miss-choose.

Moreover when there are not dropping in facilities which agree with the request on the way in the route from the present position of the car to the destination, the following condition is possible. That is, the facilities which agree with the request in the point which returned a little to the side of the starting place in the guide route exist. In this case, at the above embodiment, the facilities which the car already passed along guide route are retrieved and therefore it is possible to choose such facilities.

Further when plural dropping in facilities are extracted, as mentioned above, if a squeeze condition (the straight distance from the guide route) is made severe, only the dropping in facilities which agree with the request of the user are shown and the time which takes for the facility choosing is reduced.

In the above facility setting processing, the facilities may be retrieved in the whole area of the map information based on the guide route and the retrieving may be executed only in the specific area which is described later. In case of along guide route, the person who is traveling a route can drop in the requested facilities without deviating far from the route. Further if facilities within the requested range from the standard point (the present place, the destination or the cursor position and so on) are chosen and shown, the required information and the required retrieving result are provided quickly and clearly to the user. Further when an extracting result of the facilities is displayed in the screen, if various information of distance and position relation between each of the facilities and the guide route or distance from each of the facilities to the destination and so on is together shown, the position of the required facilities to the guide route can be grasped clearly.

27. Postcode Choosing Data 50

In the above setting of the dropping in facilities or the destination, after a specific area is specified by the area specification number of the following postcode and so on, the facilities may be extracted in order in the specification area. FIG. 58 to FIG. 63 show the structure of various data which is stored to information memory unit 37. These data is used with the destination-setting processing of FIG. 64. Postcode choosing data 50 is shown in FIG. 58. This postcode data 50 is composed of postcode RDN, street list address LA, size LD, facility genre list address NA, size ND, the east longitude coordinate PEO of the representative point, the north latitude coordinate PNO of the representative point and area shape data address EA. One area is specified by one postcode RDN. Various data about this specified area is stored in order from the address in the information memory unit 37 which is specified by street list address LA and facility genre list address NA etc.

For example, the memory start address and the memory size which a street list is stored are specified by the street list address LA and the size LD. Likewise the memory start address and the memory size which a genre list that each of the facilities is belonged are specified by facility genre list address NA and size ND. Furthermore the genre indicates the classification of the destination or the dropping in place, a field, a purpose, an use or business contents or facilities such as the public facilities, traffic facilities, sports/leisure facilities or the shopping facilities such as the station, the museum, the golf course, the bookstore, the pharmacy, the restaurant or etc.

The east longitude coordinate PEO of the representative point and the north latitude coordinate PNO of the representative point indicate a center approximately in the area according to postcode RDN. When the map data in the information memory unit 37 is displayed in display 33, the geographical coordinate which is specified by the east longitude coordinate PEO of the representative point and the north latitude coordinate PNO of the representative point is approximately made in the center of the display 33. Therefore the area which corresponds to the specified postcode is approximately shown in the center of the display 33. In other words, the map data which corresponds to the postcode area is approximately shown in the center of the display 33 by the east longitude coordinate PEO of the representative point and the north latitude coordinate PNO of the representative point. Furthermore the end or the edge of the area is sometimes cut in the display reduced scale.

Data which specifies outward form of an area which is specified by a postcode RDN is stored from a memory start address in the information memory part 37 which is specified by the area shape data address EA. Then data is stored in a memory area which is specified by the size ED. Latitude data and longitudinal data (geographical coordinates) of plural places which plots an out edge of the area are stored from the memory address in the information memory part 37 which is specified by address EA. One postcode area is specified in map data of an information memory part 37 by latitudes and longitudes of plural places (geographical coordinates). If all latitude and all longitude are displayed into display 33 by a reduced scale, a specified postcode area is completely displayed in a display 33.

Postcode choice data 50 of a FIG. 58 is composed of a postcode RDN, a street list address LA, a facility genre list address NA, east longitude coordinate PEO of a representative point, north latitude coordinate PNO of a representative point and an area shape data address EA. A postcode RDN is made index data. Therefore if postcode RDN is specified, One area is specified in the map data in information memory part 37. This specified postcode (the telephone number) area is displayed at approximately center in the display output means (display 33) based on the representative point data in this area. Further in case of area display, the optimal display reduced scale may be chosen based on the shape data in the area. In other words, a reduced scale is adjusted and the whole area may be totally displayed in display 33.

Moreover postcode RDN was used for the specifying of an area, this may be specified by the telephone number, the city administration management area number or the personally set number and so on. By the part (the part of the higher rank figure) of postcode and telephone number, the specific area which has the east longitude coordinate of the representative point and the north latitude coordinate of the representative point may be chosen. In other words, if a part with postcode and telephone number is inputted, the area which corresponds to the inputted partial postcode and the telephone number is specified. For example, when higher rank 2-digit "12" is inputted from 3-digit postcode "123", the area which corresponds to the higher rank "12" of this inputted postcode may be displayed. Moreover as with the postcode and the telephone number, the area may be specified by the specific distinguishing number every area is distinguished, classified or divided by the fixed condition. For example, it is a prefecture, a city, a number every city or village, a number every state, a number every time difference area or a number every country in the European collective and so on.

In this way, after an area is specified by the postcode and so on, the nearest facility setting processing of FIG. 49 may be executed. Moreover after area specification, the following street specification is done and moreover the nearest facility setting processing of FIG. 49 may be done.

28. Street List Data 55

FIG. 59 shows the data structure of street list data 55. This street list data 55 is composed of the group data of the number SS(m) of the streets. This list data 55 is stored from the address at the head of the information memory part 37 which is specified by street list address LA. One piece of street list data 55 is composed of street name SSN, the east longitude coordinate SEO of the display representative point, the north latitude coordinate SNO of the display representative point, shape data address SEA and size SED.

Street name SSN indicates the name of the street of the for example m-th turn eyes. This street name may include a national highway name (the national highway number), a local road name (the local road number) or an expressway name (the expressway number). By the east longitude coordinate SEO of the display representative point and the north latitude coordinate SNO of the display representative point, the longitude and the latitude (the geographical coordinate) of the representative point at this street are indicated. This representative point is made a point at the center of the street, but may be made a point at the end in north, south, east or west of the street or at the start point or the end point of the street.

The memory start address of the geographical coordinate data of each node which composes this street is specified by shape data address SEA. The memory size where street shape data is stored is specified by size SED. The outward form of this street is decided by the geographical coordinate data of each of these nodes. Using the geographical coordinate data of the east longitude coordinate SEO and the north latitude coordinate SNO of these display representative points and each node, a street diagram is displayed in display 33.

When one street extends for plural postcode area, street list data 55 about this street is memorized every postcode area. Because the partial shape of the street in each area is different respectively, the east longitude coordinate SEO of the display representative point, the north latitude coordinate SNO of the display representative point, shape data address SEA and size SED are different. In other words, when one street extends for two areas, the each street in each area is different respectively. Therefore the display representative point at the street in each area is also different. As a result, the east longitude coordinate SEO of the display representative point north latitude coordinate SNO of the display representative point at the street in each area are recorded as the street data. Further each street name SSN is the same.

29. Facility Genre List Data 60

FIG. 60 shows the data structure of facility genre list data 60. This facility genre list data 60 is composed of the data group of facility genre number NC(k). One piece of facility genre list data 60 is composed of facility genre name NM, facility restoration dress NLA and size SED. Facility genre name NM indicates the name of the genre.

To the memory area which is specified by size NLD from the memory start address which is specified by facility restoration dress NLA, list data at the facilities which belong to this genre is memorized. By the data which was read from the memory which is specified by this facility restoration dress NLA and size NLD therefore, a geographical coordinate at each of the facilities and the peculiar name of the facilities which belong to this facility genre name NM are distinguished.

30. Street Shape Data 65

FIG. 61 shows the data structure of street shape data 65. This street shape data 65 is composed of the data group of the number ES(t) of the nodes. One piece of street shape data 65 is composed of east longitude coordinate EEO, north latitude coordinate ENO, address ENO and street name SSN. The geographical position of the node about the map data in information memory part 37 is decided by east longitude coordinate EEO and north latitude coordinate ENO. Moreover address ENO indicates the address data of the address of this node. When a street is displayed in display 33, this address ENO is displayed with the street (or the node). This can distinguish each address based on the street.

31. Facility List Data 70

FIG. 62 shows the data structure of facility list data 70. This facility list data 70 is composed of the data group of the number IS(u) of the facilities. This facility list data 70 indicates plural facilities which belongs to one genre of one piece of facility genre list data 60 which is shown in FIG. 60.

One piece of facility list data 70 is composed of facility name IM, east longitude coordinate IEO, north latitude coordinate INO and address IB. Facility name IM is the peculiar name of the facilities. East longitude coordinate IEO and north latitude coordinate INO show the longitude and the latitude (the geographical position) of these facilities. A position on the map at these facilities is specified by this east longitude coordinate IEO and north latitude coordinate INO. Also address IB indicates the address of the address.

Street name SSN is the name of the road which these facilities are close to. But when there is not a neighbor road, the name of the nearest street is chosen. Further this street name SSN may be the name of the road which is made the object for the guidance which is the nearest these facilities. Therefore when plural streets (or guidable roads) exists around the facilities, plural street names SSN is memorized in one piece of facility data. Moreover this street name SSN is the same as the street name SSN of the street list data 55 which is shown in FIG. 59. Further the guidable road means the road which is the used by the route search processing.

32. Area Shape Data 75

FIG. 63 shows the structure of area shape data 75. This area shape data 75 specifies an out edge (periphery) of the postcode area on the map. Therefore an area range on the map is specified by area shape data 75. A geographical position of the periphery in the geographical range of the area is specified by plural nodes. One piece of area shape data 75 consists of longitude and latitude, i.e. east longitude coordinate AEO and north latitude coordinate ANO. Moreover node number data SNC(v) shows the number of the nodes. In other words, the number of the nodes which model a periphery in the area is node number data ANC(v).

33. Destination-setting Processing (step SA5)

Figure 64:
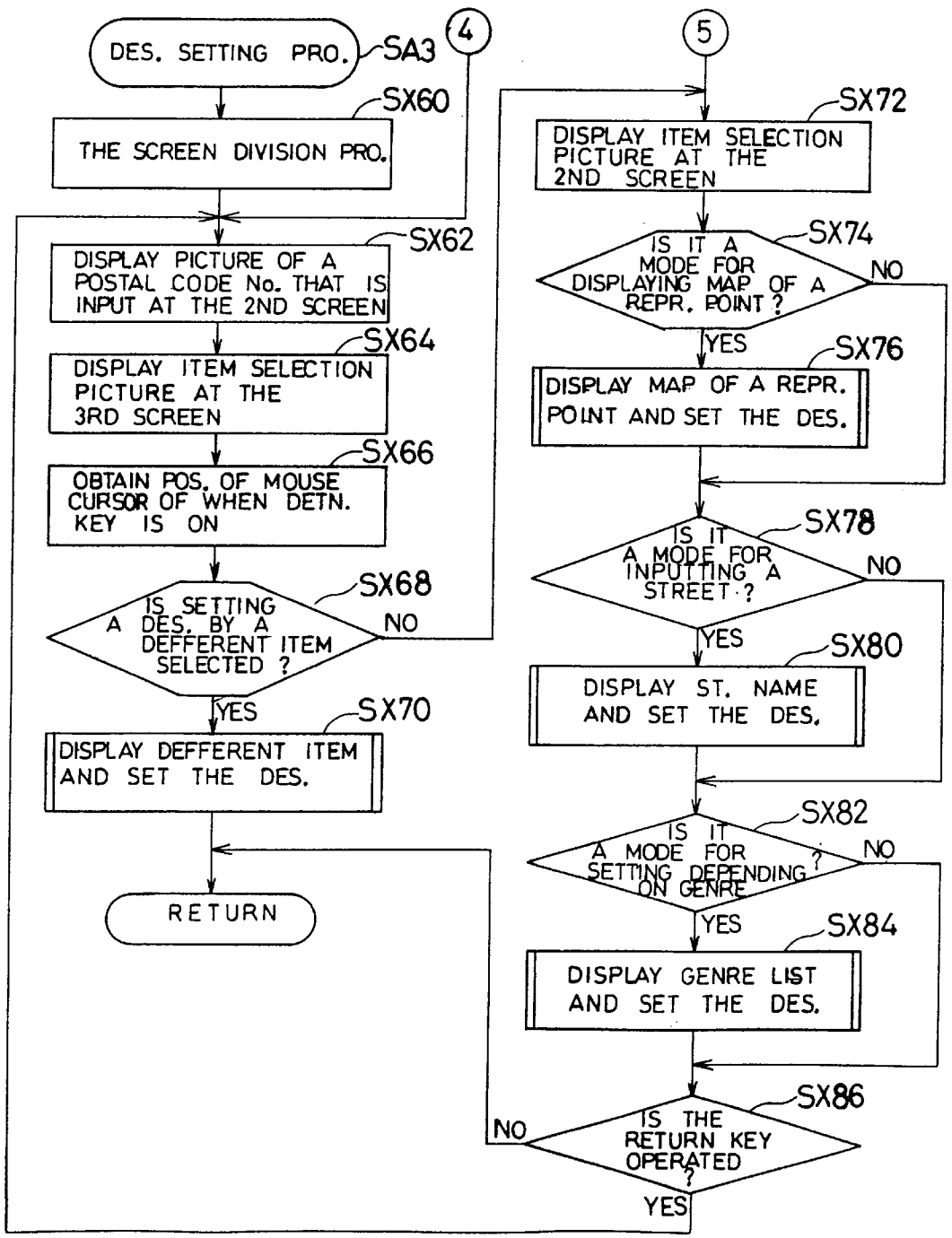
FIG. 64 shows a flow chart of destination setting processing (a step SA3).
Figure 65:
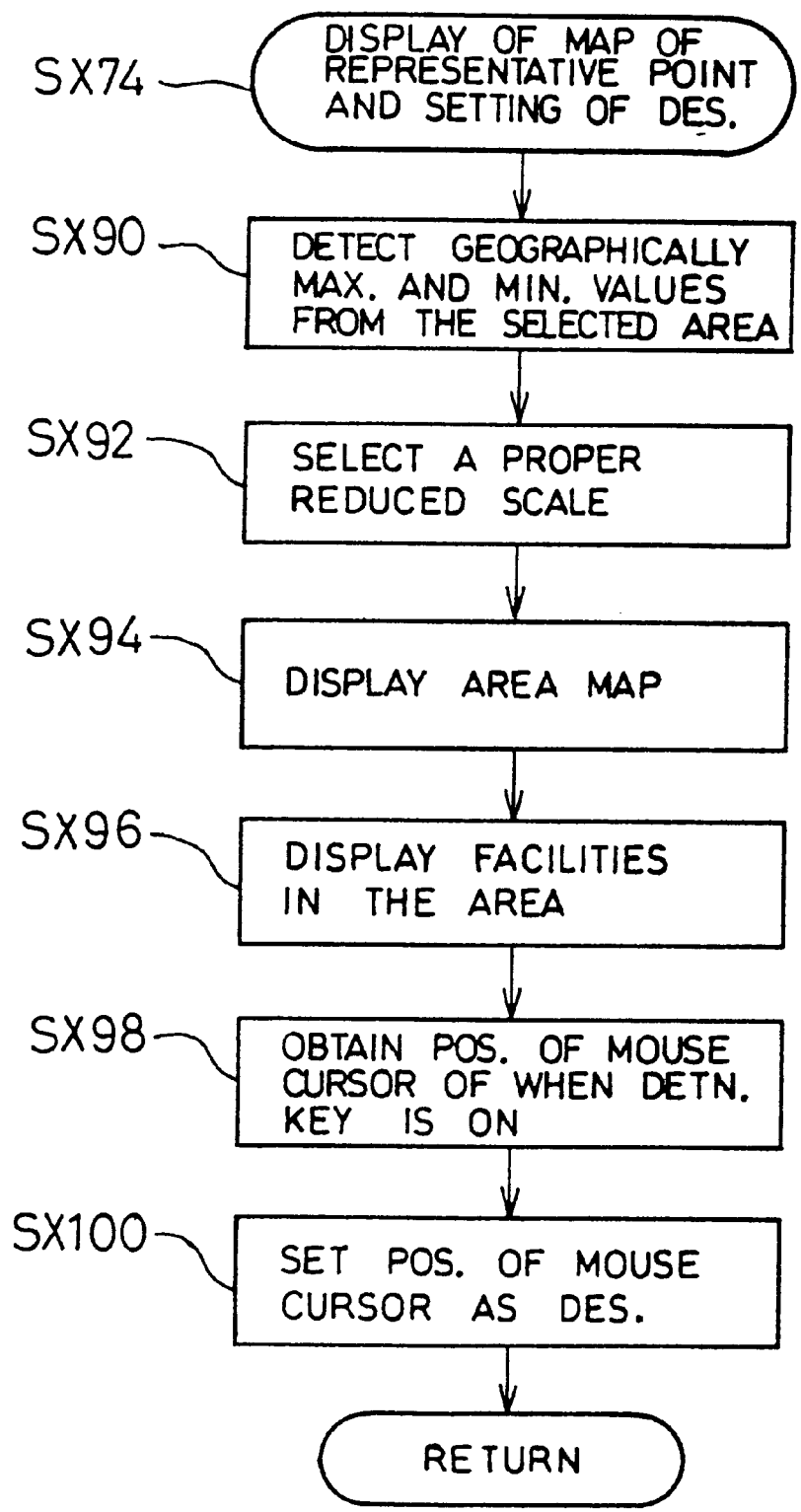
FIG. 65 shows a subroutine of a representative point map display and destination setting.

FIGS. 64 to 65 show the flow chart of the destination-setting processing which is executed with the navigation device of this invention. The screen of display 33 is divided first with FIG. 64 (step SX60). Then the input screen of the postcode is displayed in the 2nd screen (step SX62). The example of the input screen of this postcode is shown in the 2nd screen 108 of FIG. 68. Moreover a picture for the choice item is displayed in the 3rd screen 110 (step SX64).

Figure 68:
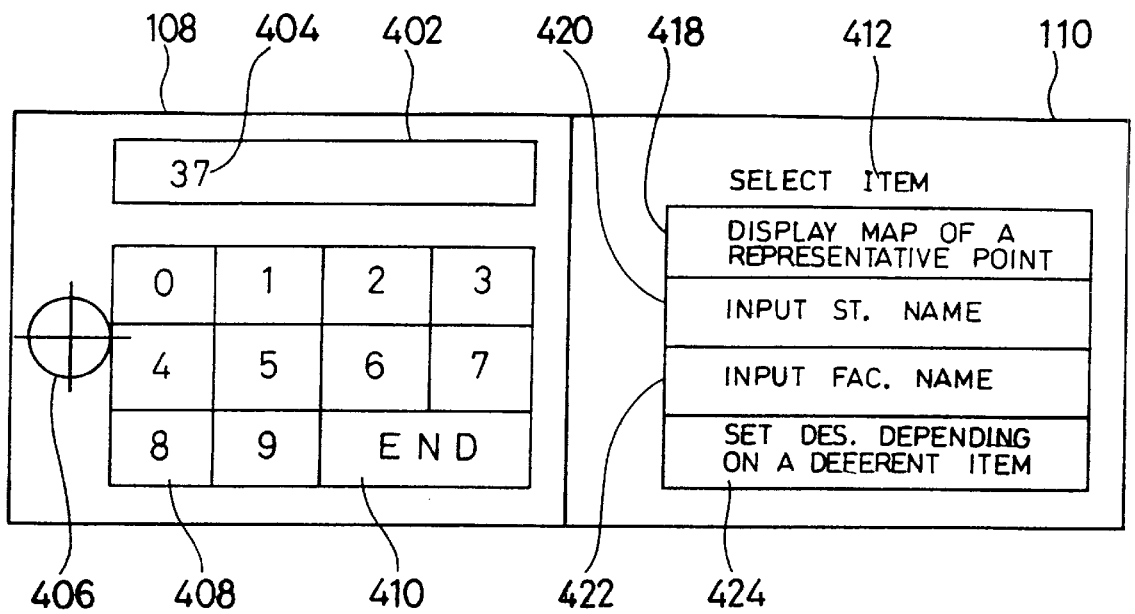
FIG. 68 shows a screen of a postcode and an item choice.

As shown in FIG. 68, input number display columns 402, number 408 of 0–9 and the "END" letter 410 which chooses that the number input is complete is displayed in the 2nd screen 108. Moreover the mouse cursor 406 which can be freely moved from in this screen 108 is also displayed. When this mouse cursor 406 is moved onto each number 408 and a fix input key is pushed, a number is recognized with the navigation device. Further the fix input key is prepared onto the navigation device.

Mouse cursor 406 may be moved by the small joystick. The fix input key may be the switching mechanism which this joystick is pushed into. Moreover mouse cursor 406 doesn't have to be displayed in the 3rd screen 110. In this case, each display item in screen 110 is chosen by the drive to the top or the bottom of the joystick. Then, in the frame with chosen display item, the color is changed into and a choice condition is distinguished. By push of the fix input key after this, the choice of the item which is displayed in reverse is decided.

The numerical value which is inputted using the input screen of the 2nd screen 108 of FIG. 68 is used as postcode RDN. When this postcode RDN is inputted, based on this postcode RDN, postcode choice data 50 (the FIG. 58 reference) is retrieved from information memory part 37. From the data group of postcode choice data 50, one piece of postcode choice data which agrees with inputted postcode RDN is read from information memory part 37.

For example the letter 418 of "representative point map display", the letter 420 of "street name input", the letter 422 of "facility name input" and the letter 424 of "destination setting by another item" are displayed in the item choice screen (FIG. 68) of the 3rd screen 110. The following processing is executed when the fix key is pushed after the mouse cursor 406 which is displayed in the screen of display 33 is moved by the operator. When the fix key is pushed, the relative position of mouse cursor 406 on the screens 108 and 110 is detected (step SX66). That is, when the fix key is pushed, a position on the screen of mouse cursor 406 is distinguished by CPU2. Then the information contents which are displayed in the position of this mouse cursor 406 are chosen. For example, if the fix key is pushed when mouse cursor 406 are overlapped and displayed on letter 418 of "representative point map display", the processing of a map display by this representative point is chosen.

Next the choice of "destination setting by another item" is determined (step SX68). The processing of FIG. 64 is ended when this "destination setting by another item" is chosen. The processing which a destination is set from the area which is specified by the postcode is canceled. Therefore it is when the determination result of the step SX68 is "YES", setting processing subroutine of the destination which is based on another item is executed (step SX70). In the example of the destination setting which is based on another item, the destination is selected straight from the address of the destination. When the subroutine of this step SX70 is ended, the flow is returned to the overall processing of FIG. 5.

However when the determination result of the step SX68 is "NO", processing since the step SX72 is executed. In the item choice processing by the steps SX64 and SX66, when either of the representative point map display processing, the street name input processing or the facility name input processing is chosen, this choice result is memorized in the RAM 5 as mode set data MD.

If "destination setting by separate section eyes" isn't selected and the other processing, e.g. "representative map display" are specified, the item choice picture which was displayed in the 3rd screen is displayed in the 2nd screen (step SX72). After this, the mode which is chosen in the 3rd screen of FIG. 68 is determined. In other words, the selection of the mode to make display a representative point map is determined by the mode set data MD (step SX74). If it is selected, "representative point map display and the destination setting" subroutine is executed (step SX76).

However the representative point map mode isn't selected or the processing of "representative point map display and destination setting" of the step SX76 is ended, the determination of the following step SX78 is executed. In other words, it is determined whether the mode selection is a street input mode or not (step SX78). If the street input mode is chosen, "display of street name and destination setting" subroutine is executed (step SX80).

When "display of street name and destination setting" subroutine is ended or the determination result of the step SX78 is "NO", the determination of the step SX82 is executed. That is, it is determined whether setting mode by genre is chosen or not (step SX82). If it is the setting mode by genre, "genre list display and the destination setting" subroutine is executed (step SX84). If the subroutine of this step SX84 is ended or the result of the step SX82 is "NO", the push of return key is determined (step SX86). If a return key is pushed, processing since the step SX62 is executed once again. In other words, a picture for the postcode input is displayed in the 2nd screen. However if a return key isn't pushed, the flow is returned to the overall processing of FIG. 5. In other words, if the return key is pushed, the display condition of display 33 is returned to the condition one ahead.

34. Subroutine of Map Display of Representative Point and Destination Setting

FIG. 65 shows the subroutine of the map display of the representative point and the destination setting. First the postcode choice data 50 which is specified by postcode RDN is read from information memory part 37. Further this postcode RD1 is inputted in the step SX62 of FIG. 64. Moreover the area shape data address EA and size ED which is recorded to this postcode choice data 50 are extracted.

From the memory area which is specified by this area shape data address EA and size ED, the east longitude coordinate AEO and north latitude coordinate ANO (the FIG. 63 reference) of each node to set an out edge (the periphery) of the area are read in order. Then a maximum and a minimum value are extracted in the east longitude coordinate AEO of each node (step SX90). Likewise maximum and minimum value in the north latitude coordinate ANO of each node are extracted.

From the maximum and the minimum value of each of the these east longitude coordinates AEO and each of north latitude coordinate ANO, the reduced scale when displaying a map in display 33 is found (step SX92). For example, a geographical distance to the direction of the east longitude is calculated from the maximum and the minimum value of the east longitude. Likewise the geographical distance to the direction of the north latitude is calculated from the maximum and the minimum value of the north latitude. Further by optional reduced scale, a geographical distance to the direction of the east longitude and the north latitude which can be displayed in the divided screen of display 33 is understood from the actual size of the screen. The reduced scale to display the geographical distance to the direction of the north latitude and east longitude in the specified area is calculated backward from the geographical distance which can be displayed in the screen. When this reduced scale is found, a specified area is totally displayed in the divided screen.

In other words, the end of the area which is specified by postcode RDN is not broken, the whole area is displayed in the 3rd screen 110 of display 33 (step SX94). Further a geographical range in the specified area of postcode RDN is decided by area shape data 75. Moreover the map data which is displayed in display 33 is memorized in information memory part 37.

Figure 69:
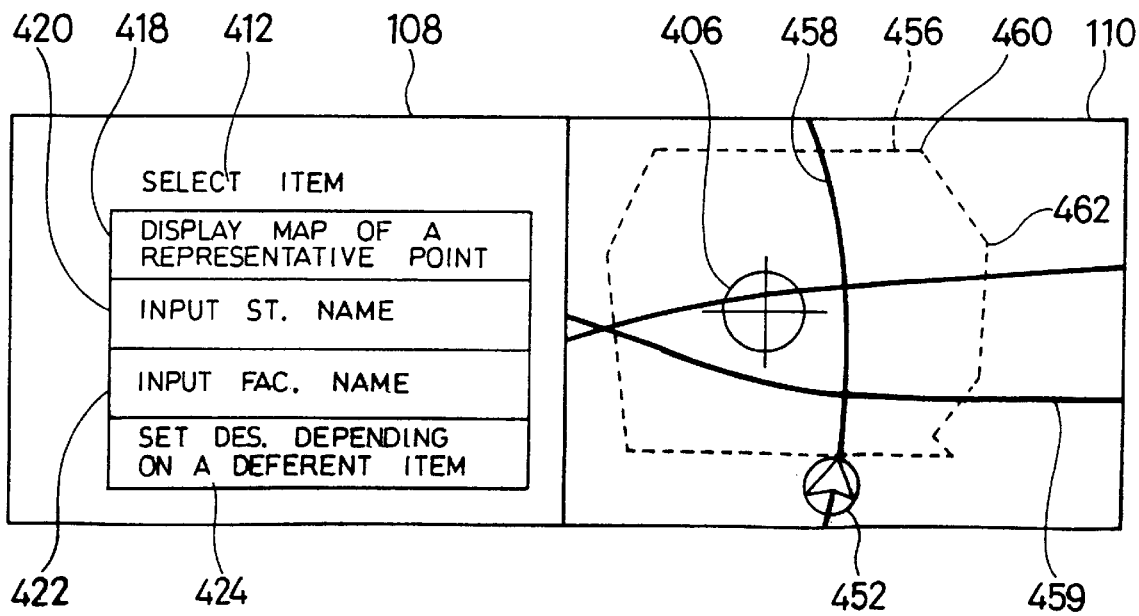
FIG. 69 shows display example in a specification area.

Example of the specified area which is displayed in this appropriate reduced scale is shown in FIG. 69. This specified area is the range which is surrounded by the dotted line 456 of FIG. 69. Further the turning points 460 and 462 which are shown in this FIG. 69 indicate a node. Moreover symbol 452 indicates the present position of the car. Curves 458 and 459 indicate roads. Further the shape of all the streets or the main street in the specified area is together displayed in the step SX94. In this case, street shape data 65 in each area of this FIG. 61 is used.

Further the choice processing of the appropriate reduced scale in the step SX92 may be omitted and the reduced scale may be chosen by manual of a operator. Moreover the map in the wide range which includes the area which was specified by postcode RDN may be displayed in the 3rd screen 110. In other words, the map (the wide area map) may be displayed at the reduced scale which is bigger than in the proper reduced scale where the specified area can be effectively for the 3rd screen displayed. Further when the processing of step SX92 is saved, the area map which is displayed in display 33 expands most and is displayed. Moreover the east longitude coordinate PEO of the representative point and the north latitude coordinate PNO (the FIG. 58) of the representative point in the specified area are centered in the 3rd screen 110.

When an area map is displayed in the 3rd screen 110 of display 33, each of facilities are displayed in the specified area using the figure symbol which was memorized in the flash memory 3 (step SX96). The facility list data 70 of FIG. 62 is used in the display of these facilities. A specific symbol is displayed in the geographical coordinate of each of the facilities. For example, this symbol is a star, a circle, a triangle, a square, a fork, a glass, a bag, a flag and a house and so on. Further only when the area map which was most expanded is displayed into the 3rd screen of display 33, this facilities may be displayed.

After this, an optional point in the display map area is specified using the mouse cursor 406 which is displayed in display 33. In other words, by the operation of the operator, mouse cursor 406 is moved and a fix key is pushed. The display position of the mouse cursor 406 when this fix key is pushed is made the request destination of the operator. Therefore the display position of the mouse cursor 406 when the fix key is pushed is acquired (step SX98). A actual geographical coordinate position is calculated by the calculation which used a map reduced scale etc. from this cursor display position. The geographical coordinate position which was found by this calculation is memorized in the RAM 5 as the entry destination data TP (step SX100).

When the processing of this step SX100 is ended, the flow is returned to the destination setting processing of FIG. 64. Further the dropping in place may be also set according to the procedure which is the same as the above. When the dropping in place is set by the processing which is the same as the processing of FIG. 64, a geographical coordinate in the dropping in place is memorized in the RAM 5 as dropping in place DP.

35. Display of Street Name and Destination Setting Subroutine

Figure 66:
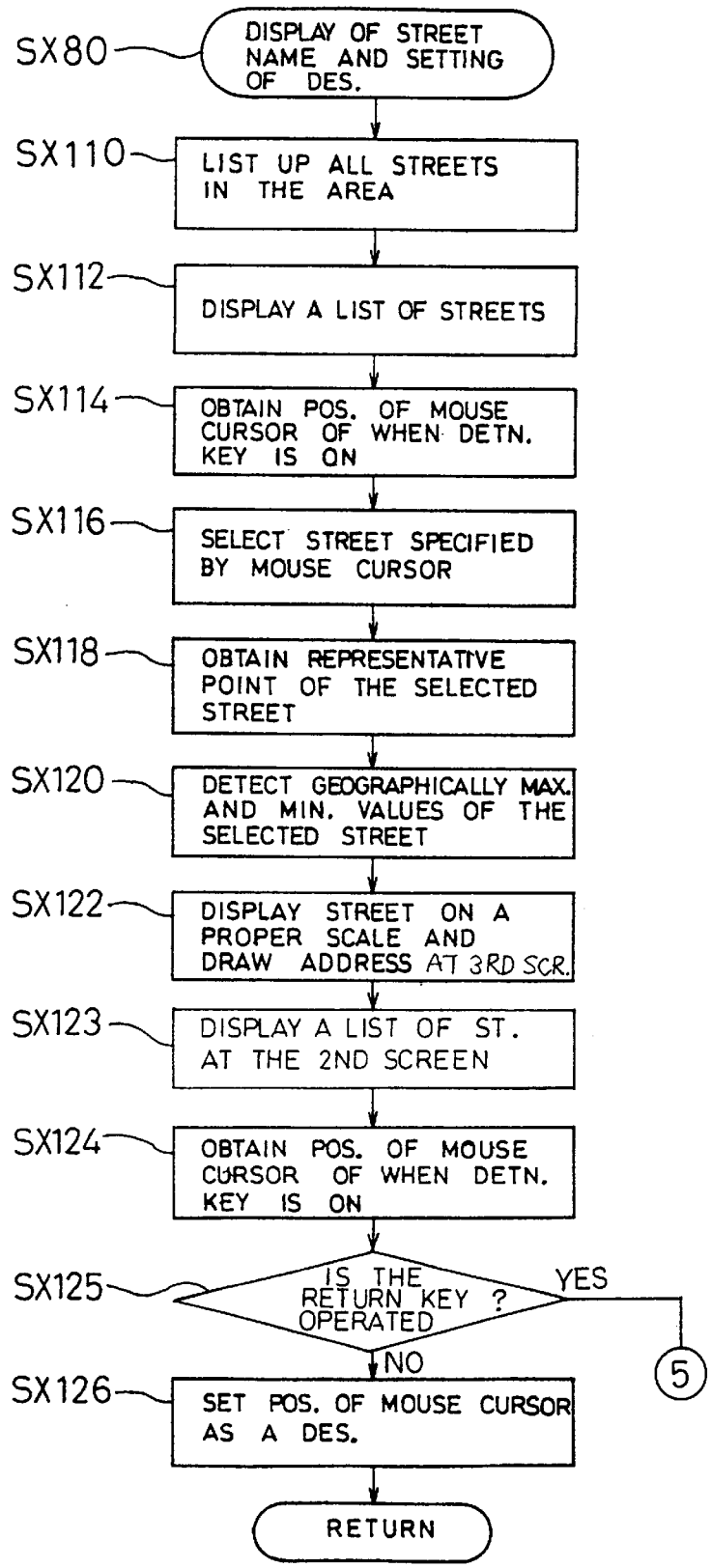
FIG. 66 shows a subroutine of a display of a street name and destination setting.

FIG. 66 shows a display of the street name and a destination setting subroutine. When the determination result of step SX78 is YES in FIG. 64, the processing of this FIG. 66 is executed. First all streets in the area which is specified by the postcode RDN are read (step SX110). The list of all these streets is made using the street list data 55 of FIG. 59. Street names in the area which is specified by postcode RDN are memorized in this street list data 55. Only street names are extracted from this street list data 55 and street list is made.

Figure 70:
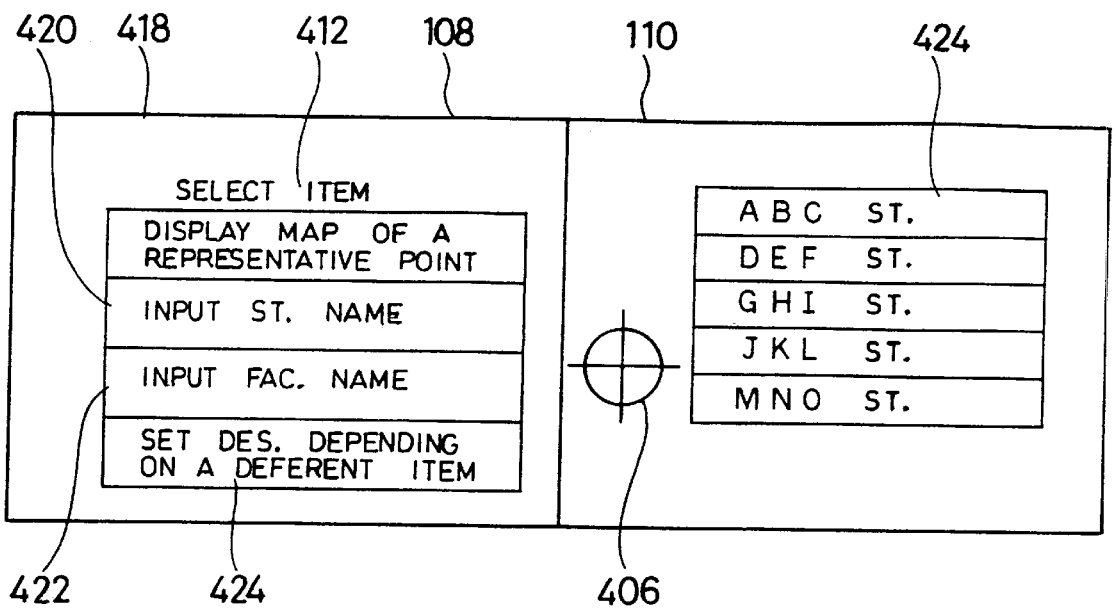
FIG. 70 shows a street list.

The list of the street names which is made in the step SX110 is displayed in the 3rd screen 110 of display 33 (step SX112). Further when there are many street numbers SS(m), all the streets can not be displayed together in display 33. In this case, the screen of display 33 is scrolled and the street names of the remainder are displayed in order. The display example of the street list is shown in FIG. 70. Also when this street list is displayed, each street name may be reported by the sound.

When a street list displays in the step SX112, the mouse cursor 406 is also displayed in the screen 108 of display 33. Then the display position of mouse cursor 406 when the fix key is pushed is acquired (step SX114). It is distinguished which street is chosen by the display position of this mouse cursor 406 (step SX116).

The east longitude coordinate SEO of the display representative point and the north latitude coordinate SNO of the display representative point of the street which is chosen in this step SX116 is read from street list data 55 (step SX118). Moreover street shape data 65 of the chosen street is read from information memory part 37. This street shape data 65 consists of the east longitude coordinate EEO and north latitude coordinate ENO of each node and the shape of this street is decided. Therefore from the east longitude coordinate EEO and north latitude coordinate ENO of this each node, each maximum and minimum value are detected (step SX120).

The detection of the maximum and the minimum value of the directions of the east longitude and the north latitude of this node coordinate is processing like the step SX90 in case of above area map display. By the found maximum and the minimum value of the directions of each of the east longitude and the north latitude, the appropriate reduced scale of the map which is displayed in the display 33 is found. In other words, the reduced scale that the specified whole street can be completely displayed in the divided screen is found. By this found reduced scale, a street is displayed in the 3rd screen 110 of display 33 (step SX122). When this street is displayed, each address with this street is together displayed. Further this street names may be reported by the sound with the display of this street.

Figure 71:
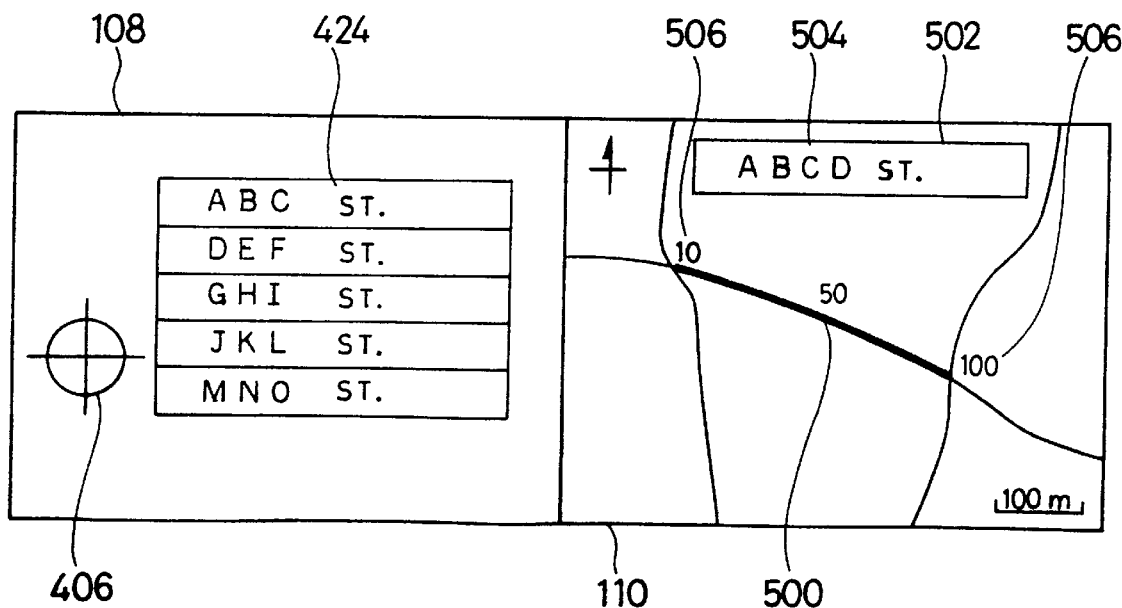
FIG. 71 shows a state to have displayed a street.

With the streets display in the 3rd screen, the street list is displayed in the 2nd screen (step SX123). Example of the street which is displayed in the 3rd screen 110 of display 33 is shown in FIG. 71. The chosen street is distinguished with the other road in the 3rd screen 110 as shown this Figure. In this FIG. 71, it is shown by thick line 500. Further the color of this specified street is different from the other road and it may be possible to be easily distinguished. Also the chosen street names is displayed by letter 504 in display area 502 at the upper part of the 3rd screen 110. Further this displayed street names are used by the street name SSN of street list data 55. Letter 506 in FIG. 71 indicates an address. As this displayed address, the data of the address ENO of street list data 55 is used.

The calculation of the appropriate reduced scale in the step SX122 may be omitted. In this case, a map displayed for a street to be most expanded or a map (wide area map) in the wide range is displayed. Moreover it is adjusted for the representative point of the street to become the center of screen 100. The representative point of this street is decided by the east longitude coordinate SEO and the north longitude coordinate SNO of the display representative point in the street list data 55.

When a specified street is displayed in the 3rd screen 110 in this way, the optional spot of the along street is specified as the destination by mouse cursor 406. That is, a position of the mouse cursor 406 on screen 110 when the fix key is pushed is detected (step SX124). Also it is determined whether the return key is pushed or not (step SX125). If the return key is pushed, the display condition of display 33 is returned to a condition before one processing. In other words, processing is returned to the step SX72 of FIG. 64. Also if the return key isn't pushed, a actual geographical coordinate position when the fix key is pushed is calculated from the displayed cursor position. The geographical coordinate position which is found by this calculation is memorized in the RAM 5 as entry destination data TP (step SX126).

When the processing of this step SX126 is ended, the flow is returned to the destination-setting processing of FIG. 64. Furthermore the setting of a dropping in place may be also done according to the procedure which is the same as the above in other words, an area is specified by postcode RDN. A specific street is chosen from all the streets in this specified area and moreover a specific spot is chosen on the map of the displayed street. This specified spot is memorized in the RAM 5 as dropping in place DP.

All the streets in the specification area are put on the list in the display of the street name of FIG. 66 and the destination setting in this way. Then one street where the destination exists is selected from the list of the street name. A map of the selected street is displayed in the screen. And then on the map of this street, a specific spot is chosen as the destination by the mouse cursor. Therefore the destination or the dropping in place can be easily specified from the name of the street. Further when the street is displayed in the step SX122, the whole specification area which includes this street may be displayed.

36. Genre List Display and Destination Setting Subroutine

Figure 67:
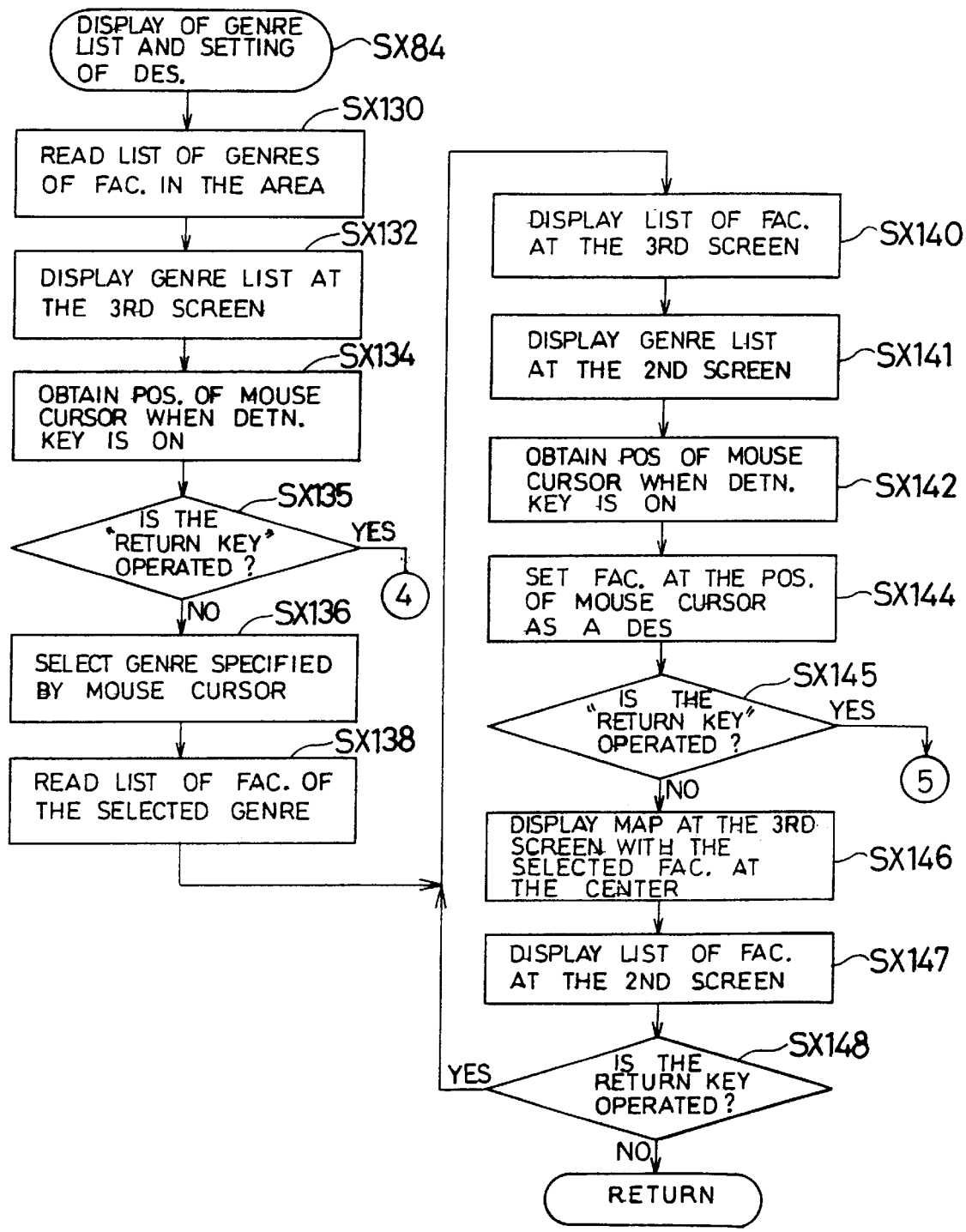
FIG. 67 shows a subroutine of a genre list display and destination setting.

FIG. 67 shows a genre list display and a destination setting subroutine. In this FIG. 67 first the genres of each of the facilities in the area which is specified by postcode RDN are put on the list (step SX130). This genre is put on the list using the facility genre list data 60 of FIG. 60. A memory area in the information memory part 37 of this facility genre list data 60 is specified in the facility genre list address NA of postcode choice data 50 and size ND.

Figure 72:
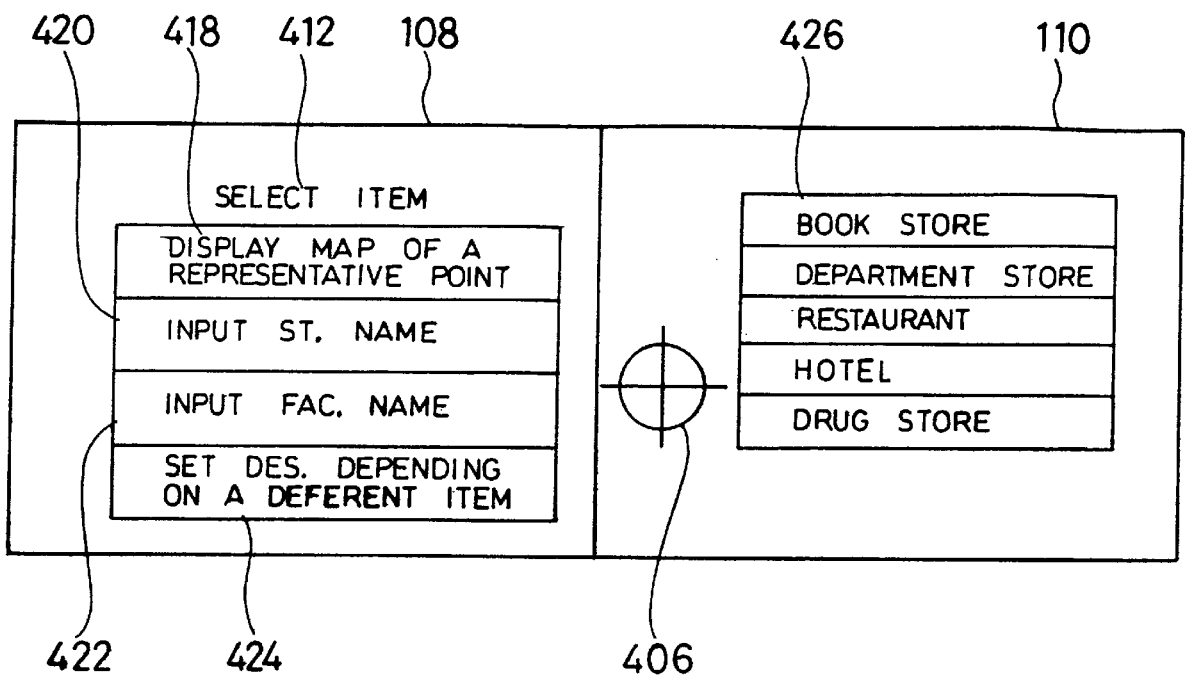
FIG. 72 shows display example of a genre list.

Next facility genre number NC(k) of the facility genre name NM is read from facility genre list data 60. Then the genre list is displayed in the 3rd screen of display 33 (step SX132). The screen display example of this genre list is shown in FIG. 72. After this, the display position of mouse cursor 406 in the screen 110 when the fix key is pushed is acquired (step SX134). In other words, the genre name of the display position of the mouse cursor when the fix key is pushed is made a choice genre. Also it is determined whether the return key is pushed or not (step SX135). If the return key is pushed, the flow is returned to the step SX62 of FIG. 64 from the processing of FIG. 67.

If the return key isn't pushed, it is determined that the genre which is displayed in the position of the cursor 406 is chosen (step SX136). The facilities which belong to this specified genre are put on the list (step SX138). In other words, the facilities which correspond to the chosen genre are put on the list using the facility list data 70 of FIG. 62.

The memory area of facility list data 70 is specified by facility list address NLA and size NLD. Facility list address NLA and size NLD are included in facility genre list data 60. In other words, if the genre is specified, the list of the facilities in the specified area and belonged to the genre at once is read from the information memory part 37.

Next only the facility name IM of facility list data 70 is extracted and the list is displayed in the 3rd screen of display 33 (step SX140). Moreover the genre list is displayed in the 2nd screen (step SX141). Then the display position of mouse cursor 406 in the screen 110 when the fix key is pushed is acquired (step SX142). The facilities of the display position of this cursor 106 are set as the destination (step SX144). In other words, chosen facilities are memorized in the RAM 5 as entry destination data TP.

Also it is determined whether the return key is pushed or not (step SX145). If the return key is pushed, the processing is returned to the step SX72 of FIG. 64. However if the return key isn't pushed, the processing since the step SX146 is executed. In other words, when the return key is pushed, the display condition of display 33 is returned to the previous display condition.

If the return key isn't pushed, east longitude coordinate IEO and north latitude coordinate INO of the chosen facilities in the step SX144 are read from facility list data 70. A map around the specified facilities is displayed in the 3rd screen of display 33 based on this east longitude coordinate IEO and north latitude coordinate INO (step SX146). Moreover the facility list is displayed in the 2nd screen (step SX147). Further the reduced scale of this displayed map may be the reduced scale that a map is displayed in the maximum or the reduced scale which is chosen by the operator. Moreover the facility name may be reported by the sound together with the display of the map of these specified facilities and neighborhood. Further the processing of the steps SX146 and SX147 may be omitted.

It is determined whether the return key is pushed or not after the display of the step SX147 (step SX148). If the return key is pushed, the processing of the step SX140 is again executed. However if the return key isn't pushed, the flow is returned to the destination-setting processing of FIG. 64. In this way, the genre is specified from the specified area in the genre list display and the destination setting of FIG. 67. Then the requested destination is specified from the list of the specified genre. In this way, at the destination-setting processing of this embodiment, a specific area is specified by the postcode RDN and plural kind (three kinds, 3 modes) pieces of information are displayed in display 33. Then a destination is specified from the map or the list etc. which is displayed in each mode. For example a street is specified in the specified area. Because this specified street is displayed at the map, a spot is specified as the destination on the street of the map. Because the retrieving of a destination is done step-by-step through the area specification, the street specification, the genre specification and so on in this way, the specification of the destination is simpler. Also when the return key is the pushed in each display condition of the embodiment, the display is returned to the choice screen one ahead.

37. Application Example of Destination Setting or Dropping in Place Setting Processing The destination setting processing may be implemented as follows. First a area is specified by the postcode. Next a specific street is chosen from all the streets in the area. Moreover when genre is specified, the facilities which correspond to the specified genre and is around the choice street are put on the list. Lastly the requested destination is chosen from the facility name that is put on this list. Therefore the required destination can be retrieved from the street and neighborhood and the specific genre.

Moreover the destination setting processing may be executed as follows. A area is specified by the postcode. Next a specific street is chosen from the streets in the area. The facilities along the chosen street are put on the list. Lastly a required destination is chosen from the facility name that is put on this list. Therefore a required destination is extracted along the specific street in the specific area.

Moreover again the destination setting processing may be executed as follows. First a area is specified by the postcode RDN. After this, a specific genre is chosen. Next the street name where each of the facilities corresponding to the specified identical genre exist is enumerated. Then facilities are chosen based on this street name list. When a destination is set, it can be retrieved in order of the area, the genre and the street.

This invention isn't the limited to the above embodiments and various changes and modifications are possible in the range which doesn't deviate from the object of this invention. For example, in street choice in the step SX116 of FIG. 66, the street list is displayed in display 33 as shown FIG. 70 but this may be done as follows. That is, an area is displayed in the divided screen of display 33 as shown the 2nd screen 110 of FIG. 69 and each street name is also displayed together on the screen. Then when an optional geographical coordinate on the display area is chosen by mouse cursor 406, an expansion figure which particularly includes the choice part is displayed at once.

In case of the display of the expansion figure, the facilities in the possible display range of display 33 are also together displayed. Therefore each of the facilities along the specific street in the specific area can be retrieved while seeing a map.

Further an area is specified by the postcode in the each embodiment, but this postcode can be replaced with all or the higher rank part of the telephone numbers. That is, an area is specified only by the outskirt telephone number and an area is specified using an outskirt telephone number and several digits on the remain telephone number which excluded the outskirt telephone number. That is, an area is specified only by the outskirt telephone exchange number. Further higher rank part of or all the postcodes may be inputted.

Moreover after the step SX94 or SX96, the processing may jump to the step SX110 or step SX130. By this, a list or a diagram of the streets, a list or a position of the facilities in the displayed area is outputted by display or/and outputted by sound. Also the processing of the step SX94 may be executed in the step SX112. Moreover again the facility list display in the step SX140 may be replaced the map display of the facilities in the step SX96, the positions of the facilities may be displayed on the map together with the facility list display. By this, the diagram at the street in the specified area or the position of the facilities in the specified area is displayed. Further the order of step SX146 and step SX144 may be the replaced.

Moreover the choice by the mouse cursor may be executed by the sound from the operator. In this case, the item (a genre, a street name, a facility name and so on) which is required from a list that is outputted by a display or/and is outputted by a sound is specified by a pronouncing of the operator.

In the each embodiments, the retrieving processing of the destination or the dropping in place based on inputting of the postcode RDN is executed before route search processing (step SA4). However these retrieving processing of the destinations or the dropping in place may be executed on the way of the guide/display processing of the step SA5. In other words, on the way of the guide route, according to the request of the operator, a new dropping in place or a destination is set. But these operation is executed at the condition when the car is stopping or going slowly. By this, the destination or the dropping in place is easily changed and set. Moreover the extraction of each of the facilities may be executed by a business time in the choice of the destination and the dropping in place. For example, the facilities which are doing business from 11 AM to 11 PM may be extracted.

Moreover again a address of a prefecture name, a state name, a city name, a town name and a village name may be used for the retrieving condition of the destination or the dropping in place. A field, a kind of business, a brand, a sales list of articles and a sales article may be used as the genre of the retrieving condition. Each of the facilities may be classified or retrieved by the price, the achievements, the results of the concrete sales article at each shop. In other words, the all kind internal information which shows the internal characteristic of the facilities which extracts each of facilities may be what one of the sales list of articles and so on. The internal information is a category of business, a brand, a list of articles, a price, achievements, results, business time and so on.

Moreover the retrieving or the extraction may be done by the outward information which shows the outward characteristic of the building, for example, the number of the floors, the floor area, the height, the advertisement body, the color, the site, the zoning, the plane shape or the solid shape. Also the ground or the underground building such as the facilities, the building does not only correspond to the destination and the dropping in place but also the guidable spot such as the detailed place name or the address and so on. A start point or the start spot which can begin a guidance and so on are included in the present position of the car which is made the retrieving start point of the guide route or the cardinal point in case of map display.

Also the street in the area is specified in extraction of the facilities of the above embodiment. In other words, the facilities at the specific street and neighborhood in the area are extracted but this may be done as follows. For example, the famous facilities in the specific area, e.g. the facilities which are within the fixed distance from every station of the bus, the streetcar, the subway and so on may be extracted. Moreover agency, an intersection name, commemoration facilities in the prefecture, towns and villages and so on, e.g. Tokyo Tower, Olympia Park, Imperial Palace, a castle, Washington Monument and so on are included in the famous facilities.

In the destination-setting processing or the dropping in place setting processing, the extraction of the facilities by the new retrieving condition is executed to each retrieving result. However the various retrieving condition to extract these facilities may be compound by plural retrieving condition. For example, when extracting facilities in the area, the extraction of the facilities by the genre and so on and the extraction of the facilities along the street may be overlapped and executed at the same time.

Also in the above embodiment, the retrieving condition and the extraction result by the retrieving condition are combined respectively in order and displayed in the 2nd screen and the 3rd screen. For example, when the retrieving condition is displayed in the 2nd screen, an extraction result by the previous retrieving condition is displayed in the 3rd screen. Then when the choice of the retrieving condition in the 2nd screen is executed, the retrieving condition which was displayed in the 2nd screen is displayed in the 3rd screen and a new retrieving result is displayed in the 2nd screen.

In other words, the latest information at the time of each operation is displayed in the 2nd screen. Moreover when the choice of the retrieving condition is operated, the information of the 2nd screen is moved to the 3rd screen and the new retrieving result and so on are displayed in the 2nd screen. However this may be done as follows. That is, each retrieving condition, e.g. the list for the choice of the genre or the street and so on and the facility extraction result by each retrieving condition may be displayed in the 2nd and the 3rd screen by a optional combination. For example, the retrieving condition may be displayed in the 3rd screen and the past facility extraction result which is extracted by this retrieving condition is may be displayed in the 2nd screen.

Also the screen division of the display 33 is executed by the choice operation of the retrieving condition by the operator and so on in the above embodiment but may be executed by the following environment change. For example, it may be executed simultaneously with the beginning direction of the retrieving processing and it may be executed when the retrieving condition is inputted or the retrieving result by the chosen retrieving condition is displayed. Also it may be executed when the divided screen display is demanded by the operator, a change of the running condition of the car, a change of the speed of the car, a change of the direction of the car, a advanced change of the car, a change of the distance to the destination or the dropping in place, the destination is changed or the car deviates from or enters in the range of the house map which is stored in the information memory part 37. It may be executed when a change of a running time, a change of a temperature of a drive source (a engine, a motor), a change of a number of rotations of the drive source, a change of the time, a change of remain value of fuel or a change of a voltage or a electric current of a battery (an accumulator, a cell). It may be executed when an environment change around (a change of a light (after a sunset, in a sunset or in a daytime), a temperature, a humidity, a wind pressure, a amount of rainfall (a rainfall, a snow quantity or a noise)).

Similarly the cancellation of the screen division may be executed when a changing operation of the operator, the choice of the retrieving condition, retrieving processing ending or display of the retrieving result. Moreover it may be executed when a change of a running condition of the car, a change of a speed of the car, a change of a direction of the car, a advanced change of the car, a change of the distance to the destination or the dropping in place, the destination is changed or the car deviates from or enters in the range of the house map which is stored in the information memory part 37.

It may be executed when a change of a running time, a change of a temperature of a drive source (a engine, a motor), a change of a number of rotations of the drive source, a change of the time, a change of remain value of fuel or a change of a voltage or a electric current of a battery (an accumulator, a cell). It may be executed when an environment change around (a change of a light (after a sunset, in a sunset or in a daytime), a temperature, a humidity, a wind pressure, a amount of rainfall (a rainfall, a snow quantity or a noise)). As explained in detail above, in the destination-setting processing of this invention, a screen is divided and a retrieving condition and a retrieving result are displayed in parallel in each divided screen. Therefore because a retrieving condition of a destination is squeezed step-by-step, it effects that the destination can be more handily retrieved and so on. Especially when an address in the required destination and so on are not understood and clear, based on the number which specifies an area, the destination can be retrieved.

38. Application Example of all Embodiments

The screen division of the display 33, division cancellation (the combining of the screen) or the changing of a navigation operation is executed by the choice operation of the operator or the change of the present position of the car in each above embodiments but may be executed by the following environment change. For example, it may be executed when a change of a running condition of the car, a change of a speed of the car, a change of a direction of the car, a advanced change of the car, a change of the distance to the destination or the dropping in place, the destination is changed or the car deviates from or enters in the range of the house map which is stored in the information memory part 37. It may be executed when a change of a running time, a change of a temperature of a drive source (a engine, a motor), a change of a number of rotations of the drive source, a change of the time, a change of remain value of fuel or a change of a voltage or a electric current of a battery (an accumulator, a cell). It may be executed when an environment change around (a change of a light (after a sunset, in a sunset or in a daytime), a temperature, a humidity, a wind pressure, a amount of rainfall (a rainfall, a snow quantity or a noise)). Further the, the various sensor is necessary for the environment change to detect. For example, the light sensor which is equipped with the photoelectric change device and so on is used for the detect of the light change of the environment around.

A division position is not limited especially in the screen of the display 33 in this invention. Moreover in the above embodiments, the screen of the display 33 is divided in the vertical direction and the 2nd screen and the 3rd screen have equal area. However the display area of the 2nd screen may be smaller than the display area of the 3rd screen. Oppositely the display area of the 2nd screen may be bigger than the display area of the 3rd screen. Also when the display screen of display 33 is a vertical length, the screen is cut off to the level direction and the 3rd screen may make a screen above and the 2nd screen may make a screen below. Further the 3rd screen in this case means the screen which displays higher necessity map information for the operator. Moreover in the each embodiment, the screen is divided in two but may divided into more than two screens. For example, the 2nd screen of the above each embodiment is divided into the level direction and the 2nd screen divides into the upper side and the under side. Then the geographical information which is different from may be displayed in each divided screen.

Moreover in the each embodiment, the geographical information is displayed in each of the 2nd screen and the 3rd screen. It may do as follows. For example, a television picture is displayed in the 2nd screen. The map information and so on may be displayed in the 3rd screen. Further when the screen division cancellation is indicated by the user in the each embodiment, one map is displayed in the whole screen of display 33. In case of this division cancellation, the map which was displayed in the 3rd screen may be displayed in the whole screen of display 33.

(1) In addition to above matter, the screen may be divided up/down or top of the slant/under of the slant and so on except the left/right and the display area of both screens may be different. In this case, the image memory 10 is divided according to these division forms and the addressing of each image memory device is also divided according to these division forms. Also the number of the divided screens may exceed two, and division's number of image memory 10 is increased according to this and the number of the palette RAM 204 and 208 of FIG. 18, 208 also are increased.

(2) The information which is the displayed in the 3rd screen 110 (or the 2nd screen 108) of FIG. 10 or FIG. 14 may be the simple map of FIG. 17 in addition to the above (1). In this case, the processing of the step SK16 or SK24 is executed in the steps SC8, SC20, SD12 and SD14 or the steps SC6, SC18, SB18, SB22, SK8 and SK12.

In addition to the above matter, in the step SK4, the operation of the touch switch on the icon which is displayed in display 33 or the switch which corresponds to this icon may be distinguished. This icon is "direction of map".

The operation by the operator according to the icon may be also distinguished in the steps SB4, SB10, SE4, SE12, SG10 and SG4 in addition to the above matter. This icon is "whole route display" in the step SG10, "fore route display" in the step SE12, "reduced scale change" in the step SG4 and SE4, "screen division" in the step SB10 and "division cancellation" in the step SB4.

The map which is displayed in each screen in case of screen division processing of FIG. 8 may be able to be chosen by manual. In this case, when "details" which are displayed by the icon are chosen, it is changed to the divided screen which contains a non-turnpike (the backlane or the non-guidable road) and the divided screen displayed only the turnpike (the guidable road) from the whole screen displayed mainly only the turnpike (the guidable road). Also when "outline" which is displayed by the icon is chosen, it is changed to the divided screen displayed only the turnpike and the divided screen which contains a non-turnpike from the whole screen which contains a non-turnpike.

Also condition of the display map may be also able to be chosen by manual in the step SD4 of the 3rd screen processing of FIG. 11. In this case, when "intersection" which is displayed by the icon is chosen, it is changed to the divided screen which shows the turn direction of either side in the intersection or in the turning spot and the divided screen of the road map from the whole screen of the road map. By the above, display contents before the screen division are displayed in one screen after the division and the contents to want to display by the display changing are displayed in the other screen after the division.

(3) In addition to the (1) and (2), the changing to the division display may accept the change of the azimuth of the car. In this case, based on the information from absolute azimuth sensor 21 or relative azimuth sensor 22, the processing enters the step SK12→SK14→ . . . , the step SK8→SK10→ . . . , the step SK20→SK24→ . . . , the step SK22→SK24→ . . . , if the azimuth of the car shifts the fixed angle (e.g. +45 degree or ±30 degrees) from "the north". Or it may be determined whether the distance to the destination or the dropping in place from the car became less than a fixed distance or not in the step SD2 of FIG. 11. In this case, the category of business, the brand, the price, the name, the telephone number and so on of the destination or the dropping in place are displayed in the 3rd screen in the step SD4.

(4) The detailed road map which is north up and contains backlane may be displayed in the 2nd screen 108 of FIG. 10, FIG. 14 or FIG. 16 (or the 3rd screen 110) in addition to the (1) (2) and (3).

In addition to the above, the step SK2 may be omitted and as the divided screen by each processing of FIG. 6 is displayed, the processing may enter to the step SK6→SK7→ . . . Or as the divided screen by each processing of FIG. 19 or FIG. 21 is displayed, the processing may enter to the step SD2 or the step SD10. The display contents of the divided screen are changed at the same time by this.

In addition to the above, in every divided screen, the icon of "details", "outline", "intersection", "direction of map", "screen division", "reduced scale change", "fore route display", "whole route display" and so on may be displayed, a switch according to this icon may be operated by the operator and the display contents may be individually switched every divided screen.

(5) As the divided screen by each processing of FIG. 6, FIG. 19 or FIG. 21 is displayed, it may return to the single screen display in addition to (1) (2) (3) and (4). In this case, the map information which is displayed in this single screen may be the map information which was displayed in either of the divided screen, was not displayed in both of the divided screen or previous map information before the screen division.

In this case, the changing to the single screen based on a change of the distance from the turning spot or the intersection to the car, a above changing operation of the operator, a change of the travelling condition of the car, a change of the speed of the car, a change of the azimuth of the car, a change of the distance to the destination or the dropping in place or so on.

According to this display changing, the steps SK16, SK24, SD4, SC6, SC8, SC18, SC20, SK8, SK10, SK12, SK14, SK20, SK22 and SK24 are the executed. In this case, display information is not a divided screen and is displayed in the whole screen of display 33.

(6) In the FIG. 10, FIG. 14, FIG. 16, FIG. 20, FIG. 24, FIG. 25, FIG. 30, FIG. 32, FIG. 33, FIG. 41, FIG. 42, FIG. 43, FIG. 44, FIG. 51, FIG. 52, and FIG. 68 to FIG. 73 of the above embodiments, the screen which is nearer the driver is the 3rd screen 110. However this 3rd screen 110 and 2nd screen 108 may be replaced each other according to the left handle and the right handle or the change of the travelling condition of the car. In this case, based on a change of the distance from the turning spot or the intersection to the car, the changing operation of the above operator, a change of the travelling condition of the car, a change of the speed of the car, a change of the azimuth of the car, a change of the distance to the destination or the dropping in place or so on, the change of the computer program of the flow chart of FIG. 6, FIG. 19, FIG. 21, FIG. 22, FIG. 27, FIG. 34, FIG. 35, FIG. 36, FIG. 37, FIG. 38, FIG. 39, FIG. 49, FIG. 64, FIG. 65, FIG. 66 and FIG. 67 is executed.

In this change, the information which is displayed in each divided screen is replaced each other in the display processing of the steps SC6, SC8, SC18, SC20, SD12, SD14, SE120, SG16, SK12, SK14, SK8, SK10, SK20, SK22, SK24, SL12, SL34, SL36, SP14, SP38, SP40, SQ26, SQ28, ST12, ST14, SU12, SV22, SX12, SX14, SX20, SX22, SX62, SX64, SX72, SX94, SX112, SX122, SX123, SX132, SX140, SX141, SX146 and SX147.

Or the information which is displayed in the 2nd screen 108 in is moved to the 3rd screen 110, the information which is displayed in the 3rd screen 110 is moved to the 2nd screen 108 and both display screens are replaced in the steps SC6 and SC8, the steps SC18 and SC20, the steps C18 and SC20, the steps SK12 and SK14, the steps SK8 and SK10, the steps SK20 and SK22, the step SK20 and the SK24 etc. Therefore the display contents of each divided screen can be replaced each other.

(7) In addition to the above matter, the map which is displayed in the 2nd screen of the 1st embodiment may be the map which ranges to north direction, northeastern direction, eastern direction, southeastern direction, south direction, west direction, southwestern direction or northwestern direction of the map which is displayed in the 3rd screen. In this case for example, it is determined whether the mode which is determined in the step SB16 of the 1st embodiment is the map display mode which connects with (ranges to) the directions or not. Then if the mode is the mode which corresponds to this step SB16, the map display which fits in this mode is executed in the step SB18. For example the map which is displayed in the 3rd screen is made the north up screen.

In this case, the map display mode which ranges for east is chosen. Further geographical coordinate detection in the map ranging part is executed in the step SD20 that crossing point CSP in the edge part of the 3rd screen in FIG. 11 (the 3rd screen display processing) is detected. In other words, the geographical coordinate of the east edge of the map which is displayed in the 3rd screen is detected in this step SD20. Then, the map which is connected with the east edge of the map which is displayed in this 3rd screen is displayed in the 2nd screen in the step SB18 of FIG. 6 according to the mode choice. Moreover this operation may be detected based on the operation of the operator, the operation of the installation person or so on in the map display of the 2nd screen.

Moreover the position of the operator (driver) may be detected by the object detection sensor, e.g. the infrared sensor to have prepared for the navigation device surface and neighborhood or so on. Then the map display processing of the 2nd screen may be executed by the position of this operator. Moreover the map display processing of the 2nd and 3rd screens may be executed by a change of the travelling condition of the car or a change of the speed of the car which is detected by a speed sensor or so on. Moreover the map display of the 2nd and 3rd screens may be executed by a change of the azimuth of the car which is detected by a relative azimuth sensor. The change of the distance from the turning spot or the intersection to the car, the change of the distance to the destination or the dropping in place are detected by the travelling position of the guide route and the display of the 2nd and 3rd screens may be executed according to the detection result.

(8) In addition to the above matter, the map which is the displayed in the 3rd screen may be the map information which shows around the car, the start point, the destination, the dropping in place or the chosen optional part. Then the map which connects with one azimuth of all the azimuths of the map which is displayed in this 3rd screen may be displayed in the 2nd screen. In other words, a map around the destination (the dropping in place, the specification place or so on) is displayed in the 3rd screen. Moreover the map which is connected with the map of this 3rd screen and contains the guide route which connects from the start point to the destination may be displayed in the 2nd screen.

Processing in this case is also executed in the step SD20 of the 3rd screen display processing of FIG. 11 like the (7). In other words, the geographical coordinate which corresponds to the edge of the map which is displayed in the 3rd screen is detected in the step SD20. Then the map which connects with the geographical coordinate of the edge of this 3rd screen is displayed in the 2nd screen in the step SB18 of FIG. 6.

Moreover the map which connects with the 3rd screen and is displayed in the 2nd screen may be the map which connects on the running prolongation of the car. In other words, a map around the destination is displayed in the 3rd screen when the car isn't running on the guide route. The map which connects with the 3rd screen is displayed in the 2nd screen.

However because the car isn't running on the guide route, the guide route doesn't have to be included in the 2nd screen. Additionally the map in the direction which is unrelated to the position of the car or the guide route may be displayed in the 2nd screen. Moreover again the display center of the maps which are displayed in the 2nd and 3rd screens may be shifted each other. The display range of each map of the 2nd and the 3rd screen doesn't overlap each other and the geographically left maps may be displayed in these screens. The each part of the maps which are displayed in the 2nd and 3rd screens may overlap. This invention isn't the limited to the above embodiments and it is possible to change some kinds in the range which doesn't deviate from the tendency of this invention.

For example the memory medium to store the various data which is shown in FIG. 2 may be the memory medium e.g. a floppy disk or so on which can be write. Moreover the navigation device may equip with the voice input device which is equipped with the analog/digital converter. Then each operation may be executed by the sound direction which is inputted by this voice input device. Also in each embodiment, the screen of one display 33 is divided into two display screens.

It may implement by two display devices. In other words, two liquid crystal displays neighbor and are arranged in the inside of one box. Then before the division, one map is displayed by two liquid crystal displays. When division is directed, the different map information are displayed in each liquid crystal display. Moreover in the navigation device of this invention, all or partial processing of the above flow charts may be executed in the information management center of VICS or ATIS etc.

This processing result (the processing information) is received with the data transmitter/receiver unit 27. For example the destination setting processing (step SA3) of FIG. 5 and route search processing (step SA4) and so on are executed in the information processing center where map information is accumulated. Then identified guide route data is transferred to the navigation device of this invention through the data transmitter/receiver unit 27. In the navigation device of this invention, the processing of a guidance display is executed based on the sent guide route data.

In other words, the information of the retrieving condition of the destination or dropping in facilities and the route search condition and so on is sent from the navigation device of this invention to the information management center. In the information management center, the retrieving of the required facilities and the search of the route to the destination are executed based on this condition. Then information about the retrieving, extraction and search result is transmitted to the navigation device from the information management center with the map information and so on. In the navigation device, based on this received retrieving, the extraction and the search result, retrieving facilities are displayed in the display 33. In this way, the retrieving, the extraction, the search of each of facilities are possible based on the details and latest information in each of the facilities around the present position of the car.

Also in case of this facility retrieving, the retrieving which is considered the environment change of the circumference road (establishment of the one-way traffic road and so on) is possible. Further in this case, the information about each of the facilities which are accumulated in the information management center must be always renewed. Moreover the information memory part 37 which stored each program which is explained by this invention and the information of the map and the display symbol and so on may be able to used by the general computer device. In other words, the program which is memorized in information memory part 37 is made the program which can be executed in the general computer.

Then this navigation processing can be also executed by this computer device, if the device which can detect the present position by GPS reception device 25 and this information memory part 37 are connected with the carrying-type computer device. Moreover this invention can be applied as the vehicle except the car and the navigation device of the shipping, the aircraft and the map which is used for the navigation may be a chart and a submarine map and so on in addition to the road map. Moreover again this invention may be applied to the carrying-type navigation device in addition to the navigation device which is attached to the movement bodies such as the car. In other words, this invention may be applied to the small navigation device which can be accompanied by the human and which is used in a cycling, a travel, a mountaineering, a hike, a fishing or so on.

What is claimed is:

1. A device for displaying a map, comprising:
   first means for dividing a screen which displays map information into a plurality of windows;
   second means for showing stored or received first map information in at least one of the plurality of windows; and
   third means for displaying second map information which is different from said displayed first map information in another window different from the said one window in which said first map information is displayed, wherein
   a scale of the first map information is the same as the scale of the second man information, and
   road classification of the first map information is different from road classification of the second map information.

2. The device for displaying a map according to claim 1, wherein said road classification is information about a guidable road and a non-guidable road for navigation,
   the first map information is information of both the guidable road and the non-guidable road for navigation, and
   the second map information is information of only the guidable road for navigation.

3. The device for displaying a map according to claim 1, wherein the first map information is displayed by a north up, and
   the second map information is displayed by a head up.

4. The device for displaying a map according to claim 1, further comprising
   a detector for detecting a changing of display contents of the screen which displays said map information,
   means for operating said second means to display map information which is displayed before the changing as the first map information according to said detection result, and for operating said third means to display map information which is to be displayed after said changing as the second map information according to said detection result.

5. The device for displaying a map according to claim 4, wherein the display screen before changing of said display contents isn't divided, and
   the changing of said display contents is in response to a changing operation of a operator, a change of a traveling condition of a car, a change of a car speed, a change of a azimuth of a car, a change of a distance from a turning point or a intersection or to a car and/or a change in the distance to a destination or a dropping-in place.

6. The device for displaying a map according to claim 1, wherein said first map information and/or the second map information is changed to another map information in order, therefore a part of or all display contents of said divided screen are changed individually in order or at the once, or according to further changing of display contents of the screen, said divided screen is made a single window which isn't divided, map information which is displayed in the single window is the first map information, the second map information, a map information except the first map information and the second map information and/or a previous map information before screen division, and changing of said display contents is according to a changing operation of a operator, a change of a traveling condition of a car, a change of a car speed, a change of an azimuth of a car, a change of a distance from a turning point or an intersection to a car and/or a change of a distance to a destination or a dropping-in place.

7. The device for displaying a map according to claim 1, further comprising means for changing the first map information and the second map information so that the displayed first and second map information replace each other, this replacement being in response to a change of a distance from a point, an operation of an operator, an operation of an installation person, detecting a position of a driver, a change of a traveling condition of a car, a change of a car speed, a chance of an azimuth of a car, a change of a distance from an intersection or to a turn point and/or a change of a distance to a destination or a dropping-in place, and the first map information or the second map information is shown in a window of a divided screen which is nearer to a driver.

8. The device for displaying a map according to claim 1, including means for searching a route to the neighborhood of a destination or to a dropping-in place from the neighborhood from a starting place or a present position of a car, said map information being related to said searched route, the first map information is information of a simple map which designates geographical relation between the neighborhood of a starting place or a present position of a car and the neighborhood of a destination or a dropping-in place, and the second map information is detailed geographical information around a present position of a car, or the first map information is based on traveling information of a car in a searched route, and the second map information is detailed geographical information near a present position of a car, or the first map information of is information about: a turnpike and a non-turnpike or an object road and a non-object road of a navigation, and the second map information is information only about a turnpike or an object road of a navigation, or the first map information is displayed by north up and the second map information is displayed by head up, or the first map information is information of a map which maintained an absolute azimuth in the north to the direction of either window, and the second map information is information of a map which maintained the moving direction of a car to the direction of either window.

9. A device for displaying a map, comprising:

first means for dividing a screen which displays map information into a plurality of windows;

means for displaying stored or received first map information relating to a first guide route in at least one window of said plurality of windows; and third means for displaying second map information related to a second guide route which is different from said displayed first map information in another window of said plurality of windows different from said one window in which said first map information is displayed, the first map information is shown by specified processing, and the second map information is map information which is joined or connected to the first map information.

10. The device for displaying a map according to claim 9, wherein the first map information is information of a simple map which designates geographical relation between a neighborhood of a starting place or a present position of a car and a neighborhood of a destination or a dropping-in place or map information designated a neighborhood of a car, and the second map information is map information which is joined to the first map information and indicates map information of a connection or destination direction of a car or a map information between a neighborhood of a starting place or a present position of a car and a neighborhood of a destination or a dropping-in place.

11. The device for displaying a map according to claim 9, wherein said map information includes guidable road information, non-guidable road information of a navigation, first map information or/and the second map information.

12. The device for displaying a map according to claim 9, further comprising a detector for detecting a changing of display contents of the screen which displays said map information, means for operating said second means to display map information which is displayed before the changing as the first map information according to said detection result, and for operating said third means to display map information which is to be displayed after said changing as the second map information according to said detection result.

13. The device for displaying a map according to claim 12, wherein the display screen before changing of said display contents isn't divided, and the changing of said display contents is in response to a changing operation of a operator, a change of a traveling condition of a car, a change of a car speed, a change of a azimuth of a car, a change of a distance from a turning point or a intersection or to a car and/or a change in the distance to a destination or a dropping-in place.

14. The device for displaying map according to claim 9, wherein reduced scales of maps which are displayed in divided screens are changed individually or is connected and changed.

15. The device for displaying a map according to claim 9, wherein said first map information and/or the second map information is changed to another map information in order, therefore a part of or all display contents of said divided screen are changed individually in order or at the once, or according to further changing of display contents of the screen, said divided screen is made a single window which isn't divided and the first map information, the second map information, map information except the first map information and the second map information or the previous map information before screen division are displayed in the single window, and changing of said display contents is according to a changing operation of a operator, a change of a traveling condition of a car, a change of a car speed, a change of an azimuth of a car, a change of a distance from a turning point or an intersection to a car and/or a change of a distance to a destination or a dropping-in place.

16. The device for displaying a map according to claim 9, further comprising means for changing the first map information and the second map information so that the displayed first and second map information replace each other, this replacement being in response to a change of a distance from a point, an operation of an operator, an operation of an installation person, detecting a position of a driver, a change of a traveling condition of a car, a change of a car speed, a change of an azimuth of a car, a change of a distance from an intersection or to a turn point and/or a change of a distance to a destination or a dropping-in place, and the first map information or the second map information is shown in a window of a divided screen which is nearest to a driver.

17. The device for displaying a map according to claim 9, wherein the first map information is displayed by north up and the second map information is displayed by head up, or one of the first map information and the second map information is information of a map which maintained an absolute azimuth in the north to the direction of either window, the other is information of a map which maintained in the moving direction of a car to the direction of either window, or the first map information and the second map information have the same reduced scale or different reduced scale from each other, the second map information connects the north, the northeast, the east, the southeast, the south, the southwest, the west or the northwest of the first map information, and this replacement is in response to a change of a distance from a point, an operation of an operator, an operation of an installation person, detecting a position of a driver, a change of a traveling condition of a car, a change of a car speed, a change of an azimuth of a car, a change of a distance to an intersection or turn point and/or a change of a distance to a destination or a dropping-in place.

18. The device for displaying a map according to claim 9, wherein the above first map information is map information which indicates a car, a start place, a destination, a dropping-in place or a neighborhood of a chosen optional part, said second map information is information of a map which connects with this first map information, a map of this second map information matches with a map of said first map information or matches with the ahead or behind along a progress direction of a car or identifies a route to a map of said first map information, and a center of a display of each map is shifted relative to each other and a display range of each map doesn't overlap each other or overlaps in the part.

19. A navigation device for displaying a map, comprising:

first means for dividing a display screen into a plurality of windows;

second means for displaying first guide route information relating to a first guide route in at least one window of the plurality of windows; and third means for displaying a second guide route information relating to a second guide route which is different from said displayed first guide route in another window of the plurality of windows.

20. The navigation device according to claim 19, wherein the device is a navigation device for guiding a vehicle along a route according to a beforehand set route, and further comprises means for searching another route which is different from the beforehand set route, and means for displaying information of the beforehand set route as the first guide route information in the at least one window, and for displaying information of the another route which is different from the first guide route information as second guide route information in the another window.

21. The navigation device according to claim 19, wherein the device is a navigation device for guiding a vehicle alone a route according to a previous set route, and further comprises means for searching a new route when a new route search is directed in response to a car deviating from the previous set route, means for displaying information of the previous set route as the first guide route information in the at least one window, and for displaying information of the new route as the second guide route information in the another window.

22. The navigation device according to claim 19, wherein the first and second guide route information are identified and received information of a route from car start point or a neighborhood of a present position to an inputted destination or a neighborhood of a dropping-in place or is information of a route which connects a guide route from which a car deviates and the present position of a car.

23. The navigation device according to of claim 19, wherein every time a search direction is input, the first guide route information and/or the second guide route information is changed to the other guide route information.

24. The navigation device according to claim 19, wherein every time a search direction is input, the first guide route information is changed to the second guide route information and the second guide route information is changed to identified or received new guide route information.

25. The navigation device according to claim 19 wherein the first and second guide route information includes the main name of a guide route, a name of a passage point, full length of the guide route and/or required passage time.

26. The navigation device according to claim 19, wherein when one of the first and second guide route information is chosen, guidance by a chosen guide route is begun, the screen is made a single window which displays only a chosen guide route.

27. A navigation device for guiding a route according to set guide route information, comprising:

first means for outputting guidance information to a display device which displays guide route information;

second means for searching different guide route information from the previous set guide route information;

third means for dividing a display screen of said display device into a plurality of windows, when the guide route information which is different from the previous guide route information is identified by said second means for searching;

fourth means for displaying first guide route information of the previous guide route information in at least one window of the plurality of windows;

and fifth means for displaying second guide route information of the different guide route information from the previous set guide route information in another window of the plurality of windows.

28. The navigation device according to claim 27, including second means for searching different guide route information from the previous set guide route information in response to a present position or a car deviating from the previous guide route information.

29. The navigation device according to claim 27, wherein the different guide route information from the previous set guide route information is return route information for guidance to the searched route, a destination, a dropping or the previous set guide route.

30. The navigation device according to claim 27, wherein the searched route or the previous set route is displayed in the another window, and display reduced scale of each divided screen is the same as a display reduced scale of a screen which was displayed before division.

31. The navigation device according to claim 27, wherein said navigation device also displays a leaving route to a present position from a leaving spot when a present position deviates from the above search route, said navigation device also displays a non-running route to the return spot from the above leaving spot in the search route, and/or the above navigation device also displays a geographical relation between the return route and the search route.

32. The navigation device according to claim 27, wherein a display is controlled for the whole return route to be displayed in a divided screen and display reduced scale is decided for this whole return route to be displayed in a divided screen in this display control, a display is also controlled for the whole leaving route to be displayed in a divided screen and display reduced scale is decided for this whole leaving route to be displayed in a divided screen in this display control, or a display is also controlled for the whole non-running route to be the displayed in a divided screen and display reduced scale is decided for of this non-running route approximately generally to be displayed in a divided screen in this display control.

33. The navigation device according to claim 27, wherein in a route which is displayed in a divided screen, a present position becomes a center of a window of the screen, an absolute azimuth in the north is maintained to the direction of either two windows of the screen, and/or the progress direction of a present position is maintained to the direction of another window of the two windows of the screen.

34. The navigation device according to claim 27, wherein the divided screen is formed in response to deviation of a present position from search route, changing operation of an operation person, a change of a running condition of a present position, a change of speed of a present position, a change of an azimuth of a present position, a change of a distance from a turning point or an intersection or to a present position and/or a change of a distance to a destination or a dropping-in place, this divided screen is combined back into a single window in response to a change of a distance to search route, changing operation of an operation person, a change of a running condition of a present position, a change of speed of a present position, a change of an azimuth of a present position, a change of a distance from a turning point or an intersection to a present position and/or a change of a distance to a destination or a dropping-in place, and map information which was displayed before screen division, a previous search route or map information which includes a present position is displayed in the screen after combination.

35. A device for displaying a map, comprising:

first means for retrieving information of a geographical object and information which indicates a place of this geographical object and a lot of memorized geographical objects;

second means for setting at least one retrieving condition by this reference;

third means for outputting a retrieving result;

fourth means for dividing a display screen of said display means into a plurality of windows having the same scale; and fifth means for displaying different information in a retrieving condition and/or a retrieving result in each of these plurality of windows.

36. The device for displaying a map according to claim 35, wherein the retrieving condition and the retrieving result are displayed in each of the plurality of windows, or a way result and a last result of retrieving are displayed in each of the plurality of windows, or plural different retrieving conditions are displayed in each of the plurality of windows, or a result which is retrieved by a different retrieving condition is displayed in each of the plurality of windows, or the retrieving conditions and the retrieving result are displayed, or in plural retrieving processing which are executed by a series of retrieving procedures, plural new retrieving processing content is displayed by this retrieving procedure.

37. The device for displaying map according to claim 35, wherein for the retrieving way result or all last retrieving results to be displayed in a display map, a display reduced scale of each divided screen is decided.

38. The device for displaying map according to claim 35, wherein the retrieving condition is, a condition to specify an area with all or a part of distinguishing numbers which specify an area, a condition of a street in this area to specify or extract, a condition to extract a geographical object which is in this street neighborhood in a distance from the street, a condition to extract a geographical object by a genre, business contents and /or a price of goods/service, a condition to extract a geographical object in business time or a business list of articles, a condition to extracts a geographical object by existing number of floors of building/facility of the geographical object, a condition to extract a geographical object by a distance from a present position, a car or a guide route, it is one to have combined at least one condition from a condition to extract a geographical object by the direction of a relative position from a present position, a car or a guide route, and these combinations are changed according to a changing order or fixed condition.

39. A computer program for displaying a map, comprising:

a first processing procedure for dividing a screen which displays map information into a plurality of windows;

a second processing procedure for showing stored or received a first map information in at least one window of the plurality of windows;

and a third processing procedure for displaying a second map information which is different from said displayed first map information in another window of the plurality of windows, a scale of a map of the first map information being the same as the scale of a map of the second map information, and road classification of a map of the first map information being different from road classification of a map of the second map information.

40. A computer program for displaying a map, comprising:

a first processing procedure for dividing a screen which displays map information into a plurality of windows;

a second processing procedure for displaying stored or received first map information in at least one window of the plurality of windows; and a third processing procedure for displaying second map information which is different from said displayed first map information in another window of the plurality of windows, the first map information being shown by specified processing, and the second map information being map information which is joined to the first map information.

41. A computer program for displaying a map, comprising:

a first processing procedure for dividing a display screen into a plurality of windows;

a second processing procedure for displaying first guide route information relating to a first guide route in at least one window of the plurality of windows; and a third processing procedure for displaying a second guide route information relating to a second guide route which is different from said displayed first guide route in another window of the plurality of windows.

42. A computer program for guiding a route according to set guide route information, comprising:

a first processing procedure for outputting guidance information to a display device which displays guide route information;

a second processing procedure for searching different guide route information from the previous set guide route information;

a third processing procedure for dividing a display screen of said display device into a plurality of windows, when the guide route information which is different from the previous guide route information is identified by said second processing procedure for searching;

a fourth processing procedure for displaying first guide route information of the previous guide route information in at least one window of the plurality of windows;

and a fifth processing procedure for displaying second guide route information of the different guide route information from the previous set guide route information in another window of the plurality of windows.

43. A computer program for displaying a map, comprising:

a first processing procedure for retrieving a geographical object to information which indicates a place of this geographical object and a lot of memorized geographical objects;

a second processing procedure for setting at least one retrieving condition by reference;

a third processing procedure for outputting a retrieving result;

a fourth processing procedure for dividing a display screen of said display means into a plurality of windows; and a fifth processing procedure for displaying different information in a retrieving condition and/or a retrieving result in each of these plurality of windows at the same scale.

* * * * *

UNITED STATES PATENT AND TRADEMARK OFFICE
CERTIFICATE OF CORRECTION

PATENT NO.    : 6,067,502 B1
DATED         : May 23, 2000
INVENTOR(S)   : Kihachi Hayashida et al.

It is certified that error appears in the above-identified patent and that said Letters Patent is hereby corrected as shown below:

Delete specification and abstract and substitute therefore the specification and abstract as shown on the attached pages.

Signed and Sealed this

Seventeenth Day of February, 2004

JON W. DUDAS
*Acting Director of the United States Patent and Trademark Office*

(12) United States Patent
Hayashida et al.

(10) Patent No.: US 6,067,502 B1
(45) Date of Patent: May 23, 2000

(54) DEVICE FOR DISPLAYING MAP

(75) Inventors: Kihachi Hayashida; Takeshi Yanagikubo; Chihiro Hayashi, all of Anjo (JP)

(73) Assignee: Aisin AW Co., Ltd. (JP)

(*) Notice: Subject to any disclaimer, the term of this patent is extended or adjusted under 35 U.S.C. 154(b) by 0 days.

(21) Appl. No.: 08/916,131

(22) Filed: Aug. 21, 1997

(30) Foreign Application Priority Data

| Aug. 21, 1996 | (JP) | H8-239795 |
| Sep. 7, 1996 | (JP) | H8-257847 |
| Oct. 1, 1996 | (JP) | H8-261075 |
| Oct. 11, 1996 | (JP) | H8-289246 |
| Oct. 15, 1996 | (JP) | H8-272009 |

(51) Int. Cl.⁶ ............................................. G09B 29/10
(52) U.S. Cl. .................. 701/209; 701/211; 701/212; 340/990; 340/995
(58) Field of Search ............................ 701/208, 209, 701/201, 210, 211, 212; 340/990, 995

(56) References Cited

U.S. PATENT DOCUMENTS

| 4,675,676 A | * | 6/1987 | Takanabe et al. | 340/995 |
| 5,398,188 A | * | 3/1995 | Maruyama | 701/208 |
| 5,729,109 A | * | 3/1998 | Kaneko et al. | 318/587 |
| 5,731,979 A | * | 3/1998 | Yano et al. | 701/211 |
| 5,748,109 A | * | 5/1998 | Kosaka et al. | 340/995 |
| 5,884,217 A | * | 3/1999 | Koyanagi | 701/208 |

FOREIGN PATENT DOCUMENTS

JP 4-335390 11/1992

* cited by examiner

*Primary Examiner*—Tan Nguyen
(74) *Attorney, Agent, or Firm*—Lorusso & Loud

(57) ABSTRACT

A navigation system has a display screen which can be divided into a plurality of windows for simultaneously displaying different classifications of routes in the same scale, or different routes from a present position or starting point to a destination or return to a route from which a car has deviated.

43 Claims, 58 Drawing Sheets

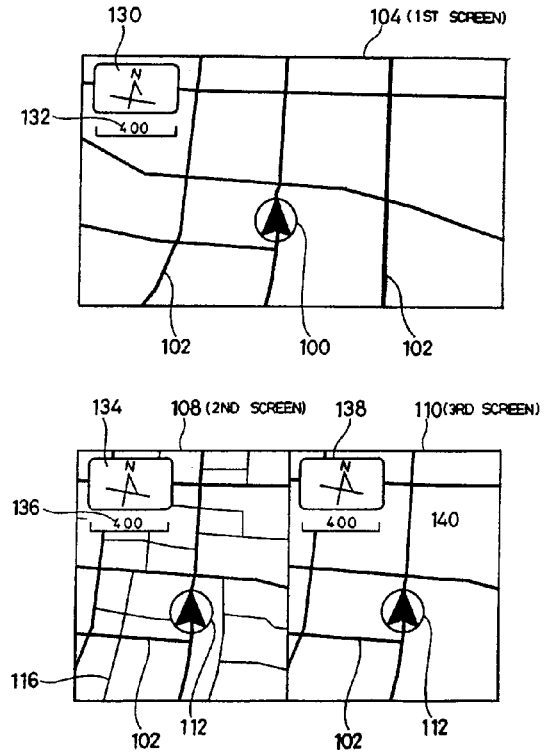

DEVICE FOR DISPLAYING MAP

BACKGROUND OF THE INVENTION

1. Field of the Invention

This invention is related to a map display device for guiding and searching a route for a vehicle based on map information, and especially relates to an improvement of the display of the map information.

2. Description of the Related Art

A map is shown in a display of a conventional map display device, e.g. a conventional navigation device. A requested destination is set, and an optimal guide route which links this destination and a present position of the vehicle is retrieved and is shown. Then when a route other than this route is required while the vehicle is traveling this route, another route is searched and used for guidance. In the search of this another route, a search cost of the presently selected road is raised and the search for another route is conducted under a condition which is different from a search condition used to search the presently selected route. In this way, the presently selected road is excluded and a new guide route is searched.

Also in the conventional device, when a vehicle deviates from a guide route, a new route is automatically re-searched from the present position. Or when a re-search key is operated, a re-search is executed. In this conventional device, the neighborhood of the present position is searched first and a whole route is searched by a request of a user. In the search of the neighborhood, a route which returns to a previous route is searched and in a whole route searching, a whole route to the destination is searched.

SUMMARY OF THE INVENTION

In the conventional navigation device, one map is shown occupying the whole screen of a display device. However recently the price of the liquid crystal displays has declined and wider screens are also available. Therefore, a wider range of geographical information is displayed and the detail of the displayed geographical information is increased.

However, sometimes the display of a wide range of geographical information isn't necessary. For example when the vehicle (car) approaches the destination, only a geographical relation between the vehicle and the destination should be shown. The other geographical information isn't necessary. In this case geographical information which is necessary is sufficiently displayed on the screen along with unnecessary geographical information. Further information of doubtful use is sometimes shown on the screen during travel.

Moreover when plural routes are retrieved from a present position of the car to the destination and each guide route is alternately displayed in one screen, the routes cannot be easily compared with each other. Further when plural routes are displayed on the same screen, these routes are not clearly distinguished between each other since parts of the routes overlap each other.

To solve the above problem, in this invention, a screen which displays map information is divided into a plurality of windows, according to a traveling condition of the car. One window displays a simple map which shows geographical relation between a present position of the car and a destination, and another window displays detailed map information. Therefore a driver can readily view a direction to the destination and can also view detailed geographical information around the present position of the car at the same time.

Also when the car approaches a right or left turning point, geographical information of the right or left turning point on the identified route is shown in the first window. Moreover at this time, a detailed map is displayed in the second window. In this detailed map, the quantity of information which is displayed is adjusted according to a traveling condition of the car. Therefore the user can readily ascertain the direction in which the car should turn as well as geographical information around the car.

Moreover a north up map, i.e. a map which is oriented with north at the top, is displayed in the first window, and a head up map, i.e. a map which is oriented with the direction of travel at the top, is displayed in the second window.

Another route is often searched on the conventional navigation device for guidance to the destination. For example this another route may be searched at the request of a user when the route being traveled is congested. This another route is sometimes a very big detour around the previous route and, since the previous route has been erased, the user cannot compare the previous route with the another route. Further plural routes which are searched by the different search conditions could not be compared each other.

Moreover another route is searched when the vehicle deviates from its searched route, and guidance is performed along the another new route. However when the another re-searched route makes a big detour around the previous route, the previous route would be a better guide. Also when the previous route has been erased, the user cannot compare the previous route with the another route. Further a route determined by the above neighborhood searching and a route determined by all the range searching cannot be compared.

Moreover in the case a car deviates from the guide route temporarily while traveling and returns to the above guide route, or the driver has to deviate off the guide route to make a sudden stop or to go around a road which is closed, the conventional navigation device positions the displayed map so that a mark of the car (vehicle) is in a center of the screen. Therefore the previous guide route isn't included in the screen and sometimes the guide route isn't shown at all. In this case, a direction and a position of the previous guide route cannot be immediately confirmed in the screen. Therefore it is necessary to display a reduced scale of the map in order for the previous guide route to be displayed.

Moreover a new guide route which is re-searched when the car deviates from the guide route is not always a better route. Rather it sometimes better to return to the previous guide route. When the present position of the car and the previous guide route aren't displayed in one screen, this return is difficult. Moreover the previous route and a new guide route cannot be compared with each other.

Also when stopping at facilities in the neighborhood while traveling the guide route, often there could not be displayed in the center of the screen a return route to this guide route along with a neighborhood of the car. Moreover since information for setting a destination or a dropping in place can be sufficiently shown in only a part of a screen, a wide display screen isn't sufficiently utilized. Also the prior art display screen must be returned to the previous screen or be returned to a first input screen when the screen is switched to retrieve information.

To solve the above problem, in this invention, the screen which displays a map is divided into a plurality of windows. When the car deviates off the guide route, the new searched route is displayed in a first of the windows and the guide route which was searched previously is shown in a second window. In the map which is displayed in this second window, the quantity of information which is displayed is adjusted according to a traveling condition of the car. Therefore the direction which the car should progress and the geographical information around the car can be displayed together.

Also a guide route and a map around the present position of the car are displayed in the first window and the map and the destination which connects with the guide route of the first window are shown in the above second window. According to a traveling position of the car, a direction of a right or left turn in the guide route, a direction of the destination or information about the destination and so on are alternately shown in this first window.

Moreover different guide routes from the present position of the car to the destination are displayed in the above first window and the second window and the user is able to choose one guide route from the displayed routes.

Also a whole return route which returns to the guide route and a part of the guide route are shown in the first window when the car deviates off the guide route. A map centered on the present position of the car or a re-searched new guide route is shown in the second window. Further when guidance instruction is begun, the return route of the first window is displayed and is shown in the whole screen.

Moreover on the occasion of setting of a destination or a dropping in place, a result of a facility retrieving by a first retrieving condition is displayed in the first window and a choice branch of another new retrieving condition is shown in the second window. After this, a result of a facility extraction by a new retrieving condition is displayed in the above second window and a choice branch of this new retrieving condition is shown in the first window. Therefore the retrieving condition to extract facilities and the retrieving result are shown in parallel in the divided windows.

All the terms "destination", "dropping in place" and "guidance ending point" referred to herein include "destination", "dropping in place" and "guidance ending point". All the terms "present position", "start point", "dropping in place" and "guidance beginning" referred to herein include "present position", "start point", "dropping in place" and "guidance beginning".

BRIEF DESCRIPTION OF THE DRAWINGS

FIG. 1 is a block diagram of a whole circuit of a navigation device.

FIG. 2 is a table illustrating a data structure which is memorized in data 38c at an information memory unit 37.

FIG. 3 is a table illustrating data which is memorized in RAM 5.

FIG. 4 is a table illustrating structure of a road data file F4.

FIG. 5 is a flow chart of a whole guidance procedure.

FIG. 6 is a flow chart of a guidance/display procedure of a first embodiment.

FIG. 7 is a flow chart of a subroutine of a single screen display procedure of a first embodiment.

FIG. 8 is a flow chart of a subroutine of a screen division procedure of a first embodiment.

FIG. 9 is an illustration of an undivided screen which is shown in a display 33.

FIG. 10 is an illustration of a divided screen of a display 33.

FIG. 11 is a flow chart of a subroutine of a third screen display procedure of a first embodiment.

FIG. 12 is a flow chart of a subroutine of a display procedure of a forward route of a first embodiment.

FIG. 13 is a flow chart of a subroutine of calculation procedure of a possible display range of a first embodiment.

FIG. 14 is an illustration of a screen on which a forward guide route is displayed.

FIG. 15 is an illustration of a subroutine of display procedure of a whole route (fore) of a first embodiment.

FIG. 16 is an illustration of a screen where the remainder of a guide route, i.e. a whole route to a destination is displayed.

FIG. 17 is an illustration of a simple map which is displayed in a display 33.

FIG. 18 is a block diagram of a circuit which is provided between a image memory 10 and a display 33.

FIG. 19 is a flow chart of a guidance/display procedure of a second embodiment.

FIG. 20 is an illustration of a divided screen of a display 33 is a second embodiment.

FIG. 21 is a flow chart of a guidance/display procedure of a third embodiment.

FIG. 22 is a flow chart of a guidance/display procedure of a fourth embodiment.

FIG. 23 is an illustration of a screen of a display 33 before a screen is divided.

FIG. 24 is an illustration of a divided-screen of a display 33.

FIG. 25 is an illustration of a divided screen of a display 33.

FIG. 26 is an illustration of a single screen after division of a display 33 is canceled.

FIG. 27 is a flow chart of a guidance/display procedure of a fifth embodiment.

FIG. 28 is an illustration of a screen of a display 33 before a screen is divided.

FIG. 29 is an illustration of a divided screen of a display 33.

FIG. 30 is an illustration of a divided screen of a display 33.

FIG. 31 is an illustration of a single screen after division of a display 33 is canceled.

FIG. 32 is an illustration of a divided screen of a display 33.

FIG. 33 is an illustration of a divided screen of a display 33.

FIG. 34 is a flow chart of a guidance/display procedure of a sixth embodiment.

FIG. 35 is a flow chart of a procedure upon deviating from a route.

FIG. 36 is a flow chart of the initial showing of a second window of FIG. 35 in a first embodiment.

FIG. 37 is a flow chart of the initial showing of a second window of FIG. 35 in a second embodiment.

FIG. 38 is a flow chart of a display adjustment of a second window in a guidance/display procedure of FIG. 34 of a first embodiment.

FIG. 39 is a flow chart of a display adjustment of a second window in a guidance/display procedure of FIG. 34 of a second embodiment.

FIG. 40 is an illustration of a screen of a display 33 before a screen is divided.

FIG. 41 is an illustration of a divided screen of a display 33 immediately after deviating from a guide route.

FIG. 42 is an illustration of a state when a return route 258 is displayed in a second window.

FIG. 43 is an illustration of a divided screen of a display 33 when a car leaves a guide route far.

FIG. 44 is an illustration of a state when a return route 260 is displayed in a second window of FIG. 43.

FIG. 45 is an illustration of a state when a return route 260 is displayed in a second window of FIG. 43.

FIG. 46 is an illustration of an application example of a display of a display 33 immediately after leaving a guide route.

FIG. 47 is an illustration of a guide route showing each node of the guide route.

FIG. 48 is an illustration of an area of a display when a map is displayed in a second window.

FIG. 49 is a flow chart of setting procedure of nearest facilities.

FIG. 50 is an illustration of a screen displaying an example of a genre list.

FIG. 51 is an illustration of a state where facilities which correspond to a specification genre are displayed at a divided screen.

FIG. 52 is an illustration of a state of a divided screen.

FIG. 53 is a flow chart of a subroutine of extraction of facilities of route going-along.

FIG. 54 is a flow chart of a subroutine which calculates a shortest straight line distance between retrieved facilities and a guide route.

FIG. 55 is an illustration of a guide map showing position relation between retrieved facilities and the guide route.

FIG. 56 is an illustration explaining procedure of a step SX36.

FIG. 57 is an illustration explaining calculation of a shortest straight line distance.

FIG. 58 is a table illustrating postal code choice data 50.

FIG. 59 is an table illustrating contents of street list data 55.

FIG. 60 is an table illustrating contents of facility genre list data 60.

FIG. 61 is an table illustrating contents of street shape data 65.

FIG. 62 is an table illustrating contents of facility list data 70.

FIG. 63 is an table illustrating contents of area shape data 75.

FIG. 64 is a flow chart of destination setting procedure (a step SA3).

FIG. 65 is a flow chart of a subroutine of a representative point map display and destination setting.

FIG. 66 is a flow chart of a subroutine of a display of a street name and destination setting.

FIG. 67 is a flow chart of a subroutine of a genre list display and destination setting.

FIG. 68 is an illustration of a screen of a postal code and an item choice.

FIG. 69 is an illustration of display example in a specification area.

FIG. 70 is an illustration of a street list.

FIG. 71 is an illustration of a state wherein a street is displayed.

FIG. 72 is an illustration of a display example of a genre list.

FIG. 73 is an illustration of a state where facilities which correspond to a specification genre and facilities which correspond to a specific brand are displayed on a divided screen.

DETAILED DESCRIPTION OF THE PREFERRED EMBODIMENTS

1. Summary of the embodiments (1) When a single screen (a first window) is divided (step SC4), a map of head up or a map of north up is shown in one of the screens (a second window) which were divided (Steps SK20, SK22). A present position of a car, a distance to a destination, a direction to a destination etc. are shown in the other divided screen (a third window) (step SK24). This is a simple map where necessary and minimum information is displayed. After this, another guidance/display procedure is executed (step SK18).

(2) When a single screen (a first window) is divided (steps SB10, SB12), the fore route is displayed (step SB18) or the whole route of the remainder is shown (step SB22) in one of the screens (a second window) which were divided. All the terms "fore" in this application papers include "front" and "forward". A map which was displayed in a single screen (a first window) before division is shown in the other divided screen (a third window) (step SB14). After this, an other guidance/display procedure is executed (step SB8).

(3) When another route is searched (steps SL4, SL8), a single screen (a first window) is divided (step SL10). A guide route which results from a N-th search is displayed in one of the screens (a second window) which were divided and a guide route which results from a (N−1)th search is shown in the other divided screen (a third window) (step SL12). A guide route in a second window or in 3rd a screen is selected after this (step SL30).

(4) When a car deviates off a guide route (step SQ2), a procedure to deviating route is executed (step SQ4), and a return route is searched (step SR4) and a single screen (a first window) is divided (step SR8). A return route which includes a car is shown in one of the screens (a second window) which were divided (step SQ22). A map which was displayed in a screen (a first window) before division is shown in the other which divided screen (a third window) (step SQ23).

(5) When a genre selection is directed (step SX2), a list for a genre choice is shown in a screen before division (step SX4). When one genre is chosen and specified, a single screen (a first window) is divided (step SX10) and all facilities corresponding to a specified genre are shown in one of the screens (a second window) which were divided (step SX12). A list of an sales article which is the following selection condition is shown in the other screen (a third window) which divided (step SX14). If facilities are chosen and specified after this, screen division is canceled and specified facilities are set as a dropping in place (step SX28).

2. Overall Circuitry

FIG. 1 illustrates the overall circuitry of the navigation device. A central processor 1 controls the operation of the whole navigation device. The central processor 1 is comprised with a CPU 2, a flash memory 3, a RAM 5, a ROM 4, a sensor input interface 7, a communication interface 8, an image (picture) processor 9, a image (picture) memory 10, a voice processor 11 and a clock (clock generator) 6. The CPU 2 and the devices 3–11 are connected together through a CPU local bus 15, and the data are exchanged among these devices.

A flash memory 3 is composed of a memory (EEPROM) etc. in which data or instructions can be erased electrically and stored. Computer programs 38b which are memorized in an information memory unit 37 (a outside storage media/ means) are copied and are memorized (installed/transferred) into this flash memory 3 (an inner storage media/means). Also programs which are sent through a data sending and a data transmitter/receiver (sending/receiving) unit 27 from a outside system are copied and are memorized into a flash memory 3. These programs correspond to various procedures by flow charts mentioned later and are executed in CPU 2. For example, these programs 38b correspond to a display control of information and a guidance control by sound (voice) and so on.

This installation (transferring/copy) is automatically executed when inserting an information memory unit 37 in this navigation device, is automatically executed when turning on the power of this navigation device or is executed by operation of an operator. This information memory unit 37 can be replaced with the other information memory units 37 and it can be replaced with a newer or the latest program and data. As a result, the latest navigation system is supplied with this replacement.

The flash memory 3 stores a variety of parameters required for the programs. The ROM 4 stores figure data to be displayed and various general-purpose data. The figure data to be displayed are used for route guidance and map showing on the display 33. The general-purpose data include voice waveforms recording synthetic or human voice for voice guidance, and are used for the navigation operation.

The RAM 5 stores data input from external units, a variety of parameters used for the arithmetic operation, the operated results and programs for navigation. The clock 6 comprises a counter, a battery backed-up RAM or EPROM, etc., and outputs time data.

The sensor input interface 7 comprises an A/D converter circuit or a buffer circuit. The sensor input interface 7 receives analog or digital sensor data from the sensors 21 to 24 of a present position detector 20. The present position detector 20 includes an absolute direction sensor 21, a relative direction sensor 22, a distance sensor 23 and a vehicle speed sensor 24.

The absolute direction sensor 21 is, for example, a terrestrial magnetism sensor and detects terrestrial magnetism. The absolute direction sensor 21 outputs data indicating a south-and-north direction which serves as the absolute direction. The relative direction sensor 22 is, for example, a steering angle sensor and detects the steering angle of the wheel based upon a gyroscope such as optical fiber gyroscope or piezo-electric vibration gyroscope. The relative direction sensor 22 outputs a relative angle of a direction of progress of the car with respect to the absolute direction detected by the absolute direction sensor 21.

The distance sensor 23 comprises a counter or the like interlocked to, for example, an odometer. The distance sensor 23 outputs data indicating distance traveled by the car. The vehicle speed sensor 24 comprises a counter or the like connected to a speedometer. The vehicle speed sensor 24 outputs data that vary in proportion to the running speed of the car.

An I/O data bus 28 is connected to the communication interface 8 of the central processor 1. To the I/O data bus 28 are connected the GPS receiver unit 25, the beacon receiver unit 26 and the data transmitter/receiver unit 27 of the present position detector 20. To the I/O data bus 28 are further connected a touch switch 34 and a printer 35 of the input/output unit 30, and an information memory unit 37.

That is, a variety of data are exchanged between the external accessory equipment and the CPU local bus 15 through the communication interface 8.

The present position detector 20 outputs data for detecting the present position of the car. In other words, the absolute direction sensor 21 detects the absolute direction. The relative direction sensor 22 detects the relative direction with respect to the absolute direction. Furthermore, the distance sensor 23 detects the distance traveled. The vehicle speed sensor 24 detects the running speed of the car. The GPS receiver unit 25 receives GPS (Global Positioning System) signals to detect position data such as longitude and latitude of the car. The GPS signals are microwaves transmitted from a plurality of satellites orbiting round the earth.

Similarly the beacon receiver unit 26 receives a beacon from a data offering system such as VICS (Vehicle Information and Communication System) or the like, and the received data and the corrected data of GPS are output to the I/O data bus 28.

The data transmitter/receiver unit 27 exchanges a variety of information related to the present position or the road conditions near the car relative to the bi-directional present position information offering system or the ATIS (advanced traffic information service), etc. by utilizing a cellular phone, FM multiplex signals or a telephone circuit. These information are used as detecting information of the car position or support information of movement. The beacon receiver unit 26 and the data transmitter/receiver unit 27 may not be provided. As for this data sending and the data transmitter/ receiver unit 27, a radio receiver, a television receiver, a carrying telephone, a pager or the other radio communication machine are used.

The input/output device 30 comprises a display 33, a transparent touch panel 34, a printer 35 and a speaker 13. The display 33 displays guide data during the navigation operation. The touch panel 34 is constituted by a plurality of transparent touch switches that are arranged in the form of a matrix on a plane, and is adhered onto the screen of the display 33. By using the touch panel 34, data necessary for setting the destination, such as start point, destination, passing points, drop-in places, etc. are input to the navigation device.

A printer 35 is used for printing a variety of data such as map and guide information to facilities output through the communication interface 8. Information of various kinds is transmitted by voice to the user from the speaker 13. The printer 35 may be omitted.

The display 33 may be a CRT, a liquid crystal display or a plasma display, and displays picture data. Desirably, however, the liquid crystal display is preferred as a display 33 because it consumes small amounts of electric power, it can be seen highly clearly, and is light in weight. In this embodiment (invention), this display 33 is liquid crystal having a wide screen.

Furthermore this display 33 may be composed of more than two liquid crystal displays which can separate. Then each liquid crystal display is connected with a image processor 9 respectively with an independent video signal cable and is placed in a same or a different position from each other.

A image memory 10 such as DRAM (dynamic RAM) or dual port DRAM is connected to the image processor 9 that is connected to the display 33. The picture data are written into the image memory 10 by the image processor 9. Under control of the image processor 9, the data are read out from the image memory 10 and are displayed on the display 33.

According to division of a screen of a display 33, a image memory 10 also is divided into an area for a second window and an area for a third window and independent image data is written in each. According to this division, memory elements of the image memory 10 are also divided into a second window and a third window.

In accordance with a drawing command from the CPU 2, the image processor 9 converts map data and character data into picture data for display and writes them into the image memory 10. At this moment, the peripheral picture on the screen is also formed and is written into the image memory 10. Therefore the peripheral picture can be also readily displayed upon scrolling.

When the screen of the display 33 is divided, a memory area of image memory 10 are divided corresponding to the divided screen. And image data which is different each other is written to each divided memory area of image memory 10.

A voice processor 11 is connected to the speaker 13. The voice processor 11 is connected to the CPU 2 and to the ROM 4 through the CPU local bus 15. The voice waveform data for voice guidance read out from the ROM 4 by the CPU 2 are input to the voice processor 11. The voice waveform data are converted into analog signals by the voice processor 11, and are output from the speaker 13. The voice processor 11 and the image processor 9 comprise general-purpose DSPs (digital signal processors) or the like.

The information memory unit 37 is connected to the I/O data bus 28 through the data transmitter/receiver 39. In a nonvolatile manner, disk management information 38a, programs 38b and data 38c such as road map data necessary for the navigation operation are stored in the information memory unit 37. The disk management information 38a are related data or programs stored in the information memory unit 37, for example version information of the programs 38b. The information memory unit 37 is provided with a data transmitter/receiver 39 for reading data written into the information memory unit 37 and outputting them onto the I/O data bus 28.

The information memory unit 37 may be an optical memory (CD-ROM, etc.), a semiconductor memory (IC memory, card, etc.), or a magnetic memory (opto-magnetic disk, hard disk, floppy disk, etc.). The data transmitter/receiver 39 is equipped with a data pickup adapted to the recording medium so as to be adapted to a change in the data recording medium. When, for example, the recording medium is a hard disk, a core head is provided.

A part or all of the above programs 38b may be stored in an area center which is different from this navigation device, data sent from this navigation device to the area center through the data sending and the data transmitter/receiver unit 27 may be processed based on these programs 38b, and this processed data may be sent from the area center to this navigation device through the data sending and the data transmitter/receiver unit 27.

The data 38c of the information memory unit 37 includes map data, intersection data, node data, road data, photographic data, destination data, guide point data, detailed destination data, destination read data, house shape data, as well as other data and programs that are necessary for the navigation operation. In accordance with these programs, the navigation operation is executed by using the road map data stored in the information memory unit 37. The program for navigation is read by the data transmitter/receiver 39 from the information memory unit 37, copied and written into the flash memory 3. Other data include indication guide data, voice guidance data, picture data showing simple guide route, etc.

The data 38c of the information memory unit 37 includes map data of a plurality of reduced scales or one scale. In other words, the data 38c may have map data of a plurality of reduced scales of same region, or the data 38c may have map data of one scale of same region. When the map of a large scale is to be shown on the display 33, the map data stored in the information memory unit 37 is shown on a reduced scale. In this case, not only the lengths of the roads, etc. are shortened but also signs and data representing buildings and facilities are reduced.

3. Data 38c of Information Memory Unit 37

FIG. 2 is a table illustrating the contents of data files stored in the data 38c of the information memory unit 37. A map data file F1 stores the map data such as road maps of the whole of the country, road maps of a district, and house maps. Each road of a main turnpike, an expressway and a backlane and so on and destination (facilities and so on) on the ground are shown in a road map. A diagram which shows an outward form of a building on the ground and so on and a road name and so on are shown in a house map. For example, a backlane, a road having a width below a specific value, or a municipal road and a driveway except a national highway or a local road, isn't used by the procedure for searching a route of FIG. 5 which is mentioned later.

An intersection data file F2 stores the coordinates of geographical positions of the intersections and data related to the intersections. A node data file F3 stores geographical coordinate data of the nodes utilized for searching a route on the map. A road data file F4 stores data related to the positions and kinds of the roads, number of the lanes, connections among the roads, etc. A photographic data file F5 stores photographic image data of places where visual display is required such as of various facilities, sightseeing spots, major intersections, etc.

A destination data file F6 stores data related to the positions and names of various facilities that may be destinations. The facilities may be sightseeing spots, buildings, sites, companies and offices listed in a telephone book. A guide point data file F7 stores guide data of points that require guidance. The points may be the contents of information boards and branch points. A detailed destination data file F8 stores detailed data related to destinations stored in the destination data file F6. A road name data file F9 stores name data of principal roads among the roads stored in the road data file F4. A branch point name data file F10 stores name data of principal branch points. An address data file F11 stores list data for identifying, from the addresses, the destinations stored in the destination data file F6.

A file F12 of a list of toll numbers and local office numbers stores list data of toll numbers and local office numbers only of the destinations stored in the destination data file F6. A registered telephone number file F13 stores telephone number data of clients input by the user. A landmark data file F14 stores data related to positions and names of points that serve as marks while driving and of the places that should be remembered input by the user. The point data file F15 stores detailed data of landmark points stored in the landmark data file F14. A facility data file F16 stores data related to positions and descriptions of destinations such as gas stations, drug stores, parking lots and positions of objective places where the driver may wish to drop in, in addition to the destinations.

4. Contents which are Memorized in RAM 5

FIG. 3 illustrates some of a group of data stored in the RAM 5. The present position data MP represent the present position of the vehicle and are detected by a present position detector 20. The absolute direction data ZD represents the south-north direction relying upon the terrestrial magnetism and are found based upon the data from an absolute direction sensor 21. The relative direction angle data Dθ represent an angle of the direction in which the vehicle is traveling with respect to the absolute position data ZD and are found based upon the data from a relative direction sensor 22.

The traveled distance data ML represent a distance traveled by the vehicle and are found based on the data from a distance sensor 23. The present position data PI are related to the present position and are input from a beacon receiver 26 or the data transmitter-receiver 27. The VICS data VD and ATIS data AD are input from the beacon receiver 26 or the data transmitter-receiver 27. The VICS data VD are used for correcting an error in the position of the vehicle detected by a GPS receiver 25. The ATIS data AD are used for determining traffic regulations and traffic jamming in the areas.

The inputted destination data TP are related to the coordinate positions and names of the destinations and are input by the user. The start point of route data SP are map coordinate data of a point from where the navigation operation starts. The end point of route data ED are map coordinate data of a point where the navigation operation ends.

The start point of route data SP utilize node coordinates on a guide route closest to the present position of the vehicle or to the point of departure. This is because, the present position of the vehicle may be on a site such as golf course or parking lot, but may not necessarily be on the guide route. Similarly the end point of route data ED utilize node coordinates on a guide route closest to the inputted destination data TP. This is because the coordinates of the inputted destination data TP may not often be on the guide route.

The guide route data MW stored in the RAM 5 represent an optimum route or a recommended route up to the destination, and are found by a procedure for searching a route that will be described later. Specific road numbers are attached to the individual roads in the road map stored in the data 38c of the information memory unit 37. The guide route data MW are constituted by the road numbers or by the link numbers that will be described later of from the start point of route data SP to the end point of route data ED.

Mode set data MD is used by processing to set a destination which is described later and set by a touch switch 34 which is made on a display 33 in a product layer by a laminate. Mode contents which are displayed on display 33 are decided by this mode set data MD. Dropping in place data DP shows facilities in which the car drop on the way of a guide route. A screen condition data GJ shows a display condition of a display 33 and shows whether a display screen is in a division condition or the single (non-division) condition. A screen condition data GJ is rewritten every time a display condition of a display 33 is changed.

Crossing point data CSP is used by processing of a display a forward portion of a route and so on which is described later, and indicates an end point geographical coordinate of a guide route which is displayed in one of the above divided windows. It makes this crossing point CSP a start point and therefore the forward portion of the guide route is shown in the other divided window.

A reduced scale WDA of a first window shows a reduced scale of a map which is displayed in a single window before division of a display 33. A reduced scale WDB of a second window shows a reduced scale of a map which is displayed in a divided window of the display 33 which is near a assistant's seat after division. A reduced scale WDC of a third window shows a reduced scale of a map which is displayed in a window which is nearest a driver's seat after division. Therefore the second window is situated on the side of the assistant's seat and the third window is situated on the side of the driver's seat. Furthermore, these screens may replace each other.

A horizontal distance XLM shows a geographical maximum straight line distance which can be displayed in a horizontal direction of a map screen of display 33. A perpendicular distance YLM shows the geographical maximum straight line distance which can display in a perpendicular direction of the map screen of display 33.

A point node NDP is used by program "a calculation procedure of a possible display range" which is described later and is the coordinate value of the node of the guide route which is displayed at the edge of the divided screen.

5. Road Data

FIG. 4 is a diagram illustrating road data in the road data file F4 stored in the information memory unit 37. The road data file F4 includes data related to all roads wider than a predetermined width in the whole areas stored in the map data file. When the number of roads contained in the road data file F4 is n, the road data related to the roads of a number n are stored in the information memory unit 37. Each road data is constituted by road number data, object-of-guide flag, road attribute data, shape data, guide data and length data.

The road number data are discrimination numbers attached to all roads contained in the map data of the information memory unit 37, the roads being sectionalized by the branch points. The object-of-guide flag becomes "1" in the case of a guide road and becomes "0" in the case of a non-guide road. The guide road is the one wider than a predetermined width, such as a main trunk road or a general road, and may be selected as a route. The non-guide road is a road (backlane) narrower than a predetermined width, such as footpath or lane, and is seldom selected as a route.

The road attribute data represent attribute of road such as elevated road, underpass, speedway or toll road. The shape data represent the shape of a road and are constituted by coordinate data of start points and end points of the roads, and of the nodes between the start point and the end point.

The guide data are constituted by intersection name data, caution point data, road name data, road name voice data and connection data. When the end point of a road is an intersection, the intersection name data represents the name of the intersection. The caution point data represent caution points on the road such as railway crossing, inlet of a tunnel, exit of the tunnel, point where the width of the road decreases, etc. The road name voice data are voice data of road names, and are used for a guidance by voice.

The connection data represent a road that connects to the end point of the above-mentioned road, and are constituted by a number k of connections and data of the connections. The data for each connection are constituted by connection road number data, connection name data, connection name voice data, connection direction data and travel guide data.

The connection road number data represent a road number of a connection. The connection name data represent a name of a road that is connected. The connection name voice data store voice data for guiding the name of connection by voice. The connection direction data represent the direction in which the road of connection is headed. The travel guide data include guide data for guiding the driver to enter into the right lane or into the left lane on the road to proceed to a road that is connected, or to travel on the center lane. The length data represent a length from the start point to the end point of a road, lengths from the start point to the nodes, and lengths among the nodes.

6. Overall Procedure

FIG. 5 is a flow chart of the overall procedure executed by a CPU 2 in the navigation device according to the present invention. The procedure starts upon closing the power source circuit and ends upon breaking the power source circuit. The power source is turned on or off as the power source of the navigation device is turned on or off, or as the engine start key (ignition switch) of the vehicle is turned on or off.

First the procedure for initialization is executed (step SA1). in this procedure, a program for navigation is read out from the data 38c of the information memory unit 37, copied into a flash memory 3, and is executed. The CPU 2 clears the general-purpose storage areas in the RAMs, such as work memory of a first RAM 5 and an image memory 10.

Then a present position procedure (step SA2), a destination-setting procedure (step SA3), a route search procedure (step SA4), a guide/display procedure (step SA5) and a other procedure (step SA6) are cyclically executed.

Furthermore a destination-setting procedure (step SA3) and a route search procedure (step SA4) aren't again executed during subsequent cycles when a destination isn't changed or the car doesn't leave a route.

Then a procedure for detecting the present position (step SA2) and the subsequent procedure are executed. The procedure for detecting the present position (step SA2) detects the geographical coordinates (latitude, longitude, altitude, etc.) of an overland moving body, i.e., of a vehicle mounting the navigation device. That is, a GPS receiver 25 receives signals from a plurality of satellites orbiting around the earth, detects coordinate positions of the satellites, times at which the electromagnetic waves are emitted from the satellites and the time at which the electromagnetic waves are received by the GPS receiver 25, and calculates the distances to the satellites. The coordinate position of the vehicle is calculated from the distances to the satellites, to detect the present position of the vehicle. The thus found geographical coordinate data of the vehicle are stored in the RAM 5 as present position data MP. The present position data MP are often corrected by the data input through a beacon receiver 26 or the data transmitter/receiver 27.

In the procedure for detecting the present position (step SA2), furthermore the absolute direction data ZD, relative direction angle data Dθ and the traveled distance data ML are simultaneously found by using an absolute direction sensor 21, a relative direction sensor 22 and a distance sensor 23. The absolute direction data ZD, relative direction angle data Dθ and traveled distance data ML are operated to determine the position of the vehicle. The thus determined position of the vehicle is collated with map data stored in a data 38c of the information memory unit 37, and the present position on the map screen is corrected and is indicated more correctly. Therefore, the present position of the vehicle is correctly indicated even when the GPS signals are not received such as traveling through a tunnel.

In setting the destination(step SA3), the geographical coordinates of the destination desired by the user are stored as inputted destination data TP. For example, a coordinate position is specified by the user on a road map or on a house map shown on a display 33. The destination is selected by the operator from a list of destinations shown on the display 33. Thereafter, a central processing unit 1 stores the data related to the geographical coordinates of the destination in the RAM 5 as inputted destination data TP.

Present position data MP is set as the above guidance beginning point data SP or a node data of the guidable road which is near present position data MP is set. All the terms "beginning" and "begin" in this document are intended to include "starting" and "start". Furthermore, when the car is deviated from the guide route, a optimal route from this deviating position to a end point of guide route is automatically re-searched. This is a auto re-route mode. If this auto re-route mode isn't set, the re-search of the route isn't done. Further when a dropping in place is set, the guide route which goes via the dropping in place is sometimes searched.

In the procedure for guiding and displaying the route (step SA5), the guide route identified by the above-mentioned procedure for searching a route (step SA4) is shown on the display 33 with the present position of the vehicle as a center. The guide route is displayed on the map in a manner that it can be easily discriminated. For example, the guide route and the road other than the guide route are indicated in different colors, so that the two can be discriminated from each other. Furthermore, guide information is sounded by voice from a speaker 13 or is shown on the display 33 at all times, so that the vehicle is allowed to travel favorably along the guide route. The image data of the guide route are the road map data around the present position or are the house map data around the present position stored in the data 38c of the information memory unit 37.

The road map data and the house map data are changed depending upon the conditions such as a distance from the present position to a guide point (destination, place to be dropped in or intersection), a traveling speed of the vehicle, the size of the area that can be displayed, or the switching operation by the user. Near the guide point (destination, place to be dropped in or intersection), the map is shown on an enlarged scale on the display 33. Instead of displaying the road map, a minimum amount of necessary data only may be displayed, such as the guide route, direction of the destination or the place to be dropped in and the present position, but omitting geographical data.

Furthermore as described later the screen of display 33 is divided in two by the operation of the operator or automatically and information of the map etc. is shown. Then various guidance information and road information are shown in these two windows by the procedure and the operation which was independent respectively.

After the guide/display procedure of step SA5, the other procedure (step SA6) is executed. At "the other procedure" of this step SA6, nearest facility procedure is sometimes executed. A dropping in place (the facilities and so on) except the above entry destination data TP is retrieved and is specified by this nearest facilities procedure. Data about this dropping in place is set by using the map or each item information etc. which is displayed in display 33. This nearest facilities procedure is executed as with the destination-setting procedure of the above step SA3.

For example, it is determined whether the traveling position of the car goes along a calculated guide route or not in the above other procedure. Also it is also determined whether the destination is changed or not by the switch operation of the operator and so on. After processing of step SA6, processing is repeated from "the present position procedure" (step SA2). Furthermore when the car reaches a destination, a guide/display procedure of the route is ended and the procedure is returned to step SA2 once again. In this way, the procedure of steps SA2–step SA6 is repeated in order.

7. Guide/display Procedure of a First Embodiment

This guide/display procedure is the procedure to report the information to guide travel the car along the guide route. In other words, a guide route is searched and this searched guide route is shown in display 33. This guide route is displayed for the car to be always at a window center and information about points where the user should turn right or left in the guide route is reported at any time. In this guide/display procedure, various information is reported and is shown at any time. for the car to travel a guide route smoothly.

FIG. 6 shows the flow chart of the guide/display procedure. Firstly it is determined whether a display screen of display 33 is divided or not (step SB2). In the division of the display screen of this display 33, for example, the display screen is long into the width direction, the screen is divided into right and left windows at the about center. Alternatively, a screen may be divided into top and bottom windows. Then an independent map is each other shown at each divided window. In this embodiment, the divided window on the side of the assistant's seat is a second window and the window on the side of the driver's seat is the third window. Therefore in a car with the driver on the right, the left window is a second window, and in a car with the driver on the left, the right window is a second window.

It is determined whether a screen division cancellation was required or not (step SB4), if the screen is divided (step SB2). This request is executed by the operation of the specific switch of touch switch 34. Furthermore the touch switch 34 may be replaced with a push switch etc. which is provided for the lower part of the screen of display 33.

If a cancellation of the screen division is required, "display procedure of a single screen" of the subroutine is executed (step SB6). In the display procedure of the single screen, at the reduced scale of the first window before the division, a map is shown in the whole screen of display 33. This "display procedure of a single screen" is described later in detail. Then "other guide/display procedure" of the subroutine is executed and the flow returns to the overall procedure (step SB8). Each information about the guide route which the car travels is displayed and reported at any time in this step SB8. On the other hand, if the cancellation of the screen division isn't required at step SB4, "display procedure of 3rd screen" of the subroutine is executed (step SB14). This "display procedure of the 3rd screen" is described later.

Further it is determined whether screen division is required or not when the screen of display 33 isn't divided in the above step SB2 (step SB10). The request of this screen division is also based upon a operation of a switch which is set on touch switch 34. When screen division isn't required, "other guide/display procedure" of step SB8 is executed. However when screen division is required, "screen division procedure" of the subroutine is executed (step SB12). In this "screen division procedure", the screen of display 33 is divided at the center and a map or a guidance information which is independent is shown in each respective divided window. This "screen division procedure" is described later in detail.

When "screen division procedure" of step SB12 is executed, subroutine "display procedure of 3rd screen" is further executed (step SB14). In this "display procedure of 3rd screen", a information which is displayed in the third window is changed according to the traveling condition of the car. This "display procedure of 3rd screen" is described later.

Next if a display mode the fore route is selected (step SB16) by the operator, "display procedure of fore route" of a subroutine is executed (step SB18). In this procedure, a guide route which connects with the upper end (crossing point CSP) of the guide route which is displayed in the third window is shown in the second window. This "display procedure of fore route" is described later in detail. Then "other guide/display procedure" of step SB8 is executed and the flow returns to "the overall procedure" of FIG. 5.

On the other hand, "display procedure of whole route (fore)" of the subroutine is executed (step SB22), if a display mode of fore route isn't selected (step SB16) and a display mode of a whole route is selected (step SB20). The selection of the display mode of the whole route is executed by a operation of a specific switch which is set on touch switch 34. When the display mode of whole route isn't selected, "other guide/display procedure" of step SB8 is executed.

In the above "whole route (fore) display procedure", a guide route to the destination which is connected with a upper end of a guide route in the third window is shown in the second window. Furthermore this subroutine "display procedure of whole route (fore)" is described later in detail. After this, "other guide/display procedure" of step SB8 is executed and the flow returns to "the overall procedure" of FIG. 5.

8. Display Procedure of a Single Screen

FIG. 7 shows a subroutine of "display procedure of a single screen". In this procedure, the divided screen of display 33 is returned to a single screen. Firstly the screen condition GJ of RAM 5 is read (step SH2). This screen condition GJ indicates a display condition of a map which is displayed in the divided third window.

For example, when the map displayed in the divided third window (screen) includes a backlane, the information which shows the display condition is memorized as the screen condition GJ in RAM 5. Then a map is shown in the screen in which division is canceled based on this screen condition GJ. Therefore when the map displayed in the divided third window includes a backlane, the map which includes a backlane is shown in the first window after division cancellation (combination). Furthermore, the first window means the whole single screen of display 33 which isn't divided.

If a backlane is included in the map which was displayed in the third window based on the screen condition GJ that was read (step SH4), the reduced scale WDC of the third window of RAM 5 is read (step SH6). Based on the screen condition GJ, a map with reduced scale WDC is shown in the whole screen of display 33 (step SH8) and a map which includes a backlane is shown in the first window which isn't divided.

On the other hand, when the map displayed in the third window doesn't include a backlane, the reduced scale WDA of the first window of RAM 5 is read (step SH10) and a map with reduced scale WDA is shown in the whole screen of display 33 (step SH12) based on the screen condition GJ. Furthermore, when a simple map is displayed at the divided third window, a display condition is memorized as the screen condition GJ. Therefore this simple map is shown in the first window after division cancellation. When screen division of display 33 is canceled in step SH8 or step SH12, the flow returns to the guide/display procedure of FIG. 6.

9. Screen Division Procedure

FIG. 8 is a flow chart of subroutine "screen division procedure" of FIG. 6. In this screen division procedure, the whole screen of display 33 is divided into a second window (screen) and a third window (screen). Furthermore, in this screen division, a memory area of image memory 10 is divided corresponding to the divided screen. Map information which is different from each other is written to each memory area of the divided image memory 10 by image processor 9. The display screen of display 33 is divided into two by this, and different map information is shown in both windows. Furthermore in this embodiment, the screen was divided approximately in the center but may be divided in the right side of the center or in the left side of the center.

At the beginning of the screen division procedure, the display condition of the first window (screen), i.e. the screen before the division is detected (step SC2), and if the road map which includes a backlane in the first window is displayed (step SC4), a road map which excludes a backlane in the second window (screen) (a window on the side of a passenger's (an assistant's) seat) after the division is shown (step SC6). A road map which is the same as the one in the first window before the division is shown in the third window (screen) (the window on the driver's side) after the division (step SC8). Here a road map which includes a backlane is shown in the third window.

On the other hand, when a road map displayed in the first window before the division doesn't include a backlane, a road map which includes a backlane is displayed in the second window (a window on the passenger's (assistant's) side) (step SC18) and a road map which doesn't include a backlane is displayed in the third window (step SC20). In this way, a different map from the one in the first window before the division is displayed in the divided second window and the same map as the one in the first window before the division is shown in the divided third window.

After this, a display condition of the road map which is displayed in the third window is memorized as the screen condition GJ in RAM 5 (step SC10). If a road map which includes a backlane is displayed in the third window, the data which indicates a condition is set as the screen condition GJ. Furthermore as this screen condition GJ, a display condition of the simple map or a display condition of figure which shows only a turning direction to the right or left and so on are also set.

Also when a road map except the simple map is displayed in the third window, the geographical coordinate of the guide route which breaks off at the edge of the screen is detected and is stored as crossing point CSP in RAM 5 (step SC12). Furthermore, this crossing point CSP designates a point ahead of the present position of the car on the guide route and a point in the guide route which breaks off from the displayed map in the third window. All the terms "front" in this document are intended to include "ahead", "fore" and "forward".

Then a reduced scale of the first window before the division is stored as "the reduced scale WDA of the 1st screen" to RAM 5 (step SC14) and is copied as "the reduced scale WDB of the 2nd screen" and "the reduced scale WDC of the 3rd screen" to RAM 5 (step SC16). Immediately after the screen of display 33 is divided, a map with the same reduced scale is shown in the second window and the third window. If each reduced scale of the second window and the third window is changed, each value of reduced scales WDB and WDC is changed. After this, the flow is returned to the guide/display procedure of FIG. 6.

FIG. 9 shows the map of display 33 before the division, i.e. the first window. Symbol 100 in this map designates the present position and a traveling direction of the car. Only the principal turnpike 102 is shown in this screen 104. Symbol 130 shows the direction north which is an absolute azimuth and a numerical value "132" of this symbol 130 indicates a reduced scale of the map which is displayed in the screen 104. This FIG. 9 shows that a reduced scale is 1/400 in numerical value 132.

FIG. 10 shows the display screen 104 of the display 33 divided into the right and the left (third and second) windows (screens). The symbol 112 of FIG. 10 designates a present position and a traveling direction of the car. A principal turnpike 102 and a backlane 116 are displayed in a second window 108 and only principal turnpike 102 is shown in a third window 110. In this way, the same road map as in the 1st screen before the division is shown in the third window.

The symbols 134 and 138 of FIG. 10 designate the direction north of a absolute azimuth, numerical value 136 shows a reduced scale of the second window, numerical value 140 shows a reduced scale of the third window and numerical value 136 is stored as a table. Furthermore in the division procedure of the above screen, a different map from the one in the third window is displayed in the second window but the same map as the one in the third window may be shown in the second window.

10. Display Procedure of Third Window

FIG. 11 is a flow chart of a subroutine of "display procedure of 3rd screen" of FIG. 6. In this "display procedure of 3rd screen", a reduced scale of a road map which is displayed in the third window is changed.

Firstly if a distance between a present position of the car and a next turning point to the right or the left in the guide route becomes less than a specific value (the car approaches a next turning point in the guide route—step SD2), a simple map of a turning direction to the right or the left of the present traveling direction of the car is shown in the third window (step SD4). The data which indicates a display condition of this third window is stored as the screen condition GJ in RAM 5 (step SD22). After this, the procedure is returned to the flow chart of FIG. 6.

Further if a change of a reduced scale of the map which is displayed in the third window (screen) is required, when a distance between the car and a next turning point of the right or the left becomes more than a specific distance (step SD6), a map with changed reduced scale is displayed in the third window and the changed reduced scale is stored as "the reduced scale WDC of the 3rd screen" in RAM 5 (step SD8). The change of this reduced scale is executed by a operation of a specific switch which was provided for in touch switch 34. When a road map which includes a backlane in the third window is displayed before change of this reduced scale, if the reduced scale is changed such that the backlane is insufficiently displayed, a road map which excludes the backlane is shown in the third window.

After this, if a speed of the car is less than a specific value (0 Km (stopped) or a small value Km (very slow speed) per hour) (step SD10), a road map which includes the backlane is shown in the third window (step SD12). If a speed of the car is more than the specific value, a road map which excludes the backlane is shown in the third window (step SD14).

After this, if the car moves a specific distance (step SD16), "scroll procedure of screen" of a subroutine is executed (step SD18). In this scroll procedure of screen, a displayed map is scrolled to maintain the present position of the car shown in the center of the third window. After the screen is scrolled (step SD18) or the car doesn't move the specific distance (step SD16), a geographical coordinate in a edge of the screen of the guide route which was displayed in the third window is detected (step SD20). In other words, the guide route which is displayed in the third window breaks off in the edge of the screen and this breaking point is detected.

A coordinate value of this detected point is stored in RAM 5 as crossing point CSP and data which shows a display condition of the third window is stored in RAM 5 as the screen condition GJ (step SD22). After this, the procedure is returned to the guide/display procedure of FIG. 6.

11. Display Procedure of Fore Route

FIG. 12 is a flow chart of a subroutine "display procedure forward of route" in the guide/display procedure of FIG. 6. In this display procedure of fore route, a remaining guide route which continues from the guide route, which was displayed in the third window is shown in the second window.

Firstly if the map which is displayed in the second window is not in the display condition of the fore route (step SE2), it is determined whether a front display was required or not (step SE12). This request of front display is executed by a operation of a specific switch which was provided for touch switch 34.

If the front display isn't required (step SE12), this "display procedure of fore route" is ended and procedure is returned to the guide/display procedure of FIG. 6. On the other hand, if the front display is required (step SE12), calculation procedure of possible display range is executed (step SE8).

Further if a change of the reduced scale isn't required (step SE4) when the second window is not in a condition of the front display (step SE2), calculation procedure of possible display range is executed (step SE8). If a reduced scale change is demanded (step SE4), the value of the data with "reduced scale WDB of the 2nd screen" of RAM 5 is changed (step SE6). Furthermore, this change of reduced scale also is executed by a operation of a specific switch which was provided for touch switch 34.

Point node NDP is found by the calculation procedure of possible display range and a guide route is shown in the second window using this point node NDP and crossing point CSP. Furthermore, the point node NDP is a value of a geographical coordinate of a end point of the guide route which it is possible to show by the above reduced scale WDB.

In other words, a guide route to point node NDP is shown from crossing point CSP on the map which is displayed in reduced scale WDB.

A halfway point of each east longitude coordinate of crossing point CSP and point node NDP is located on a central perpendicular line of the second window and crossing point CSP is situated on the bottom tip of the screen. A road map which includes the guide route is shown in the second window (screen) (step SE10). When a remaining (forward) portion of the guide route which was displayed in the third window is displayed in the second window in this way, the flow is returned to the guide/display procedure of FIG. 6.

12. Calculation Procedure of Possible Display Range

FIG. 13 is a flow chart of subroutine "calculation procedure of a range . . . " which was called in step SE8 in FIG. 12. Firstly a geographical range of a map which can be displayed in the second window in reduced scale WDB is calculated (step SF2). Here in the case that a map with reduced scale WDB is displayed in the second window, a straight line distance in a horizontal direction of a screen map which is possible to show on the screen is calculated and stored in RAM 5 as horizontal distance XLM. Similarly a straight line distance in a perpendicular direction of a screen map which is possible to show similarly is calculated and stored in RAM 5 as perpendicular distance YLM.

Next the procedure of step SF6-SF10 is repeated until a condition of step SF12 is satisfied. By this procedure, the crossing point CSP of the guide route is made as a start point and the guide route is effectively shown in the second window. In other words, if crossing point CSP is a basic point, the guide route which is possible to show by the reduced scale WDB is in a area of a rectangle which is composed of the above horizontal distance XLM and perpendicular distance YLM.

And then, it is checked in order whether a coordinate value of each node on the guide route is in a square composed of the crossing point CSP as one of angles and surrounded by horizontal distance XLM and perpendicular distance YLM. Therefore value N with the number of times of step SF4 indicates a N-th node on the guide route of which a start point is the crossing point CSP. Then each procedure of step SF4 to SF22 is repeatedly executed based on value N with the number of times that is increased one by one.

Moreover value N with the number of times is initialized by "1", interval XN is initialized by "0" and the coordinate value of the east longitude of crossing point CSP is stored as the horizontal XP (step SF4). Next a coordinate value of the N-th node of the guide route which connects with crossing point CSP is read from road data file F4 and node data file F3 and is stored in RAM 5 as point node NDP (step SF6). A value of a north latitude of crossing point CSP is subtracted from a value of a north latitude of this point node NDP and this subtraction result is stored in RAM 5 as perpendicular value YM (step SF8).

Moreover a value of the above horizontal XP is subtracted from a east longitude value of point node NDP and an absolute value with the subtraction value is stored in RAM 5 as horizontal value XM (step SF10). Next if the horizontal value XM is bigger than interval XN (step SF12), a value with horizontal value XM is substituted for interval XN (step SF14).

On the other hand, when the horizontal value XM is less than the interval XN, a east longitude value of a (N−1)-th node of the guide route is stored as the horizontal XP (step SF20). Then interval XN is cleared to 0 (step SF22). At these steps SF12, SF20 and SF22, it is detected that the guide route curves to a direction of east and west.

In other words, the crossing point CSP is displayed in a lower edge of the second window and when the guide route has a curve part to the direction of east and west, the guide route which includes the curve part must be efficiently shown in the second window. Therefore the curve part of the guide route is made as a new basic point (the horizontal XP) and the point node NDP which is the end of the displayed guide route is retrieved in order.

Next, the horizontal value XM, perpendicular value YM, each horizontal distance XLM and perpendicular distance YLM which is found by the above steps SF8 and SF10 are compared to each other as follows.

$$XM > XLM \quad (A)$$

$$0 > YM > YLM \quad (B)$$

In other words, it is determined that the horizontal value XM is bigger than the horizontal distance XLM by expression (A). Further it is determined that the perpendicular value YM is smaller than "0" or is bigger than the perpendicular distance YLM by expression (B).

If the expression (A) or (B) is true, the procedure of steps SF6 to SF22 is ended. Then the flow returns to the display procedure forward of the route of FIG. 12. However if neither expression (A) or (B) isn't true, "1" is added to the value N and a next node of the guide route is processed (step SF18).

By the procedure of above steps SF6 to SF22, the crossing point CSP is made as a start point and the coordinate value of a point of a end of the guide route which is efficiently displayed in the second window is stored as point node NDP.

Furthermore a part of the crossing point CSP of the guide route which is displayed in the second window points to a perpendicular direction.

FIG. 14 shows the second window in which a fore part of the guide route is displayed by the display procedure of fore route of FIG. 12. A guide route 144 of the second window is connected with the crossing point CSP of the guide route 146 which is displayed at third window 110. Then when the road map which includes the guide route 144 is displayed in the second window by reduced scale WDB, a point on the guide route which can be displayed is point node NDP. Further a curve part 148 to a direction of east and west of the guide route is detected by steps SF12 to SF22 in the FIG. 13. In other words, an east longitude value which is stored newly as the horizontal XP by the step SF22 is a coordinate of this curve part 148.

13. Display Procedure of Whole Route

FIG. 15 shows the subroutine of the display procedure of whole route (front) at FIG. 6. In this procedure, all of the remaining guide route to a destination which continues from crossing point CSP at a end of the guide route which is displayed in the third window is shown in the second window. Moreover a display reduced scale can be changed and a wider road map which includes the remaining guide route can be shown in the display procedure of whole route (fore).

Firstly, if a whole route is displayed in the second window (step SG2), it is determined whether a reduced scale change is required or not (step SG4). This reduced scale change is executed by a operation of a specific switch which is provided for touch switch 34 by a user.

When the reduced scale change is required, a value with reduced scale WDB is changed (step SG6) and a map is shown in the second window at the changed reduced scale WDB (step SG8). Furthermore, when this reduced scale becomes bigger and a whole guide route to a destination from the crossing point CSP cannot be displayed in the second window, the procedure which is the same as the display procedure of FIG. 12 is executed. In other words, a display position of the guide route is adjusted and the guide route is most efficiently shown in the second window.

Also when the reduced scale change isn't required (step SG4), the procedure of FIG. 15 is ended and the program returns to the guide/display procedure of FIG. 6. Moreover when the whole route isn't displayed in the second window (step SG2), it is determined whether a display of a whole route is required or not (step SG10). The request of a display of a whole route is executed by a operation of a specific switch which is set to touch switch 34.

When the display of the whole route isn't required, the procedure of FIG. 15 is ended and the program returns to the guide/display procedure of FIG. 6. On the other hand, when the display of the whole route is required, in a each node of the guide route from the crossing point CSP to a end point of guide route data ED, maximum latitude, minimum latitude, maximum longitude and minimum longitude are detected (step SG12). A reduced scale at which all this maximum latitude, the minimum latitude, the maximum longitude and the minimum longitude can be held in the second window is found (step SG14). In the calculation of this reduced scale, a change table of a numerical value which was beforehand determined for may be used.

A road map which includes the guide route by the found reduced scale is displayed in the second window (step SG16) and the reduced scale which was found by the step SG14 is stored in RAM 5 as "reduced scale WDB of the 2nd screen" (step SG18). After this, step SG4 is executed to determine if a change procedure to reduce the scale is required.

FIG. 16 shows the second window 108 where the guide route from crossing point CSP to destination 152 is displayed by the display procedure of this whole route (forward). In this way, in the display procedure of the whole route (forward), a whole guide route in front of the crossing point CSP which is a end of the guide route of the third window is shown in the second window.

When instructing to divide a screen at the above embodiment, map information which is necessary to travel is displayed in the third window and map information which is less necessary to travel is shown in the second window. For example, when the car approaches intersection to turn right or left, information which indicates direction to turn right or left is more necessary than information of the whole guide route, and thus information which indicates a turning right or left direction is shown in the third window. Then road information which isn't so necessary is shown in the second window. Here a general road map which includes the guide route is shown in the second window.

Further when the car isn't approaching a point to turn right or left, the map which includes a backlane and the map which doesn't include a backlane are automatically shown. For example, when a speed of the car exceeds a constant value, as for the road map which includes a backlane is not important to a driver, therefore a road map only for the main turnpike is displayed in the third window and a road map which includes a backlane is shown in the second window.

Furthermore the third window in the above embodiment is situated on a right of the divided screen of display 33 in a right driver car and is situated on a left side of the divided screen of display 33 in a left driver car. The third window is a divided screen near the driver.

Therefore guidance information with a higher importance is displayed with priority at a divided screen near a driver and supplementary guide route information is shown in a divided screen near an assistant's seat. Furthermore, a map at a north up may be shown in addition to the map of the head up in the first, the second and/or the third window of the above embodiment. In the head up, a direction of a travel by the car always points up in the screen map and in the north up, the direction north always points up in the screen map.

FIG. 17 shows the simple map which is displayed in the screen of display 33. A symbol 120 which designates the absolute direction (north based on terrestrial magnetism), a symbol 126 which designates the present position of the car, an arrow 122 which designates a direction to the destination, and characters 124 which designates a distance to the destination are shown in screen 104. Such a simple map may be shown in either of the first, the second and/or the third window.

Furthermore, this simple map isn't limited to the one of FIG. 17, e.g. a traveling direction of the car may be always point up in the screen 104. In this case, a symbol 120 which designates the absolute direction is turned on screen 104 according to relative azimuth data D$\theta$.

FIG. 18 shows a part of a circuit composition of the above image processor 9 which is inserted between image memory 10 and display 33. When the screen of display 33 is divided like FIG. 10, the circuit of this FIG. 18 is also used. An output terminal of image memory 10 is connected with a palette RAM 204 and a palette RAM 208 in parallel and a same image data is input to the palette RAM 204 and the palette RAM 208. An output terminal of palette RAM 204 is connected with a terminal 222 of digital switch 214, an output terminal of palette RAM 208 is connected with a terminal 224 of switch 214 and an output terminal of switch 214 is connected with a digital/analog converter (DAC) 218.

An analog video signal which is output from DAC 218 is input to a display control circuit of the display 33 and a control signal to drive a liquid crystal display is generated. A control signal 202 of image processor 9 is input to image memory 10. A switching control signal 216 of digital switch 214 is generated by image processor 9.

Furthermore although it isn't illustrated, the other circuit of the image processor 9 is connected with the palette RAM 204 and 208 and data of a change table is written. Data of a change table which is, written in the palette RAM 204 and data of a change table which is written in the palette RAM 208 are different each other and this different part is data about a display color of the backlane. For example, data in which a color of the backlane is different from a background color of the screen is stored at the change table of the palette RAM 204 and data a color of the backlane is the same as or resembles the background color of the screen and is stored at the change table of palette RAM 208.

A color of the other one which was displayed in the map is made identical almost by the change table of each palette RAM 204. Digital image data which is read from the image memory 10 is changed into serial/parallel and input to address terminals of the each palette RAM 204 and 208. A digital color signal which is output from palette RAM 204 and 208 is input to switch 214 and the switching control of this switch 214 is done by image processor 9. When this switching is done in a division part of the second window 108 and the third window 110 and image data of the second window 108 is read from image memory 10, the switch 214 is switched to the palette RAM 204. Therefore a color signal which is output from palette RAM 204 is input to DAC 218.

Also when image data of the third window 110 is read from image memory 10, the switch 214 is switched to the palette RAM 208. As mentioned above, data which displays the backlane is written in the change table of the palette RAM 204 and data which does not display the backlane is written in the change table of palette RAM 208. Therefore to be shown in FIG. 10, the backlane is displayed in the second window 108 and the backlane isn't shown in the third window 110.

Furthermore palette RAM 204 and 208 are shown in FIG. 18 respectively as single RAMs but each of these palette RAMs is composed of three palette RAMs, red, green and blue.

14. Guide/display Procedure of Second Embodiment

FIG. 19 is a flow chart of the guide/display procedure of the a second embodiment. In this second embodiment, as with the a first embodiment, the display screen of display 33 is divided, an image with north up is shown in one of screens which are divided and an image with head up is shown in the other screen. In the north up map, north is always at the top of the screen and in the head up map, the direction of travel by the car is always at the top of the screen.

In the procedure of FIG. 19, first, if display of a sketch is chosen by the user (step SK2), a sketch (rough map) is shown in the whole screen of display 33 (step SK16). This sketch is the same as the a first embodiment and is shown in FIG. 17. A direction of this sketch display is executed by a operation of a specific switch of touch switch 34. When the sketch display isn't chosen (step SK2)and if the division display of the screen isn't selected (step SK4), the other guide/display procedure of step SK18 is executed. Various information about the guide route where the car travels is displayed and reported at any time at this step SK18.

On the other hand, when the division display of the screen is selected (step SK4), a display condition of the first window (screen) before the division is detected (step SK6). This display condition indicates the north up screen or the head up screen and so on. When the head up map is displayed in the first window before the division, the north up map is displayed in the second window (step SK8) and the head up map is shown in the third window (step SK10).

Further when the head up map isn't displayed in the first window before the division (step SK7), the head up map is displayed in the second window (step SK12), and the north up map is displayed in the third window (step SK14). The map which was displayed before the division is always shown in the third window. Then the map which is different from the third window is shown in the second window. After this, the other guide/display procedure is executed (step SK18), the subroutine of FIG. 19 is ended and the flow is returned to the overall procedure of FIG. 5.

Furthermore, as with the a first embodiment, about the second window and the third window, the divided screen on the driver's side is the third window and the divided screen on the assistant's side of the car is the second window.

FIG. 20 shows a divided screen of this a second embodiment. A head up map is shown in the first window before the division as shown in FIG. 9. When instructing to divide the screen, the north up map is displayed in the second window 108 with a symbol 120 which shows an absolute azimuth of north pointing up and a symbol 100 which shows the direction of travel by the car (in the second window the symbol 100 points to the left).

Also the head up map is displayed in the third window 110 and a symbol 100 which designates the direction of the traveling by the car points up in the third window. A symbol 122 which designates a northern direction points to the right in the third window.

15. Guide/display Procedure of the Third Embodiment

FIG. 21 is the flow chart of the guide/display procedure of the third embodiment. In this third embodiment, an identical start is made to the procedure as in the second embodiment. In this third embodiment, the display screen of display 33 is divided, the map which was displayed before the division is shown just as it is in one of the screens which are divided and the sketch is shown in the other screen.

When a sketch display is first chosen (step SK2) in the procedure of FIG. 21, the sketch is shown in the whole screen of display 33 (step SK16). This sketch is the same as the a first embodiment and is shown in FIG. 17. The direction of this sketch display is executed by a operation of the specific switch of touch switch 34.

When the sketch display isn't chosen (step SK2)and if the screen division isn't selected (step SK4), the other guide/display procedure of step SK18 is executed. Various information about the guide route which the car travels is displayed and reported at any time in this step SK18.

On the other hand, when screen division is selected (step SK4), the display condition of the first window before the division is detected (step SK6), when the head up map is displayed in the first window, the head up map is displayed in the second window (step SK20) and the simple map of FIG. 17 is shown in the third window (step SK24).

Further when the head up map isn't displayed in the first window before the division, the north up map is displayed in the second window (step SK22) and the simple map like FIG. 17 is shown in the third window (step SK24). In other words, the map which was displayed in the first window before the division is always shown in the second window and minimum guidance information like the direction of the destination and so on is shown in the third window. After this, the other guide/display procedure is executed (step SK18), the subroutine of FIG. 21 is ended and the flow is returned to the overall procedure of FIG. 5.

Furthermore, as with the a first embodiment, about the second window, the divided screen on the side of the driver's seat is the third window and the divided screen on the side of the assistant's seat is the second window.

16. Guide/display Procedure of the Fourth Embodiment

FIG. 22 is a flow chart of the guide/display procedure of the fourth embodiment of this invention. At this embodiment, in addition to the guide route which is identified first, another guide route is searched newly according to the request of the operator (the user). Then the newly found guide route and the earlier found guide route are shown in two respective windows. Also still another guide route search is performed when instructed to do a further search, and the newly identified guide route is shown in one of the screens along with one of the previous guide routes being shown in the other screen. Therefore the previous route, the new route or plural routes can be compared on the divided screen and the operator can select the desired guide route.

In the flow chart of FIG. 22, firstly, it is determined whether the screen of display 33 is divided or not (step SL2). If it is in a division condition, a different guide route which is searched independently is showing in each window. When a decision of the guide route isn't inputted even if a re-search is ordered by the operator at this embodiment, the whole subroutine of FIG. 22 is repeated, the division condition of the screen of display 33 is maintained until a operation of a decision of the guide route is done by the operator. In other words, when the decision of the guide route by the operator isn't done after the re-search is ordered, the procedure of FIG. 22 is once ended and the flow is returned to the main procedure of FIG. 5, if the subroutine of FIG. 22 is again called, the procedure which was executed just before is repeated once again.

When the search of another route isn't ordered (step SL4) if the screen isn't divided (step SL2), "the other guide/display procedure" is executed (step SL38). At "the other guide/display procedure", based on the guide route which was found first or the chosen guide route with re-search, various sound information and image information are output for the driving guidance. After this, the guide/display procedure of FIG. 22 is ended and the flow returns to the overall procedure of FIG. 5. The instruction for the search for another route is executed by a touch by the operator to a icon "the re-search" or "another route" etc. which is displayed in display 33.

On the other hand, in case of the instruction for the search of the another route (step SL4), number N of the routes is initialized by "1" (step SL6). The number N of routes means the number of the identified guide routes. Furthermore for example, the searching instruction for another route is made when an operator touches a button 160 "another route" (FIG. 23) which is displayed in the screen of display 33. Then in response to the instruction to search another route, a guide route from the present position of the car to the destination is newly searched (step SL8). This searched another guide route is different from the presently displayed guide route.

In the searching of another route of this step SL8, a procedure like the route search procedure of FIG. 5 is executed. The route which connects from the present position of the car to the end point of guide route using each road data and each intersection data which is stored in information memory unit 37 is searched. For example, when the car is on a guidable road, an intersection in the end of the guidable road is retrieved based on the road data and the intersection data. Then the next intersection which approaches the destination is retrieved and the road which reaches a destination by the shortest distance is searched from each road which connects from this intersection, this procedure is repeated until the guide route is searched.

Here the searching procedure of the guide route is simply explained. Information about the road is stored, for example, as 1 unit for a road which links between of two forks (intersection etc.), in information memory unit 37 (FIG. 4). The information of each road includes length data of the road, shape data which indicates the direction etc. of the road and road attribute data which indicates the classification etc. of the road. Therefore a searching cost to convert to a length of the road based on these data values is set. For example, the wider the width of the road is, the smaller the value of searching cost. For example if the number of lanes of the road is 3, the searching cost is "10" and oppositely if the number of the lanes is 1 the searching cost is "30". Therefore the searching cost becomes small when the road width is wide, and the searching cost becomes big when the road width is narrow.

Similarly a searching cost is also set to the road attribute data, the shape data and so on. The direction (the geographical direction) of the connection at this road is determined by the connection direction data which is included in the previous road data connecting with this road. Therefore the more accurately this connection direction data points to the destination, the smaller the searching cost becomes. Further the searching cost may be also set based on whether the road is a local road, a municipal road, a national highway and so on, and the type of road may be primarily selected.

Furthermore, in the computation of this searching cost, a beforehand set table for the numerical value calculation can be used. In case of above-mentioned number of the lanes, a numerical value correspondence table setting the searching cost at "10" for 3 lanes and the searching cost at "30" for 1 lane, is stored in information memory unit 37 or in ROM 4.

Thus the searching cost which corresponds to the value of the attribute, the connection direction of the road and so on respectively is found in each corresponding table. The total of these found searching costs is the searching cost (hereinafter—total searching cost) of this road. Furthermore, the length of the road may be used as the searching cost just as it is or may be multiplied by a coefficient. In the latter case, a coefficient value is multiplied by a road length value and the result is made a searching cost for length. Furthermore this coefficient may be also calculated by finding the numerical value from a table according to the length of the road as stored in the information memory unit 37 or the ROM 4.

For example, coefficient "1.0" is given if the length of the road is less than 10 km, a searching cost with the length is 10×1.0=10. Coefficient "3.0" is given if the length of the road is longer than 10 km and is less than 20 km and the searching cost with this length becomes 20×3.0=60. In this way, a coefficient according to the length of the road is given in order and a comparison of a size with searching cost according to a relative length with distance becomes easy. Furthermore, these values are one example and this invention isn't limited to these numerical values and the calculation of these searching costs may be executed using any other suitable computation expression.

In this way, the total searching cost of each road is calculated. Then the total searching cost of each of the roads connected from the beginning point (the node or the intersection) of the searching is found if the number of such roads is more than one. Then the found value of the total searching cost of the each road is added to calculate the total searching cost of the searched route. The route which has the smaller total searching cost is selected as the optimal route.

A road with the smallest total searching cost is selected in the same way as the road which connects with this selected road. The route which continues from the starting place (guidance beginning point) to the destination (guidance ending point) which is searched in this way is stored in RAM 5 as the guide route data MW. In above-mentioned case, the roads which are pointed to the destination and are wider are primarily selected.

Also when a road is connected to another at an intersection by turning right or left, the searching cost of the route may become bigger. By this additional cost, turning right or left at intersections is excluded from the guide route as much as possible. Similarly the searching cost may fluctuate with the existence or non-existence of the traffic signal in the intersection or the existence or non-existence of the name of the intersection and so on. For example, the searching cost value at an intersection which does not have a traffic signal is bigger than at an intersection which has a traffic signal.

Therefore an intersection which can be passed more smoothly is primarily selected in the guide route. Furthermore in above-mentioned explanation, the total searching cost of the road in the better condition becomes smaller. Alternatively, the total searching cost of the road in better condition may become bigger. In this case, the searching cost value of the shorter road becomes bigger and the coefficient value which is multiplied by the value of length is in inverse proportion to the value of length. Similarly the searching cost of the wider road becomes bigger.

For example, coefficient "3.0" is given if the length of the road is less than 10 km and a searching cost with the length of the road is made 10×3.0=30, coefficient "0.1" is given if the length of the road is longer than 10 km and is less than 20 km and a searching cost with the length of the road is made 20×0.1=2. In this case, the searching cost of the road with short length becomes big.

Furthermore when the car is not on a guidable road, a node on a guidable road which is within a specific distance and is near to the car is selected as the searching beginning point. If more than one node of a guidable road is near to the car, the node which is nearest to the destination is selected as the guidance beginning point. This is the same in the searching procedure of another route of step SL8 (FIG. 22) and the route search procedure (FIG. 5) of step SA4.

Also the road of the guide route which was searched in the route search procedure of FIG. 5 or the guide route with guidance at present is not selected as when another possible route is available as the new guide route in the above step SL8. For example, a newly searching cost is added to the road which is already used for the previous guide route, numerical value with searching cost "50" is added extra-to each road which composes the guide route which was searched with the route search procedure of FIG. 5. Therefore the selection of the road which is already used as the guide route becomes difficult in searching of a newly guide route.

The new guide route which was searched at the step SL8 in this way is stored in the RAM 5 as the N-th guide route. The display screen of display 33 is divided into the right and the left (step SL10), a divided screen on the left side is referred to as a second window and a divided screen in the right is referred to as a third window.

Then the N-th guide route which is identified by the above step SL8 is displayed in the second window (step SL12) and (N−1)-th guide route is shown in the third window (step SL12). This (N−1)-th guide route is the first guide route which was identified in the route search procedure of FIG. 5 or the present guidance route wherein N−1=0. For example, the route of this N=0 is the route which was searched when the destination and so on are set before guidance began by the navigation system, is a new guide route which was re-searched and selected by the guide/display procedure of FIG. 22 or is the route which was re-searched during the present travel and guidance.

But when the re-searching of the guide route is repeated, the latest guide route is shown in the second window and a guide route searched immediately before the latest one is shown in the third window.

Next when a icon, i.e. a return key "RETURN", which is displayed in display 33 is pushed (step SL16), each of the guide routes which is displayed in the second window and the third window is turned into the previous guide route respectively.

By the way, after the searching instruction of another route in the guide/display procedure of FIG. 22 is repeated, a N guide route is searched. Then as mentioned above, the latest N-th guide route is displayed in the second window and (N−1)-th guide route is shown in the third window.

When the return key is pushed in this condition, (N−1)-th guide route is displayed in the second window and (N−2)-th guide route is shown in the third window. By this, after the return key is pushed, the display condition of display 33 is returned to the previous one. This procedure may be executed by steps SL12 to SL20 more than one time.

That is, the number N of the routes is reduced by 1 (step SL18) and when the number N of the routes isn't smaller than "1" (step SL20), the procedure returns to the step SL12 again and the searched previous guide route is displayed in the second window and the former guide route which was searched before the previous one is shown in the third window.

Reversely when a value of the number N of the routes is smaller than "1" (step SL20), there is no identified route which is older than the guide route of N=0. Therefore the first route which was searched with the route search procedure of FIG. 5 or the present guide route is selected (step SL22). In this case, the division of the screen is canceled and the map which was displayed before the division is shown without changing a reduced scale (step SL23). After this, the other guide/display procedure is executed (step SL38) and the guide/display procedure of FIG. 22 is once ended.

Furthermore when the number N of routes becomes smaller than "1" (steps SL22 and SL23), another route which was re-searched at first may be displayed in the second window and the previous route may be shown in the third window. In this case, when either of the displayed routes of the second window and the third window is selected, the division of the screen is canceled.

Furthermore, when a screen is divided and the subroutine of the guide/display procedure of FIG. 22 is called, the procedure of step SL16 is also executed. In other words, it is determined whether the return key is pushed or not when a screen is divided or whether a route decision key which is described later is pushed or not. In case of the instruction for the searching of another route, the screen of display 33 is divided. Here this division condition is continued until the guide route of the second window or the third window is chosen by the operator, or the "RETURN" key is repeatedly pushed and the number N of the routes becomes "0".

However this division is canceled, a divided screen is combined and guidance procedure is executed by the guide route when a guide route is chosen or "RETURN" is repeatedly pushed until number N of routes become "0".

Furthermore the guide/display procedure of FIG. 22 is repeatedly executed until the car reaches a end point of guide route. But a searching instruction for another route is permitted only when the car stops and goes slowly.

Several N of routes are added by "1" (step SL24) when a return key, i.e. "RETURN" key isn't pushed in the step SL16 and another route key is pushed (step SL28). Then a new guide route is searched once again and a searched new guide route is stored in RAM 5 as the N-th guide route (step SL26). Furthermore also in case of searching of the guide route of this step SL26, the road which was previous used as the guide route is made difficult to be chosen. In other words, when a road with the smaller total searching cost is selected, a newly searching cost is added to the road which was already selected as the road which composes a guide route. Plural guide routes which are composed by the different roads are searched.

Further the searching condition of the guide routes in this step SL8 or SL26 may be different from the searching condition of the first guide route. For example, the 1st guide route takes in a toll road (the expressway) primarily, the 2nd guide route doesn't use a toll road at all. Also the 1st guide route has the shortest distance to the destination and the 2nd guide route takes in a wide road primarily. In this way, in case of the repeated searching of a guide route, a searching condition of each route is changed.

The guide route which is searched by the step SL26 is displayed in the second window and the guide route which was displayed in the second window is shown in the third window (step SL12). Furthermore, in the third window, the guide route which is searched first by the route search procedure of FIG. 5, or the guide route with guidance at present may be always shown. In other words, the latest guide route which is searched every time "another route" key is pushed is shown in the second window. On the other hand, the route with guidance at present is always shown in the third window. Therefore the previous guide route and the re-searched new guide route can be directly compared.

Furthermore, when number N of the route is "1", a route except the guide route which is searched with the route search procedure of FIG. 5 is shown in the third window. In other words, when the route which was searched newly at the guide/display procedure of FIG. 22 is selected as the guide route, this new guidance road is referred to as a basic guide route. While guiding according to the new guide route by the searching of another route, when instructing to search the another route once again, this new guide route is shown in the third window.

"The other guide/display procedure" of the step SL38 is executed and the procedure of FIG. 22 is ended if another route key isn't pushed in the step SL28 of FIG. 22 and a route decision key (icon) isn't pushed (step SL30). Reversely when a route decision key is pushed, which of the guide route (icon) of the second window or the third window was chosen is determined (step SL32). If the guide route of the second window is chosen, the screen division of display 33 is canceled. Then the guide route which was displayed in the second window is shown in the single screen (the first window) after division cancellation (step SL34). Then "the other guide/display procedure" is executed and information according to the chosen guide route is displayed and reported and so on (step SL38).

Also when the guide route of the third window is chosen, screen division by display 33 is also canceled. Then the guide route of the chosen third window is shown in the combined single screen (step SL36). Moreover "the other guide/display procedure" is executed and information according to the chosen guide route is displayed and reported and so on (step SL38). After this, the procedure of FIG. 22 is ended and the procedure is returned to the flow chart of FIG. 5.

FIG. 23 shows the display screen of display 33 before the division. The first guide route 162 which is searched by the route search procedure of FIG. 5 is shown in screen (first window) 104, the symbol loo which designates the present position and the direction of the traveling of the car which is traveling on this guide route 162 is shown and icon 160 of "another route" which is the object of determination of the step SL4 is shown in screen 104.

FIG. 24 shows the divided screen of display 33 and shows the screen of the display 33 immediately after the process of the step SL8 of FIG. 22 executed for the first time. The new guide route 170 which is searched by the route search procedure of the step SL8 is shown in the second window 108, the guide route 162 which is displayed in FIG. 23 is shown in the third window 110. Further icons 164, 166 and 168 are shown in the second window 108 and the third window 110. Icon 164 designates "another route". Icon 166 designates "route decision" key the operation of which is determined in step SL30. Icon 168 designates the "RETURN" key the operation of which is determined in the step SL16, i.e. a return key.

FIG. 25 shows the display screen of display 33 immediately after execution in the procedure of the step SL26 of FIG. 22. The guide route 172 which was searched newly by step SL26 is shown in the second window 108. The guide route 170 which was displayed in the second window of FIG. 24 is shown in the third window. Furthermore, icons 164, 166 and 168 are the same as the icons of FIG. 24.

FIG. 26 shows the screen of the display 33 which is returned to the single screen by the step SL36 of FIG. 22. For example, screen division is canceled when icon 166 is pushed in the FIG. 25 and the guide route 170 of the third window 110 is chosen. The guide route 170 is shown in whole single first window 104. Furthermore, icon 160 is also shown in the screen 104 after this screen division cancellation.

The route which is displayed in each of the second windows and the third windows at the fourth embodiment may be freely selected. In other words, when N routes are searched, optionally one of the N routes is shown in the second window. Likewise another optional one of the N routes may be shown in the third window.

Moreover the route which is displayed in the second window or the third window may be fixed, for example, the previous route immediately before another route is re-searched may be always shown in the third window. The reduced scale of the map which is displayed in the second window and the third window isn't especially limited. In order to display the whole route from the present position of the car to the destination in each whole divided screen, the reduced scale may be automatically adjusted. Or using the reduced scale before the screen division, the map of each divided screen may be shown.

17. Guide/display Procedure of the Fifth Embodiment

FIG. 27 is a flow chart of the guide/display procedure of the fifth embodiment. When the car deviates from the guide route during guidance, in the guide/display procedure of this fifth embodiment, a return route which returns to the guide route and another newly searched route or the previous route are shown respectively in the windows of the divided screen.

Firstly "The other guide/display procedure" is executed (step SP42) and information according to the guide route is reported and displayed and so on, if the car doesn't deviate from the guide route and the car is traveling on the guide route (step SP2). After this, the procedure of FIG. 27 is ended and the procedure is returned to the flow chart of FIG. 5. In detection of a deviation from the guide route in step SP2, a present position information PI which is stored in RAM 5 and a geographical coordinate at the road which composes the guide route data MW are compared.

However when the car deviates from the guide route while the screen is divided (step SP4), two-previously searched guide routes are shown in the respective screens on the right and the left. In this case, when the return key is pushed or the route identity key is pushed, if the screen is divided, the procedure of steps SP18, SP20, SP22 and SP14 is executed.

However, if the screen isn't divided, it is determined whether an instruction for re-searching is input or not (step SP6) and it is determined whether a re-searching of a route which returns to the present guide route is instructed or not. The order of these re-searching is executed by touches of the operator on the icon such as "re-searching" or "another route" which is displayed in the screen of display 33 and this touch is based on on/off of the touch switch 34.

When this re-searching isn't ordered, the guide route from which the car deviated is continuously shown in the display 33. Further in this case, information warning that the car has deviated from the guide route may be reported at any time. Moreover if the re-searching is ordered, number of routes N is set to "1" (step SP8) and a route which returns to the guide route from the present position of the car is searched. The search for this return route searches the surrounding roads for a road which reaches the guide route to be primarily selected. For example, in case the road opposite to the direction of the moving of the car is a return road, fixed searching cost is added to the total searching cost and the total searching cost becomes big. Similarly a specified value is also added to the cost of a road which leaves the guide route and the searching cost becomes big. As the result, a road which approaches the guide route is primarily selected.

After this the return route which is identified is set as the N(N=1)-th route (step SP10) and the screen of display 33 is divided (step SP12). The N-th guide route is shown at the divided second window (step SP14). Here it is N=1 and the return route to the present guide route is shown in the second window. Further this N-th guide route is shown in a different color, etc. from the previous guide route from which the car deviates so that the previous guide route can be distinguished from the return route.

Furthermore, (N−1)-th guide route is shown in the third window. Here it is N−1=0, this (N−1)-th guide route is the first guide route which was identified with the route search procedure of FIG. 5 or is the guide route when the car deviates. Next if the icon of "RETURN" (the return key) which was displayed in the screen of display 33 is pushed (step SP18), the guide routes which are displayed in the second window and the third window are changed to the immediate previous guide routes respectively. Further if a search procedure for a whole new route is performed in step SP30 which is described later repeated, N guide routes are identified. Immediately before the above return key is pushed, the latest N-th guide route is shown in the second window and the (N−1)-th guide route is shown in the third window. The push of the icon of the above "RETURN" (the return key) depends on on/off of the touch switch 34.

Then if the return key is pushed, the (N−1)-th guide route is shown in the second window and the (N−2)-th guide route is shown in the third window. In this way, when the return key is pushed, the display condition of display 33 is returned to the immediate previous condition. This procedure can be repeated by execution of steps SP14 to SP22.

That is, when "RETURN" i.e. the return key is pushed, the value of the number N is reduced by "1" (step SP20). When the value of number N isn't smaller than "1" (step SP22), the procedure returns to step SP14, the guide route which was searched once before is shown in the second window and the guide route which was searched twice before is shown in the third window.

When the value of number N becomes smaller than "1" (step SP22), there is no identified route before the guide route of N=0, and the guide route which was guided when the car deviated is selected (step SP24). Then the image before the screen division is shown, the previous route and the car which deviated from this route are shown in one map screen (step SP25). After this, the other guide/display procedure is executed (step SP42) and the guide/display procedure of FIG. 27 is ended. In this case, the guiding procedure of a route isn't executed.

Moreover if the "RETURN" key is pushed when the number N of the routes is "1", division isn't canceled, the return route is shown in the second window and the guide route from which the car deviated may be continuously shown in the third window. In this case, when the second window or the third window route is chosen, screen division is canceled. Moreover if "RETURN" key is pushed when the number N of the routes is "1", the return route of the second window may be compulsorily selected and it is determined that a return to the previous guide route is required.

Further when the car deviates from the previous guide route, the screen is divided and the subroutine of the guide/display procedure of FIG. 27 is called. The procedure of step SP18 is executed first. In other words, when a screen was divided, it is determined whether the return key is pushed or not or it is determined whether the route identifying key etc. which are described later are pushed or not. Moreover if the instruction for re-searching is once inputted, the screen of display 33 is divided. Then, if the guide routes of the second window or the third window are not chosen by the operator or return key (RETURN) isn't repeatedly pushed until the number N of the routes becomes "0", this division is continued. However if the guide route is chosen, the division is canceled and the screen is made single. Guidance along the identified guide route is executed.

Further, the guide/display procedure of FIG. 27 is repeated until the car reaches the end point of the guide route. Furthermore, the reduced scale of the map which is displayed in the second window and the third window isn't especially limited in this embodiment. When another re-searched route is displayed, the whole route may be shown on the screen or, with the reduced scale of the map which was displayed in the first window before the division, the map of the second window and the third window may be shown.

The number N of routes is incremented by "1" (step SP28) and a new guide route is searched when the pushing of the return key, i.e. the "RETURN" key isn't detected at step SP18 and the re-search key is pushed (step SP32). A identified new guide route is stored in the RAM 5 as the N-th guide route (step SP30). Furthermore, in the searching of the guide route of this step SP30, the road which is used for the guide route which was identified before is rendered difficult to be selected. In this case, the searching cost is increased for the already selected road which composes the previous guide route and a new guide route composed by a different road is searched. In the whole route searching at this step SP30, a procedure like the step SL8 etc. of the above FIG. 22 is executed.

Further the searching condition of the guide route in this step SP30 may be different from the searching condition of the first guide route. For example, the first guide route prefers a toll road (expressway) primarily and the second guide route doesn't use a toll road. Moreover the first guide route has the shortest distance to the destination and the second guide route prefers a wide road primarily. In this way, in repeated guide route searching, each route search condition may be changed.

The guide route which is searched in the step SP30 is displayed in the second window and the guide route which is displayed in the second window is shown in the third window (step SP14). Furthermore the guide route which was searched first by the route search procedure of FIG. 5 or the guide route on which guidance is presently active may be always shown in the third window. In other words, the latest guide route which was searched every time the "re-searching" key is pushed is shown in the second window. The guide route from which the car has deviated is shown in the third window. By this the previous guide route and the new guide route can be directly compared.

Moreover each route which is displayed in the second window and the third window may be freely specified and be shown by the number N of the route. In other words, when re-searching is executed N times, any of the N routes may be selected and shown by each of the second and the third windows.

Furthermore when the number N of routes is "1", a route except the guide route which was identified by the route search procedure of FIG. 5 is shown in the third window. In other words, when the new route which is searched at the guide/display procedure of FIG. 27 is selected as the guide route, this new guide route is referred to as a basic guide route. Therefore while guiding procedure is executed by the new guide route which is searched by the re-searching, the new guide route is shown in the third window if re-search is instructed once again.

Further when a re-search key isn't pushed with the step SP32, it is determined whether a guidance beginning (route identifying) key is pushed or not (step SP34). Furthermore, when the search procedure of surrounding route of the step SP10 is executed, a return route is displayed in the second window and the previous guide route is displayed in the third window, but the car is not on this guide route. Therefore, when guidance by the guide route of this third window is required, the guiding can be executed using the return route of the second window. Then when a return route is displayed in the second window, the icon "guidance beginning" is displayed in the second window and it is determined whether this guidance beginning key is pushed or not in the step SP34.

Further if a third window (the deviations from the guide route) is chosen when number N of routes is "1", nothing may be guided. In this case, this screen is returned to the single screen before the division, the guide route from which the car has deviated and the car are displayed and a procedure similar to the return procedure (steps SP24 and 25) called when "RETURN" key is pushed is executed when the number N of the routes is "1".

However when whole route searching in step SP30 is repeated, as in the fourth embodiment, the icon of "route identifying" is shown in the screen of display 33. Then if the guidance beginning (the route identifying) key isn't pushed (step SP34), "the other guide/display procedure" of step SP42 is executed and the procedure of FIG. 27 is ended. When the route identifying key is pushed, if the guide route of the second window is chosen (step SP36), the screen division of display 33 is canceled, the guide route which is displayed in the second window is shown in the first window after division cancellation (step SP38), "other guide/display procedure" is executed and information according to the chosen guide route is displayed and reported and so on (step SP42). The above "route identifying", i.e. the choice of the guide route also depends on on/off status of the touch switch 34.

Further the screen division of display 33 is also canceled when the guide route of the third window is chosen. The guide route which is chosen is shown in the single screen of display 33 (step SP40), "other guide/display procedure" is executed and information according to the chosen guide route is displayed and reported and so on (step SP42). After this the procedure of this FIG. 27 is ended and the procedure is returned to the flow chart of FIG. 5. Furthermore the reduced scale of the map after division cancellation may be the same as or be different from the reduced scale of the map before the division.

FIG. 28 shows the screen of display 33 before the division. The first guide route 162 which is searched by the route search procedure of FIG. 5 is shown in screen 104. The symbol 100 shows the present position and the direction of travel of the car which has deviated from this guide route 162 in screen 104. The icon 174 "re-search" which is the object of determination of the step SP6 is shown in screen 104.

FIG. 29 shows the divided screen of display 33 and shows the screen of the display 33 immediately after the step SP12 of FIG. 27 is executed. The return route 178 which is identified by the search procedure of surrounding route in the step SP10 is displayed in second window 108 and the guide route 162 which is displayed in FIG. 28 is shown in third window 110. Further icons 174, 176 and 168 are shown in the second window 108 and the third window 110, the icon 174 designates "re-search" key and the icon 176 designates "guidance beginning" key which is the object of determination of the step SP34 and the icon 168 designates "RETURN" key which is the object of determination of the step SP18, i.e. a return key.

FIG. 30 shows the screen of the display 33 immediately after the step SP30 of FIG. 27 is executed. The guide route 180 which is identified newly in the step SP30 and the guide route 162 which is identified first are shown in the second window 108 and the return route 178 which was displayed in the second window of FIG. 29 is shown in the third window. Furthermore icons 174 and 168 have a function which is the same as the same icons of FIG. 29 and icon 166 is a route identifying key and corresponds to the icon of "guidance beginning" of FIG. 29. Further while two guide routes are displayed in the second window 108 of FIG. 30, alternatively only guide route 180 may be shown.

FIG. 31 shows the screen of the display 33 which is returned to the single screen in the step SP40 of FIG. 27. For example, if icon 166 is pushed in FIG. 30 and the return route 178 of third window 110 is chosen, the screen division is canceled and the return route 178 and the guide route 162 are shown wholly in the single first window 104. Furthermore the icon 174 is also shown in the screen 104 after this division cancellation.

FIG. 32 shows another example of FIG. 24 and FIG. 25 of the fourth embodiment and FIG. 30 of the fifth embodiment. In this example, distance and time information 186 are shown with the respective guide routes. These distance and time information indicate the distance and required travel time to the end point of the respective guide routes. For example this distance and time information in the second window is the distance according to the route 182 and the required time to travel this distance by the prescribed speed, when traveling guide route 182 to the end point of the guide route.

Travelling distance to the end point of the guide route 184 and traveling time are also shown in the third window 110 of FIG. 32 as the distance and time information 186. FIG. 33 shows the guide route which is changed from FIG. 32 when the step SL26 etc. of FIG. 22 is executed. The distance and time information 186 in the second window 108 of this FIG. 33 indicate the travelling distance and the required time to the end point of the guide route 188. Furthermore the third window 110 of FIG. 33 is copied from the second window of FIG. 32.

Further in the FIGS. 32 and 33 the distance and time information 186 may include VICS information (construction information or information of road congestion in the route etc.) which is received by data sending and the data transmitter/receiver unit 27 and may include the number of times of the turning right or left in the this route and so on. This VICS information can include congestion information at a parking lot near the route and so on.

Moreover names of central roads (name of national highway and prefecture road, etc.) which composes the guide route and names of main intersections (intersection having a name) may be shown. These road names and intersection names, etc. can be shown in list form, when an icon key of "route information" which is displayed on the screen is pushed. In this case, the detailed information (road name and so on) of each guide route which is displayed in the second and the third window, for example, the distance and the required time of the guide route to the destination and VICS information, etc., are shown. By this, more information assisting in choosing a route is displayed and therefore the comparison becomes easier.

Further in each searching procedure of "searching procedure of another route", "search procedure of surrounding route" and "searching procedure of whole route" of the fourth and fifth embodiments, the traffic information of VICS, etc. which is received from outside may be taken account of in the searching cost.

Therefore a road which is crowed is less likely to be chosen based on the congestion information and a route which goes around the congestion road can be searched. Further in the fourth and fifth embodiments the head up image and the north up image of each divided screen may point to the right, the left or down.

18. Guide/display Procedure of Sixth Embodiment

FIG. 34 shows the flow chart of the guide/display procedure of the sixth embodiment. In the sixth embodiment, the screen is divided when the car deviates from the first guide route. A road map which includes a portion of the guide route from which the car deviated and the present position of the car is shown in the divided second window. The previous guide route which was displayed before the division or a new re-searched whole guide route to the destination is shown at the divided third window. The previous guide route from which the car deviates is searched by the route search procedure (step SA4) of FIG. 5 or the whole route re-searching (step SR20) which is described later.

Further the return route which returns to the previous guide route isn't immediately shown in the second window after the division. However if the operator orders the guidance by the return route, the return route is shown on the screen. Furthermore, the reduced scale of the displayed map of the second window is adjusted and the whole return route is shown in the second window.

If first the car is on the guide route (step SQ2) and the screen of display 33 is divided (step SQ14), single screen procedure is executed (step SQ16), the screen division of display 33 is canceled and the map which is displayed in the third window is shown in the whole screen of display 33.

Furthermore the determination procedure of the above step SQ2 is executed as follows. Present position information PI and guide route data MW are read from RAM 5. It is determined whether the coordinate which is indicated by present position information PI almost agrees with the geographical coordinate of the road which composes a guide route data MW or not. If it is agreed, the car is traveling on the guide route and if it is not agreed, the car is determined to deviate from the guide route. Further the determination procedure of the above step SQ14 is executed as follows. Screen division of this display 33 is stored in the RAM 5 as the screen condition GJ and it is determined whether display 33 is divided or not by the data of this screen condition GJ.

Moreover when the car is on the guide route (step SQ2) and the screen is divided (step SQ14), the car deviates from the guide route once and returns onto the guide route again. In other words, when the car deviates from the guide route, the screen is divided. However when the operator doesn't instruct to search a route or change a route, etc. and the car returns to the previous guide route, the procedure of steps SQ2, SQ14 and SQ16 is executed.

When a sudden detour occurs to facilities in the route neighborhood while the car is traveling the guide route, the car deviates from the guide route temporarily. When the car returns to the guide route again after this occupation ending, these steps SQ2, SQ14 and SQ16 are useful. In a prior conventional navigation device, when a auto re-route mode is set, if the car deviates from the guide route, a new guide route from the present position to the destination is automatically re-searched. However this new guide route doesn't always have the shortest distance to the destination. If rather the car returns to the previous guide route, the car sometimes can reach the destination more quickly. In this case it is better that the guide route isn't automatically re-searched and that the car returns to the previous guide route. Then in the condition in which the auto re-route mode isn't set, when the car returns to the previous guide route again, the procedure of the above steps SQ2, SQ14 and SQ16 is executed. Furthermore at the auto re-route mode, it is detected that the car deviates from the route in guidance and a route from the present position of the car to the destination is automatically re-searched.

If the screen isn't divided in the FIG. 34 (step SQ14) or the screen division is canceled (step SQ16), the other guide/display procedure is executed (step SQ26) and various information is displayed and reported and so on according to the chosen guide route. For example, when the car approaches an intersection to turn right or left, a distance to the intersection is shown in display 33. After this the procedure of FIG. 34 is ended and the flow is returned to the overall procedure of FIG. 5.

On the other hand, when the car deviates from the guide route (step SQ2), if guidance is being performed along a return route (step SQ3), the choosing of the display of a single screen or the display procedure of the second window and the third window in step SQ20 is executed. In this step SQ3 based on the return route which is identified by "procedure to deviating route" which is described later, it is determined whether the car is returning to the previous route or not. When the procedure of FIG. 34 is repeatedly executed, the determination of this step SQ3 is executed to prevent "procedure to deviating route" from being executed by mistake. Furthermore the procedure of this step SQ20 is described later.

When the car is not traveling on the return route during guiding procedure, a subroutine "procedure to deviating route" is executed (step SQ4). In this procedure, the screen of display 33 is first divided into the right and the left at the center, the screen on the left side becomes a second window and the divided screen in the right side becomes a third window. In this case the video memory is divided into two areas, independent image data is written in each division area and the display screen of display 33 is divided. Furthermore, the display 33 may be originally composed of two display device.

After a screen is divided into two windows, the return route which returns to the guide route before deviating is searched. Furthermore, when a road map around the present position of the car is displayed in one of the screens (the second window) which were divided, this return route is used. If the navigation device is set to the auto re-route mode, a route from the present position of the car to the end point of guide route is automatically re-searched. Furthermore, a return route isn't displayed in the second window immediately after the division and a road map around the present position of the car is shown.

FIG. 40 shows the condition of the display 33 immediately after the car deviates from the guide route 146 which is searched first. Symbol 100 designates the present position and the traveling direction of the car. The screen of display 33 before this division is a first window. Icons 250, 256 and 252 with the letter "reduction", "magnification" and "whole route" and so on are shown in the lower part of the first window. When the icon 250 of "reduction" is touched by the operator, the reduced scale of the map which is displayed in the first window is made small and a wide area map is shown.

Further, when the icon 256 of "magnification" is touched by the operator, the reduced scale of the map which is displayed in the first window is made big and a detailed map or a house map is shown. Moreover when icon 252 in "whole route" is touched by the operator, a guide route from the present position of the car to the end point of guide route is re-searched.

Further FIG. 41 shows the display screen of the display 33 immediately after the "procedure to deviating route" is executed. The car which deviated from guide route 146 and the guide route 146 is shown as symbol 100 in the second window 108. The map which was displayed in the first window which is the screen before the division is shown in the identical reduced scale in the third window 110. Further in the lower part of the second window 108, icon 252 of "whole route" and icon 255 of "start guidance" are shown, and in the lower part of the third window 110 icon 250 of "reduction" and icon 256 of "magnification" are shown. The icon 255 of "start guidance" is used to instruct to begin a guidance by the return route.

When "procedure to deviating route" of the subroutine is executed at FIG. 34 and the return route or the whole route is searched, it is determined whether the pushing of the guidance beginning key is detected or not (step SQ6). This guidance beginning key is shown as the icon of letter "start guidance" in the second window which is described above. Then it is determined whether a display part of this "start guidance" is touched by the operator or not by a switch signal which is output from the touch switch 34.

It is decided whether guiding process by the return route which returns to the previous guide route is executed or not by the pushing of this "start guidance" key. Therefore procedure since step SQ18 of FIG. 34 is executed if "start guidance" key is pushed. In other words, a return route is displayed in the second window and specified guiding procedure is executed. However if the pushing of "start guidance" key isn't detected (step SQ6), the determination of the following condition is executed. That is, it is determined whether a whole route which is re-searched from the present position of the car to the destination is specified or not (step SQ8). The re-searching of this whole route is executed when the auto re-route mode is set or the re-searching is ordered by the operator.

When this new whole route is chosen, a new guide route is searched and stored in the RAM 5 (step SQ10). Moreover the division of display 33 is canceled and this new guide route is shown in the whole screen (step SQ12). In other words, the screen which was divided into two is returned to one screen and a new guide route is shown in this single screen. After this, "Other guide/display procedure" by which information along the new guide route is reported and displayed is executed (step SQ26). Then the procedure of FIG. 34 is ended and the flow is returned to the overall procedure of FIG. 5. Furthermore, a reduced scale before the division (the first window) is used as the reduced scale of the new guide route which is displayed in the single screen.

On the other hand, when "sixth" key is pushed (step SQ6), the return route which is searched when the screen was divided is shown in the second window (step SQ18). Next it is determined whether this return route is displayed in one screen or not (step SQ20). In this determination, it is determined whether the icon of "division cancellation" (example) which is displayed in the screen of display 33 is touched or not by the operator. Single screen procedure is executed if screen cancellation is chosen (step SQ12).

In this single screen procedure, screen division by display 33 is canceled and a return route and the previous guide route are shown in the single screen. Further the reduced scale of the map which was displayed in the second window or the reduced scale of the map which was displayed in the first window before the division is used as the reduced scale of the return route which is displayed in this single screen. After single screen procedure, the other guide/display procedure (step SQ26) is executed and the procedure of FIG. 34 is ended.

Further when the display of the return route isn't chosen with the single screen (step SQ20), subroutine "display adjustment of 2nd screen" with movement of the car is executed (step SQ22). In this "display adjustment of 2nd screen", the position of the car which is displayed or the reduced scale of the map in the second window is adjusted. In other words, the return route and the car are shown by the following two ways of displaying in the second window. The return route of which the car is in the center is shown at the whole second window by the first way of displaying. A return route is displayed at the whole second window by the second way of displaying and is shown for the car to move on the return route. In other words, in the second way of displaying, the display position of the car moves on the second window as the car travels. Furthermore "display adjustment of 2nd screen" by these first or second way of displaying is described later.

After "display adjustment of 2nd screen", subroutine "display adjustment of 3rd screen" is executed (step SQ23). In this subroutine "display adjustment of 3rd screen", the map which was displayed in the first window before the screen division is shown in the third window. Furthermore, a displayed map is also scrolled at this third window as the car travels. After this, "guide procedure of chose route" is executed and sound information, etc. by the return route are reported (step SQ24).

Furthermore, the map of the north up or the head up which is executed in the a second embodiment is shown in the third window. After the above step SQ24 is executed, "other guide/display procedure" is executed (step SQ26). Then the procedure is returned to the main flow chart of FIG. 5. Furthermore, the reduced scale of the map of the above third window may change with the traveling position of the car.

19. Procedure to Deviating Route of Sixth Embodiment

FIG. 35 shows the flow chart of the subroutine "procedure to deviating route" of FIG. 34. First it is determined whether the car which deviated from the route on guiding is traveling the return route which returns to this route or not (step SR2). After the series of procedures of FIG. 35 is first executed, a return route has been identified, if the route isn't chosen by the operation of the operator, the procedure of FIG. 35 is repeatedly executed. Further "searching procedure of return route" is executed when the car isn't traveling on the return route (step SR4).

Furthermore the condition in which the car isn't traveling on the return route which has identified also includes the condition that a return route isn't searched (identified) at all. This is the condition immediately after the car deviates from the previous route. But if the car is travelling on the already identified return route, the searching of the return route isn't executed. In this "search procedure of return route", the procedure which is the same as the search procedure of surrounding route of the fifth embodiment of the above guide/display procedure is executed.

In other words, the route which connects to the guide route from which the car has deviated is searched. Moreover in case of this return route searching, priority weight is put to the selecting of the road which connects (goes) to the previous guide route.

For example, to the opposite road to the direction of the moving of the car, fixed searching cost value is added to the total searching cost and the total searching cost is increased. Similarly to the opposite road to the forward direction of the road which connects to the guide route, a specified value is added for the searching cost. As a result, a road which progresses to the guide route is primarily selected.

Then the shortest route which links the intersection nearer to the destination and nearest the point of the guide route from which the car has deviated and the present position of the car is searched. But when the route which links the present position of the car and the above intersection can not be discovered, the route which links the intersection which is next near the destination and the car is searched. In this way, the return route which links the present position of the car and the intersection of the previous guide route being nearer the destination from the point that the car has deviated from is searched.

If a return route is searched or the car is traveling on a previously searched return route, it is determined whether the screen of display 33 is divided or not (step SR6). If the screen isn't divided, the screen division procedure of display 33 is executed (step SR8). In other words, the area of the image memory which displayed image data is written in is divided and the display screen is divided. In this case, as with the above embodiments, it makes the center of display 33 a boundary and the screen is divided into the right and the left.

Then the screen on the left side is made the second window and the screen in the right is made the third window. Furthermore, the screen before the division is the first window. If display 33 is divided, the screen division procedure of step SR8 isn't executed (step SR6). In other words, the screen of display 33 is divided if the car deviates once from the present guidance route and the procedure of FIGS. 34 and 35 is executed. After that, when the choosing of a route and so on aren't operated, screen division is maintained. In this case the screen division procedure of this step SR8 isn't executed.

When the screen is divided by the procedure of step SR8, subroutine "initial showing of 2nd screen" is executed (step SR10). In this "initial showing of 2nd screen", the car and a guide route which the car deviates from are shown by the optimal reduced scale in the second window. In other words, the car and the connection point (the intersection and so on) of the return route which is identified by the step SR4 and the previous guide route are shown by the optimal reduced scale in the second window. Furthermore, in this "initial showing of 2nd screen", the return route itself isn't displayed. But if the start guidance key isn't pushed in the step SQ6 of FIG. 34, the return route isn't shown in the second window. This "initial showing of 2nd screen" is described later.

After "initial showing of 2nd screen", it is determined whether the navigation device of this embodiment is set to an auto re-route mode or not (step SR12). If the auto re-route mode is set, it is determined whether the present position of the car is on the re-searched route or not (step SR16). In the procedure of the steps SR12 and SR16, when the navigation device is set in the auto re-route mode, the route isn't specified by the operator after the new whole route is re-searched, the procedure of FIGS. 34 and 35 is repeated. Therefore it is prohibited that the new whole route is re-searched by the repeating by the procedure of the step SR16.

A finding that the car isn't traveling the re-searched route is also found when the whole route hasn't been re-searched at all. Therefore if the car isn't traveling the re-searched new route, the whole route to the end point of guide route from the present position of the car is re-searched (step SR20). Then, the re-searched new whole route is shown in the third window. Furthermore, the previous guide route which the car deviates from may also be shown in this third window. The display reduced scale of this third window is or may be the same as the reduced scale of the first window before the division. When the new whole route is displayed, the reduced scale is adjusted and the whole route may be shown in the screen. When this newer whole route is displayed, like FIGS. 32 and 33 of the fifth embodiment the detailed information on the newly searched route also may also be shown. In other words, the information of the distance from the present position of the car to the destination, the expected traveling time, the name of the principal road, the name of the principal intersection and so on may be shown. The detailed information on this new route may be shown in list form by the choosing of a operator.

When the re-searched whole route is displayed in the third window, the procedure of FIG. 35 is ended and the program is returned to the procedure of FIG. 34. Further when it is not set in the auto re-route mode (step SR12), the map which is displayed in the screen (the first window) of display 33 before the division is shown in the third window (step SR14). In other words, the car to have deviated from the previous route is shown in a center of the map of the third window. Furthermore, the reduced scale of the map before the division is used as the reduced scale of the displayed map of this third window. Moreover the map which includes the car, the destination and the previous guide route may be shown in this third window. In other words, the reduced scale of the map may be adjusted and the previous whole route may be shown. Or the map may be shown in the third window at the reduced scale which is the same as the reduced scale of the map which is displayed in the second window.

After the display of the map of the third window (step SR14), it is determined whether the whole route key is pushed or not (step SR18). On/off of this whole route key is based on the touch by the operator in icon "the whole route" which is displayed in display 33. This touch or non-touch is determined by the detection signal of touch switch 34. "Re-searching procedure of whole route" which is above mentioned is executed if the whole route key is pushed (step SR20). After this, the re-searched whole route is shown in the third window (step SR22). If the whole route key isn't pushed, the procedure of FIG. 35 is ended and the program returns to the procedure of FIG. 34.

20. First Embodiment of Initial Showing of Second Window

FIG. 36 shows the a first embodiment of "initial showing of 2nd screen" of FIG. 35. In the "initial showing of 2nd screen" of FIG. 36, a map is displayed in the second window at the reduced scale where the whole return route can be displayed and the present position of the car becomes the screen center.

This return route is searched as the map information to return to the previous route. But, the return route itself isn't shown in the second window.

The node coordinate value of each road which composes a return route and a part of previous route that the car deviates from is read from the node data file F3 etc. (step ST2). From the coordinate value of each node which was read with step ST2, maximum value (Emax, Nmax) and minimum value (Emin, Nmin) to the east longitude direction and the north latitude direction are retrieved (step ST4). The maximum and the minimum value to the direction of this east longitude and the north latitude are explained below using FIG. 47.

For example, the route PC10 which is linked with node P24 from node P20 at FIG. 47 is the part of the previous guide route and the route PC12 of the dashed line and the route PC11 of the chain line are the return route. In other words, the point (the estrangement point, the leaving point) where the car deviated from the previous route is node P22. The junction (the return point) of the identified return route and the previous guide route is node P12. From the present position P10 of the car to node P12 at the confluence is an un-traveling part in the return route. Further a route PC11 to the present position P10 of the car from the node P22 of the leaving points is assumed as the route by which the car has deviated and traveled from the previous guide route. Furthermore, the destination of the previous guide route is in the direction of node P24. The north which is an absolute azimuth points to the top of FIG. 47. Furthermore, when the car deviates from the previous route, the return route is searched at once. Therefore actually route PC11 also is a part of the return route. Here for convenience of the explanation, it is assumed that the car moved to present position P10 on the return route.

When the return route of this FIG. 47 is displayed in the second window, the route which joins the whole return route of route PC12 and route PC11 and each of the following nodes is shown. The previous route which links node P28 on the side of the starting place and node P24 on the side of the destination in the both sides of node P12 at the junction is shown in the second window with the return route. Further in the showing of the return route in this second window, all of the return route and the previous route from the node P22 of the leaving point to node P12 at the confluence may be shown in the second window.

By the way, in the return route (route PC11 and route PC12) of FIG. 47, the node which has the maximum of the east longitude becomes node P24. Therefore, the coordinate value of the east longitude of node P24 is stored in the RAM 5 as maximum Emax. Similarly if the node which has the maximum of the north latitude is node P12, the coordinate value of the north latitude of this node P12 is stored in the RAM 5 as maximum Nmax.

Further if the node which has the minimum value of the east longitude is node P14, the coordinate value of the east longitude of this node P14 is stored in the RAM 5 as minimum value Emin. If the node which has the minimum value of the north latitude is node P16, the coordinate value of the north latitude of this node P16 is stored in the RAM 5 as minimum value Nmin.

Furthermore, when the previous route also is together displayed in the second window, this route may be include the following node and a route. That is, the previous route which links the node P24 on the side of the destination from the confluence P12 and the node P26 on the side of the starting place from the node P22 of the leaving point may be shown in the second window with the return route. In this case, the node P24 has the maximum of the east longitude, the node P20 has the maximum of the north latitude, the node P26 has the minimum of the east longitude and node P16 has the minimum of the north latitude. Then, the coordinate value of each node is stored in the RAM 5 as the maximum (Emax, Nmax) and minimum value (Emin, Nmin) of the east longitude and the north latitude.

As mentioned above, the following expression is computed based on the coordinate (GX, GY) of the present position P10 of the car when maximum (Emax, Nmax) and minimum (Emin, Nmin) are detected.

$$|GX-Emax| \quad (1)$$

$$|GX-Emin| \quad (2)$$

An absolute value is found by this expression (1) and (2). Then the bigger value of the computation result of expression (1) and (2) is stored in the RAM 5 as east longitude width WE (step ST6). Moreover the following expression is computed.

$$|GY-Nmax| \quad (3)$$

$$|GY-Nmin| \quad (4)$$

An absolute value is also found by this expression (3) and (4). Then the bigger value of the computation result of the expression (3) and (4) is also stored in the RAM 5 as north latitude width WN (step ST8).

Then, the reduced scale of the map which can display the above east longitude width WE and north latitude width WN is found using the numerical value calculation table etc. which is stored in the information memory unit 37. In other words, the road map which includes a return route with the car being situated on the center of the screen is shown in the second window. The reduced scale of this displayed road map is found using the numerical value calculation table (step ST10).

It is explained using FIG. 48. Divided display 33 is shown in FIG. 48. The area which can be effectively displayed in this second window 108 is a range according to horizontal width HC6 and perpendicular high HC14. Then a road map which includes the return route etc. in an area which is smaller by about 5 percent than with the area of this effective display is shown.

The area which is smaller by about 5 percent has horizontal width HC4 and perpendicular high HC10. The reduced scale of the map is found for the above east longitude width WE to be settled within width HC2 of the half with this horizontal width HC4 and for north latitude width WN to be settled within height HC8 of the half of perpendicular high HC10. In this way, the area which displays the map which includes the return route is made smaller than the area of the effective display, i.e. the largest display area and therefore it is prohibited that important information is displayed at the end of the screen. When the important information is displayed at the end of the screen, it is difficult to see the information.

A value with east longitude width WE and north latitude width WN and each reduced scale value of the map are calculated and stored in the numerical value calculation table. The reduced scale value which corresponds to the east longitude width WE and north latitude width WN is found from the numerical value calculation table after the east longitude width WE and the north latitude width WN are found by each of the above expressions. Furthermore, this map reduced scale may be found by the calculation of the proportional expression and so on.

For example, if the map reduced scale is "MSA", the geographical distance of the map which can be displayed from the actual size of the second window is proved. Therefore, the vertical geographical distance of the map which was displayed in the second window becomes "MYA" and the side geographical distance becomes "MXA" when the map reduced scale is "MSA". If the geographical distance which can be show is proved in these map reduced scales, the proper reduced scale to display a road map with the above east longitude width WE and north latitude width WN is found by the following expression.

$$MSA \times WE/MXA \quad (5)$$

$$MSA \times WN/MYA \quad (6)$$

Big value (the reduced scale in which the wide area map can be displayed) of the reduced scales which is found by the expression (5) and (6) is selected as the proper reduced scale. The reduced scale of the map that each east longitude width WE and north latitude width WN are calculated by the expression (5) and (6) is stored in the above numerical value calculation table. Furthermore, when a north up map is displayed in the second window, calculation by the expression (5) and (6) is executed.

When the head up map is displayed, the following value is calculated in the revision by each east longitude width WE and north latitude WN. In other words, the cosine value of the relative azimuth data Dθ which indicates an angle to the direction of the moving of the car to the absolute azimuth is found. Then the above cosine value is multiplied to the distance of the oblique side of the triangle which consists of east longitude width WE and north latitude width WN. The map reduced scale in which this multiplication value is settled within the width HC2 and the height HC8 of FIG. 48 is found.

Icon "whole route" "start guidance" and so on are shown in interval HC12 of the lower part in the second window of FIG. 48. The road map and so on may be also displayed in the background of the icon in this interval HC12 or not. Further, the area where a return route is displayed isn't limited to the area which is smaller by about 5 percent than the effective display area of the second window. In other words, the display area may be more than 5 percent or may be smaller such as 1–5 percent smaller than the effective display area.

When a map reduced scale is found in the step ST10 of FIG. 36, the map which includes the return route in this found reduced scale with the car symbol at the center of the screen is shown in the second window (step ST12). Furthermore, here the return route itself isn't yet shown. After this, the program returns to FIG. 35 and the display procedure and so on of the third window are executed.

Furthermore when return route PC12 is displayed in the second window in the above embodiment, a previous partial route linking nodes P28 and P24 on both sides of the node P12 of a confluence is also shown. However the return route PC12 may be shown in the second window only for node P12 at the confluence to be displayed. Moreover the map in the range which includes totally the whole return route to confluence P12 from the node P22 of the leaving point may be shown in the second window.

21. Second Embodiment of "Initial Showing of Second Window"

FIG. 37 shows the flow chart of the a second embodiment of "initial showing of 2nd screen" of FIG. 35. In the second embodiment of this "initial showing of 2nd screen" the present position of the car doesn't always become the center of the screen. In other words, the map which includes the whole return route which was found first is uniformly displayed in the second window and this display is maintained. Therefore, the car moves on the map which is displayed in the second window.

Firstly the node coordinate values of each road which composes the return route are read (step SU2). The maximum (Emax, Nmax) and minimum value (Emin, Nmin) of the east longitude and the north latitude are retrieved from the coordinate value of each node which is read in the step SU2 and the coordinate value of the present position of the car (step SU4). This procedure is the same as the step ST4 of FIG. 36. Furthermore, in this embodiment the return route is also composed of route PC11 and route PC12. Further when the map which includes the return route is displayed in the second window, a part (FIG. 47) of the previous route between node P28 and P24 is also shown.

Furthermore, the previous route between this node P28 and P24 doesn't have to be shown and the map in the range which includes only route PC12 from the node P22 of the leaving point or the present position P10 of the car to node P12 at the confluence may be shown. Moreover the map in the range which includes the whole return route and the previous route to node P24 from node P26 as with "initial showing of 2nd screen" of the a first embodiment may be shown in the second window. The case in which the previous route between the above node P28 and P24 and the return route to node P12 at the confluence from the node P22 of the leaving point is displayed in the second window is explained below.

For example, in the return route (route PC11 and route PC12) of FIG. 47, node P24 has the maximum of the east longitude. Therefore the coordinate value of the east longitude of the node P24 is stored in the RAM 5 as maximum Emax. Similarly node P12 has the maximum of the north latitude. Therefore the coordinate value of the north latitude of the node P12 is stored in the RAM 5 as maximum Nmax.

Node P14 or node P22 has the minimum value of the east longitude. Therefore the coordinate value of the east longitude of node P14 is stored in the RAM 5 as minimum value Emin. Node P16 has the minimum value of the north latitude. Therefore the coordinate value of the north latitude of node P16 is stored in the RAM 5 as minimum value Nmin.

Then, the following expression is computed based on each maximum and minimum value of each east longitude and north latitude (step SU6).

$$Emax - Emin = XE \quad (7)$$

$$Nmax - Nmin = YN \quad (8)$$

Then the reduced scale that the map in the interval XE of this east longitude and the interval YN of the north latitude can be displayed in the screen is found using the numerical value calculation table which is beforehand stored in information memory unit 37 (step SU8). The map reduced scale that the interval XE of the east longitude is settled within horizontal width HC4 and that the interval YN of the north latitude is settled within perpendicular high HC10 of FIG. 48 is found by the numerical value calculation table as with "initial showing of 2nd screen" of the first embodiment.

Furthermore, when the interval XE of east longitude and the interval YN of the north latitude are supplied, the reduced scale value in which the return route and the part of the previous route can be correctly displayed in the display area of the second window which is surrounded in horizontal width HC4 and perpendicular high HC10 is stored in the numerical value calculation table. In other words, the reduced scale value which corresponded to the interval XE of the east longitude and the interval YN of the north latitude is stored in the numerical value calculation table. Furthermore, this reduced scale value may be directly found by calculation. For example, when a map is displayed in the second window at the optional reduced scale, a geographical distance i.e. a distance of the direction of the east longitude and a distance of the direction of the north latitude are proved from the actual size of the second window. Therefore the map reduced scale that the interval XE of the specific east longitude and the interval YN of the north latitude are correctly shown in the second window can be calculated by a proportional expression. Correspondence relation among the map reduced scale and the interval YN of the north latitude and the interval XE of the east longitude is stored in the above numerical value calculation table.

Furthermore, the areas which are surrounded in horizontal width HC4 and perpendicular high HC10 are about 5 percent smaller than the effective display area as with "initial showing of 2nd screen" of the first embodiment. A map in the range which includes the return route is shown in the second window (step SU10), at the reduced scale which was found in the step SU8, for the east longitude coordinate (Emin+XE/2) and the north latitude coordinate (Nmin+YN/2) to become the screen center. After this the flow is returned to FIG. 35. Furthermore, in this a second embodiment the map which includes the return route is shown in the north up condition.

FIG. 41 shows the state of display 33 immediately after the car deviates from the guide route. In other words, the previous route 146 and the present position 100 of the car are shown in second window 108. But the searched return route itself isn't yet shown and guidance based upon the return route isn't executed. Further icons 252 and 255 also are shown. Icon 252 designates the switch which instructs for the re-searching procedure of the whole route of FIG. 35 to be begun. Further icon 255 designates the switch which instructs to begin guidance by the return route. Icons 250 and 256 are the switches to change the map scale of the third window manually.

FIG. 42 shows the state that return route 258 is displayed in the second window. This FIG. 42 shows the state of the display 33 when a start guidance key (icon 255) is pushed in the display of FIG. 41. In FIG. 41, the return route is shown by inserting the dotted line 258 to the map shown in FIG. 41. Furthermore, in the actual display screen, the return route is displayed in a different color from the color of the previous guide route 146. Furthermore, in FIGS. 41 and 42, there is also shown the previous guide route linking the node on the side of the starting place of the guide route which is next to the leaving point (the intersection point 261 of FIG. 42) and the node on the side of the destination of the guide route which is next to the confluence (the intersection point 259 of FIG. 42).

FIG. 43 shows the state when the car deviates farther from the guide route than the state in the display condition of FIG. 41. In other words, in the condition of FIG. 41, the return route is once searched. After this, when the car deviates from this return route, a new return route is searched by the procedure of steps SR2 and SR4 of FIG. 35. Then the road map which includes this new return route is shown in second window 108. But because the start guidance key isn't pushed in this FIG. 43, the return route isn't displayed and the route guidance based on the return route isn't executed. When the start guidance key is pushed in the condition of this FIG. 43, the return route is shown by dotted line 260 as shown in FIG. 44.

FIG. 44 shows the return route displayed by dotted line 260 in the second window. This FIG. 44 shows the state of the display 33 when the start guidance key (icon 255) is pushed in the display condition of FIG. 43. In other words, the return route is shown by inserting dotted line 260 into the map shown in FIG. 43. Furthermore, in the actual display screen, the return route is displayed in a different color from the color of the displayed previous guide route 146.

FIG. 45 shows an example in which only the return route 260, when the start guidance key is pushed, is shown joining the confluence 263 and the present position (position of symbol 100) of the car in the second screen. The guide route 146 to the destination from confluence 263 is also shown in the second window. Therefore the unnecessary part of the guide route, i.e. the part already traveled and so on aren't shown in the second window.

22. First Embodiment of "Display Adjustment of 2nd Screen" (Step SQ22 of FIG. 34)

FIG. 38 shows the flow chart of the display adjustment (step SQ22) of the second window of the sixth embodiment (FIG. 34). In "the display adjustment of the 2nd screen" of FIG. 38, the display position of the return route of the second window with traveling by the car is adjusted. In other words, when the car is traveling along the return route, the return route from the present position of the car to the confluence and the guide route etc. in the confluence neighborhood is shown by the maximum in the second window. Furthermore, in "the display adjustment of the 2nd screen" of FIG. 38, the road map which includes the return route makes the car the screen center and is shown.

Firstly road data which composes a remaining route in the return route i.e. an un-traveling route is read from the information memory unit 37. Then each node coordinate value of the read road data is read from node data file F3 etc. (step SV2). The maximum (Emax, Nmax) and minimum value (Emin, Nmin) of the east longitude and the north latitude are retrieved (step SV4) from the coordinate value of the each node which is read in the step SV2.

The procedure of this step SV4 is the same as step ST4 of FIG. 36. Then the following expression is computed based on the present position coordinate (GX, GY) of the car and each maximum (Emax, Nmax) and minimum value (Emin, Nmin).

$$|GX - Emax| \qquad (9)$$

$$|GX - Emin| \qquad (10)$$

Furthermore, in the expressions (9) and (10), the absolute value of the computation result is found. Then the bigger one of the computation values of the expressions (9) and (10) is stored in the RAM 5 as east longitude width WE (step SV6). Moreover the following expression is computed.

$$|GY-Nmax| \quad (11)$$

$$|GY-Nmin| \quad (12)$$

Furthermore, in expressions (11) and (12), the absolute value of the computation result is found. Then the bigger one of the computation value of the expressions (11) and (12) is stored in the RAM 5 as north latitude width WN (step SV8).

Further, the reduced scale KAP of the map which is displayed at present in the second window is determined (step SV10). Then, geographical distance RE in the direction of the east longitude and geographical distance RN in the direction of the north latitude which can be displayed by the determined reduced scale KAP are found (step SV12). Furthermore, these distances RE and RN may be found using the numerical value calculation table which is stored in the information memory unit 37 or in the ROM 4 and may be found by proportional arithmetic expression etc. This numerical value calculation table is the same as the numerical value calculation table which is explained in the above "initial showing of 2nd screen". In other words, when a map is displayed in the second window by each reduced scale, the geographical distance which can be shown in the perpendicular direction and the horizontal direction of the second window corresponds to the above reduced scale and is stored. Then the above distances RE and RN are found using this numerical value calculation table (step SV12).

Next comparison of the east longitude width WE and the distance RE and comparison in the north latitude width WN and the distance RN are executed. Then if the east longitude width WE is longer than the distance RE or the north latitude width WN is longer than the distance RN, reduced scale KAP is changed into the value which the map can be displayed in the wider geographical range (step SV16). In other words, when the remaining route in the return route is not able to be displayed in the second window to show the movement of the car, the procedure of the step SV16 is executed.

However when the east longitude width WE is shorter than the distance RE and the north latitude width WN is shorter than the distance RN, it is determined whether the east longitude width WE and the north latitude width WN can be appropriately displayed by the reduced scale KAP (step SV18). In other words, it is determined whether the east longitude width WE is shorter fairly than the distance RE or the north latitude width WN is shorter fairly than the distance RN or not. The East longitude width WE being much less than the distance RE (WE<<RE) or the north latitude width WN being much less than the distance RN (WN<<RN) indicates that the geographical range in the return route which should be displayed in the second window is narrow to show moving of the car. In this case, a reduced scale KAP value is changed into a value by which the map can display only the narrower geographical range (step SV20). In other words, a map reduced scale is changed for a detailed map to be displayed with the larger geographical range bigger than the range that fits in the second window.

When reduced scale KAP is adjusted by the steps SV16 and SV20, the determine procedure by the steps SV14 and SV18 is executed once again. In other words, the value of the reduced scale KAP is further changed for the east longitude width WE and the north latitude width WN to be most appropriate. Then when proper reduced scale KAP is found in the steps SV14 and SV18, a remaining route in the return route makes the car a screen center and is shown in the second window (step SV22). After this the procedure is returned to the guide/display procedure of FIG. 34. After guidance by the return route is chosen in this way, when the car travels, the remaining part to the confluence in the return route decreases. Therefore in the a first embodiment of "the display adjustment of the 2nd screen", the map reduced-scale is adjusted according to the decreased remaining part in the return route. For example, when the remaining part in the return route becomes short and the geographical range to display becomes narrow, the reduced scale of the displayed map of the second window is made small. As the result, a more detailed map is shown at the second window.

Furthermore, the reduced scale KAP of the map may be found using a table which is beforehand recorded in the information memory unit 37. The reduced scale KAP in which the car becomes the center of the second window and the remaining return route is efficiently shown on the map may be directly found using the numerical value calculation table which is stored in the information memory unit 37 and so on. Furthermore, the reduced scale KAP becomes the value that the remaining return route etc. can be appropriately displayed in the area which is a little smaller than the effective display area of the second window. This is the same as the procedure of "initial showing of 2nd screen" in FIGS. 36 and 37.

23. Second Embodiment of "Display Adjustment of 2nd Screen" (Step SQ22 of FIG. 34)

FIG. 39 shows the flow chart of the a second embodiment of "display adjustment of 2nd screen". The second embodiment of this "display adjustment of 2nd screen" corresponds to "initial showing of 2nd screen" of FIG. 37. In other words, the remaining part in the return route decreases as the car travels and the map reduced scale which this remaining part displays efficiently in the second window is found at any time. Un-traveling road data to the confluence in the return route from the present position of the car is read from the information memory unit 37 in FIG. 39. The node coordinate value of each road which composes a route in the confluence neighborhood of the previous guide route and this remaining return route is read from the node data file F3 (step SW2). The coordinate value of each node which is read in the step SW2 and maximum (Emax, Nmax) and minimum value (Emin, Nmin) to the direction of the east longitude and the direction of the north latitude from the coordinate value of the present position of the car are retrieved (step SW4). This procedure is the same as the step SU4 of FIG. 37.

Then the following expression is computed based on the maximum and minimum value of the direction of east longitude and the direction of the north latitude (step SW6).

$$Emax-Emin=XE \quad (13)$$

$$Nmax-Nmin=YN \quad (14)$$

Then the reduced scale of the map which can display the horizontal distance XE and the perpendicular distance YN is found using the numerical value calculation table which is beforehand recorded to the information memory unit 37 (step SW8). In other words, the reduced scale which the remaining part in the return route is appropriately displayed in the second window is found. Furthermore, the calculation of this appropriate reduced scale is the same as "initial showing of 2nd screen" of FIG. 37. The map which is displayed in the second window is fixed on this embodiment and the car moves on the return route of the displayed map. But as the car moves the reduced scale of the map sometimes changes.

When a map reduced scale is found in the step SW8, by this found reduced scale, the un-traveling return route and the part of the previous guide route centered on the confluence are shown in the second window (step SU10) and in this display the east longitude coordinate (Emin+XE/2) and the north latitude coordinate (Nmin+YN/2) become the screen center. Then the flow is returned to FIG. 34. Furthermore, when the return route which is displayed in the second window is displayed by "initial showing of 2nd screen" of FIG. 27, "display adjustment of 2nd screen" of this embodiment is executed as the step SQ22 of FIG. 34. Further when the map which includes the return route is displayed by the procedure of "initial showing of 2nd screen" of FIG. 37, "display adjustment of 2nd screen" of FIG. 39 doesn't have to be executed. In other words, the reduced scale of the map which includes the return route etc. which is displayed first in the second window is fixed and the adjustment of the map reduced scale doesn't have to be executed as the car moves.

FIG. 46 shows an example of the display of the second window. For example, the return route is shown by arrow 268. Further when the return route isn't displayed in the second window, only the confluence which the return route and the previous route cross may be shown by mark 262. Further the confluence may be also shown by mark 262 when the return route is displayed. Moreover, the direction of the destination in the previous guide route may be shown by a direction mark 264 to the destination.

The display procedure of the above direction mark 264 to the destination is simply explained below. The intersection point of the previous guide route displayed in the second window and the edge of the map screen which is displayed in the second window 108 of display 33 is computed. In this procedure, the road data which is included in the coordinate range which is displayed in display 33 is read from each road which composes the above guide route data MW by image processor 9. Then the road which is the nearest to the destination TP is found from the road data. By arranging the road number data which links to the destination from the guidance beginning point in order, the guide route data MW is composed. Therefore the road number which has the biggest order (address number) indicates the road which is nearest the destination.

Moreover the node in the coordinate range which is displayed in display 33 is read from the node which composes the road. Then node ND1 which has the biggest order (the address number) is selected in each of these nodes. Coordinate data in the intersection point of the straight line which links this node ND1 and the node ND2 of the following address number and the screen edge of display 33 is found. This found coordinate data is stored in RAM4 as the intersection point data CP.

Next the procedure which finds the direction of the destination of the guide route which is displayed in display 33 is executed. Various procedures can be used.

For example, inclination.corner (Tanθ1) to the absolute azimuth of the straight line which links the coordinate of the above intersection point data CP (or the coordinate of node ND1) and the coordinate of the above node ND2 becomes the direction of the destination.

Next the procedure to display the direction mark 264 of the destination which shows the direction of the destination in the computed intersection point CP is executed. For example, this procedure is executed as follows. The character pattern data of the arrow which is used for the direction mark of the destination is stored in the information memory unit 37 or the ROM 4. Then the character pattern of the arrow is turned to show the above direction of the destination according to the above intersection point data CP. This character pattern data is sent to image processor 9 and is changed into the image data. Therefore the direction mark of the destination 264 is shown at the coordinate which is designated by the intersection point data CP. Actually as the tip of the arrow agrees with the coordinate of the intersection point data CP, a deviation to the.intersection point data CP is provided for the coordinate of the direction mark of the destination.

As an explanation of the above, when the car deviates from the guide route in the start guidance embodiment of the guide/display procedure, the return route to return to this guide route is searched. Then a road map in the car neighborhood is shown by the reduced scale in which the return route and so on are appropriately displayed in the second window. Then guidance processing to the previous guide route using the return route by the choosing of a operator is executed. Further in the guidance procedure of this return route, two screens or one screen is shown by the choosing of the operator. Moreover when the return route doesn't fit the request of the operator, whole route searching is executed according to the direction of the operator and a new guide route to the destination is searched. In other words, it is possible to choose the guide route according to the traveling position of the car.

Furthermore, the operation such as the start guidance, searching the return route and identifying the route etc. of each of the above embodiments is possible to operate only when the car is stopping or traveling by a very slow speed in this invention.

According to this above described embodiment, even if the car deviates from the guide route and travels temporarily with the intention of the operator, the road map which includes the previous guide route and the car neighborhood is shown in one of the screens of divided display 33. The road map in this car neighborhood is shown by the appropriate reduced scale when the return route to the confluence with the previous route from the point which deviated from the previous route is displayed. This return route is a recommended route to the recommended confluence with the previous guide route from the point which deviated from the previous route or the present position of the car and is automatically searched by the navigation device.

Then even if the car deviates from the guide route with the intention of the operator, the necessary map information with the position relation etc. of the present position of the car and the previous guide route can be quickly confirmed. Moreover, if a start guidance is instructed, the guidance procedure to return to the previous route is begun together with display of the return route. Therefore while the car is traveling the guide route, even if the car deviates temporarily from the route with the urgent business, the car can return to the guide route quickly.

Further the map which was displayed before the division is shown at the same reduced scale in the other of the divided screen and therefore confusion which accompanies a changing of the map display is prevented. In other words, when the map which is displayed in display 33 is changed, generally a period of time is necessary to understand the displayed present position of the car and the displayed map information, and therefore the operator can concentrate on the screen. As a result, it avoids lack of attention ahead of the vehicle. Further because the map which was displayed before the division is shown in the other screen after the division just as it is, the dispersion of the consciousness to the above screen is prevented.

Moreover when the map around the present position of the car is displayed in the conventional single screen, the guide route sometimes disappears completely from the screen at some display reduced scale. In other words, when the detailed map is displayed in the screen before the division, the guide route disappears sometimes from the screen as the car travels far from the guide route. In this case, the operator doesn't understand the direction of the previous guide route from the present position of this car and the operator cannot quickly return to the previous route. Further in such a case, even if the guide route from the present position of the car to the destination is re-searched, it takes more time to travel by the new guide route and it sometimes is better to return to the previous guide route. However according to this embodiment, because the relative position of the deviation form the previous route and the car is correctly shown in one of the divided screens, the position and the direction of the previous guide route from the present position of the car can be correctly understood. In other words, the comparison of the condition in the case of returning to the previous route and using the new guide route is easy.

Furthermore, in this sixth embodiment, the kind of the map which is displayed in the divided second window isn't especially limited and the displayed map may be the road map and the house map. Furthermore, the house map is the road map which includes information of the facilities such as the dwelling and so on. Moreover in this sixth embodiment, the map reduced scale of the second window is decided as the value at which the whole return route is displayed fully, but it may be a value which is more or less. In other words, the map in the wide range which includes the return route may be shown in the second window. Moreover the route may be searched based on the information (for example VICS information) which is transmitted from outside and so on in the searching of the return route. Therefore a congested road isn't selected as the return route based on the information of the road congestion (jam) and so on.

Further a traveling route is cumulatively stored after the car deviates from the previous route and the map which includes the traveling route and the return route may be shown in the second window. In other words, after an optional time passes after the car deviates from the previous route, the car isn't always traveling on the return route which was searched immediately after the car deviated from the previous route. Therefore when it is detected that the car deviated from the previous route, the change of the present position of the car is stored in order in the RAM 5 as the movement coordinate of the east longitude and the north latitude. Then the above change is stored as the maximum coordinate and the minimum coordinate to the direction of the east longitude and the maximum coordinate and the minimum coordinate to the direction of the north latitude. In other words, the geographical movement range of the car is stored as the maximum and the minimum value to the direction of the east longitude and the north latitude. Then when the map which includes the return route and so on in the second window is displayed, a map which includes a changed geographical range to include the present position of the car and the point which deviated from the previous route may be shown.

24. Setting Procedure of Nearest Facilities

FIG. 49 shows the flow chart of the setting procedure of nearest facilities of the seventh embodiment of this invention. The setting procedure of nearest facilities is executed with the destination-setting procedure or the other procedure of FIG. 5. In the nearest facility procedure, the retrieving and the choosing of dropping in facilities except the destination are executed. These facilities are in the neighborhood of the present position of the car or along the guide route. Examples of dropping in facilities are as follows: gasoline stations for the fuel replenishment, restaurants, banks, post offices or supermarkets and so on. In other words, it is an facility except the destination and it is various facilities to used in daily life.

When the setting procedure of the nearest facilities of FIG. 49 is required, a list of the genre of dropping in facilities is shown in display 33. Then one genre is specified using this genre list. The facilities which correspond to the specified genre are shown on the map of the second window. At this time, a list of the names of the sales articles (brands) which are available at the retrieved facilities is shown in the third window to enable reduction of the number of displayed facilities. When a specific article is selected from the list of the names of the sales articles of the third window, the list of the names of the above sales articles is shown in the second window.

Moreover only the facilities which correspond to the name of this selected sales article are shown on the map of the third window. By specifying dropping in facilities in this way, the list of suitable facilities is changed to a narrower category from the large category. Moreover the retrieving result by this specification is shown in the divided screen. Additionally a retrieving result or a retrieving condition by the category which is specified immediately before is also shown.

Next FIG. 49 is explained. Firstly it is determined whether choosing of the genre is requested by the operator or not (step SX2). By touching the letters or icon "dropping in place setting" etc. which is displayed in display 33, the request of the genre choosing is input. The procedure of FIG. 49 is ended when genre choosing isn't required and then the flow is returned to the overall procedure of FIG. 5. However if genre choosing is required, the list for the genre choosing is shown in the screen of display 33 (step SX4).

FIG. 50 shows the example of the genre list which is displayed in the first window 104 of display 33. The name of the genre is shown in each column of the list 270 which is shown in FIG. 50. For example these genre are drugstores, restaurants and gasoline stations and so on.

When the genre list is displayed, it is determined whether one genre is chosen from the this genre list or not (step SX6). When the choosing of a genre isn't executed, in other words, the operation of touch switch 34 isn't executed during a predetermined period of time, the procedure of FIG. 49 is ended (step SX6). Then the program returns to the overall procedure of FIG. 5. However when a specific genre is selected, the facilities which correspond to the selected genre in the area within a specified distance from the present position of the car are retrieved from facility data file F16 (step SX8). In other words, only the facilities which correspond to the specified genre are retrieved from the facility data file F16. A geographical straight distance between the present position of the car and the facilities is calculated based on east longitude coordinate SEO and north latitude coordinate SNO of the each retrieved facility.

The discriminating number of the each facility which this calculated straight distance is less than the specified distance is temporarily stored in the RAM 5 as retrieving facility number GBn. When the extraction of the facilities which correspond to the chosen genre ends, the division procedure of the display screen of display 33 is executed (step SX10). Then each of facilities which are extracted in the step SX8 is shown on the map of the second window (step SX12).

Moreover, list of the names of the sales articles and the brand names are shown in the third window. For example, if the genre of gasoline stations is chosen in the first window which is shown in FIG. 50, the list of the brands (the names of the goods) of the gasoline stations is shown in the third window as shown FIG. 51 (step SX14). Further if a bank is specified as the genre, the list of the name of each bank is shown in the third window by the procedure of step SX14. Furthermore, before a list of restaurants is displayed when a genre of restaurant is specified, the list of the kind of food, Chinese food, Japanese cuisine and the Western dish, may be shown. In this case, the procedure for (step SX18) retrieving a list of facility names to be described later is repeated.

FIG. 51 shows the condition of a divided screen of display 33. The facilities which correspond to the genre which is specified by the first window are extracted and are shown on the map which is centered on the car in the second window 108. Further the list 272 of the brands (the names of the sales article) of the gasoline stations (genre selected in the first window) is shown in the third window.

Next it is determined whether a return request or not (step SX16) has been made. The information which is shown in display 33 is returned to the contents which were previously displayed by this return request. When a return request is input (step SX16), it is returned to the display of the genre list of the step SX4, i.e. the first window of FIG. 50. Furthermore, when the above return request is input, the genre list which is displayed in the first window of FIG. 50 may be shown in the second window or the third window of FIG. 51. Further the input of the return request depends on the icon which is displayed in display 33 being pushed.

If the return isn't requested, it is determined whether the brand of gasoline (the sales articles) is specified or not using the list 272 which is displayed in the third window (step SX18).

Furthermore, the specification of step SX18 corresponds to the retrieving condition which is used in the second retrieving. The reduction of the list of specific facilities is executed by the performance of this 2nd retrieving.

When the brand (the sales article) of the gasoline station is specified in step SX18, the list of the brands (the names of the sales article) of the gasoline stations is shown in the second window (step SX20). Then only the facilities which sell the brand (the sales article) of the specified gasoline station are shown on the map of the third window (step SX22). The processing result of step SX20 is shown in the second window 108 of FIG. 52. Likewise the processing result of step SX22 is shown in the third window 110 of FIG. 52. The list 272 of the third window which is shown in FIG. 51 is shown in second window 108 of FIG. 52. Only the facilities 279 which correspond to the selected brand (the sales article) 278 of the gasoline station of list 272 are shown on the map in the third window 110 of FIG. 52.

Next it is determined whether the return is requested or not (step SX24). The information which is displayed in display 33 by this return request is returned to the previously displayed contents. When the return request is input (step SX24), the flow is returned to the procedure of the step SX12. In other words, it is returned to the display condition of FIG. 51 when the return request is executed in the display condition of FIG. 52.

However, if return isn't requested, it is determined whether the specification of the facilities is operated or not (step SX26). In other words, it is determined whether or not a facility has been selected using the display of the third window as shown in FIG. 52. If a facility has been selected, information of the coordinate value etc. of the selected facility is read from the information memory unit 37 and is stored in RAM 5 as dropping in place DP (step SX28).

On the other hand, when one facility isn't specified using the display of third window 110 or touch switch 34 isn't operated during the specified time, the cancellation procedure of screen division and so on are executed (step SX30). In other words, the setting procedure of the nearest facilities which is shown in FIG. 49 is ended. Furthermore, when facilities are selected as described above, screen division is canceled (step SX30).

In this way, in the selection of the facilities such as the dropping in place and so on in the setting procedure of the nearest facilities of FIG. 49, as it does the name of the genre and the brand (the sales article), the narrowing of the selection (squeeze) for the facilities that are retrieved is executed in order. Moreover when the squeeze of this retrieving is executed, the facilities which the condition agrees with and the following retrieving condition (the list of the sales articles and so on) is shown in parallel in the divided screen of display 33. Therefore the change of the retrieving condition and the retrieving result as the condition changes can be confirmed at once on the divided screen. The facilities about the dropping in place or the destination can be quickly and accurately specified.

Further when the selection of the brand (the sales article) of the gasoline station is executed in step SX18 of FIG. 49, as shown in FIG. 73, the map of all the facilities which correspond to the genre which is chosen in the step SX12 may be shown in the second window 108. In this procedure, all gasoline stations which are in the specific area are shown in the second window. Moreover only the gasoline stations which sell the specific brand (the sales article) which is specified in the step SX18 are shown in the map of the third window.

In the above embodiment, the specification of the genre is executed as the first retrieving condition. The specification of the name of the brand (the sales article) is executed as the second retrieving condition. However this invention isn't limited to this retrieving condition. For example, a retrieving condition which extracts the only facilities which are within the specified distance from the searched guide route may replace the 2nd retrieving condition or the 3rd retrieving condition. Moreover the same procedure as the setting procedure of the nearest facilities of FIG. 49 may be executed in case of destination setting and so on. That is, in the specification of the destination, each of the facilities may be specified by the condition of the various choosing such as the genre choosing, the chain shop name choosing and the sales article choosing and so on. Moreover the extraction (FIG. 53) of the following facilities along route and/or the extraction (FIG. 54) of the shortest straight distance between the guide route and the facilities may be added to the retrieving condition of the each facility.

25. The Extraction of the Facilities Along Route

FIG. 53 shows the subroutine for the extraction of the facilities along route. Based on the geographical coordinate data at each of the retrieved facilities, in this subroutine, a geographical shortest straight distance to the guide route from the facilities is calculated (step SX32). Then the only facilities with the shortest straight distance which is within the specified value is extracted. Furthermore, the subroutine of this calculation of the shortest straight distance is shown in FIG. 54. The above guide route means the guide route data MW which is found by the route search procedure in the overall procedure of FIG. 5. FIG. 55 explains position relation between the detected facilities and the guide route. A route to destination a from guidance beginning point $\epsilon$ is found by the route search procedure (step SA4).

In the extraction procedure of the facilities along route of FIG. 53., firstly a shortest straight distance to the guide route from each of the facilities is calculated (step SX32). This shortest straight distance is about 150 m (step SX34). Then it is determined whether each of the facilities extracted in the step SX34 are on the right or the left to the moving direction of the car on the guide route (step SX36). FIG. 56 explains the procedure of step SX36.

In the FIG. 56, coordinates (X1, Y1) indicate the coordinates of the node of the guide route which is near the facilities of the objective coordinate (Xb, Yb). Coordinate (X1, Y1) corresponds to the node SAS1 of the guide route which is shown in FIG. 55. Further as shown in FIG. 56, standard coordinate (X0, Y0) corresponds to the coordinate of the node SAS2 of the guide route or the present position of the car. Therefore, the standard vector a=(ax, ay) which links coordinate (X1, Y1) and basis coordinate (X0, Y0,) corresponds to the branch 300 of FIG. 55. Furthermore, standard vector a is a=(ax, ay)=(X1−X0, Y1−Y0). The node of the coordinate which is the nearest objective coordinate (Xb, Yb) of the facilities is selected from each of the road data which composes a guide route data MW as this coordinate (X1, Y1) and standard coordinate (X0, Y0).

Orthogonal vector c=(−ax, ay) which turns counterclockwise by 90 degrees to this standard vector is defined. Further the objective vector b which links the standard coordinate (X0, Y0) and the objective coordinate (Xb, Yb) of the facilities shifts to the orthogonal vector c in angle θ. Furthermore, the objective vector b is b=(Xb−X0, Yb−Y0).

The inner product of the orthogonal vector c and the objective vector b is defined as follows.

$$c \cdot b = |c| \times |b| \times \cos \theta$$

By the way, it is 0<cos θ<1 at the time of −90 degrees<θ<90 degrees. Further it is −1<cos θ<0 at the time of −180 degrees<θ<−90 degrees and 90 degrees<θ<180 degrees. Therefore, if the value with the inner product of the above vectors c and b is positive, the above facilities are on the left side to the moving direction of the car on the guide route. If the above inner product value is negative, the facilities are on the right side to the moving direction of the car. In this way, the position on either side of the extracted facilities to the guide route is determined by positive (plus) and the negative (minus) of the vector inner product (step SX36).

Therefore if the positive and negative in the calculation result of the inner product is determined, direction of the right or left of the objective one is easily decided. This determined right or left data RL is stored in the above RAM 5. Furthermore, the standard coordinate (X0, Y0) which is shown in FIG. 56 is the coordinate (node SAS2 in the FIG. 55) of the node which is near the starting point in two nodes of the guide route which is the nearest facilities of the retrieving object. Oppositely the coordinate (X1, Y1) is the node coordinate (node SAS1 in the FIG. 55) which is near the destination. Furthermore, the above orthogonal vector c may be turn clockwise by 90 degrees to standard vector a. The relative position of each of the facilities to the moving direction of the car of the guide route may be detected by the exterior product ($|a| \times |b| \times \sin E$) of the standard vector a and the objective vector b. But, E of sin E is an angle between the standard vector a and the objective vector b and the clockwise turn to standard vector a is plus (positive).

Moreover, the direction of standard vector a may be north, south, east, west, the moving direction of the present position of the car, the direction to the destination from the car or the direction which the operator set and so on. Therefore the position on either side of each of the facilities to the direction which is specified is determined.

When a position on either side of each of the extracted facilities to the guide route is detected in the step SX36 of FIG. 53 and facility-destination distance Zn from the extracted facilities to the destination are calculated (step SX38). This facility-destination distance Zn is the distance along the guide route and means the distance along route to destination α from the point PP1 which is shown in FIG. 55. Therefore in case of FIG. 55, each straight distance of branches 364, 365 and 366 is added to the straight distance to node SAS1 from point PP1 and this is facility-destination distance Zn. Further the shortest straight distance, i.e. the value which is found in step SX32 of FIG. 53 may be added to this facility-destination distance Zn.

Then the extracted facility data is replaced in line based on the found facility-destination distance Zn (step SX40). For example, each of facilities are arranged from the biggest facilities-destination distance Zn. Then the extracting condition of facilities may be set by this facility-destination distance Zn. By the comparison between the distance from the car to the destinations and the facility-destination distance Zn, the facilities which are left by more than the specified distance or are left the present position of the car by more than the specified distance may be excluded from the destination.

26. Calculation of the Shortest Straight Distance

FIG. 54 shows the subroutine (step SX32) of the calculation of the shortest straight distance between the retrieving facilities at FIG. 53 and the guide route. FIG. 55 explains relative geographical position relation between the facility which is along the guide route and this guide route. FIG. 57 explains the calculation of the shortest straight distance. As described above, a route from the guidance beginning point c which is shown in FIG. 55 to destination α is found by the route search procedure (step SA4 of FIG. 5).

Further the nodes SAS1 and SAS2 which are shown in FIG. 57 correspond to the nodes SAS1 and SAS2 which are shown in FIG. 55. A geographical shortest straight distance between coordinate PP2 of one retrieved facility and the guide route is found as follows. The nodes SAS1 and SAS2 of the guide route which is the nearest coordinate PP2 at these facilities are selected (step SX42 of FIG. 54). Furthermore, two nodes which are the nearest each of the aimed facilities in the nodes which are in this guide route are detected by the following procedure. First a straight distance between each node of the guide route and coordinate PP2 is calculated. The nodes which have a straight distance with minimum value and the next small value in each calculated straight distance are detected. These two nodes are made the nodes which are nearest the guide route.

Next each coordinate of JJ1, JJ2 . . . of intermediate (middle or halfway) points which divide into m equal segments the straight line which links these two nodes SAS1 and SAS2 is calculated from the geographical coordinate of each node SAS1 and node SAS2 (step SX44). The geographical straight distances of the straight lines RR1, RR2 . . . which link respective intermediate points JJ1, JJ2 . . . and coordinate PP2 of the aimed facilities are calculated (step SX46).

Next the distance value of straight line RR1 is set as minimum value Rmin in the setting of a initial value. Moreover initial value "2" is set as condition variable NS (step SX48). This condition variable NS indicates the number of the above straight lines RR1, RR2 . . . A geographical distance of the NS-th straight line RR (NS) which is specified by this condition variable NS and the above minimum value Rmin are compared (step SX50). If the value of the straight line RR (NS) is smaller than minimum value Rmin, the distance value of straight line RR (NS) is set as minimum value Rmin (step SX52). After substitution for this numerical value, the condition variable NS is increased by one (step SX54).

However if the minimum value:Rmin is smaller than the distance value of straight line RR(NS), the procedure of step SX52 isn't executed and only 1 increase (step SX54) of the condition variable NS is executed. It is determined whether this condition variable NS became bigger or not than the number of the halfway points that divides nodes SAS1 and SAS2 into the regular intervals (step SX56). If the result of this step SX56 is NO, the procedure from step SX50 is executed once again. However if the condition variable NS is bigger than the number of the halfway points which divided nodes SAS1 and SAS2 into the regular intervals, the procedure of steps SX50 to SX56 is ended.

By the procedure of above steps SX50 to SX56, the numerical value which is equal approximately to the shortest straight distance to coordinate PP2 of the aimed facilities from the straight line which links nodes SAS1 and SAS2 is set as minimum value Rmin. The minimum value Rmin which is found by the above procedure is made the shortest facility-route distance Rmin between the facilities and the guide route. This minimum value Rmin indicates the distance of the perpendicular line to the straight line which links between the nodes SAS1 and SAS2 from the objective facility. Furthermore, the calculation procedure of this shortest straight distance may be executed as follows. First a straight distance from node SAS1 or node SAS2 to the objective facilities is calculated. Moreover, an angle among the straight line which links nodes SAS1 and SAS2 and the straight line which links the node and facilities is found. The shortest straight distance may be found using the triangle function based on this angle and the straight distance between the node and the facility.

Further by the position on either side to the guide route which is found for by the procedure of FIG. 53, the following extracting condition may be added. That is, when the median strip exists in the road, it is impossible to turn left at the place except the intersection. Therefore the facilities on the left side of such a road part at which a car cannot turn left may be excluded. In this case, a extracting means of the road condition to extract environment at each road in the guide route which is searched is provided. It is determined whether to exclude or not the facilities which are extracted by the facility exception means using the result of the step SX36 of FIG. 53 by the road condition read by this extracting means. In other words, it is determined whether the facilities is in right side or left side of the guide route in the step SX36. If road environment and a position on either side of the facilities are compared here, the above extracting procedure is possible.

Processing by the extracting means of the above road condition is executed as follows. That is, road attribute data and attention point data and so on are read from road data file F4 of each road. The road environment of the guide route which is nearest the extracted facilities is determined using this read road attribute data and so on. In other words, it is determined whether the dropping into the facilities is difficult or not by the facility exception means. It is possible to prevent that the facility the dropping in of which is very difficult are chosen as the destination or the dropping in place by this.

Moreover the transmitted information is taken from the outside system of VICS and ATIS etc. and this information may be made a extracting condition of the dropping in facilities. For example, when a parking lot around the destination is extracted as the dropping in facilities and so on, the following procedure is executed. By the outside information to be spent by VICS and ATIS etc., the fullness or the empty condition of each parking lot or the congestion situation of the road in the this facility neighborhood is added to the extracting condition of the facilities. In other words, the extracting condition by the information which is sent from outside for example VISC or ATIS etc. may be added in the setting of the destination or the dropping in place. This can prohibit the choosing of facilities which neighbor a full parking lot or a traffic jam (crowded) road. In other words, the chance of making a mistake in the choice of a facility is reduced. Furthermore, when the car is traveling by more than constant speed, the begin order of the setting procedure of the nearest facilities and destination-setting procedure isn't permitted.

As above mentioned, when wanting to drop in the facilities on the way etc. of the guide route to the destination which is set at first, the facilities and the distance along the guide route are retrieved considering the present position of the car. Therefore the extracting condition of the dropping in facilities becomes more appropriate and the choosing of optimal facilities becomes possible. In other words, traveling to dropping in facilities which are far from the guide route is difficult generally. Therefore it is better that the information of the facilities which are far from such a guide route aren't displayed on display 33. Further if facilities along route are extracted, it can be prevented that the unnecessary information is displayed in the screen and it can be prevented that the facilities are mis-chosen.

Moreover when there are no dropping in facilities which agree with the request along the route from the present position of the car to the destination, the following condition is possible. That is, facilities which agree with the request points which back toward the side of the starting place of the guide route may exist. In this case, in the above embodiment, the facilities which the car has already passed along guide route are retrieved and therefore it is possible to choose such facilities.

Further when plural dropping in facilities are extracted, as mentioned above, if a squeeze condition (the straight distance from the guide route) is made severe, only the dropping in facilities which agree with the request of the user are shown and the time which takes for the facility choosing is reduced.

In the above facility setting procedure, the facilities may be retrieved in the whole area of the map information based on the guide route and the retrieving may be executed only in the specific area which is described later. In case of along guide route, the person who is traveling a route can drop in the requested facilities without deviating far from the route. Further if facilities within the requested range from the standard point (the present place, the destination or the cursor position and so on) are chosen and shown, the required information and the required retrieving result are provided quickly and clearly to the user. Further when an extracting result of the facilities is displayed in the screen, if various information of distance and position relation between each of the facilities and the guide route or distance from each of the facilities to the destination and so on is together shown, the position of the required facilities to the guide route can be grasped clearly.

27. Postal Code Choosing Data 50

In the above setting of the dropping in facilities or the destination, after a specific area is specified by the area specification number of the following postal code and so on, the facilities may be extracted in order in the specification area. FIG. 58 to FIG. 63 show the structure of various data which is stored in information memory unit 37. These data are used with the destination-setting procedure of FIG. 64. Postal code choosing data 50 is shown in FIG. 58. This postal code data 50 is composed of postal code PCN, street list address LA, size LD, facility genre list address NA, size ND, the east.longitude coordinate PEO of the representative point, the north latitude coordinate PNO of the representative point and area shape data address EA. One area is specified by one postal code PCN. Various data about this specified area is stored in order from the address in the information memory unit 37 which is specified by street list address LA and facility genre list address NA etc.

For example, the memory start address and the memory size in which a street list is stored are specified by the street list address LA and the size LD. Likewise the memory start address and the memory size in which a genre list that each of the facilities belongs to are specified by facility genre list address NA and size ND. Furthermore the genre indicates the classification of the destination or the dropping in place, a field, a purpose, a use or business contents or facilities such as the public facilities, traffic facilities, sports/leisure facilities or shopping facilities such as a station, a museum, a golf course, a bookstore, a pharmacy, a restaurant or etc.

The east longitude coordinate PEO of the representative point and the north latitude coordinate PNO of the representative point indicate a center approximately in the area accorded to postal code PCN. When the map data in the information memory unit 37 is displayed in display 33, the geographical coordinate which is specified by the east longitude coordinate PEO of the representative point and the north latitude coordinate PNO of the representative point is approximately made in the center of the display 33. Therefore the area which corresponds to the specified postal code is approximately shown in the center of the display 33. In other words, the map data which corresponds to the postal code area is approximately shown in the center of the display 33 by the east longitude coordinate PEO of the representative point and the north latitude coordinate PNO of the representative point. Furthermore the end or the edge of the area is sometimes cut in the display reduced scale.

Data which specifies outward. form of an area which is specified by a postal code PCN is stored from a memory start address in the information memory part 37 which is specified by the area shape data address EA. Then data is stored in a memory area which is specified by the size ED. Latitude data and longitudinal data (geographical coordinates) of plural places which plot an outer edge of the area are stored from the memory address in the information memory part 37 which is specified by address EA. One postal code area is specified in map data of an information memory part 37 by latitudes and longitudes of plural places (geographical coordinates). If all latitude and all longitude are displayed in display 33 by a reduced scale, a specified postal code area is completely displayed in a display 33.

Postal code choice data 50 of FIG. 58 is composed of a postal code PCN, a street list address LA, a facility genre list address NA, east longitude coordinate PEO of a representative point, north latitude coordinate PNO of a representative point and an area shape data address EA. A postal code PCN is made index data. Therefore if postal code PCN is specified, One area is specified in the map data in information memory part 37. This specified postal code (the telephone number) area is displayed at approximately center in the display output means (display 33) based on the representative point data in this area. Further in case of area display, the optimal display reduced scale may be chosen based on the shape data in the area. In other words, a reduced scale is adjusted and the whole area may be totally displayed in display 33.

Moreover postal code PCN was used for the specifying of an area, this may be specified by the telephone number, the city administration management area number or the personally set number and so on. By the partial entry (part of the higher rank figure) of postal code and telephone number, the specific area which has the east longitude coordinate of the representative point and the north latitude coordinate of the representative point may be chosen. In other words, if a partial entry of postal code and telephone number is inputted, the area which corresponds to the inputted partial postal code and the telephone number is specified. For example, when higher rank 2-digit "12" is inputted from 3-digit postal code "123", the area which corresponds to the higher rank "12" of this inputted postal code may be displayed. Moreover as with the postal code and the telephone number, the area may be specified by the specific distinguishing number every area is distinguished, classified or divided by the fixed condition. For example, it is a prefecture, a city, a number every city or village, a number every state, a number every time difference area or a number every country in the European collective and so on..

In this way, after an area is specified by the postal code and so on, the nearest facility setting procedure of FIG. 49 may be executed. Moreover after area specification, the following street specification is done and moreover the nearest facility setting procedure of FIG. 49 may be done.

28. Street List Data 55

FIG. 59 shows the data structure of street list data 55. This street list data 55 is composed of the group data of the number SS(m) of the streets. This list data 55 is stored from the address at the head of the information memory part 37 which is specified by street list address LA. One piece of street list data 55 is composed of street name SSN, the east longitude coordinate SEO of the display representative point, the north latitude coordinate SNO of the display representative point, shape data address SEA and size SED.

Street name SSN indicates the name of the street of the for example m-th turn eyes. This street name may include a national highway name (the national highway number), a local road name (the local road number) or an expressway name (the expressway number). By the east longitude coordinate SEO of the display representative point and the north latitude coordinate SNO of the display representative point, the longitude and the latitude (the geographical coordinate) of the representative point at this street are indicated. This representative point is made a point at the center of the street, but may be made a point at the end in north, south, east or west of the street or at the start point or the end point of the street.

The memory start address of the geographical coordinate data of each node which composes this street is specified by shape data address SEA. The memory size where street shape data is stored is specified by size SED. The outward form of this street is decided by the geographical coordinate data of each of these nodes. Using the geographical coordinate data of the east longitude coordinate SEO and the north latitude coordinate SNO of these display representative points and each node, a street diagram is displayed in display 33.

When one street extends over plural postal code areas, street list data 55 about this street is memorized for every postal code area. Because the partial shape of the street in each area is different respectively, the east longitude coordinate SEO of the display representative point, the north latitude coordinate SNO of the display representative point, shape data address SEA and size SED are different. In other words, when one street extends for two areas, each street in each area is different respectively. Therefore the display representative point at the street in each area is also different. As a result, the east longitude coordinate SEO of the display representative point north latitude coordinate SNO of the display representative point at the street in each area are recorded as the street data. Further each street name SSN is the same.

29. Facility Genre List Data 60

FIG. 60 shows the data structure of facility genre list data 60. This facility genre list data 60 is composed of the data group of facility genre number NC(k). One piece of facility genre list data 60 is composed of facility genre name NM, facility list address NLA and size SED. Facility genre name NM indicates the name of the genre.

To the memory area which is specified by size NLD from the memory start address which is specified by facility list address NLA, list data of the facilities which belong to this genre is memorized. By the data which was read from the memory which is specified by this facility list address NLA and size NLD therefore, a geographical coordinate at each of the facilities and the peculiar name of the facilities which belong to this facility genre name NM are distinguished.

30. Street Shape Data 65

FIG. 61 shows the data structure of street shape data 65. This street shape data 65 is composed of the data group of the number ES(t) of the nodes. One piece of street shape data 65 is composed of east longitude coordinate EEO, north latitude coordinate ENO, address ENO and street name SSN. The geographical position of the node about the map data in information memory part 37 is decided by east longitude coordinate EEO and north latitude coordinate ENO. Moreover address ENO indicates the address data of the address of this node. When a street is displayed in display 33, this address ENO is displayed with the street (or the node). This can distinguish each address based on the street.

31. Facility List Data 70

FIG. 62 shows the data structure of facility list data 70. This facility list data 70 is composed of the data group of the number IS(u) of the facilities. This facility list data 70 indicates plural facilities which belongs to one genre of one piece of facility genre list data 60 which is shown in FIG. 60.

One piece of facility list data 70 is composed of facility name IM, east longitude coordinate IEO, north latitude coordinate INO and address IB. Facility name IM is the peculiar name of the facilities. East longitude coordinate IEO and north latitude coordinate INO show the longitude and the latitude (the geographical position) of these facilities. A position on the map at these facilities is specified by this east longitude coordinate IEO and north latitude coordinate INO. Also address IB indicates the address of the address.

Street name SSN is the name of the road which these facilities are close to. But when there is not a neighbor road, the name of the nearest street is chosen. Further this street name SSN may be the name of the road which is made the object for the guidance which is the nearest these facilities. Therefore when plural streets (or guidable roads) exists around the facilities, plural street names SSN is memorized in one piece of facility data. Moreover this street name SSN is the same as the street name SSN of the street list data 55 which is shown in FIG. 59. Further the guidable road means the road which is the used by the route search procedure.

32. Area Shape Data 75

FIG. 63 shows the structure of area shape data 75. This area shape data 75 specifies an outer edge (periphery) of the postal code area on the map. Therefore an area range on the map is specified by area shape data 75. A geographical position of the periphery in the geographical range of the area is specified by plural nodes. One piece of area shape data 75 consists of longitude and latitude, i.e. east longitude coordinate AEO and north latitude coordinate ANO. Moreover node number data ANC(v) shows the number of the nodes. In other words, the number of the nodes which model a periphery in the area is node number data ANC(v).

33. Destination-setting Procedure (step SA5)

FIGS. 64 to 65 show the flow chart of the destination-setting procedure which is executed with the navigation device of this invention. The screen of display 33 is divided first with FIG. 64 (step SX60). Then the input screen of the postal code is displayed in the second window (step SX62). The example of the input screen of this postal code is shown in the second window 108 of FIG. 68. Moreover a picture for the choice item is displayed in the third window 110 (step SX64).

As shown in FIG. 68, input number display columns 402, number 408 of 0–9 and the "END" letter 410 which chooses that the number input is complete is displayed in the second window 108. Moreover the mouse cursor 406 which can be freely moved from in this screen 108 is also displayed. When this mouse cursor 406 is moved onto each number 408 and a fix input key is pushed, a number is recognized with the navigation device. Further the fix input key is prepared onto the navigation device.

Mouse cursor 406 may be moved by a small joystick. The fix input key may be the switching mechanism which this joystick is pushed into. Moreover mouse cursor 406 doesn't have to be displayed in the third window 110. In this case, each display item in screen 110 is chosen by the drive to the top or the bottom of the joystick. Then, in the frame with chosen display item, the color is changed into and a choice condition is distinguished. By push of the fix input key after this, the choice of the item which is displayed in reverse is decided.

The numerical value which is inputted using the input screen of the second window 108 of FIG. 68 is used as postal code PCN. When this postal code PCN is inputted, based on this postal code PCN, postal code choice data 50 (the FIG. 58 reference) is retrieved from information memory part 37. From the data group of postal code choice data 50, one piece of postal code choice data which agrees with inputted postal code PCN is read from information memory part 37.

For example the letter 418 of "representative point map, display", the letter 420 of "street name input", the letter 422 of "facility name input" and the letter 424 of "destination setting by another item" are displayed in the item choice screen (FIG. 68) of the third window 110. The following procedure is executed when the fix key is pushed after the mouse cursor 406 which is displayed in the screen of display 33 is moved by the operator. When the fix key is pushed, the relative position of mouse cursor 406 on the screens 108 and 110 is detected (step SX66). That is, when the fix key is pushed, a position on the screen of mouse cursor 406 is distinguished by CPU 2. Then the information contents which are displayed in the position of this mouse cursor 406 are chosen. For example, if the fix key is pushed when mouse cursor 406 are overlapped and displayed on box 418 of "representative point map display", the procedure of a map display by this representative point is chosen.

Next the choice of "destination setting by another item" is determined (step SX68). The procedure of FIG. 64 is ended when this "destination setting by another item" is chosen. The procedure which a destination is set from the area which is specified by the postal code is canceled. Therefore it is when the determination result of the step SX68 is "YES", setting procedure subroutine of the destination which is based on another item is executed (step SX70). In the example of the destination setting which is based on another item, the destination is selected straight from the address of the destination. When the subroutine of this step SX70 is ended, the flow is returned to the overall procedure of FIG. 5.

However when the determination result of the step SX68 is "NO", procedure since the step SX72 is executed. In the item choice procedure by the steps SX64 and SX66, when either of the representative point map display procedure, the street name input procedure or the facility name input procedure is chosen, this choice result is memorized in the RAM 5 as mode set data MD.

If "destination setting by separate section eyes" isn't selected and the other procedure, e.g. "representative map display" are specified, the item choice picture which was displayed in the third window is displayed in the second window (step SX72). After this, the mode which is chosen in the third window of FIG. 68 is determined. In other words, the selection of the mode to display a representative point map is determined by the mode set data MD (step SX74). If it is selected, "representative point map display and the destination setting" subroutine is executed (step SX76).

However the representative point map mode isn't selected or the procedure of "representative point map display and destination setting" of the step SX76 is ended, the determination of the following step SX78 is executed. In other words, it is determined whether the mode selection is a street input mode or not (step SX78). If the street input mode is chosen, "display of street name and destination setting" subroutine is executed (step SX80).

When "display of street name and destination setting" subroutine is ended or the determination result of the step SX78 is "NO", the determination of the step SX82 is executed. That is, it is determined whether setting mode by genre is chosen or not (step SX82). If it is the setting mode by genre, "genre list display and the destination setting" subroutine is executed (step SX84). If the subroutine of this step SX84 is ended or the result of the step SX82 is "NO", the push of return key is determined (step SX86). If a return key is pushed, the procedure beginning with the step SX62 is executed once again. In other words, a picture for the postal code input is displayed in the second window. However if a return key isn't pushed, the flow is returned to the overall procedure of FIG. 5. In other words, if the return key is pushed, the display condition of display 33 is returned to a previous condition.

34. Subroutine of Map Display of Representative Point and Destination Setting

FIG. 65 shows the subroutine of the map display of the representative point and the destination setting. First the postal code choice data 50 which is specified by postal code PCN is read from information memory part 37. Further this postal code PCN is inputted in the step SX62 of FIG. 64. Moreover the area shape data address EA and size ED which is recorded to this postal code choice data 50 are extracted.

From the memory area which is specified by this area shape data address EA and size ED, the east longitude coordinate AEO and north latitude coordinate ANO (the FIG. 63 reference) of each node to set an outer edge (the periphery) of the area are read in order. Then a maximum and a minimum value are extracted in the east longitude coordinate AEO of each node (step SX90). Likewise maximum and minimum value in the north latitude coordinate ANO of each node are extracted.

From the maximum and the minimum value of each of the these east longitude coordinates AEO and each of north latitude coordinate ANO, the reduced scale when displaying a map in display 33 is found (step SX92). For example, a geographical distance in the direction of the east longitude is calculated from the maximum and the minimum value of the east longitude. Likewise the geographical distance in the direction of the north latitude is calculated from the maximum and the minimum value of the north latitude. Further by optional reduced scale, a geographical distance in the direction of the east longitude and the north latitude which can be displayed in the divided screen of display 33 is understood from the actual size of the screen. The reduced scale to display the geographical distance in the direction of the north latitude and east longitude in the specified area is calculated backward from the geographical distance which can be displayed in the screen. When this reduced scale is found, a specified area is totally displayed in the divided screen.

In other words, the end of the area which is specified by postal code PCN is not broken, the whole area is displayed in the third window 110 of display 33 (step SX94). Further a geographical range in the specified area of postal code PCN is decided by area shape data 75. Moreover the map data which is displayed in display 33 is memorized in information memory part 37.

An example of the specified area which is displayed in this appropriate reduced scale is shown in FIG. 69. This specified area is the range which is surrounded by the dotted line 456 of FIG. 69. Further the turning points 460 and 462 which are shown in this FIG. 69 indicate a node. Moreover symbol 452 indicates the present position of the car. Curves 458 and 459 indicate roads. Further the shape of all the streets or the main street in the specified area is together displayed in the step SX94. In this case, street shape data 65 in each area of this FIG. 61 is used.

Further the choice procedure of the appropriate reduced scale in the step SX92 may be omitted and the reduced scale may be chosen manually by an operator. Moreover the map in the wide range which includes the area which was specified by postal code PCN may be displayed in the third window 110. In other words, the map (the wide area map) may be displayed at the reduced scale which is bigger than in the proper reduced scale where the specified area can be effectively for the third window displayed. Further when the procedure of step SX92 is saved, the area map which is displayed in display 33. expands most and is displayed. Moreover the east longitude coordinate PEO of the representative point and the north latitude coordinate PNO (the FIG. 58) of the representative point in the specified area are centered in the third window 110.

When an area map is displayed in the third window 110 of display 33, each of facilities are displayed in the specified area using the figure symbol which was memorized in the flash memory 3 (step SX96). The facility list data 70 of FIG. 62 is used in the display of these facilities. A specific symbol is displayed in the geographical coordinate of each of the facilities. For example, this symbol is a star, a circle, a triangle, a square, a fork, a glass, a bag, a flag and a house and so on. Further only when the area map which was most expanded is displayed in the third window of display 33 may these facilities be displayed.

After this, an optional point in the display map area is specified using the mouse cursor 406 which is displayed in display 33. In other words, by the operation of the operator, mouse cursor 406 is moved and a fix key is pushed. The display position of the mouse cursor 406 when this fix key is pushed is the requested destination of the operator. Therefore the display position of the mouse cursor 406 when the fix key is pushed is acquired (step SX98). An actual geographical coordinate position is calculated by the calculation which used a map reduced scale etc. from this cursor display position. The geographical coordinate position which was found by this calculation is memorized in the RAM 5 as the entry destination data TP (step SX100).

When the procedure of this step SX100 is ended, the flow is returned to the destination setting procedure of FIG. 64. Further the dropping in place may be also set according to the procedure which is the same as the above. When the dropping in place is set by the procedure which is the same as the procedure of FIG. 64, a geographical coordinate in the dropping in place is memorized in the RAM 5 as dropping in place DP.

35. Display of Street Name and Destination Setting Subroutine

FIG. 66 shows a display of the street name and a destination setting subroutine. When the determination result of step SX78 is YES in FIG. 64, the procedure of this FIG. 66 is executed. First all streets in the area which is specified by the postal code PCN are read (step SX110). The list of all these streets is made using the street list data 55 of FIG. 59. Street names in the area which is specified by postal code PCN are memorized in this street list data 55. Only street names are extracted from this street list data 55 and street list.

The list of the street names which is made in the step SX110 is displayed in the third window 110 of display 33 (step SX112). Further when there are many street numbers SS(m), all the streets cannot be displayed together in display 33. In this case, the screen of display 33 is scrolled and the street names of the remainder are displayed in order. The display example of the street list is shown in FIG. 70. Also when this street list is displayed, each street name may be reported by sound.

When a street list displays in the step SX112, the mouse cursor 406 is also displayed in the screen 110 of display 33. Then the display position of mouse cursor 406 when the fix key is pushed is acquired (step SX114). It is distinguished which street is chosen by the display position of this mouse cursor 406 (step SX116).

The east longitude coordinate SEO of the display representative point and the north latitude coordinate SNO of the display representative point of the street which is chosen in this step SX116 is read from street list data 55 (step SX118). Moreover street shape data 65 of the chosen street is read from information memory part 37. This street shape data 65 consists of the east longitude coordinate EEO and north latitude coordinate ENO of each node and the shape of this street is decided. Therefore from the east longitude coordinate EEO and north latitude coordinate ENO of this each node, each maximum and minimum value are detected (step SX120).

The detection of the maximum and the minimum value of the directions of the east longitude and the north latitude of this node coordinate is procedure like the step SX90 in case of above area map display. By the found maximum and the minimum value of the directions of each of the east longitude and the north latitude, the appropriate reduced scale of the map which is displayed in the display 33 is found. In other words, the reduced scale that the specified whole street can be completely displayed in the divided screen is found.

By this found reduced scale, a street is displayed in the third window 110 of display 33 (step SX122). When this street is displayed, each address on this street is also displayed. Further this street name may be reported by sound with the display of this street.

With the street displayed in the third window, the street list is displayed in the second window (step SX123). Example of the street which is displayed in the third window 110 of display 33 is shown in FIG. 71. The chosen street is distinguished from other roads in the third window 110 as shown in this Figure. In this FIG. 71, it is shown by thick line 500. Further the color of this specified street is different from the color of other roads to make it may be possible to be easily distinguished. Also the chosen street name is displayed by box 504 in display area 502 in the upper part of the third window 110. Further this displayed street name is the street name SSN of street list data 55. Number 506 in FIG. 71 indicates an address. As this displayed address, the data of the address ENO of street list data 55 is used.

The calculation of the appropriate reduced scale in the step SX122 may be omitted. In this case, a map displayed for a street to be most expanded or a map (wide area map) in the wide range is displayed. Moreover it is adjusted for the representative point of the street to become the center of screen 100. The representative point of this street is decided by the east longitude coordinate SEO and the north longitude coordinate SNO of the display representative point in the street list data 55.

When a specified street is displayed in the third window 110 in this way, an optional spot on the street is specified as the destination by mouse cursor 406. That is, a position of the mouse cursor 406 on screen 110 when the fix key is pushed is detected (step SX124). Also it is determined whether the return key is pushed or not (step SX125). If the return key is pushed, the display condition of display 33 is returned to a previous condition. In other words, the procedure is returned to the step SX72 of FIG. 64. Also if the return key isn't pushed, a actual geographical coordinate position when the fix key is pushed is calculated from the displayed cursor position. The geographical coordinate position which is found by this calculation is memorized in the RAM 5 as destination data TP (step SX126).

When the procedure of this step SX126 is ended, the program returns to the destination-setting procedure of FIG. 64. Furthermore the setting of a dropping in place may be also done according to the procedure which is the same as the above. In other words, an area is specified by postal code PCN. A specific street is chosen from all the streets in this specified area and moreover a specific spot is chosen on the map of the displayed street. This specified spot is memorized in the RAM 5 as dropping in place DP.

All the streets in the specification area are put on the list in the display of the street name of FIG. 66 and the destination setting in this way. Then one street where the destination exists is selected from the list of the street name. A map of the selected street is displayed in the screen. And then on the map of this street, a specific spot is chosen as the destination by the mouse cursor. Therefore the destination or the dropping in place can be easily specified from the name of the street. Further when the street is displayed in the step SX122, the whole specification area which includes this street may be displayed.

36. Genre List Display and Destination Setting Subroutine

FIG. 67 shows a genre list display and a destination setting subroutine. In this FIG. 67 first the genres of each of the facilities in the area which is specified by postal code PCN are put on the list (step SX130).

This genre is put on the list using the facility genre list data 60 of FIG. 60. A memory area in the information memory part 37 of this facility genre list data 60 is specified in the facility genre list address NA of postal code choice data 50 and size ND.

Next facility genre number NC(k) of the facility genre name NM is read from facility genre list data 60. Then the genre list is displayed in the third window of display 33 (step SX132). The screen display example of this genre list is shown in FIG. 72. After this, the display position of mouse cursor 406 in the screen 110 when the fix key is pushed is acquired (step SX134). In other words, the genre name of the display position of the mouse cursor when the fix key is pushed is made the selected genre. Also it is determined whether the return key is pushed or not (step SX135). If the return key is pushed, the flow is returned to the step SX62 of FIG. 64 from the procedure of FIG. 67.

If the return key isn't pushed, it is determined that the genre which is displayed in the position of the cursor 406 is chosen (step SX136). The facilities which belong to this specified genre are put on the list (step SX138). In other words, the facilities which correspond to the chosen genre are put on the list using the facility list data 70 of FIG. 62. The memory area of facility list data 70 is specified by facility list address NLA and size NLD. Facility list address NLA and size NLD are included in facility genre list data 60. In other words, if the genre is specified, the list of the facilities in the specified area and belonged to the genre is read from the information memory 37.

Next only the facility name IM of facility list data 70 is extracted and the list is displayed in the third window of display 33 (step SX140). Moreover the genre list is displayed in the second window (step SX141). Then the display position of mouse cursor 406 in the screen 110 when the fix key is pushed is acquired (step SX142). The facilities of the display position of this cursor 106 are set as the destination (step SX144). In other words, chosen facilities are memorized in the RAM 5 as destination data TP.

Also it is determined whether the return key is pushed or not (step SX145). If the return key is pushed, the procedure is returned to the step SX72 of FIG. 64. However if the return key isn't pushed, the procedure following the step SX146 is executed. In other words, when the return key is pushed, the display condition of display 33 is returned to the previous display condition.

If the return key isn't pushed, east longitude coordinate IEO and north latitude coordinate INO of the chosen facilities in the step SX144 are read from facility list data 70. A map around the specified facilities is displayed in the third window of display 33 based on this east longitude coordinate IEO and north latitude coordinate INO (step SX146). Moreover the facility list is displayed in the second window (step SX147). Further the reduced scale of this displayed map may be the reduced scale that a map is displayed in the maximum or the reduced scale which is chosen by the operator. Moreover the facility name may be reported by sound together with the display of the map of these specified facilities and neighborhood. Further the procedure of the steps SX146 and SX147 may be omitted.

It is determined whether the return key is pushed or not after the display of the step SX147 (step SX148). If the return key is pushed, the procedure of the step SX140 is again executed. However if the return key isn't pushed, the program returns to the destination-setting procedure of FIG. 64. In this way, the genre is specified from the specified area in the genre list display and the destination setting of FIG. 67. Then the requested destination is specified from the list of the specified genre. In this way, at the destination-setting procedure of this embodiment, a specific area is specified by the postal code PCN and plural kind (three kinds, 3 modes) pieces of information are displayed in display 33. Then a destination is specified from the map or the list etc. which is displayed in each mode. For example a street is specified in the specified area. Because this specified street is displayed at the map, a spot is specified as the destination on the street of the map. Because the retrieving of a destination is done step-by-step through the area specification, the street specification, the genre specification and so on in this way, the specification of the destination is simpler. Also when the return key is the pushed in each display condition of the embodiment, the display is returned to the previous choice screen.

37. Application Example of Destination Setting or Dropping in Place Setting Procedure The destination setting procedure may be implemented as follows. First a area is specified by the postal code. Next a specific street is chosen from all the streets in the area. Moreover when genre is specified, the facilities which correspond to the specified genre and is around the choice street are put on the list. Lastly the requested destination is chosen from the facility name that is put on this list. Therefore the required destination can be retrieved from the street and neighborhood and the specific genre.

Moreover the destination setting procedure may be executed as follows. A area is specified by the postal code. Next a specific street is chosen from the streets in the area. The facilities along the chosen street are put on the list. Lastly a required destination is chosen from the facility name that is put on this list. Therefore a required destination is extracted along the specific street in the specific area.

Moreover again the destination setting procedure may be executed as follows. First a area is specified by the postal code PCN. After this, a specific genre is chosen. Next the street name where each of the facilities corresponding to the specified identical genre exist is enumerated. Then facilities are chosen based on this street name list. When a destination is set, it can be retrieved in order of the area, the genre and the street.

This invention isn't limited to the above embodiments and various changes and modifications are possible in the range which doesn't deviate from the object of this invention. For example, in street choice in the step SX116 of FIG. 66, the street list is displayed in display 33 as shown FIG. 70 but this may be done as follows. That is, an area is displayed in the divided screen of display 33 as shown the second window 110 of FIG. 69 and each street name is also displayed together on the screen. Then when an optional geographical coordinate on the display area is chosen by mouse cursor 406, an expansion figure which particularly includes the choice part is displayed at once. In case of the display of the expansion figure, the facilities in the possible display range of display 33 are also displayed. Therefore each of the facilities along the specific street in the specific area can be retrieved while viewing a map.

Further an area is specified by the postal code in the each embodiment, but this postal code can be replaced with all or the higher rank part of the telephone numbers. That is, an area is specified only by the area code and exchange number portion of the telephone number (area code and first three digits of the telephone number). That is, an area is specified only by the outskirt telephone exchange number. Further higher rank part of or all the postal codes may be inputted.

Moreover after the step SX94 or SX96, the procedure may jump to the step SX110 or step SX130. By this, a list or a diagram of the streets, a list or a position of the facilities in the displayed area is outputted by display or/and outputted by sound. Also the procedure of the step SX94 may be executed in the step SX112. Moreover again the facility list display in the step SX140 may be replaced by the map display of the facilities in the step SX96, the positions of the facilities may be displayed on the map together with the facility list display. By this, the diagram at the street in the specified area or the position of the facilities in the specified area is displayed. Further the order of step SX146 and step SX144 may be the replaced.

Moreover the choice by the mouse cursor may be executed by the sound from the operator. In this case, the item (a genre, a street name, a facility name and so on) which is required from a list that is outputted by a display or/and is outputted by a sound is specified by a pronouncing of the operator.

In the each embodiments, the retrieving procedure of the destination or the dropping in place based on inputting of the postal code PCN is executed before route search procedure (step SA4). However these retrieving procedures of the destinations or the dropping in place may be executed on the way of the guide/display procedure of the step SA5. In other words, on the way of the guide route, according to the request of the operator, a new dropping in place or a destination is set. But this operation is executed at the condition when the car is stopping or going slowly. By this, the destination or the dropping in place is easily changed and set. Moreover the extraction of each of the facilities may be executed by a business time in the choice of the destination and the dropping in place. For example, the facilities which are doing business from 11 AM to 11 PM may be extracted.

Moreover again a address of a prefecture name, a state name, a city name, a town name and a village name may be used for the retrieving condition of the destination or the dropping in place. A field, a kind of business, a brand, a sales list of articles and a sales article may be used as the genre of the retrieving condition. Each of the facilities may be classified or retrieved by the price, the achievements, the results of the concrete sales article at each shop. In other words, the all kind internal information which shows the internal characteristic of the facilities which extracts each of facilities may be what one of the sales list of articles and so on. The internal information is a category of business, a brand, a list of articles, a price, achievements, results, business time and so on.

Moreover the retrieving or the extraction may be done by the outward information which shows the outward characteristic of the building, for example, the number of the floors, the floor area, the height, the advertisement body, the color, the site, the zoning, the plane shape or the solid shape. Also the ground or the underground building such as the facilities, the building does not only correspond to the destination and the dropping in place but also the guidable spot such as the detailed place name or the address and so on. A start point or the start spot which can begin a guidance and so on are included in the present position of the car which is made the retrieving start point of the guide route or the cardinal point in case of map display.

Also the street in the area is specified in extraction of the facilities of the above embodiment. In other words, the facilities at the specific street and neighborhood in the area are extracted but this may be done as follows. For example, the famous facilities in the specific area, e.g. the facilities which are within the fixed distance from every station of the bus, the streetcar, the subway and so on may be extracted. Moreover agency, an intersection name, commemoration facilities in the prefecture, towns and villages and so on, e.g. Tokyo Tower, Olympia Park, Imperial Palace, a castle, Washington Monument and so on are included in the famous facilities.

In the destination-setting procedure or the dropping in place setting procedure, the extraction of the facilities by the new retrieving condition is executed to each retrieving result. However the various retrieving condition to extract these facilities may be compound by plural retrieving condition. For example, when extracting facilities in the area, the extraction of the facilities by the genre and so on and the extraction of the facilities along the street may be overlapped and executed at the same time.

Also in the above embodiment, the retrieving condition and the extraction result by the retrieving condition are combined respectively in order and displayed in the second window and the third window. For example, when the retrieving condition is displayed in the second window, an extraction result by the previous retrieving condition is displayed in the third window. Then when the choice of the retrieving condition in the second window is executed, the retrieving condition which was displayed in the second window is displayed in the third window and a new retrieving result is displayed in the second window.

In other words, the latest information at the time of each operation is displayed in the second window. Moreover when the choice of the retrieving condition is operated, the information of the second window is moved to the third window and the new retrieving result and so on are displayed in the second window. However this may be done as follows. That is, each retrieving condition, e.g. the list for the choice of the genre or the street and so on and the facility extraction result by each retrieving condition may be displayed in the second and the third window by a optional combination. For example, the retrieving condition may be displayed in the third window and the past facility extraction result which is extracted by this retrieving condition is may be displayed in the second window.

Also the screen division of the display 33 is executed by the choice operation of the retrieving condition by the operator and so on in the above embodiment but may be executed by the following environment change. For example, it may be executed simultaneously with the beginning direction of the retrieving procedure and it may be executed when the retrieving condition is inputted or the retrieving result by the chosen retrieving condition is displayed. Also it may be executed when the divided screen display is demanded by the operator, a change of the running condition of the car, a change of the speed of the car, a change of the direction of the car, a advanced change of the car, a change of the distance to the destination or the dropping in place, the destination is changed or the car deviates from or enters in the range of the house map which is stored in the information memory part 37. It may be executed when a change of a running time, a change of a temperature of a drive source (a engine, a motor), a change of a number of rotations of the drive source, a change of the time, a change of remain value of fuel or a change of a voltage or a electric current of a battery (an accumulator, a cell). It may be executed when an environment change around (a change of a light (after a sunset, in a sunset or in a daytime), a temperature, a humidity, a wind pressure, a amount of rainfall (a rainfall, a snow quantity or a noise)).

Similarly the cancellation of the screen division may be executed when a changing operation of the operator, the choice of the retrieving condition, retrieving procedure ending or display of the retrieving result. Moreover it may be executed when a change of a running condition of the car, a change of a speed of the car, a change of a direction of the car, a advanced change of the car, a change of the distance to the destination or the dropping in place, the destination is changed or the car deviates from or enters in the range of the house map which is stored in the information memory part 37.

It may be executed when a change of a running time, a change of a temperature of a drive source (a engine, a motor), a change of a number of rotations of the drive source, a change of the time, a change of remain value of fuel or a change of a voltage or a electric current of a battery (an accumulator, a cell). It may be executed when an environment change around (a change of a light (after a sunset, in a sunset or in a daytime), a temperature, a humidity, a wind pressure, a amount of rainfall (a rainfall, a snow quantity or a noise)). As explained in detail above, in the destination-setting procedure of this invention, a screen is divided and a retrieving condition and a retrieving result are displayed in parallel in each divided screen. Therefore because a retrieving condition of a destination is squeezed step-by-step, it effects that the destination can be more handily retrieved and so on. Especially when an address in the required destination and so on are not understood and clear, based on the number which specifies an area, the destination can be retrieved.

38. Application Example of All Embodiments

The screen division of the display 33, division cancellation (the combining of the screen) or the changing of a navigation operation is executed by the choice operation of the operator or the change of the present position of the car in each above embodiments but may be executed by the following environment change. For example, it may be executed when a change of a running condition of the car, a change of a speed of the car, a change of a direction of the car, a advanced change of the car, a change of the distance to the destination or the dropping in place, the destination is changed or the car deviates from or enters in the range of the house map which is stored in the information memory part 37. It may be executed when a change of a running time, a change of a temperature of a drive source (a engine, a motor), a change of a number of rotations of the drive source, a change of the time, a change of remain value of fuel or a change of a voltage or a electric current of a battery (an accumulator, a cell). It may be executed when an environment change around (a change of a light (after a sunset, in a sunset or in a daytime), a temperature, a humidity, a wind pressure, a amount of rainfall (a rainfall, a snow quantity or a noise)). Further the, various sensors are necessary to detect an environment change. For example, the light sensor which is equipped with the photoelectric change device and so on is used for the detect of the light change of the environment.

A division position is not limited especially in the screen of the display 33 in this invention. Moreover in the above embodiments, the screen of the display 33 is divided in the vertical direction and the second window and the third window have equal area. However the display area of the second window may be smaller than the display area of the third window. Oppositely the display area of the second window may be bigger than the display area of the third window. Also when the display screen of display 33 is vertically long, the screen is divided in the horizontal direction and the third window may be an upper screen and the second window may a lower screen. Further the third window in this case means the screen which displays higher necessity map information for the operator. Moreover in the each embodiment, the screen is divided in two but may divided into more than two screens. For example, the second window of the above each embodiment is divided into the horizontal direction and the second window divides into the upper side and the under side. Then the geographical information which is different from may be displayed in each divided screen.

Moreover in the each embodiment, the geographical information is displayed in each of the second window and the third window. It may do as follows. For example, a television picture is displayed in the second window. The map information and so on may be displayed in the third window. Further when the screen division cancellation is indicated by the user in the each embodiment, one map is displayed in the whole screen of display 33. In case of this division cancellation, the map which was displayed in the third window may be displayed in the whole screen of display 33.

(1) In addition to above matter, the screen may be divided up/down or top of the slant/under of the slant and so on except the left/right and the display area of both screens may be different. In this case, the image memory 10 is divided according to these division forms and the addressing of each image memory device is also divided according to these division forms. Also the number of the divided screens may exceed two, and division's number of image memory 10 is increased according to this and the number of the palette RAM 204 and 208 of FIG. 18, 208 also are increased.

(2) The information which is the displayed in the third window 110 (or the second window 108) of FIG. 10 or FIG. 14 may be the simple map of FIG. 17 in addition to the above (1). In this case, the procedure of the step SK16 or SK24 is executed in the steps SC8, SC20, SD12 and SD14 or the steps SC6, SC18, SB18, SB22, SK8 and SK12.

In addition to the above matter, in the step SK4, the operation of the touch switch on the icon which is displayed in display 33 or the switch which corresponds to this icon may be distinguished. This icon is "direction of map".

The operation by the operator according to the icon may be also distinguished in the steps SB4, SB10, SE4, SE12, SG10 and SG4 in addition to the above matter. This icon is "whole route display" in the step SG10, "fore route display" in the step SE12, "reduced scale change" in the step SG4 and SE4, "screen division" in the step SB10 and "division cancellation" in the step SB4.

The map which is displayed in each screen in case of screen division procedure of FIG. 8 may be able to be chosen manually. In this case, when "details" which are displayed by the icon are chosen, the screen is changed to a divided screen which contains a non-turnpike (the backlane or the non-guidable road) and a divided screen displaying only the turnpike (the guidable road) from a whole screen displaying mainly only the turnpike (the guidable road). Also when "outline" which is displayed by the icon is chosen, it is changed to the divided screen displaying only the turnpike and the divided screen which contains a non-turnpike from the whole screen which contains a non-turnpike.

Also the condition of the display map may be also able to be chosen manually in the step SD4 of the third window procedure of FIG. 11. In this case, when "intersection" which is displayed by the icon is chosen, it is changed to the divided screen which shows the turn direction of either side in the intersection or in the turning spot and the divided screen of the road map from the whole screen of the road map. By the above, display contents before the screen division are displayed in one screen after the division and the contents desired to be displayed by the display changing are displayed in the other screen after the division.

(3) In addition to the (1) and (2), the changing to the division display may accept the change of the azimuth of the car. In this case, based on the information from absolute azimuth sensor 21 or relative azimuth sensor 22, the procedure enters to the step SK12→SK14→. . . , the step SK8→SK10→. . . , the step SK20→SK24→. . . , the step SK22→SK24→. . . , if the azimuth of the car shifts the fixed angle (e.g. ±45 degree or ±30 degrees) from "north". Or it may be determined whether the distance to the destination or the dropping in place from the car became less than a fixed distance or not in the step SD2 of FIG. 11. In this case, the category of business, the brand, the price, the name, the telephone number and so on of the destination or the dropping in place are displayed in the third window in the step SD4.

(4) The detailed road map which is north up and contains backlane may be displayed in the second window 108 of FIG. 10, FIG. 14 or FIG. 16 (or the third window 110) in addition to the (1) (2) and (3).

In addition to the above, the step SK2 may be omitted and as the divided screen by each procedure of FIG. 6 is displayed, the procedure may enter to the step SK6→SK7→. . . Or as the divided screen by each procedure of FIG. 19 or FIG. 21 is displayed, the procedure may enter to the step SD2 or the step SD10. The display contents of the divided screen are changed at the same time by this.

In addition to the above, in every divided screen, the icon of "details", "outline", "intersection", "direction of map", "screen division", "reduced scale change", "fore route display", "whole route display" and so on may be displayed, a switch according to this icon may be operated by the operator and the display contents may be individually switched in every divided screen.

(5) As the divided screen by each procedure of FIG. 6, FIG. 19 or FIG. 21 is displayed, it may return to the single screen display in addition to (1) (2) (3) and (4). In this case, the map information which is displayed in this single screen may be the map information which was displayed in either of the divided screen, was not displayed in both of the divided screen or previous map information before the screen division.

In this case, the changing to the single screen based on a change of the distance from the turning spot or the intersection to the car, a above changing operation of the operator, a change of the traveling condition of the car, a change of the speed of the car, a change of the azimuth of the car, a change of the distance to the destination or the dropping in place or so on.

According to this display changing, the steps SK16, SK24, SD4, SC6, SC8, SC18, SC20, SK8, SK10, SK12, SK14, SK20, SK22 and SK24 are the executed. In this case, display information is not a divided screen and is displayed in the whole screen of display 33.

(6) In the FIG. 10, FIG. 14, FIG. 16, FIG. 20, FIG. 24, FIG. 25, FIG. 30, FIG. 32, FIG. 33, FIG. 41, FIG. 42, FIG. 43, FIG. 44, FIG. 51, FIG. 52, and FIG. 68 to FIG. 73 of the above embodiments, the screen which is nearer the driver is the third window 110. However this third window 110 and second window 108 may be switched with each other according to whether the driver's side of the car is on the left or the right or upon a change of the traveling condition of the car. In this case, based on a change of the distance from the turning spot or the intersection to the car, the changing operation of the above operator, a change of the traveling condition of the car, a change of the speed of the car, a change of the azimuth of the car, a change of the distance to the destination or the dropping in place or so on, the change of the computer program of the flow chart of FIG. 6, FIG. 19, FIG. 21, FIG. 22, FIG. 27, FIG. 34, FIG. 35, FIG. 36, FIG. 37, FIG. 38, FIG. 39, FIG. 49, FIG. 64, FIG. 65, FIG. 66 and FIG. 67 is executed.

In this change, the information which is displayed in each divided screen is exchanged with each other in the display procedure of the steps SC6, SC8, SC18, SC20, SD12, SD14, SE120, SG16, SK12, SK14, SK8, SK10, SK20, SK22, SK24, SL12, SL34, SL36, SP14, SP38, SP40, SQ26, SQ28, ST12, ST14, SU12, SV22, SX12, SX14, SX20, SX22, SX62, SX64, SX72, SX94, SX112, SX122, SX123, SX132, SX140, SX141, SX146 and SX147.

Or the information which is displayed in the second window 108 is moved to the third window 110, the information which is displayed in the third window 110 is moved to the second window 108 and both display screens are replaced in the steps SC6 and SC8, the steps SC18 and SC20, the steps C18 and SC20, the steps SK12 and SK14, the steps SK8 and SK10, the steps SK20 and SK22, the step SK20 and the SK24 etc. Therefore the display contents of each divided screen can replace each other.

(7) In addition to the above matter, the map which is displayed in the second window of the a first embodiment may be the map which ranges to north direction, northeastern direction, eastern direction, southeastern direction, south direction, west direction, southwestern direction or northwestern direction of the map which is displayed in the third window. In this case for example, it is determined whether the mode which is determined in the step SB16 of the a first embodiment is the map display mode which connects with (ranges to) the directions or not. Then if the mode is the mode which corresponds to this step SB16, the map display which fits in this mode is executed in the step SB18. For example the map which is displayed in the third window is made the north up screen.

In this case, the map display mode which ranges for east is chosen. Further geographical coordinate detection in the map ranging part is executed in the step SD20 that crossing point CSP in the edge part of the third window in FIG. 11 (the third window display procedure) is detected. In other words, the geographical coordinate of the east edge of the map which is displayed in the third window is detected in this step SD20. Then the map which is connected with the east edge of the map which is the displayed in this third window is displayed in the second window in the step SB18 of FIG. 6 according to the mode choice. Moreover this operation may be detected based on the operation of the operator, the operation of the installation person or so on in the map display of the second window.

Moreover the position of the operator (driver) may be detected by the object detection sensor, e.g. the infrared sensor to have prepared for the navigation device surface and neighborhood or so on. Then the map display procedure of the second window may be executed by the position of this operator. Moreover the map display procedure of the 2nd and third windows may be executed by a change of the traveling condition of the car or a change of the speed of the car which is detected by a speed sensor or so on. Moreover the map display of the 2nd and third windows may be executed by a change of the azimuth of the car which is detected by a relative azimuth sensor. The change of the distance from the turning spot or the intersection to the car, the change of the distance to the destination or the dropping in place are detected by the traveling position of the guide route and the display of the 2nd and third windows may be executed according to the detection result.

(8) In addition to the above matter, the map which is displayed in the third window may be the map information which shows around the car, the start point, the destination, the dropping in place or the chosen optional part. Then the map which connects with one azimuth of all the azimuths of the map which is displayed in this third window may be displayed in the second window. In other words, a map around the destination (the dropping in place, the specification place or so on) is displayed in the third window. Moreover the map which is connected with the map of this third window and contains the guide route which connects from the start point to the destination may be displayed in the second window.

Processing in this case is also executed in the step SD20 of the third window display procedure of FIG. 11 like the (7). In other words, the geographical coordinate which corresponds to the edge of the map which is displayed in the third window is detected in the step SD20. Then the map which connects with the geographical coordinate of the edge of this third window is displayed in the second window in the step SB18 of FIG. 6.

Moreover the map which connects with the third window and is displayed in the second window may be the map which connects on the running prolongation of the car. In other words, a map around the destination is displayed in the third window when the car isn't running on the guide route. The map which connects with the third window is displayed in the second window.

However because the car isn't running on the guide route, the guide route doesn't have to be included in the second window. Additionally the map in the direction which is unrelated to the position of the car or the guide route may be displayed in the second window. Moreover again the display center of the maps which are displayed in the second and third windows may be shifted each other. The display range of each map of the second and the third window doesn't overlap each other and the geographically left maps may be displayed in these screens. The each part of the maps which are displayed in the second and third windows may overlap. This invention isn't the limited to the above embodiments and it is possible to change some kinds in the range which doesn't deviate from the tendency of this invention.

For example the memory medium to store the various data which is shown in FIG. 2 may be the memory medium e.g. a floppy disk or so on which can be rewritten. Moreover the navigation device may be equipped with a voice input device including an analog/digital converter. Then each operation may be executed by the sound direction which is inputted by this voice input device. Also in each embodiment, the screen of one display 33 is divided into two display screens.

It may be implemented by two display devices. In other words, two liquid crystal displays neighbor each other and are arranged in the inside of one box. Then before the division, one map is displayed by two liquid crystal displays. When division is directed, the different map information are displayed in each liquid crystal display. Moreover in the navigation device of this invention, all or partial procedure of the above flow charts may be executed in the information management center of VICS or ATIS etc.

This procedure result (the procedure information) is received with the data transmitter/receiver unit 27. For example the destination setting procedure (step SA3) of FIG. 5 and route search procedure (step SA4) and so on are executed in the information procedure center where map information is accumulated. Then identified guide route data is transferred to the navigation device of this invention through the data transmitter/receiver unit 27. In the navigation device of this invention, the procedure of a guidance display is executed based on the sent guide route data.

In other words, the information of the retrieving condition of the destination or dropping in facilities and the route search condition and so on is sent from the navigation device of this invention to the information management center. In the information management center, the retrieving of the required facilities and the search of the route to the destination are executed based on this condition. Then information about the retrieving, extraction and search result is transmitted to the navigation device from the information management center with the map information and so on. In the navigation device, based on this received retrieving, the extraction and the search result, retrieving facilities are displayed in the display 33. In this way, the retrieving, the extraction, the search of each of facilities are possible based on the details and latest information in each of the facilities around the present position of the car.

Also in case of this facility retrieving, the retrieving which is considered the environment change of the circumference road (establishment of the one-way traffic road and so on) is possible. Further in this case, the information about each of the facilities which are accumulated in the information management center must be always renewed. Moreover the information memory part 37 which stored each program which is explained by this invention and the information of the map and the display symbol and so on may be able to used by the general computer device. In other words, the program which is memorized in information memory part 37 is made the program which can be executed in the general computer.

Then this navigation procedure can be also executed by this computer device, if the device which can detect the present position by GPS reception device 25 and this information memory part 37 are connected with the carrying-type computer device. Moreover this invention can be applied as the vehicle except the car and the navigation device of the shipping, the aircraft and the map which is used for the navigation may be a chart and a submarine map and so on in addition to the road map. Moreover again this invention may be applied to the carrying-type navigation device in addition to the navigation device which is attached to the movement bodies such as the car. In other words, this invention may be applied to the small navigation device which can be accompanied by the human and which is used in a cycling, a travel, a mountaineering, a hike, a fishing or so on.

What is claimed is:

1. A device for displaying a map, comprising:

first means for dividing a screen which displays map information into a Plurality of windows;

second means for showing stored or received first map information in at least one of the plurality of windows; and third means for displaying second map information which is different from said displayed first map information in another window different from the said one window in which said first map information is displayed, wherein a scale of the first map information is the same as the scale of the second map information, and road classification of the first map information is different from road classification of the second map information.

2. The device for displaying a map according to claim 1, wherein said road classification is information about a guidable road and a non-guidable road for navigation, the first map information is information of both the guidable road and the non-guidable road for navigation, and the second map information is information of only the guidable road for navigation.

3. The device for displaying a map according to claim 1, wherein the first map information is displayed by a north up, and the second map information is displayed by a head up.

4. The device for displaying a map according to claim 1, further comprising a detector for detecting a changing of display contents of the screen which displays said map information, means for operating said second means to display map information which is displayed before the changing as the first map information according to said detection result, and for operating said third means to display map information which is to be displayed after said changing as the second map information according to said detection result.

5. The device for displaying a map according to claim 4, wherein the display screen before changing of said display contents isn't divided, and the changing of said display contents is in response to a changing operation of a operator, a change of a traveling condition of a car, a change of a car speed, a change of a azimuth of a car, a change of a distance from a turning point or a intersection or to a car and/or a change in the distance to a destination or a dropping-in place.

6. The device for displaying a map according to claim 1, wherein said first map information and/or the second map information is changed to another map information in order, therefore a part of or all display contents of said divided screen are changed individually in order or at the once, or according to further changing of display contents of the screen, said divided screen is made a single window which isn't divided, map information which is displayed in the single window is the first map information, the second map information, a map information except the first map information and the second map information and/or a previous map information before screen division, and changing of said display contents is according to a changing operation of a operator, a change of a traveling condition of a car, a change of a car speed, a change of an azimuth of a car, a change of a distance from a turning point or an intersection to a car and/or a change of a distance to a destination or a dropping-in place.

7. The device for displaying a map according to claim 1, further comprising means for changing the first map information and the second map information so that the displayed first and second map information replace each other, this replacement being in response to a change of a distance from a point, an operation of an operator, an operation of an installation person, detecting a position of a driver, a change of a traveling condition of a car, a change of a car speed, a change of an azimuth of a car, a change of a distance from an intersection or to a turn point and/or a change of a distance to a destination or a dropping-in place, and the first map information or the second map information is shown in a window of a divided screen which is nearer to a driver.

8. The device for displaying a map according to claim 1, including means for searching a route to the neighborhood of a destination or to a dropping-in place from the neighborhood from a starting place or a present position of a car, said map information being related to said searched route, the first map information is information of a simple map which designates geographical relation between the neighborhood of a starting place or a present position of a car and the neighborhood of a destination or a dropping-in place, and the second map information is detailed geographical information around a present position of a car, or the first map information is based on traveling information of a car in a searched route, and the second map information is detailed geographical information near a present position of a car, or the first map information of is information about a turnpike and a non-turnpike or an object road and a non-object road of a navigation, and the second map information is information only about a turnpike or an object road of a navigation, or the first map information is displayed by north up and the second map information is displayed by head up, or the first map information is information of a map which maintained an absolute azimuth in the north to the direction of either window, and the second map information is information of a map which maintained the moving direction of a car to the direction of either window.

9. A device for displaying a map, comprising:

first means for dividing a screen which displays map information into a plurality of windows;

means for displaying stored or received first map information relating to a first guide route in at least one window of said plurality of windows; and third means for displaying second map information related to a second guide route which is different from said displayed first map information in another window of said plurality of windows different from said one window in which said first map information is displayed, the first map information is shown by specified processing, and the second map information is map information which is joined or connected to the first map information.

10. The device for displaying a map according to claim 9, wherein the first map information is information of a simple map which designates geographical relation between a neighborhood of a starting place or a present position of a car and a neighborhood of a destination or a dropping-in place or map information designated a neighborhood of a car, and the second map information is map information which is joined to the first map information and indicates map information of a connection or destination direction of a car or a map information between a neighborhood of a starting place or a present position of a car and a neighborhood of a destination or a dropping-in place.

11. The device for displaying a map according to claim 9, wherein said map information includes guidable road information, non-guidable road information of a navigation, first map information or/and the second map information.

12. The device for displaying a map according to claim 9, further comprising a detector for detecting a changing of display contents of the screen which displays said map information, means for operating said second means to display map information which is displayed before the changing as the first map information according to said detection result, and for operating said third means to display map information which is to be displayed after said changing as the second map information according to said detection result.

13. The device for displaying a map according to claim 12, wherein the display screen before changing of said display contents isn't divided, and the changing of said display contents is in response to a changing operation of a operator, a change of a traveling condition of a car, a change of a car speed, a change of a azimuth of a car, a change of a distance from a turning point or a intersection or to a car and/or a change in the distance to a destination or a dropping-in place.

14. The device for displaying map according to claim 9, wherein reduced scales of maps which are displayed in divided screens are changed individually or is connected and changed.

15. The device for displaying a map according to claim 9, wherein said first map information and/or the second map information is changed to another map information in order, therefore a part of or all display contents of said divided screen are changed individually in order or at the once, or according to further changing of display contents of the screen, said divided screen is made a single window which isn't divided and the first map information, the second map information, map information except the first map information and the second map information or the previous map information before screen division are displayed in the single window, and changing of said display contents is according to a changing operation of a operator, a change of a traveling condition of a car, a change of a car speed, a change of an azimuth of a car, a change of a distance from a turning point or an intersection to a car and/or a change of a distance to a destination or a dropping-in place.

16. The device for displaying a map according to claim 9, further comprising means for changing the first map information and the second map information so that the displayed first and second map information replace each other, this replacement being in response to a change of a distance from a point, an operation of an operator, an operation of an installation person, detecting a position of a driver, a change of a traveling condition of a car, a change of a car speed, a change of an azimuth of a car, a change of a distance from an intersection or to a turn point and/or a change of a distance to a destination or a dropping-in place, and the first map information or the second map information is shown in a window of a divided screen which is nearest to a driver.

17. The device for displaying a map according to claim 9, wherein the first map information is displayed by north up and the second map information is displayed by head up, or one of the first map information and the second map information is information of a map which maintained an absolute azimuth in the north to the direction of either window, the other is information of a map which maintained in the moving direction of a car to the direction of either window, or the first map information and the second map information have the same reduced scale or different reduced scale from each other, the second map information connects the north, the northeast, the east, the southeast, the south, the southwest, the west or the northwest of the first map information, and this replacement is in response to a change of a distance from a point, an operation of an operator, an operation of an installation person, detecting a position of a driver, a change of a traveling condition of a car, a change of a car speed, a change of an azimuth of a car, a change of a distance to an intersection or turn point and/or a change of a distance to a destination or a dropping-in place.

18. The device for displaying a map according to claim 9, wherein the above first map information is map information which indicates a car, a start place, a destination, a dropping-in place or a neighborhood of a chosen optional part, said second map information is information of a map which connects with this first map information, a map of this second map information matches with a map of said first map information or matches with the ahead or behind along a progress direction of a car or identifies a route to a map of said first map information, and a center of a display of each map is shifted relative to each other and a display range of each map doesn't overlap each other or overlaps in the part.

19. A navigation device for displaying a map, comprising:

first means for dividing a display screen into a plurality of windows;

second means for displaying first guide route information relating to a first guide route in at least one window of the plurality of windows; and third means for displaying a second guide route information relating to a second guide route which is different from said displayed first guide route in another window of the plurality of windows.

20. The navigation device according to claim 19, wherein the device is a navigation device for guiding a vehicle along a route according to a beforehand set route, and further comprises means for searching another route which is different from the beforehand set route, and means for displaying information of the beforehand set route as the first guide route information in the at least one window, and for displaying information of the another route which is different from the first guide route information as second guide route information in the another window.

21. The navigation device according to claim 19, wherein the device is a navigation device for guiding a vehicle along a route according to a previous set route, and further comprises means for searching a new route when a new route search is directed in response to a car deviating from the previous set route, means for displaying information of the previous set route as the first guide route information in the at least one window, and for displaying information of the new route as the second guide route information in the another window.

22. The navigation device according to claim 19, wherein the first and second guide route information are identified and received information of a route from car start point or a neighborhood of a present position to an inputted destination or a neighborhood of a dropping-in place or is information of a route which connects a guide route from which a car deviates and the present position of a car.

23. The navigation device according to of claim 19, wherein every time a search direction is input, the first guide route information and/or the second guide route information is changed to the other guide route information.

24. The navigation device according to claim 19, wherein every time a search direction is input, the first guide route information is changed to the second guide route information and the second guide route information is changed to identified or received new guide route information.

25. The navigation device according to claim 19 wherein the first and second guide route information includes the main name of a guide route, a name of a passage point, full length of the guide route and/or required passage time.

26. The navigation device according to claim 19, wherein when one of the first and second guide route information is chosen, guidance by a chosen guide route is begun, the screen is made a single window which displays only a chosen guide route.

27. A navigation device for guiding a route according to set guide route information, comprising:

first means for outputting guidance information to a display device which displays guide route information;

second means for searching different guide route information from the previous set guide route information;

third means for dividing a display screen of said display device into a plurality of windows, when the guide route information which is different from the previous guide route information is identified by said second means for searching;

fourth means for displaying first guide route information of the previous guide route information in at least one window of the plurality of windows;

and fifth means for displaying second guide route information of the different guide route information from the previous set guide route information in another window of the plurality of windows.

28. The navigation device according to claim 27, including second means for searching different guide route information from the previous set guide route information in response to a present position or a car deviating from the previous guide route information.

29. The navigation device according to claim 27, wherein the different guide route information from the previous set guide route information is return route information for guidance to the searched route, a destination, a dropping or the previous set guide route.

30. The navigation device according to claim 27, wherein the searched route or the previous set route is displayed in the another window, and display reduced scale of each divided screen is the same as a display reduced scale of a screen which was displayed before division.

31. The navigation device according to claim 27, wherein said navigation device also displays a leaving route to a present position from a leaving spot when a present position deviates from the above search route, said navigation device also displays a non-running route to the return spot from the above leaving spot in the search route, and/or the above navigation device also displays a geographical relation between the return route and the search route.

32. The navigation device according to claim 27, wherein a display is controlled for the whole return route to be displayed in a divided screen and display reduced scale is decided for this whole return route to be displayed in a divided screen in this display control, a display is also controlled for the whole leaving route to be displayed in a divided screen and display reduced scale is decided for this whole leaving route to be displayed in a divided screen in this display control, or a display is also controlled for the whole non-running route to be the displayed in a divided screen and display reduced scale is decided for of this non-running route approximately generally to be displayed in a divided screen in this display control.

33. The navigation device according to claim 27, wherein in a route which is displayed in a divided screen, a present position becomes a center of a window of the screen, an absolute azimuth in the north is maintained to the direction of either two windows of the screen, and/or the progress direction of a present position is maintained to the direction of another window of the two windows of the screen.

34. The navigation device according to claim 27, wherein the divided screen is formed in response to deviation of a present position from search route, changing operation of an operation person, a change of a running condition of a present position, a change of speed of a present position, a change of an azimuth of a present position, a change of a distance from a turning point or an intersection or to a present position and/or a change of a distance to a destination or a dropping-in place, this divided screen is combined back into a single window in response to a change of a distance to search route, changing operation of an operation person, a change of a running condition of a present position, a change of speed of a present position, a change of an azimuth of a present position, a change of a distance from a turning point or an intersection to a present position and/or a change of a distance to a destination or a dropping-in place, and map information which was displayed before screen division, a previous search route or map information which includes a present position is displayed in the screen after combination.

35. A device for displaying a map, comprising:

first means for retrieving information of a geographical object and information which indicates a place of this geographical object and a lot of memorized geographical objects;

second means for setting at least one retrieving condition by this reference;

third means for outputting a retrieving result;

fourth means for dividing a display screen of said display means into a plurality of windows having the same scale; and fifth means for displaying different information in a retrieving condition and/or a retrieving result in each of these plurality of windows.

36. The device for displaying a map according to claim 35, wherein the retrieving condition and the retrieving result are displayed in each of the plurality of windows, or a way result and a last result of retrieving are displayed in each of the plurality of windows, or plural different retrieving conditions are displayed in each of the plurality of windows, or a result which is retrieved by a different retrieving condition is displayed in each of the plurality of windows, or the retrieving conditions and the retrieving result are displayed, or in plural retrieving processing which are executed by a series of retrieving procedures, plural new retrieving processing content is displayed by this retrieving procedure.

37. The device for displaying map according to claim 35, wherein for the retrieving way result or all last retrieving results to be displayed in a display map, a display reduced scale of each divided screen is decided.

38. The device for displaying map according to claim 35, wherein the retrieving condition is, a condition to specify an area with all or a part of distinguishing numbers which specify an area, a condition of a street in this area to specify or extract, a condition to extract a geographical object which is in this street neighborhood in a distance from the street, a condition to extract a geographical object by a genre, business contents and/or a price of goods/service, a condition to extract a geographical object in business time or a business list of articles, a condition to extracts a geographical object by existing number of floors of building/facility of the geographical object, a condition to extract a geographical object by a distance from a present position, a car or a guide route, it is one to have combined at least one condition from a condition to extract a geographical object by the direction of a relative position from a present position, a car or a guide route, and these combinations are changed according to a changing order or fixed condition.

39. A computer program for displaying a map, comprising:

a first processing procedure for dividing a screen which displays map information into a plurality of windows;

a second processing procedure for showing stored or received a first map information in at least one window of the plurality of windows;

and a third processing procedure for displaying a second map information which is different from said displayed first map information in another window of the plurality of windows, a scale of a map of the first map information being the same as the scale of a map of the second map information, and road classification of a map of the first map information being different from road classification of a map of the second map information.

40. A computer program for displaying a map, comprising:

a first processing procedure for dividing a screen which displays map information into a plurality of windows;

a second processing procedure for displaying stored or received first map information in at least one window of the plurality of windows; and a third processing procedure for displaying second map information which is different from said displayed first map information in another window of the plurality of windows, the first map information being shown by specified processing, and the second map information being map information which is joined to the first map information.

41. A computer program for displaying a map, comprising:

a first processing procedure for dividing a display screen into a plurality of windows;

a second processing procedure for displaying first guide route information relating to a first guide route in at least one window of the plurality of windows; and a third processing procedure for displaying a second guide route information relating to a second guide route which is different from said displayed first guide route in another window of the plurality of windows.

42. A computer program for guiding a route according to set guide route information, comprising:

a first processing procedure for outputting guidance information to a display device which displays guide route information;

a second processing procedure for searching different guide route information from the previous set guide route information;

a third processing procedure for dividing a display screen of said display device into a plurality of windows, when the guide route information which is different from the previous guide route information is identified by said second processing procedure for searching;

a fourth processing procedure for displaying first guide route information of the previous guide route information in at least one window of the plurality of windows;

and a fifth processing procedure for displaying second guide route information of the different guide route information from the previous set guide route information in another window of the plurality of windows.

43. A computer program for displaying a map, comprising:

a first processing procedure for retrieving a geographical object to information which indicates a place of this geographical object and a lot of memorized geographical objects;

a second processing procedure for setting at least one retrieving condition by reference;

a third processing procedure for outputting a retrieving result;

a fourth processing procedure for dividing a display screen of said display means into a plurality of windows; and a fifth processing procedure for displaying different information in a retrieving condition and/or a retrieving result in each of these plurality of windows at the same scale.

* * * * *

UNITED STATES PATENT AND TRADEMARK OFFICE
CERTIFICATE OF CORRECTION

PATENT NO. : 6,067,502
DATED : May 23, 2000
INVENTOR(S) : Hayashida et al.

It is certified that error appears in the above-identified patent and that said Letters Patent is hereby corrected as shown below:

<u>Column 30,</u>
Line 8, "Ioo" should read -- 100 --.

<u>Column 54,</u>
Line 66, "a" should read -- $\alpha$ --.

<u>Column 56,</u>
Line 35, "c" should read -- $\varepsilon$ --.

Signed and Sealed this

Eighth Day of March, 2005

JON W. DUDAS
*Director of the United States Patent and Trademark Office*